US010009391B1

(12) United States Patent
Smith et al.

(10) Patent No.: US 10,009,391 B1
(45) Date of Patent: Jun. 26, 2018

(54) APPARATUS AND METHOD FOR ACQUIRING, MANAGING, SHARING, MONITORING, ANALYZING AND PUBLISHING WEB-BASED TIME SERIES DATA

(71) Applicant: Leading Market Technologies, Inc., Boston, MA (US)

(72) Inventors: James Kemp Smith, Boston, MA (US); Steven Nelson Clark, Cambridge, MA (US)

(73) Assignee: Leading Market Technologies, Inc., Boston, MA (US)

( * ) Notice: Subject to any disclaimer, the term of this patent is extended or adjusted under 35 U.S.C. 154(b) by 588 days.

(21) Appl. No.: 14/603,022

(22) Filed: Jan. 22, 2015

Related U.S. Application Data

(63) Continuation-in-part of application No. 13/801,827, filed on Mar. 13, 2013.

(60) Provisional application No. 61/653,818, filed on May 31, 2012.

(51) Int. Cl.

| | |
|---|---|
| ***G06F 17/30*** | (2006.01) |
| ***H04L 29/06*** | (2006.01) |
| ***G06F 3/0483*** | (2013.01) |
| ***G06F 3/0485*** | (2013.01) |
| ***G06F 3/0482*** | (2013.01) |
| ***G06F 3/0481*** | (2013.01) |

(52) U.S. Cl.
CPC .......... *H04L 65/403* (2013.01); *G06F 3/0482* (2013.01); *G06F 3/0483* (2013.01); *G06F 3/0485* (2013.01); *G06F 3/04817* (2013.01); *G06F 17/30893* (2013.01)

(58) Field of Classification Search
CPC ......... G06F 17/30828; G06F 17/30265; G06F 17/30843; G06F 17/30893
USPC .................................................. 707/783, 784
See application file for complete search history.

(56) References Cited

U.S. PATENT DOCUMENTS

| | | | | |
|---|---|---|---|---|
| 5,953,439 A | 9/1999 | Ishihara et al. | | |
| 6,513,019 B2 | 1/2003 | Lewis | | |
| 7,617,172 B2 | 11/2009 | Ramsey et al. | ................ | 706/53 |
| 8,281,121 B2 | 10/2012 | Nath et al. | | |

(Continued)

*Primary Examiner* — James Trujillo
*Assistant Examiner* — Fariborz Khoshnoodi
(74) *Attorney, Agent, or Firm* — Sunstein Kann Murphy & Timbers LLP

(57) ABSTRACT

A computer-implemented method of providing time series data includes maintaining by a web server user account data for each of a plurality of user accounts. Each account is associated with a user. The method includes maintaining, and repeatedly updating, in normative formats, on a time series server, a set of time series. In some aspects, the method further includes, for each user having a user account, serving by the time series server a distinct time series name for each member of the set of time series in a web page over a wide area network to a client computer of the user for display in a browser thereof in such a manner that, when the given user graphically selects the name of a given one of the time series in the browser for invoking a functionality provided by the time series server, there is provided to the server by the browser a unique location identifier of an underlying location, of the selected time series, wherein data for the time series is stored on the server.

7 Claims, 88 Drawing Sheets
(83 of 88 Drawing Sheet(s) Filed in Color)

(56) References Cited

U.S. PATENT DOCUMENTS

| | | | | |
|---|---|---|---|---|
| 2006/0202037 | A1* | 9/2006 | Gunawardena | G06F 19/3418 235/462.15 |
| 2007/0266118 | A1 | 11/2007 | Wilkins | |
| 2008/0215546 | A1* | 9/2008 | Baum | G06F 17/30551 |
| 2008/0244070 | A1 | 10/2008 | Kita et al. | |
| 2010/0070899 | A1 | 3/2010 | Hunt et al. | |
| 2012/0290833 | A1 | 11/2012 | Clegg et al. | |

* cited by examiner

*Fig. 6*
THE WALL STREET JOURNAL.
PROFESSIONAL WITH FACTIVA
Wall Street
Heard on the Street
Stocks
Mutual Funds & ETFs
Bonds
Commodities
Currencies
General Electric Co.
19.35
19.36
TRADE FREE
Quote
News
Chart
Research and Ratings
Company & People
Financials
Income Statement
Balance Sheet
Cash Flow
Ratios and Margins
Net Income Growth
Sales or Revenue
Sales or Revenue Growth
EBITDA
2011
5 year trend
142.24 B
Most P

| Employment by Sector | Dec 2011 | Jan 2012 | Feb 2012 | Mar 2012 | Apr 2012 |
|---|---|---|---|---|---|
| Construction | 14.0 | 14.1 | 14.2 | 14.1 | 14.5 |
| Durable Goods | 21.5 | 21.6 | 22.0 | 22.0 | 21.9 |
| Education & Health Services | 60.9 | 60.9 | 60.9 | 60.8 | 60.5 |
| Financial Activities | 11.9 | 11.9 | 11.9 | 12.1 | 12.0 |
| Government | 52.7 | 52.2 | 52.4 | 52.8 | 52.0 |
| Leisure & Hospitality | 33.4 | 32.8 | 32.4 | 32.6 | 31.2 |
| Manufacturing | 30.6 | 30.8 | 31.1 | 31.2 | 30.9 |
| Non-Durable Goods | 9.1 | 9.2 | 9.1 | 9.2 | 9.0 |
| Other Services | 9.8 | 9.5 | 9.6 | 9.8 | 9.8 |
| Professional & Business Services | 25.8 | 25.7 | 26.4 | 26.2 | 26.9 |
| Retail Trade | 37.9 | 38.8 | 38.9 | 38.5 | 38.8 |
| Total Nonfarm | 301.4 | 300.8 | 301.8 | 301.9 | 300.4 |
| Trade, Transportation, & Utilities | 56.7 | 57.3 | 57.3 | 56.7 | 56.9 |
| Transportation & Utilities | 8.9 | 8.8 | 8.9 | 8.8 | 8.5 |
| Wholesale Trade | 9.9 | 9.7 | 9.5 | 9.4 | 9.6 |

Note: *All Employees in Thousands (Seasonally Adjusted)* Source:

Published by University of Texas - BBR.

(embed) (download) (share) (viewer)

Figure 20:
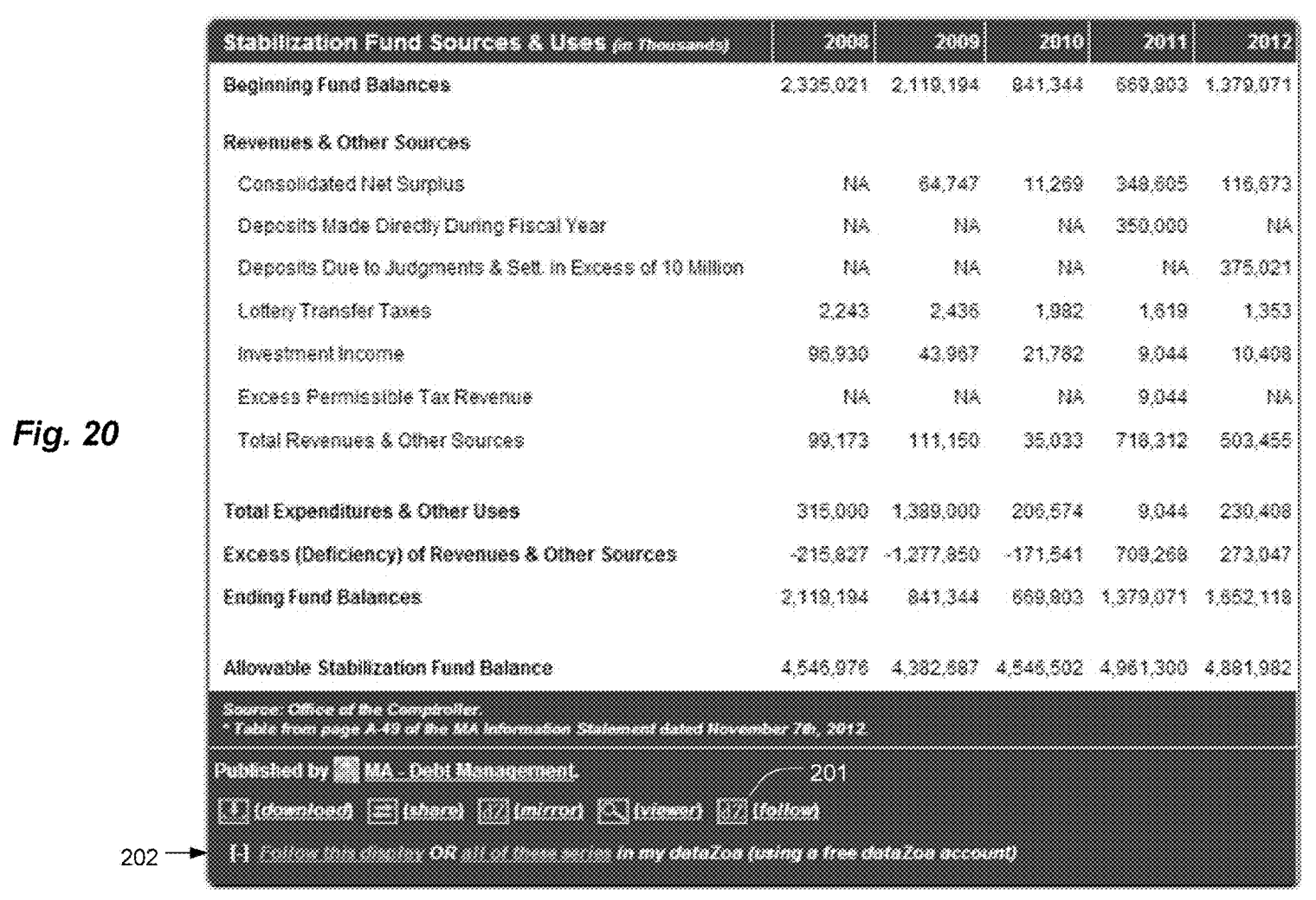

| Stabilization Fund Sources & Uses *(in Thousands)* | 2008 | 2009 | 2010 | 2011 | 2012 |
|---|---|---|---|---|---|
| **Beginning Fund Balances** | 2,335,021 | 2,119,194 | 841,344 | 669,803 | 1,379,071 |
| **Revenues & Other Sources** | | | | | |
| Consolidated Net Surplus | NA | 64,747 | 11,269 | 349,605 | 116,673 |
| Deposits Made Directly During Fiscal Year | NA | NA | NA | 350,000 | NA |
| Deposits Due to Judgments & Sett. in Excess of 10 Million | NA | NA | NA | NA | 375,021 |
| Lottery Transfer Taxes | 2,243 | 2,436 | 1,982 | 1,619 | 1,353 |
| Investment Income | 96,930 | 43,967 | 21,782 | 9,044 | 10,408 |
| Excess Permissible Tax Revenue | NA | NA | NA | 9,044 | NA |
| Total Revenues & Other Sources | 99,173 | 111,150 | 35,033 | 718,312 | 503,455 |
| **Total Expenditures & Other Uses** | 315,000 | 1,389,000 | 206,574 | 9,044 | 230,408 |
| **Excess (Deficiency) of Revenues & Other Sources** | -215,827 | -1,277,850 | -171,541 | 709,268 | 273,047 |
| **Ending Fund Balances** | 2,119,194 | 841,344 | 669,803 | 1,379,071 | 1,652,118 |
| **Allowable Stabilization Fund Balance** | 4,546,976 | 4,382,697 | 4,546,502 | 4,961,300 | 4,891,982 |

*Source: Office of the Comptroller.*
** Table from page A-49 of the MA Information Statement dated November 7th, 2012*

Published by MA - Debt Management.

(download) (share) (mirror) (viewer) (follow) 201

202 [ ] *Follow this display OR all of these series in my dataZoa (using a free dataZoa account)*

| Total Passenger Counts by Region in Sep 2012 | Latest Value | Difference from Year Ago | Percent Change from Year Ago |
|---|---|---|---|
| Grand Total | 3,831,358 | 257,825 | 7.21% |
| US | 2,993,321 | 207,106 | 7.43% |
| Asia | 331,381 | 11,292 | 3.53% |
| Australia / Oceania | 34,955 | 2,110 | 6.42% |
| Canada | 129,594 | 6,065 | 4.91% |
| Central America | 9,191 | 718.0 | 8.47% |
| Europe | 261,029 | 14,339 | 5.81% |
| Mexico | 49,906 | 14,560 | 41.19% |
| Middle East | 16,965 | 942.0 | 5.88% |
| South America | 5,016 | 693.0 | 16.03% |

Published by San Francisco International Airport (download) (embed) (follow) 211

[-] Follow this display OR all of these series in my dataZoa (using a free dataZoa account)

Fig. 21

Figure 26:
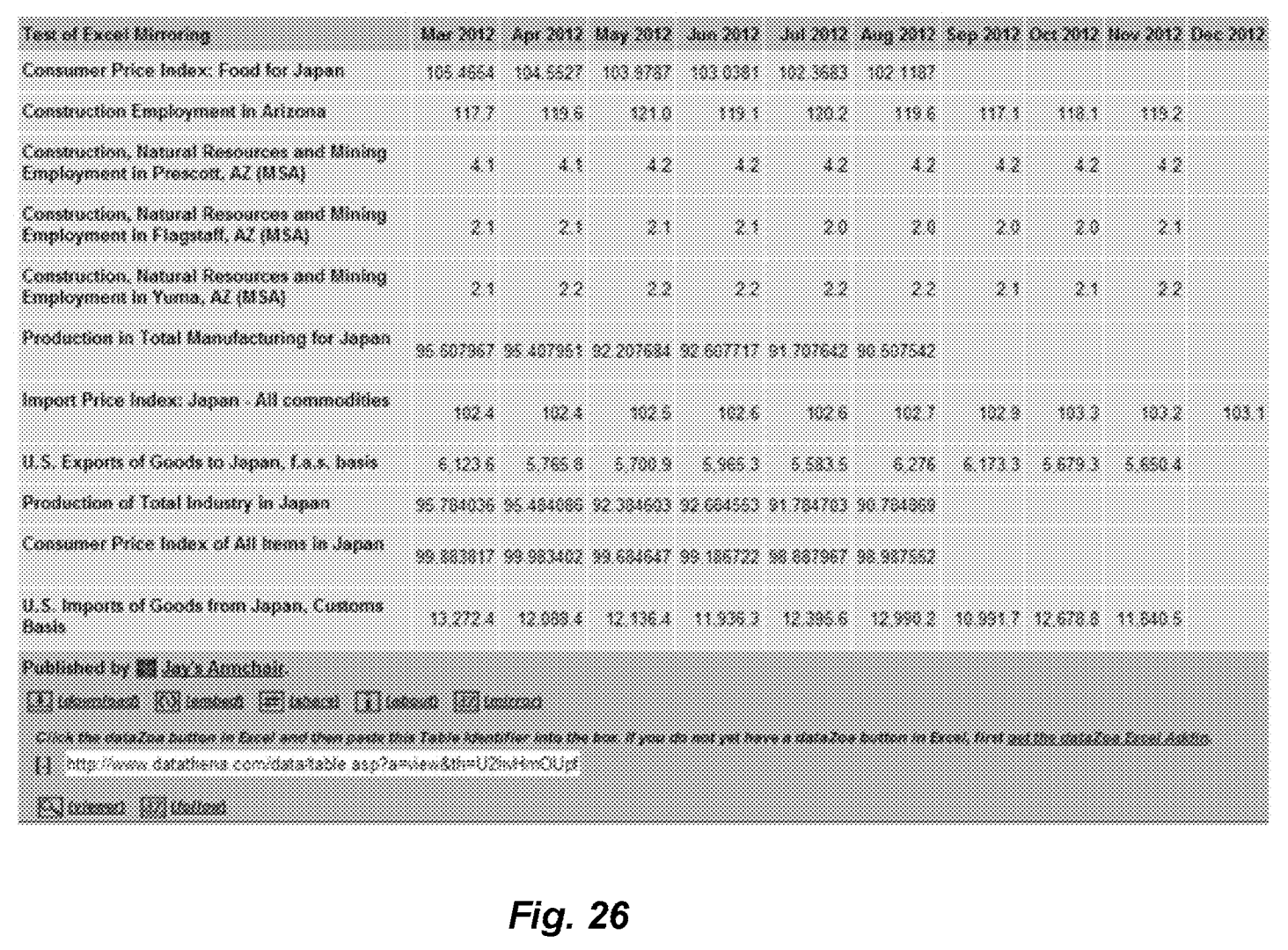

| Test of Excel Mirroring | Mar 2012 | Apr 2012 | May 2012 | Jun 2012 | Jul 2012 | Aug 2012 | Sep 2012 | Oct 2012 | Nov 2012 | Dec 2012 |
|---|---|---|---|---|---|---|---|---|---|---|
| Consumer Price Index: Food for Japan | 105.4654 | 104.5527 | 103.8787 | 103.0381 | 102.3683 | 102.1187 | | | | |
| Construction Employment in Arizona | 117.7 | 119.6 | 121.0 | 119.1 | 120.2 | 119.6 | 117.1 | 118.1 | 119.2 | |
| Construction, Natural Resources and Mining Employment in Prescott, AZ (MSA) | 4.1 | 4.1 | 4.2 | 4.2 | 4.2 | 4.2 | 4.2 | 4.2 | 4.2 | |
| Construction, Natural Resources and Mining Employment in Flagstaff, AZ (MSA) | 2.1 | 2.1 | 2.1 | 2.1 | 2.0 | 2.0 | 2.0 | 2.0 | 2.1 | |
| Construction, Natural Resources and Mining Employment in Yuma, AZ (MSA) | 2.1 | 2.2 | 2.2 | 2.2 | 2.2 | 2.2 | 2.1 | 2.1 | 2.2 | |
| Production in Total Manufacturing for Japan | 95.607967 | 95.487951 | 92.207684 | 92.607717 | 91.707642 | 90.507542 | | | | |
| Import Price Index: Japan - All commodities | 102.4 | 102.4 | 102.5 | 102.6 | 102.6 | 102.7 | 102.9 | 103.3 | 103.2 | 103.1 |
| U.S. Exports of Goods to Japan, f.a.s. basis | 6,123.6 | 5,765.8 | 5,700.9 | 5,965.3 | 5,583.5 | 6,276 | 6,173.3 | 5,679.3 | 5,650.4 | |
| Production of Total Industry in Japan | 95.784036 | 95.484086 | 92.384603 | 92.684563 | 91.784703 | 90.784868 | | | | |
| Consumer Price Index of All Items in Japan | 99.883817 | 99.983402 | 99.684647 | 99.185722 | 98.887967 | 98.987552 | | | | |
| U.S. Imports of Goods from Japan, Customs Basis | 13,272.4 | 12,989.4 | 12,136.4 | 11,936.3 | 12,395.6 | 12,990.2 | 10,991.7 | 12,678.8 | 11,840.5 | |

Published by Jay's Armchair.

Click the dataZoa button in Excel and then paste this Table Identifier into the box. If you do not yet have a dataZoa button in Excel, first get the dataZoa Excel Addin.

http://www.datathens.com/data/table.asp?a=view&th=U2lxHmOUpl

*Fig. 29*
Log Out
dataZoa
TM
DZState: Widgets
Patrick, it would be great if you could update me with the latest month's data. Just activate this DZState, add the latest values and save. This will transmit your updates to me right away. Thanks! Best, Jay
Widgets
Passworded. Hint is: the usual password
Series count: 3

Figure 49:
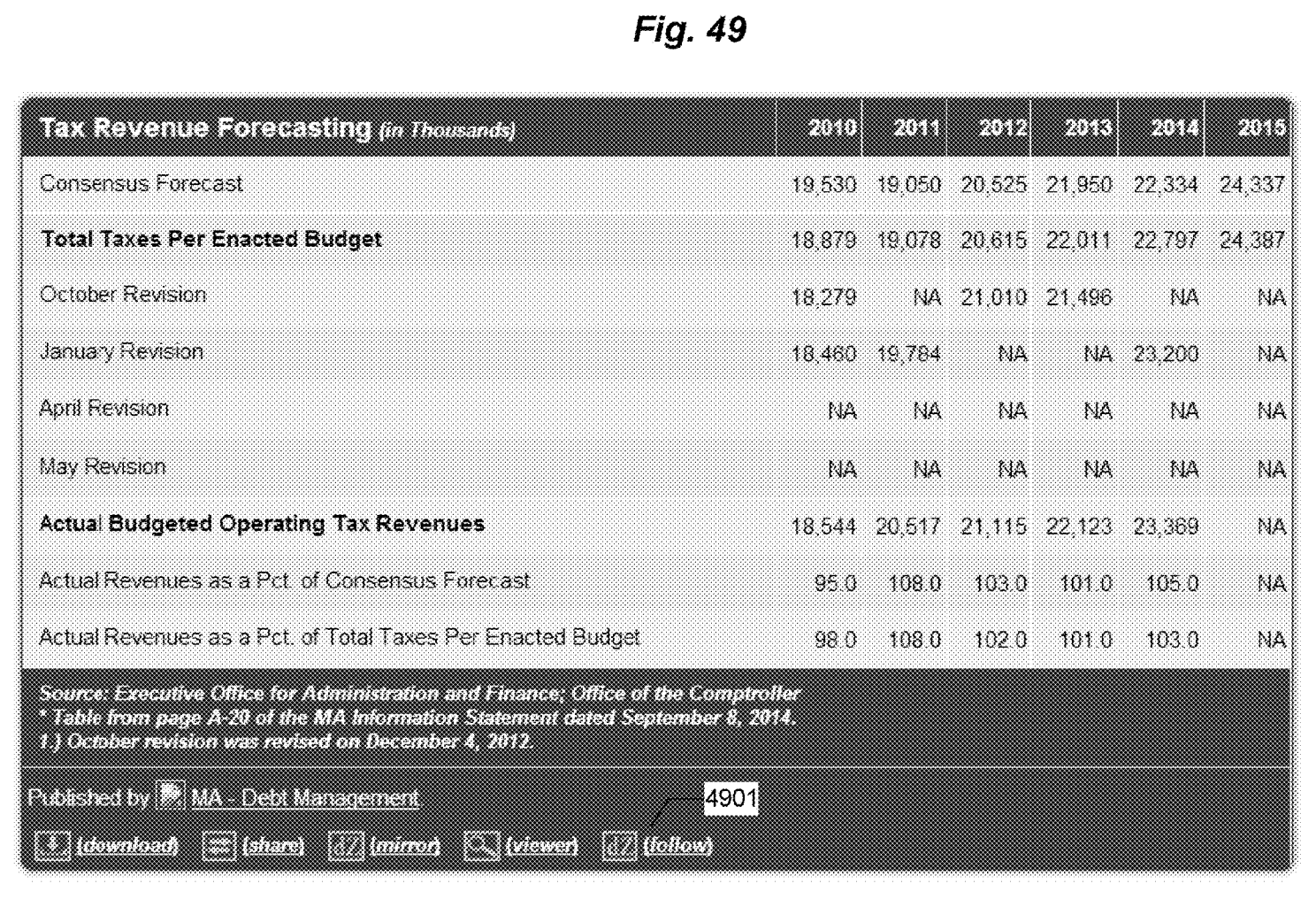

| Tax Revenue Forecasting *(in Thousands)* | 2010 | 2011 | 2012 | 2013 | 2014 | 2015 |
|---|---|---|---|---|---|---|
| Consensus Forecast | 19,530 | 19,050 | 20,525 | 21,950 | 22,334 | 24,337 |
| **Total Taxes Per Enacted Budget** | 18,879 | 19,078 | 20,615 | 22,011 | 22,797 | 24,387 |
| October Revision | 18,279 | NA | 21,010 | 21,496 | NA | NA |
| January Revision | 18,460 | 19,784 | NA | NA | 23,200 | NA |
| April Revision | NA | NA | NA | NA | NA | NA |
| May Revision | NA | NA | NA | NA | NA | NA |
| **Actual Budgeted Operating Tax Revenues** | 18,544 | 20,517 | 21,115 | 22,123 | 23,369 | NA |
| Actual Revenues as a Pct. of Consensus Forecast | 95.0 | 108.0 | 103.0 | 101.0 | 105.0 | NA |
| Actual Revenues as a Pct. of Total Taxes Per Enacted Budget | 98.0 | 108.0 | 102.0 | 101.0 | 103.0 | NA |

*Source: Executive Office for Administration and Finance; Office of the Comptroller*
** Table from page A-20 of the MA Information Statement dated September 8, 2014.*
*1.) October revision was revised on December 4, 2012.*

Published by MA - Debt Management

4901

(download) (share) (mirror) (viewer) (follow)

Fig. 70

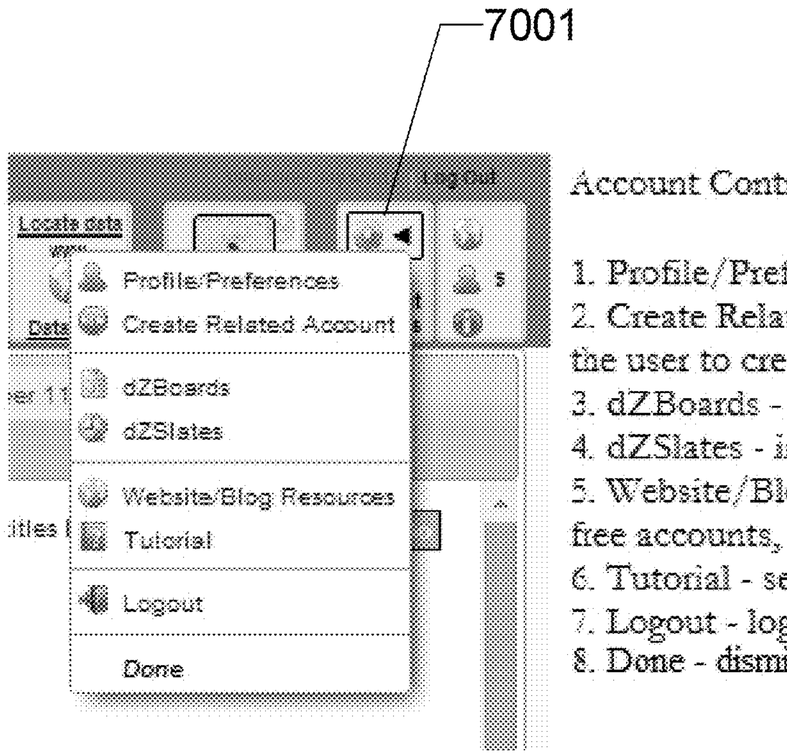

7002

Account Controls Menu

1. Profile/Preferences -- Set User Account Options
2. Create Related Account -- For Institutional Accounts this enables the user to create another account with equivalent privileges.
3. dZBoards - invokes dZBoards
4. dZSlates - invokes dZSlates
5. Website/Blog Resources - offers embedable tools for users to open free accounts, get the dZ-Dot and download dataZephyr.
6. Tutorial - sends user to a tutorial section on how to use dataZoa
7. Logout - logs the user out of their account.
8. Done - dismisses the account controls menu

Fig. 71

Home | Workbench | dZBoards | dZSlates | JKSMITH_LMTECH's Profile |
User name... JKSMITH_LMTECH
Original email... jksmith@lmtech.com
Name :: Jay Smith
Organization :: Economic Institute
Current email :: jksmith@lmtech.com
Mobile for SMS :: & (test)
Website :: www.LMTECH.com
Favicon :: http://www.marketbrowser.com/favicon.ico
TimeZone :: GMT -5 hours
Pagesize :: 50
Share Acceptance :: Accept all shares
Suppress Watermark :: False
[ edit ] [ api key ] [ get the dZ-viewer ] [ get dataZephyr-PRO ]
[ host info ] [ account info ]
[ cancel ] [ status of my subscription ]

User Profile Settings —— 7101

1. User Account Name
2. User original email address
3. User name
4. User Organization
5. Current User email address
6. User's mobile phone for sending displays, tabs & dZBoards to self
7. User's web site URL
8. Location of Favicon to be Used by user account
9. User's time zone Preferences:
10. Pagesize - Number of series to show in one page of the workbench
11. Share Acceptance -- option to accept data shared by others to the user. Options include (i) Accept all shares, (ii) Accept no shares, (iii) Accept all related Account shares, and (iv) Accept shares only from Related Account Leader (this is the main account associated with a group of accounts)
12. Suppress "Powered by dataZoa" Watermark in Displays - only to early account holders.
13. Edit - change profile settings
14. api key - get a key for using the dataZoa api
15. download the free dZ-Viewer known as dataZephyr
16. download the Pro Edition of dataZephyr for accounts having this access level
17. Host Info -- displays information about the cluster where the user account is located.
18. Account Info -- displays various account-spefic attributes such as number of total series, owned series, dZ-Dot series, displays of each type, dZBoards, dZBoard entries, date of account opening, userID, account ID, account type (level of resource privileges), and related accounts leader.
19. Status of my subscription -- shows user's subscription history, charge history and transaction history.
20. Cancel - cancels user's recurring subscription

APPARATUS AND METHOD FOR ACQUIRING, MANAGING, SHARING, MONITORING, ANALYZING AND PUBLISHING WEB-BASED TIME SERIES DATA

RELATED APPLICATION

The present application is a continuation in part of application Ser. No. 13/801,827, filed Mar. 13, 2013, entitled "Apparatus and Method for Acquiring, Managing, Sharing, Monitoring, Analyzing and Publishing Web-Based Time Series Data," (Our Prior Application") which claims priority from U.S. provisional application Ser. No. 61/653,818, filed May 31, 2012. These related applications are hereby incorporated herein by reference in their entirety.

TECHNICAL FIELD

The present invention relates to web pages, and more particularly to apparatus and methods for acquiring and managing time series data extracted from web pages, as well as the transformation, publication, sharing and use by and among individuals, of this data.

BACKGROUND ART

It is well known in the prior art to serve web pages to web browsers running on client computers. Many web pages include time series data. Typically the time series data are in a wide range of formats. A person desiring to acquire, monitor, manage, and analyze time series data found on web pages must therefore be prepared to handle this range of formats.

SUMMARY OF THE EMBODIMENTS

In a first embodiment of the invention there is provided a computer-implemented method of acquiring and managing web-based time series data.
The method of this embodiment uses computer processes including:
receiving over a network, from a requesting process running on one of a client computer and a server, at least a URL for web-based time series data; resolving the web-based time series data by using the URL to access the web-based time series data, extracting the web-based time series data, and converting the extracted web-based time series data into a normative format to produce normalized time series data; and transmitting over the network the normalized time series data to the requesting process.

In a related embodiment receiving includes receiving contextual data with the URL and using includes using the URL with the contextual data. Alternatively or in addition, converting the extracted web-based time series data includes (i) using the URL to select a previously derived and stored normalization process appropriate for the web-based time series data; and (ii) running the stored normalization process. Optionally, converting the extracted web-based time series data includes (i) using the URL and the contextual data to select a previously derived and stored normalization process appropriate for the web based time series data; and (ii) running the stored normalization process.

In another related embodiment, the web-based time series data is displayed on a web page running in a browser of a client computer. In this embodiment the method further includes serving, to a client process running in the browser, from dot data storage, algorithmic data pertinent to time series data available from the URL, such algorithmic data causing the client process to populate the web page displayed on the browser with at least one active marker, such marker indicating the presence of time series data available via the web page, and located on the displayed web page adjacent to the time series data, so that, when the active marker is graphically invoked on the client computer, the algorithmic data in cooperation with the client process, will trigger transmission of the URL to a server and invoke the processes of receiving, resolving, and transmitting. In another embodiment, the invention provides a computer-implemented method of handling time-series data. The method of this embodiment includes: receiving over a network from a client computer browser process a user-initiated request to monitor time series data found through a specified URL; causing use of the URL to access the time series data, extraction of the time series data, and conversion of the extracted web-based time series data into a normative format to produce normalized time series data; storing the normalized time series data; causing the stored normalized time series data to be updated repetitively over time; and granting access by the client computer to the stored normalized data.

In a related embodiment, the client computer is operated by an account holder, and the method further includes serving to the client computer a listing of names of time series data collections stored for the benefit of the account holder, wherein the listing is configured so that, when displayed on the client computer, the name of the collection associated with the specified URL is displayed with an icon serving as a trademark for the collection associated with the specified URL and wherein the icon also includes a hyperlink to the specified URL.

In another related embodiment, the client computer is operated by an account holder, and the method further includes granting access to the stored normalized data by another client computer operated by a person having authorization from the account holder. In another embodiment, the invention provides a computer-implemented method of handling time-series data, and the method includes:
receiving over a network from a client computer browser process a user-initiated request to store time series data from a user-specified data source, wherein the client computer is operated by an account holder; accessing the time series data from the user-specified data source; determining whether the time series data is normalized, and, if so, storing the time series data; rendering the time series data in at least one user-specified format and generating a URL to identify the rendered data; and granting access to the URL in accordance with permissions granted by the account holder.

In another related embodiment, the requesting process is initiated from a client computer of a user having a user account and the user account has been identified as a source of the requesting process, and resolving the web-based time series data includes allocating processing of incoming data including at least identity of the URL to a selected one of a set of servers configured as peers; transmitting a query message, from the selected one of the set of peers, including the identity of the user account, to a dedicated registry server that maintains a registry associating each user account with a corresponding one of the peer servers; receiving, by the selected one of the peers, a response from the dedicated registry server identifying a given one of the peer servers as corresponding to the identified user account; if the selected peer server is not the given one of the peer servers, then transmitting by the selected peer server the incoming data to the given one of the peer servers for processing; processing by the given one of the peer servers of the incoming data to accomplish resolving the web-based time series data; transmitting by the given one of the peer servers to the selected peer server a job completion message; and wherein the selected peer server accomplishes transmitting over the network the normalized time series data to the requesting process; and if the selected peer server is the given one of the peer servers, then processing by the selected peer server of the incoming data to accomplish resolving the web-based time series data, and wherein the selected peer server accomplishes transmitting over the network the normalized time series data to the requesting process.

In another embodiment, the invention provides a computer-implemented method of making updated time series data available to a client computer of a given user having a user account, the time series data having been graphically selected by the given user. The method of this embodiment includes serving by a time series server the time series data in a web page over a wide area network in such a manner that, when a user of a client computer displaying the time series web page graphically selects the time series data to be made available, there is provided to the server by the browser a unique identifier of an underlying location, of the time series, wherein the time series data is stored on the server; receiving at the server the unique identifier as a result of the graphical selection of the time series data by the given user; and modifying data associated with the given user's account so as to associate the unique identifier with the given user's account, so that when the given user, via a client computer, seeks to access the time series data having the unique identifier, then the time series data is retrieved from the underlying location, and so that whenever the time series data is updated at the underlying location the time series data accessible by the given user is also updated.

In yet another embodiment, the invention provides a computer-implemented method of making an updated display of time series data available to a client computer of a given user having a user account, the display having been graphically selected by the given user. The method of this embodiment includes serving by a time series server the display in a web page over a wide area network in such a manner that, when a user of a client computer rendering the display of time series data graphically selects the display of time series data to be made available, there is provided to the server by the browser a unique identifier of an underlying location of the display of time series, wherein the display of time series data is stored on the server; receiving at the server the unique identifier as a result of the graphical selection of the display by the given user; and modifying data associated with the given user's account so as to associate the unique identifier with the given user's account, so that when the given user, via a client computer, seeks to access the display of time series data having the unique identifier, then the display of time series data is retrieved from the underlying location, and so that whenever the display is updated at the underlying location the display accessible by the given user is also updated.

In yet another embodiment, the invention provides a computer-implemented method of providing time series data. The method of this embodiment includes maintaining by a web server user account data for each of a plurality of user accounts, each account associated with a user; for each user having a user account:

serving by the web server a set of web pages configured to support uploading of time series data to the web server, including updates of such data from time to time;

storing by the web server the uploaded time series data; and serving by the web server a set of web pages configured to present such data to such user.

In a related embodiment, the method further includes, for each user having a user account serving, by the web server, web pages configured to support building by such user of a web-embeddable display of such user's time series data and for such user to obtain a link to the display of such user's time series data thus built, so that such link, when embedded in a script for a user web page served by or on behalf of such user, will cause the display of such user's time series data to appear in a browser that is displaying the user web page, so that such user can cause the display of such user's time series data to be published on the World Wide Web.

In a further related embodiment, the web pages configured to support building a web-embeddable display of such user's time series data are additionally configured to enable such user to include, in such display of such user's time series data, time series data from a source other than such user. Optionally, the source is another user account maintained by the web server. Alternatively, the source is time series data from a third party that has been imported by such user into such user's user account.

A further related embodiment further includes serving by the web server, to a client computer of a user having a user account, a web page, the web page including time series data, wherein the web page is configured so that when it is displayed in a browser of the client computer, there is provided a graphical device associated with the web page to facilitate export of the time series data displayed in the page to an application running on the client computer. Optionally, the application is a spreadsheet. Alternatively, the application is a charting tool. Optionally, the graphical device causes display of an identifier associated with the display of such user's time series data, and the method further includes serving updated time series data to the spreadsheet application via a plug-in for the spreadsheet application.

In another embodiment, there is provided a non-volatile digital storage medium encoded with instructions that when loaded into a computer establish processes that implement any of the method embodiments previously recited. A separate storage medium embodiment corresponds to each one of the method embodiments previously recited.

Embodiments Using Time Series Server to Maintain and Update Data in Normative Formats with Further Functionality.

We describe through the balance of this section a series of embodiments using a time series server to maintain and update data in normative formats with further functionality. In one of these embodiments of the present invention, there is provided a computer-implemented method for providing a user interface for defining, on a client computer by a given user having a user account, a mathematical manipulation of a set of time series and for obtaining results of such manipulation, wherein the time series are subject to being updated. In this embodiment, and in all further embodiments summarized in this section of the description, the method includes maintaining, and repeatedly updating, in normative formats, on a time series server, each member of the set of time series.

This particular embodiment further includes:

serving by the time series server a distinct time series name for each member of the set of time series in a web page over a wide area network to the client computer for display in a browser thereof in such a manner that, when the given user graphically selects the name of a given one of the time series in the browser for invoking a functionality provided by the time series server, there is provided to the server by the browser a unique location identifier of an underlying location, of the selected time series, wherein data for the time series is stored on the server;

causing, by the time series server, display, in the browser running on the client computer, along with the time series names, of a graphical mechanism to invoke a set of tools, accessible to the given user, by which the user can define in the browser an expression that implements the mathematical manipulation;

receiving from the browser of the client computer over the wide area network an expression message corresponding to the expression defined by the user via the set of tools;

storing by the time series server, in association with the user's account, expression data in the message characterizing the user-defined expression, wherein the expression data utilizes the unique location identifiers for the time series;

on receipt by the time series server of an access request message, by the user, from a given client computer, to access the expression from the user's account, initiating an evaluation process to evaluate the expression, using the time series data as it has been updated from time to time by the time series server, and storing the resulting evaluation of the expression using the updated time series data; and serving by the time series server, responsive to the access request message, over the wide area network, to the given client computer, the resulting evaluation of the expression using the updated time series data.

In further related embodiment, serving by the time series server a distinct time series name for each member of the set of time series in a web page includes serving the web page configured with a listing of names of distinct time series from which the set of time series is graphically selectable by the user. Optionally, the time series server causes display in the client browser, after the set of time series has been graphically selected by the user, of a web page in which each member of the set is labeled with a short designation as a distinct variable so as to facilitate user entry of the expression. As a further option, responsive to user selection, the time series server causes display in the client browser of: times series that are descendants of a selected time series, time series that are ancestors of a selected series of the selected time series, time series that are immediate parents of the selected time series, and time series that are immediate children of the selected time series. Alternatively, or in addition, the set of tools includes a designator of an average of the series entries and a designator of a sum of the series entries, and the evaluation process is configured to handle algebraic notation and operations, so that the expression defined by the user can employ algebraic notation and operations.

In another one of these embodiments, there is provided a computer-implemented method for providing a user interface for displaying, on a client computer by a given user, a selected grouped set of time series, wherein the time series are subject to being updated. This embodiment, like all of this series of embodiments, includes the process of maintaining, and repeatedly updating, in normative formats, on a time series server, each member of the selected grouped set of time series. Additionally, this embodiment includes:

serving by the time series server over a wide area network to the client computer for display in a browser thereof a user-scrollable display of the selected grouped set, by causing to appear in a web page a matrix that includes (i) a header in which are displayed a user-scrollable set of consecutive dates, applicable to data in the grouped set, and (ii) a distinct row for each one of the time series in the grouped set, wherein, for each date in the displayed set, there is displayed a corresponding entry for such one of the time series; and responsive to receipt by the time series server of a scroll message that the user-scrollable set of consecutive dates has been scrolled by the user by a specified extent, causing an update of the served web page so that the displayed user-scrollable set of consecutive dates is updated along with the displayed entries in the distinct row for each one of the time series in the grouped set to accord with the specified extent.

In a related embodiment, serving by the time series server the web page includes serving the web page in which also appears a graphically selectable icon to cause the set of consecutive dates to scroll by a single time period. Optionally, serving by the time series server the web page includes serving the web page in which also appears a graphically selectable icon to cause the set of consecutive dates to scroll to a beginning date in a range of dates of the grouped set of time series. Alternatively or in addition, serving by the time series server the web page includes serving the web page in which also appears a graphically selectable icon to cause the set of consecutive dates to scroll to an ending date in a range of dates of the grouped set of time series. Optionally, serving by the time series server the web page includes serving the web page in which also appears a graphically selectable calendar icon by which the set of consecutive dates can be caused to scroll to a specific date. Optionally, serving by the time series server the web page includes serving the web page in which also appears a graphically selectable menu by which can be specified the frequency of the data displayed in the matrix. Optionally, if the matrix would lack any entries, in any one of the time series in the grouped set, for the displayed user-scrollable set of consecutive dates, then padding such entries by the time series server before serving the web page, so that the matrix has entries for each of the time series in the grouped set.

In another one of these embodiments, there is provided a computer-implemented method for providing a user interface on a client computer for defining, by a given user having a user account, a collection of time series and performing an action on the defined collection, wherein the time series are subject to being updated. In addition to maintaining, and repeatedly updating, in normative formats, on a time series server, each member of a set of time series, the method includes:

serving by the time series server a distinct time series name for each member of the set of time series in a web page over a wide area network to the client computer for display in a browser thereof in such a manner that, when the given user graphically selects the name of a given one of the time series in the browser for invoking a functionality provided by the time series server, there is provided to the server by the browser a unique location identifier of an underlying location, of the selected time series, wherein data for the time series is stored on the server;

causing, by the time series server, display, in the browser running on the client computer, adjacent to any time series name in the set, of an icon that, when graphically selected by the user, causes appearance of the time series name in a workspace called a "corkboard" so as to "pin" the time series name to the corkboard; and also causing, by the time series server, display, in the browser running on the client computer, of an icon to cause the corkboard workspace to appear in a window, wherein (i) the corkboard workspace includes a graphically movable divider and a graphically invocable set of actions, (ii) each of the actions is applicable only to pinned time series having names located on a first side of the divider, and (iii) each of the time series names pinned to the corkboard can be graphically ordered and moved to either side of the divider, so that the user can graphically select a specific action from the set of actions and can move the divider and the names of the pinned time series to define a collection of the pinned time series with respect to which the selected action will be performed.

In a further related embodiment, the set of actions includes making a chart or making a table using values from the collection of time series. Optionally, the set of actions includes making a user-scrollable display. Also optionally, the set of actions includes making a latest values display. Alternatively or in addition, the set of actions includes defining a mathematical manipulation of the collection. Optionally, the set of actions includes saving the collection under a group name for future use.

In another one of these embodiments, there is provided a computer-implemented method for providing a user interface, on a client computer of a user having an account, for associating a time series with a display, wherein the time series is subject to being updated. In addition to maintaining, and repeatedly updating, in normative formats, on a time series server, each member of a set of time series, the method includes:

serving by the time series server a distinct time series name for each member of the set of time series in a first web page over a wide area network to the client computer for display in a browser thereof in such a manner that, when the given user graphically selects the name of a given one of the time series in the browser for invoking a functionality provided by the time series server, there is provided to the server by the browser a unique location identifier of an underlying location, of the selected time series, wherein data for the time series is stored on the server;

causing, by the time series server, display, in the first web page, of a plurality of tabs, each tab, when selected, causing display of a different web page providing a different view of items associated with the user's account, the plurality of tabs also being visible in each of the different web pages, wherein a first tab invokes the first web page and a second tab invokes a user-defined second web page in which a user can define a display;

also causing, by the time series server, display, in the first web page, adjacent to any time series name in the set, of an icon that, when graphically selected by the user, enables the user to select a time series by dragging the selected time series name over the second tab to cause the second web page to open and dropping it onto the display in the second web page; and further causing, by the time series server, responsive to such dragging and dropping, association of the user-defined display with the user-selected time series, so that the user-selected time series appears in the user-selected display.

Optionally, the display is a user-scrollable display, a chart or a table, or a latest values display.

In another one of these embodiments, there is provided a computer-implemented method for providing a user interface, on a client computer of a user having an account, for copying a display, wherein the time series is subject to being updated. In addition to maintaining, and repeatedly updating, in normative formats, on a time series server, each member of a set of time series, the method includes:

serving by the time series server a distinct time series name for each member of the set of time series in a first web page over a wide area network to the client computer for display in a browser thereof in such a manner that, when the given user graphically selects the name of a given one of the time series in the browser for invoking a functionality provided by the time series server, there is provided to the server by the browser a unique location identifier of an underlying location, of the selected time series, wherein data for the time series is stored on the server;

causing, by the time series server, display, in the first web page, of a plurality of tabs, each tab, when selected, causing display of a different web page providing a different view of items associated with the user's account, the plurality of tabs also being visible in each of the different web pages, wherein a first tab invokes the first web page, a second tab invokes a second web page on which appears a display of time series data, and a third tab invokes a user-defined third web page; and also causing, by the time series server, display, in the second web page, adjacent to the display of time series data, of an icon that, when graphically selected by the user, enables the user to copy the display by dragging the icon over the third tab to cause the third web page to open and dropping it onto the third web page, whereupon the display is copied onto the third web page.

Optionally, the display is a user-scrollable display, a chart or a table, or a latest values display.

In another one of these embodiments, there is provided A computer-implemented method for providing a user interface, on a client computer of a user having an account, for copying a time series display. In addition to maintaining, and repeatedly updating, in normative formats, on a time series server, each member of a set of time series, the method includes;

serving by the time series server a distinct time series name for each member of the set of time series in a first web page over a wide area network to the client computer for display in a browser thereof in such a manner that, when the given user graphically selects the name of a given one of the time series in the browser for invoking a functionality provided by the time series server, there is provided to the server by the browser a unique location identifier of an underlying location, of the selected time series, wherein data for the time series is stored on the server;

causing, by the time series server, display, in the first web page, of a plurality of tabs, each tab, when selected, causing display of a different web page providing a different view of items associated with the user's account, the plurality of tabs also being visible in each of the different web pages, wherein a first tab invokes the first web page, and wherein the first web page includes a user-scrollable display, and a second tab invokes a user-defined second web page; and also causing, by the time series server, display, in the first web page, adjacent to the user-scrollable display, of an icon that, when graphically selected by the user, enables the user to copy the display by dragging the icon over the second tab to cause the second web page to open and dropping it onto the second web page, whereupon the display is copied onto the second web page.

In another one of these embodiments, there is provided a computer-implemented method for providing a user interface, on a client computer of a user having an account, for associating a time series with a display. In addition to maintaining, and repeatedly updating, in normative formats, on a time series server, each member of a set of time series, the method includes:

serving by the time series server a distinct time series name for each member of the set of time series in a first web page over a wide area network to the client computer for display in a browser thereof in such a manner that, when the given user graphically selects the name of a given one of the time series in the browser for invoking a functionality provided by the time series server, there is provided to the server by the browser a unique location identifier of an underlying location, of the selected time series, wherein data for the time series is stored on the server;

causing, by the time series server, pursuant to graphical selection by the user made on the web page, display in the browser of the client computer of a time series display, the time series display including a set of associated icons by which the user can graphically select a method for causing the time series display to be shared with a recipient via SMS messaging, email, or inter-user messaging hosted by the time series server;

responsive to user selection of one of the associated icons, causing by the time series server the appearance of a window for entry by the user of the electronic communication address of the recipient and a send-icon by which the user can signal completion of the entry and to cause the display to be sent to the designated address;

responsive to entry of the electronic communication address of the recipient and selection of the send-icon, causing by the time series server sending of a payload message through an e-mail gateway to the entered address, such payload message including a view token that can be invoked by the recipient to send a view-message to the time series server; responsive to receipt of the view-message invoked by the recipient from the view token; and serving by the server of the display populated with time series data reflecting any updates of the time series data for viewing by the recipient.

In a further related embodiment, the payload message is an email, and the electronic communication address is an email address. In another related embodiment, the payload message is an SMS message, and the electronic communication address is a mobile telephone number.

In another one of these embodiments, there is provided a computer-implemented method for providing a user interface, on a client computer of a user having an account, for saving, grouping, and accessing time series, wherein the time series are subject to being updated. In addition to maintaining, and repeatedly updating, in normative formats, on a time series server, each member of a set of time series, the method includes:

serving by the time series server a distinct time series name for each member of the set of time series in a first web page over a wide area network to the client computer for display in a browser thereof in such a manner that, when the given user graphically selects the name of a given one of the time series in the browser for invoking a functionality provided by the time series server, there is provided to the server by the browser a unique location identifier of an underlying location, of the selected time series, wherein data for the time series is stored on the server; and causing, by the time series server, display, in the first web page, of a plurality of tabs, each tab, when selected, causing display of a different web page providing a different view of items associated with the user's account, the plurality of tabs also being visible in each of the different web pages, wherein a first tab invokes the first web page and a second tab invokes a user-defined second web page into which a user can add user-selected time series data.

In a related embodiment, the user can add a plurality of user-defined tabs to invoke a plurality of user-defined web pages to accommodate user-selected time series data, and wherein the plurality of tabs is a quantity definable by the user according to needs of the user.

BRIEF DESCRIPTION OF THE DRAWINGS

The file of this patent or application contains at least one drawing executed in color. Copies of this patent with color drawings will be provided by the Patent and Trademark Office upon request and payment of necessary fee.

The foregoing features of embodiments will be more readily understood by reference to the following detailed description, taken with reference to the accompanying drawings, in which:

FIG. 18 is representation of a display of a web page that illustrates an exemplary DataZoa-served table, in accordance with an embodiment of the present invention, which (among other things) can be inserted into any web site by using the link served up by the DataZoa table builder, which in turn is depicted in FIG. 19;

FIGS. 20 and 21 are representations of displays of web pages in which appear DataZoa-served tables in accordance with an embodiment of the present invention providing the user with a series of options for using the time series data in the table, including the "follow" option by which the user may subscribe to time series data in the table;

FIG. 26 is a representation of a display of a web page in which appears a DataZoa-served table in accordance with an embodiment of the present invention, wherein an option is presented to have data in the tabled mirrored in a spreadsheet and repetitively updated in the spreadsheet;

FIG. 49 is a representation of a display of a web page presenting time series data as a DataZoa table, in accordance with an embodiment of the present invention, manifesting the "Follow" button, which enables the user to either (i) post this display to the Following tab in the user's own account, or to (ii) post all data series manifest in the display as individual time series in the user's own account;

FIG. 70 is a representation of a display of part of a web page of a user's account, in accordance with an embodiment of the present invention, which includes the account controls menu which is presented to the user upon the user clicking on the gear icon above the control labeled "Account Controls";

FIG. 71 is a representation of a display of a web page of a user's account, in accordance with an embodiment of the present invention, which includes the profile/preferences page invokable by the user in FIG. 70 and sets forth the options selectable by the user in an explanatory panel on the right side of FIG. 71;

DETAILED DESCRIPTION OF SPECIFIC EMBODIMENTS

Definitions. As used in this description and the accompanying claims, the following terms shall have the meanings indicated, unless the context otherwise requires:

"Web-based data" is data that is accessible from one or more web sites by a client computer running a web browser.

A "web page identifier" is data identifying a web page, such as a uniform resource locator (URL) or IP address.

A "normative format" is a uniform format, employed for storage of time series data, configured so that identical sets of data are displayed identically when rendered by the same processes, even though such sets of data may have been obtained from host web sites or other sources in differing formats.

To "resolve" a web page means accessing the web page over a network using a web page identifier for the web page, extracting web-based time series data from the web page, and converting the extracted web-based time series data into a normative format to produce normalized web-based time series data.

A "resolver server" is a server configured to resolve a web page for which it has been provided a web page identifier.

A computer "process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "time series" is a time-ordered series of observations pertinent to a phenomenon, wherein each observation has a value that may be a numeric value, a state value or a combined numeric and state value.

Figure 16:
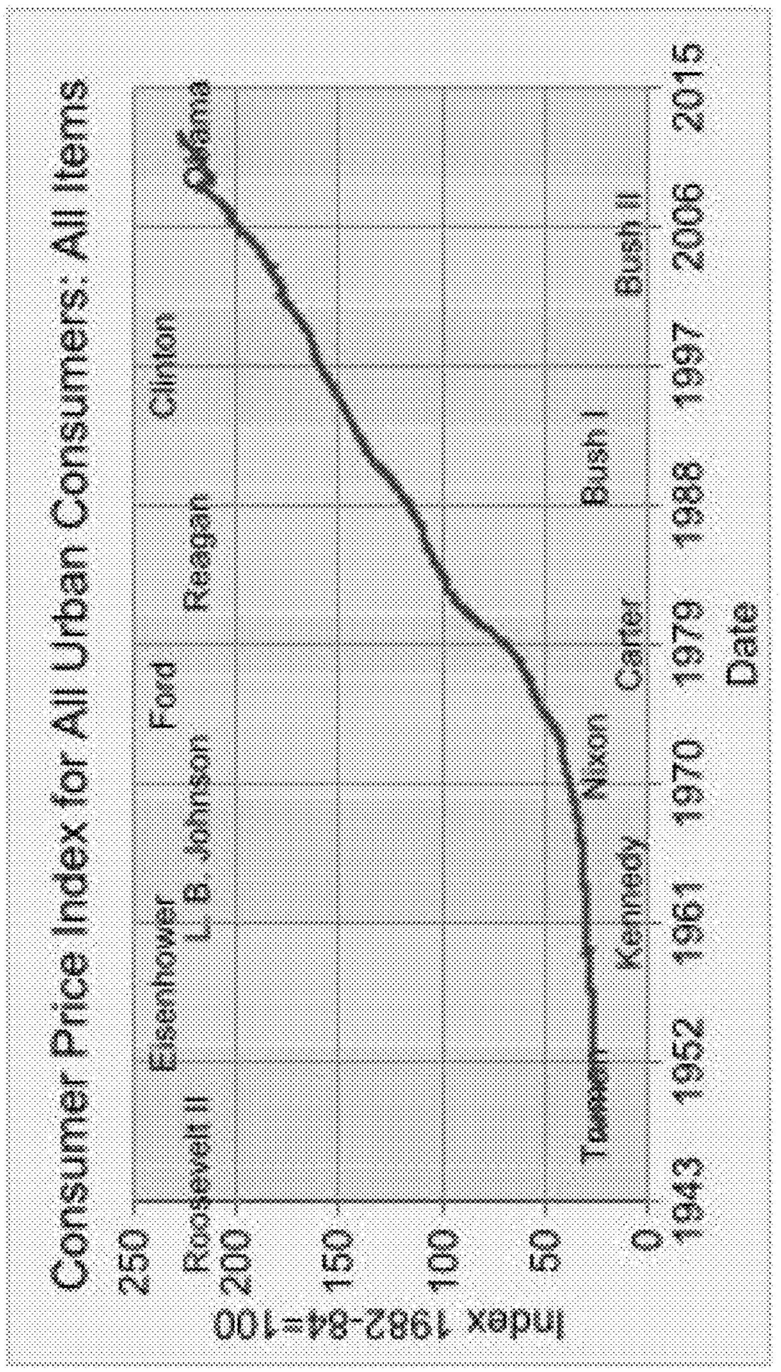
FIG. 16 is a representation of a display in which is presented an example of a graph of an epochal time series in accordance with an embodiment of the present invention.

An "epochal time series" is a time-ordered series of states of a phenomenon at various points of time, which can, but need not, be regularly occurring. As an example, the phenomenon may be chairmanship of the Federal Reserve and the state may be the identity of the Chairman of the Federal Reserve. This identity is a state variable that changes from time to time, sometimes at irregular intervals, and may even be indeterminate during a period when the position of Chairman is temporarily empty or not knowable. A state may be represented, among other ways, by a name or an image (such as a picture of the Chairman of the Federal Reserve). Each state value in an epochal time series may also have descriptive or qualifying information associated with it, such as a flag that the current Chairman of the Federal Reserve is an interim or temporary position holder, or any other descriptive information having a bearing on the meaning or interpretation of that state value. An example of an epochal time series is shown in FIG. 16, wherein the state value is the identity of the President of the United States, which is depicted in a DataZoa-served chart, along with a numeric time series, in this case, the Consumer Price Index.

A "numeric time series" is a time-ordered series of numbers measuring a phenomenon at various points of time, which can, but need not, be regularly occurring. Each such number in a numeric time series may also have descriptive or qualifying information associated with it, such as a flag that is "preliminary" as is common with economic information releases, or any other descriptive information having a bearing on the meaning or interpretation of that number.

A "calculated series" is a time series that is a mathematical transformation of one or more other time series. When the calculated series is itself a transformation of at least one calculated series, so as to result in a set of nested calculations, then there must be an innermost time series that is not a calculated series.

A "user account" with a DataZoa or other time series server is an account, of a registered user of information provided by a DataZoa server or a similar server, that associates with the registered user, among other things, data that the registered user has identified for preservation, potentially including time series data, display specifications, and calculation specifications for calculated series.

A "shard" of a DataZoa server or other time series server is a group of one or more user accounts physically served by a single peer server in a set of peer-to-peer servers that collectively serve all user accounts.

A "time series server" is a web server configured to store and serve time series data for a plurality of users, wherein each user has a separate user account by which such user can store and access time series data using web pages.

A "server" includes a server system.

The "frequency" of a displayed time series is the rate of occurrence of a single time period with respect to which data items are displayed in the series, such as, for example, daily, monthly, or annually.

A "dataBlock" is a user-scrollable display of one or more time series in a matrix having a header to identify consecutive dates selectable by the user, below which appear entries in the matrix for time series values corresponding to the dates in the header; sometimes herein called "user-scrollable display".

A "recipient's electronic communication address" is an email address of the recipient, or a mobile telephone number of the recipient by which the recipient may receive an SMS message, or a designator of the recipient's user account through which the recipient may receive a message addressed thereto.

A growing number of web sites worldwide are being increasingly relied upon by users to provide numeric or state information about some subject for which the numbers or states presented change over time, often carrying a trail of historical numbers and states respectively, as well as associated descriptive information for some or all of such numbers or states. The ranges and kinds of such data are vast. As examples, such data may be the Unemployment Rate, a high school's graduation rate, the rate of hospital acquired infections for a specific hospital, a baseball player's batting average or game log, the identity of an athlete holding a world record at any particular point in time, the most popular pop-song, the name of a county's president, or a security price. Embodiments of the present invention facilitate the acquisition, maintenance, date/time stamping, dissemination and use of such data. Additionally, a growing number of owners or publishers of numeric and state data are using such data for marketing purposes, in order achieve new or maintain existing connections and relationships with prospects and customers respectively, or merely to give "free samples" of data which they sell, to help inform prospective customers on their products, and then sell and deliver the full data collections behind the samples. Embodiments of the present invention facilitate the efforts of the owners and publishers of numeric data to utilize it for such marketing purposes, and to move this data into broader access and use it in ways which extend their brand, name and data products further into the marketplace, while making it easy for those discovering and using this data to find their way back to the owner or publisher of the data, including in particular, the owner or publisher's web site. Further, various embodiments of the invention address important unmet, and insufficiently met, needs of users of numeric data which may have deep history and/or flows over time.

More specifically, embodiments of the present invention enable such users to have their numeric data (which, by its nature, continues to grow as a numeric time series) collected and kept current in a single place and in a consistent format, so that this data may be used by any of a variety of applications running locally on a computer or smartphone or on a server-based system, and at any time in any of a variety of settings. Additionally, embodiments of the present invention enable owners and publishers of data to put out their data to users or customers of that data in a consistent format and through a consistent set of interfaces, which by their nature increase the utility of that data. For example, embodiments herein enable a publisher to offer a table of many time series on a web site, from which a site visitor or user might select one or more series of interest, which would then be made instantly available in the user's DataZoa account, where the user could combine it and use with other data of interest to the user. Embodiments of the present invention also enable users who hold accounts to act as publishers of data and to share the data publicly or privately with others.

The ability of embodiments herein to accept, provide, and handle data in a dynamic and growing time series contrasts with prevalent tools, such as spreadsheets, that restrict the user to data spanning a specific time frame for evaluation, and thereby hamper user access to, and use of, deeper historical data, as well as dynamic new data. The comparison of embodiments herein, which elegantly handle dynamic time series data, with spreadsheets, which are restricted to data in a specific time interval, is similar to the comparison of digital video, which elegantly handles dynamic changes in a scene, with a still photograph, which cannot.

The easy capture of, and access to, virtually any depth of history of a numeric data stream, as well as the easy utilization of new values as they appear or are produced by various sources and systems, provide considerable convenience and time-savings to users in comparison to current common approaches. The ability to have a format-consistent, and automatically updating, or easily user-updated reservoir of numeric data of types which flow and grow over time, may be a unique enabler of many types of uses by many types of users. Finally, the ability in various embodiments hereof to facilitate sharing by users of these data streams and historic data, both privately to individuals of their choosing, and publicly, on a data-item-by-data-item basis, further enables and increases the productivity of still other uses and users respectively of this type of data.

Figure 1:
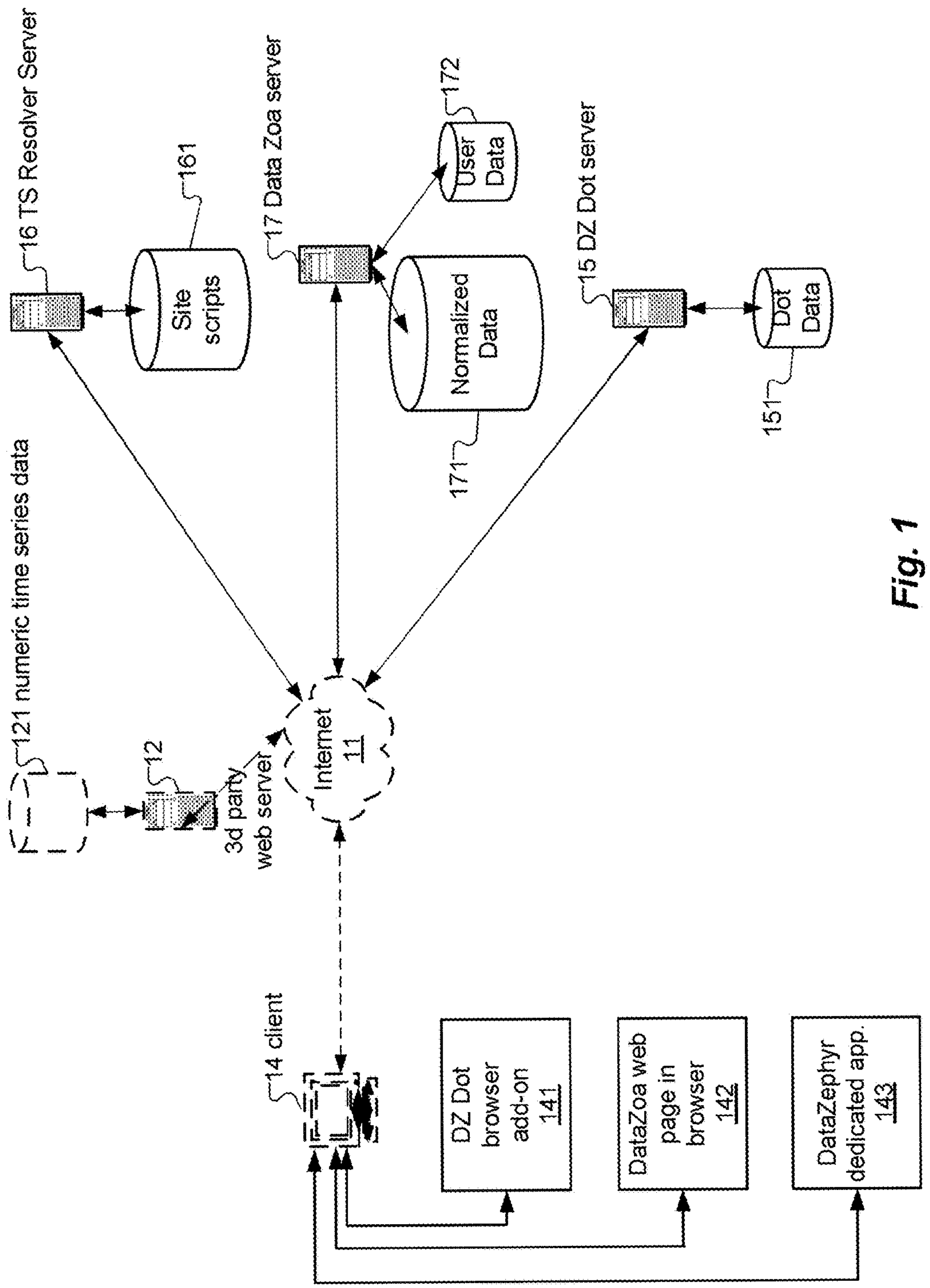
FIG. 1 is a block diagram showing system architecture of a an embodiment of the present invention.

FIG. 1 is a block diagram showing system architecture of an embodiment of the present invention. A series of servers, each independently running a distinct set of processes, identified as DZ Dot Server 15, TS Resolver Server 16, and DataZoa Server 17, are coupled to the internet 11. For purposes of scaling, there may be multiple instances of each of these servers, but for simplicity in illustration we show a single server of each type. These servers communicate independently over the internet 11 with processes running on client computers. There may be a very large number of client computers, but we show a single client computer 14 for convenience of illustration. In FIG. 1, the client computer 14 is running three processes, namely, a browser process 142 with respect to which the user has directed the browser to access a web page from the DataZoa Server 17, a DZ Dot browser add-on process 141, and a DataZephyr dedicated application process 143. In practice, a given client computer need not run all of the processes 141, 142, and 143 simultaneously (and might run only one or two of the processes at all), because each such process can operate independently of the other processes, although, as we shall see, the processes perform complementary functions. We sometimes refer to the system of FIG. 1 as the "DZ system" or simply "the system".

As an illustration of the operation of the processes 141, 142, and 143 in relation to the servers 15, 16, and 17, let us suppose that a user has caused the browser of client computer 14 to access, over the internet 11, the web site of a third party server 12. The server 12 serves to the browser of the client computer 14 a web page displaying numeric time series data from storage 121, which is accessed by the server 12. In this example, this web page served by server 12 has been previously analyzed, and its URL has been stored on DZ Dot Server 15, which also stores, in association with the URL, a location on the displayed web page for placement of what we call a "Data Zither Dot" or "DZ Dot", as discussed in further detail in relation to FIGS. 4-7. In this description and the accompanying claims, we sometimes refer to the DZ Dot as an "active marker". As discussed in further detail in connection with FIG. 9, the DZ Dot browser add-on process 141 running on the client computer 14 communicates over the internet with the DZ Dot Server 15 to obtain data, from Dot Data storage 151, that defines placement of the DZ Dot on the displayed web page served from third party server 12. (In this example, the DZ Dot does not reside on the web page served by third party server 12; instead the DZ Dot Server 15 and DZ Dot browser add-on process 141 cause the DZ Dot to appear on the display of the web page in the browser process of client computer 14.)

A user of the client computer 14 of FIG. 1 can use a mouse to graphically select the DZ Dot that has been caused to appear on the display of the web page and will be presented with a menu of choices generated by the DZ Dot browser add-on process 141. The menu gives the user a list of destinations for the numeric data, on the displayed web page, that is identified by the selected DZ Dot. From the list the user can select a destination for the data. One such destination that may be selected by the user, for example, is the dedicated DataZephyr application 143 that is running on the client computer 14. The DataZephyr application 143 provides charting and analysis of data, and is particularly suited to charting and analyzing time series data, among other things.

Also in this example, the structure of the time series data served by server 12 of FIG. 1 has been previously analyzed and stored heuristically on TS Resolver Server 16 as a script in script storage 161. The script includes data that characterize the one or more URL locations where the numeric time series data can be accessed from server 12, as well the organization of the time series data. Let us assume that the user has invoked the DZ Dot and selected the menu choice to have the time series data served by server 12 of FIG. 1 sent to the DataZephyr application 143 running on the client computer 14. Such a user selection causes the DZ Dot browser add-on process 141 to send the URL and other information identifying this data to the destination application DataZephyr 143. The destination application in turn sends the URL and other identifying information over the internet to the TS Resolver Server 16. In turn the TS Resolver Server 16 accesses a script for the data identified by the DZ Dot, normalizes the data, and sends the data over the internet to the client computer 14, where the data is received by the destination DataZephyr application 143.

Another possible destination for the data that may be selected by the user on invoking the DZ Dot is the DataZoa server 17. Each user of the DataZoa server 17 has an account for which data is stored in the User Data storage 172 accessible by the server 17. Let us now assume that our user of client computer 14 has an account for the DataZoa server 17, that the user has now selected the DataZoa server 17 as the destination for the time series data displayed in the browser of client computer 14. In this case, the DZ Dot browser add-on process 141 would send the URL and other information identifying this data to the DataZoa application 142. The DataZoa application then sends the URL and other identifying information over the internet to the TS Resolver Server 16. In turn, the TS Resolver Server 16 accesses the script for the data identified by the DZ Dot, normalizes the data, and sends the data over the internet to the DataZoa server 17, where it is stored in Normalized Data storage 171 in association with the user's account. The DataZoa server 17, depending on configuration of the user account and parameters associated with the server 17, will update on a period or other basis the data stored in Normalized Data storage 171, so that the user may access periodically updated data each time the user seeks data from storage 171 and does not need to go through a manual update cycle. A user with a DataZoa account can share data easily by selectively giving permission to another to access, possibly under specified conditions, some or all data of the user in the account. Another, and a related, facility of DataZoa lies in the ability of a user with a DataZoa account to publish selected data that is in the account. Further aspects of this system are described below.

Figure 2:
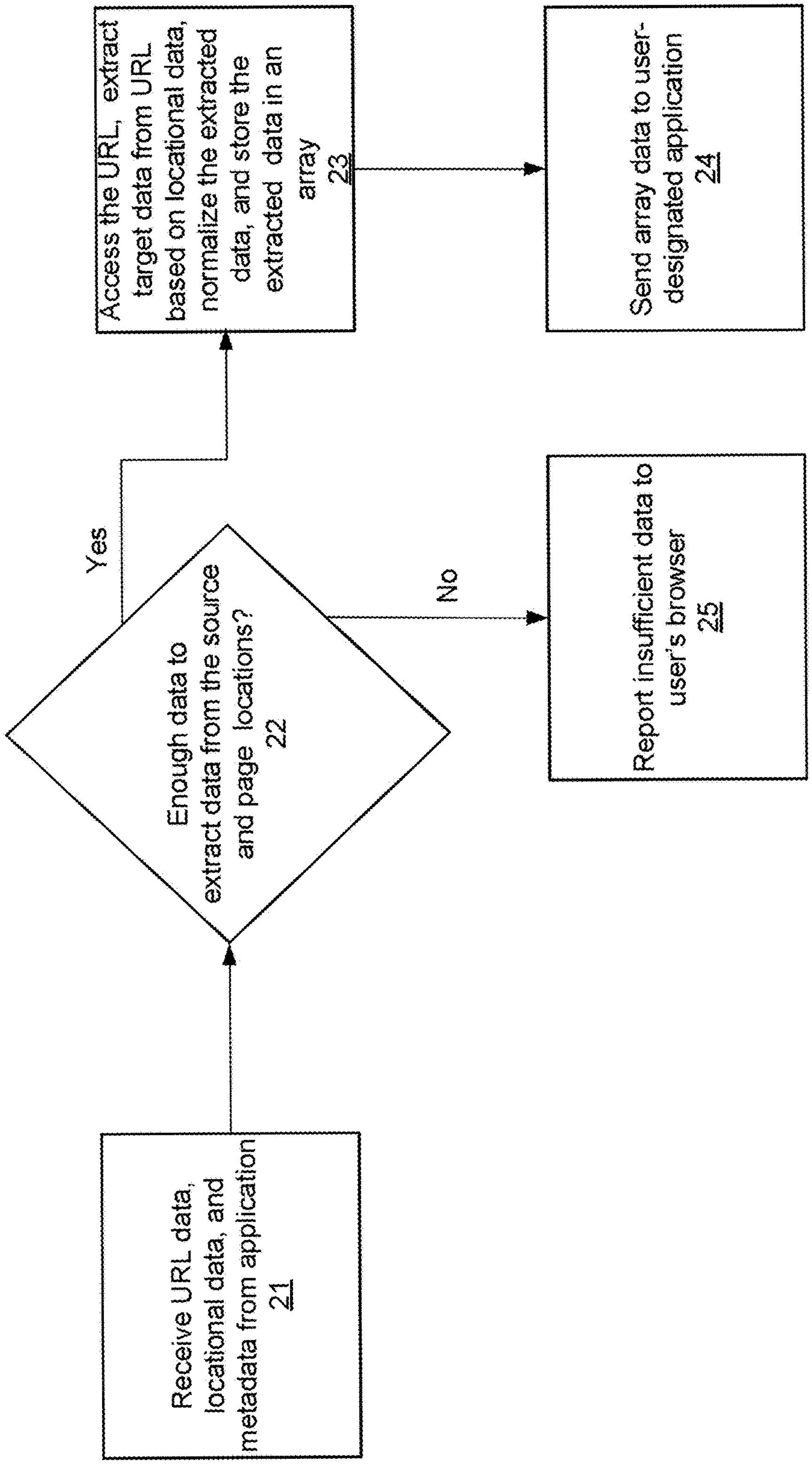
FIG. 2 is a block diagram showing logical flow of the TS Resolver server in accordance with an embodiment of the present invention.

FIG. 2 is a block diagram showing logical flow of the TS Resolver server in accordance with an embodiment of the present invention. In process 21, the TS Resolver receives a data request from the requesting application 141 or 143. The data request is in the form of an information package including a URL that identifies the web page containing data of interest to the user, and, when appropriate, locational data that identifies the location in the web page, or elsewhere, of the data of interest to the user, as well as metadata that identifies the target application selected by the user and may provide additional data to the server, such as user credentials and date/time stamps. The application, in turn, obtains the content of the data package from DZ Dot browser add-on process 141. In process 22, the TS Resolver determines whether it has received enough data from the client computer 14 to extract useful data from the identified web page at the identified location. If in process 22, the TS Resolver determines that it does not have enough data, then in process 25, it sends information in response to the requesting process 142 or 143 application, which in turn responds in a manner appropriate to the condition. In process 23, if the TS Resolver determines that it has enough data to do these things, then it accesses the identified web page, extracts the target data based on the locational data, normalizes the extracted data, and stores the extracted data in an array. In various embodiments, the array is implemented as a text-based TSV table, which optionally may be encrypted. Finally, in process 24, the TS Resolver transmits the extracted data to the target application that was selected by the user.

Examples of such normalized data appear in the documents attached hereto and incorporated herein by reference as Appendix B and Appendix C of Our Prior Application. In Appendix B of Our Prior Application, we show time series data taken from the St. Louis FRED Unemployment Rate, It can be seen that the normalized data include a header with entries for Title, Series ID, Source, Release, Seasonal Adjustment, Frequency, Units, Date Range, Last Updated, and Notes. Similarly, in Appendix C of Our Prior Application, we show time series data taken from an Estonia web site that results from use of a query form provided on the site. The normalized data include a generally similar header and also include URL data that enable replicating the query for updating the time series, and a parameter specifying the frequency of updates.

Figure 3:
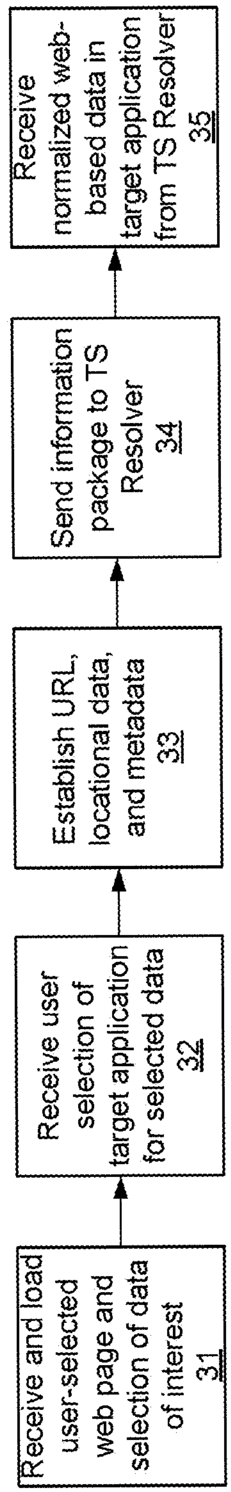
FIG. 3 is a block diagram showing logical flow of a user's client computer in communicating with the TS Resolver server in accordance with the embodiment FIG. 2.

FIG. 3 is a block diagram showing logical flow of a user's client computer 14 when the user seeks to import time series data, from a web page open in the browser of client computer 14, into the user's client side application running locally on the client computer 14 for charting and manipulating such extracted data, which we call the DataZephyr application. In process 31, the browser of client computer 14 receives and loads a user-selected web page and the DZ Dot browser add-on process 141 receives a user's graphical selection of data of interest. In process 32, the DZ Dot browser add-on process 141 receives the user's selection of a target application to receive the data of interest. In process 33, responsive to an action by the user triggering the importing of time series data to the application, the DZ Dot browser add-on process 141 establishes a package of information including a URL for the displayed web page, and if appropriate, locational data to identify the data of interest on the displayed web page, and metadata that, among other things, identifies the target application to receive the identified data. In process 34, the information is transmitted by the browser process to the TS Resolver. Finally, in process 35, the identified data, after having been normalized, is received in the target application from the TS Resolver. Similar processes are invoked for importing web-based time series data to destinations other than the DataZephyr application, for example, when the target application is the user's web-based account for hosting such data, which we call a DataZoa account. Additionally, in a further embodiment of the present invention, the DZ Dot browser add-on process 141 operates to cause transfer of the normalized time series data from the TS Resolver Server 16 to any other software application or system, be it on a client computer or server, which has been enabled to receive such data. For example, a client-side connector enables the user to drag and drop the selected data of interest into a spreadsheet. In that context, the data may optionally be automatically registered in a user's parallel DataZoa account, so updating of the data is managed by the DataZoa account. Alternatively, the client-side connector is configured to seek updates from the original data source, via the TS Resolver Server 16. These embodiments thus enable other software programs or systems of the user to receive the data retrieval, storage, and updating benefits of the system described herein.

Once the data is extracted, the URL, metadata, and locational information for subsequent extractions is also sent to the user's targeted application. In various embodiments herein, a unique "fingerprint" and serial number or "key" for the data is created at this time, which is valuable in maintaining of the integrity of the system's automatic and other data update processes. More particularly, the name of the data source, various dimensional attributes of the data (see DZDimensions below), and the numeric values themselves, are used alone or in combination to create the fingerprint, and the key corresponding to that fingerprint is logged along with it in a database. The purpose of doing this is to accommodate situations where there is a change in one or more attributes of the data source such as its main web URL or naming conventions relating to some or all of the utilized data. In various embodiments, by maintaining a system of fingerprints and key identifiers, the process of updating or rewriting a data source connector and deploying into a live data updating context is helped considerably. The individual rewriting or updating a connector in that situation can easily map new names for data dimensions and Attribute:Value pairs onto the existing data dimension and Attribute:Value pairs, and the match of data from the source using new naming conventions can be confirmed to some level of statistical certainty through the comparison of data values, and in particular trailing data values, to those previously attributed to that same data under its prior naming conventions and other dimensional characterizations.

An important aspect to various embodiments of the present invention in general, and not limited to the above case, is the technique of checking that a collection of data being updated, such as a specific time series of values, is the proper collection. Such checking is accomplished by numerical comparison of prior date and/or time-stamped values contained within the DZ system to those values observed in a data update cycle for what appears to be the same data collection. A failure to match generates an exception report which can be evaluated (by a human supervisor when necessary) in a timely fashion, so as to increase the integrity of the data update process.

The user's targeted application can be configured to request updates obtained from the original data source via the TS Resolver at any user-selected range of frequencies, and based on any type of user-selectable trigger, such as a calendar, a set polling frequency, or a notification that data has changed or may have changed. The user's targeted application will then update its copy of the data on receipt, and in further embodiments, make its own record of the date and time associated with the acquisition of any new values; such embodiments may further place date or time stamps on state data which is found without associated date/time stamps in situ thereby utilizing the date and time when each new data value was found as one option for the date/time attribute needed to make the data values found into usable time series. In further related embodiments, the DZ system is configured to identify or poll for updates that are pertinent to data in the user's target destination (such as DataZephyr dedicated application 143 or DataZoa account 17 maintained on a DataZoa server) and push these updates to the user's target destination. In a simpler embodiment the DZ system is configured to regularly (e.g., daily) revisit all data being monitored by a DataZoa account holder, for example, and make a comparison of the user's data to data from the sources' to determine if there are any changes or additions to such data. This checking for updates may be implemented by the TS Resolver Server 16 itself or may be driven by requests from a target destination like DataZephyr 143 or the DataZoa account. In either event of a detected change, the TS Resolver server, or independently of any change-checking (e.g., in the case of a request by the target destination) new data is fetched and transmitted to the target destination. Importantly, in the general case of DataZoa use, and as enabled by the above-mentioned practice of DataZoa giving each data collection a unique key when it is initially requested by the user, when DataZoa is storing the same data collection for multiple users, when it is determined that data has changed in one of the collections (which may in some embodiments be determined using attribute data as opposed to the underlying numerical data, or in some further embodiments by performing checksum operations on all or data-specific portions of the web pages, files or other data-containing medium used) the TS Resolver makes only a single fetch of new data and shares the results of that data fetch with all DataZoa users monitoring that specific collection. In further embodiments of DataZoa, the sharing of the results of such a data fetch among all DataZoa users can be achieved by giving all users of a given such collection or data series a file pointer to one or more master copies of that collection or series, with the benefit to all users being that their copy of that data is immediately and simultaneously updated upon the completion of the fetch/es of the master copy/ies. In another further embodiment, when any user makes from a DZ compliant application (such as DataZoa or DataZephyr), a request for a data collection or series that has been not previously requested by that user, but is already being monitored by other users of DataZoa, the user is offered the option to get a near instantaneous data fetch result by being given from a master copy of the data in question, a file pointer and associated data header information in the user's DataZoa account or other DZ compliant application. This approach avoids the need and delay associated with composing an original normalized data array corresponding to the user's request. The determination of the identity between the requested data and existing data in DataZoa is achieved by comparing the unique key for that for the requested data collection to a pre-existing master index of all data collection keys. Yet another beneficial embodiment involves allowing any data request by any user at any time, including automated requests, upon discovering that data corresponding to a unique key has changed, to provide, to all users, updates by one of the above-described methods.

When the data comes back from the TS Resolver, it may have added to it a set of DZDimensions™, either by the TS Resolver or a process running upon the return of the data. These DZDimensions are Attribute:Value pairs such as Country:USA or Gender:Male. The DZDimensions may be inferred by the connector from the observed data or may be set based on programmer knowledge of the data source in question. The DZDimensions are important in that they may be subsequently utilized as a basis for searching, selecting, aggregating or statistically distributing a collection of data. Such searching may be conducted within Normalized Data storage 171 by the DataZoa server 17 in or any other search system, including a public search engine if the relevant data is presented to such engine.

In various embodiments, users and publishers have the ability to specify such dimensional attributes in their own data which they upload to a DataZoa account. Further embodiments of the present invention are configured so that users and publishers can add their own dimensional and other attributes and identifying tags to data they have accessed from another source, such as through the TS Resolver system. Alternatively or in addition, users and publishers can override dimensional and other attributes provided by the DZ system. This functionality enables the user to map such data into the user's own contexts and needs more easily and directly. For example, if a user has defined the user's own fantasy baseball team, assigning team roles to various players drawn from various sports teams, in spite of what DZDimensions as to player roles and teams might be inferred automatically by the TS Resolver Server 16 from the data source used, the user can make independent decisions as to such attribute:value pairs as Position:Pitcher, Team:MyBestTeam.]

We now turn to the user interface for identifying data of interest on a web site selected by the user. We have built connectors for many web sites having numeric data of interest to users, to facilitate access by users to such data, including for purposes of monitoring dynamic numeric data, which may typically be numeric time series (either uniform-interval series, e.g., weekly or monthly, or non-uniform-interval series, e.g., resulting from transaction flow). Embodiments herein enable users to access and monitor such data from their own DataZoa™ account or via a DZ-enabled application such as DataZephyr™, which is a desktop software application for displaying and manipulating such data.

In various embodiments of the present invention, the data found on a public web site is flagged by a green dot, which we variously call a DZ Dot™ or a "DataZither™" dot (which can be graphically selected by the user to cause selection of the corresponding data). The flagging by the DZ Dot is achieved in the user's browser view of a visited web page by the DZ Dot browser add-on process 141 running in the browser, which examines the viewed web page against a site knowledge base. Information from the knowledge base is delivered to the browser processes dynamically via the DZ Dot server 15, from Dot Data storage 151, and updated when needed as determined by periodic checks. The knowledge base includes a list of URLs for each web page on which one or more DZ Dots will be placed to enable a user to select data adjacent to the dot, and a designation of the location on each page where the dot will be placed, along with a programmatic descriptors of the data, and, URLs by which data manifested on the page is actually accessed. The DZ Dot browser add-on process 141 considers any web page to determine if it is one from which the TS Resolver Server 16 can get data and should therefore receive placement of DZ Dots in proximity to data which the TS Resolver Server can access. (This process also accesses instructions from a served file for the content for the menu, if any, to be served up to the user, upon hovering of the user's mouse over a DZ Dot and serves up that menu content.) The portion of the process that considers which web pages should be examined for DZ Dot candidacy gets its instructions from a file, entitled DZ-Algorithm, served by the DZ Dot server 15. The DZ-Algorithm is written in the ZithScript™ language described in the document attached hereto and incorporated herein as Appendix A of Our Prior Application. Once a web page is determined by the aforementioned process to be a candidate for examination, each data object associated with a link (which is a URL) on that page is compared to any corresponding link syntax diagrams that appear in a "URL Includes" list and a "URL Excludes" list, to determine whether the data object associated with that link is specifically included to receive a DZ Dot or specifically excluded from receiving a DZ Dot. The DZ-Algorithms file may also contain instructions to delay running the process of applying all or portions of the knowledge base and other processes in order, for example, to allow the subject web page time to fully load. The DZ-Algorithms file may also include graphic rendering instructions for each DZ Dot so as to make it graphically compatible with the display conventions applicable to the location on the web page into which the DZ Dot is inserted. The DZ-Algorithm can be made operational not just on web pages which are themselves supported sources, but also on URLs, to those supported pages, that might be manifested on other web sites linking to those supported pages if the operators of the DZ system so desire or, in another embodiment of this invention, if the user so desires by choosing this option. This dot placement is described in further detail in connection with FIG. 9 below.

Figure 4:
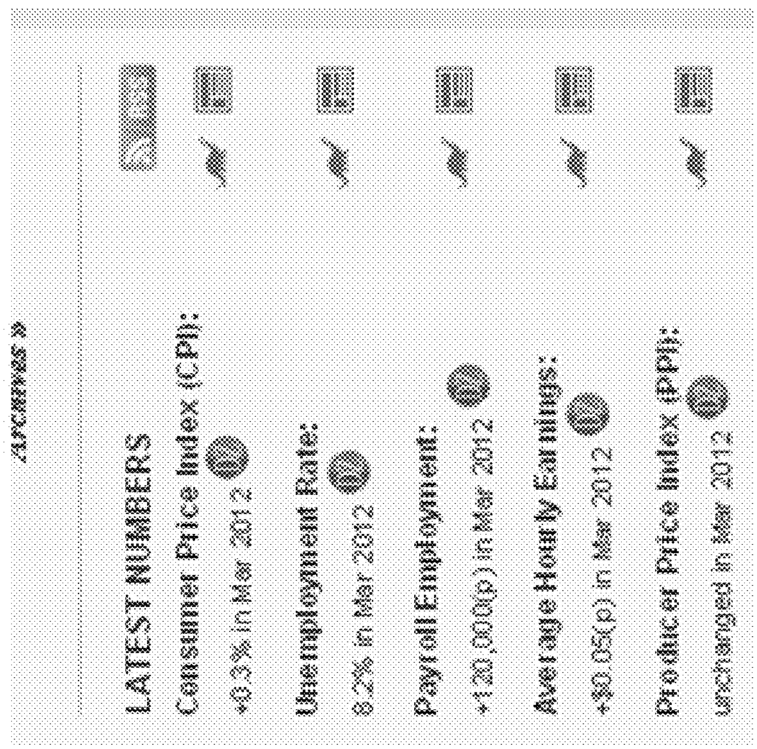
FIG. 4 is representation of a display of a web page that illustrates placement of the DataZither Dot on the home page of the Bureau of Labor Statistics at BLS.gov in accordance with an embodiment of the present invention.
Figure 5:
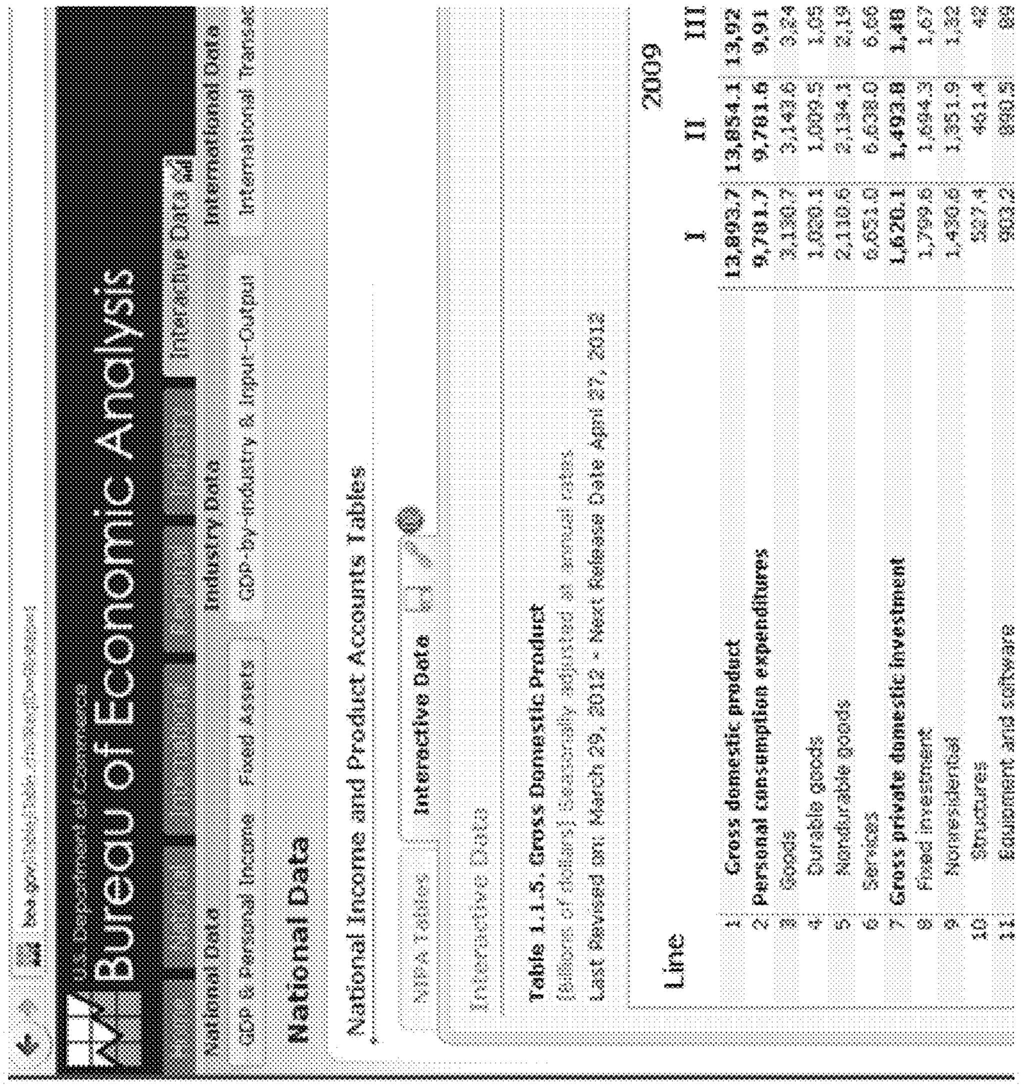
FIG. 5 is representation of a display of a web page that illustrates placement of the DataZither Dot on the Interactive Pages of the Bureau of Economic Analysis, which has a home page at BEA.gov in accordance with an embodiment of the present invention.
Figure 6:
FIG. 6 is representation of a display of a web page that illustrates DataZither Dots (DZ Dots) on the Financial Statement Pages, for GE Corporation, of WSJ.com, in accordance with an embodiment of the present invention.
Figure 7:
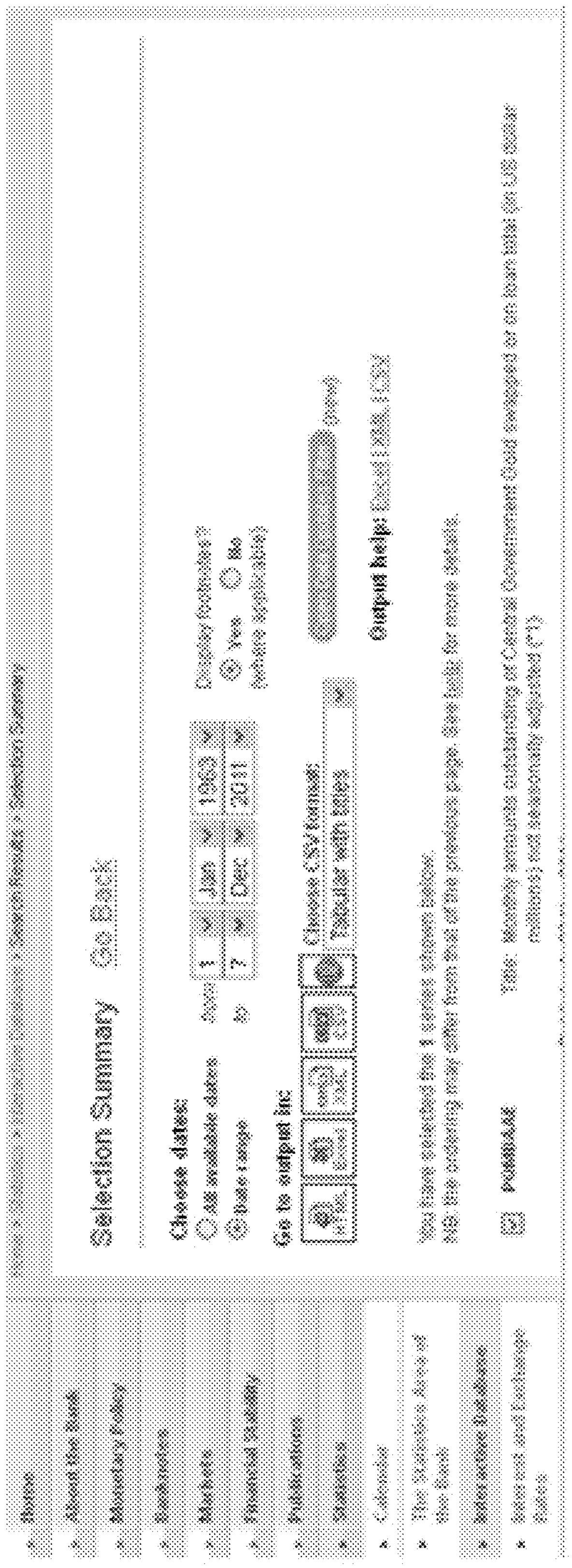
FIG. 7 is representation of a display of a web page that illustrates placement of a DataZither Dot in a web page of the Bank of England in accordance with an embodiment of the present invention.

FIG. 4, we show placement of the DZ Dot on the home page of the Bureau of Labor Statistics at BLS.gov. In FIG. 5, we show placement of the DZ Dot on the Interactive Pages of the Bureau of Economic Analysis, which has a home page at BEA.gov. In FIG. 6, we show DZ Dots on the Financial Statement Pages, for GE Corporation, of WSJ-.com. As can be seen from FIGS. 4 and 6, it is within the scope of embodiments of the present invention to place a plurality of dots on single web page, with each dot identifying a distinct cluster of data.

The placement of a DZ Dot on a web page can be achieved with surgical precision. To illustrate this feature, in FIG. 7, we show placement of a DZ Dot in a web page of the Bank of England, wherein the DZ Dot is placed immediately adjacent to alternate output format options, such as CSV, HTML and XML, that are present natively on the Bank of England web site. Positioning of the DZ Dot as shown enables the user to easily access the data extraction features of embodiments herein in a manner that is graphically and notionally compatible with output options provided natively on the Bank of England web site.

As shown in FIGS. 4-7, each DZ Dot appears adjacent to individual data or data collections that can be extracted and monitored by the DZ applications, including DataZephyr (the client side application previously described) and DataZoa (the web-hosted account described previously), as well as any other applications which are made to be DZ-data aware. (As previously discussed, the data may be numeric time series data, but may optionally be non-numeric series—e.g., a series of events—or simply numeric data that is not time-stamped or date-stamped).

Although the DZ Dots in FIGS. 4-7 have been described in the context of placement by processes running in the browser of the user of client computer 14 working in conjunction with the DZ Dot server 15, it is within the scope of embodiments of the present invention for the web site owner to cause placement of DZ Dots directly on the web site. Such placement may be achieved by snippets of code written for the purpose of placing such dots. The site owner causing placement of DZ Dots directly on the owner's site would thus make DZ compliant data on the owner's site readily and immediately accessible to the public in a normalized format via the user interface described herein.

Figure 8:
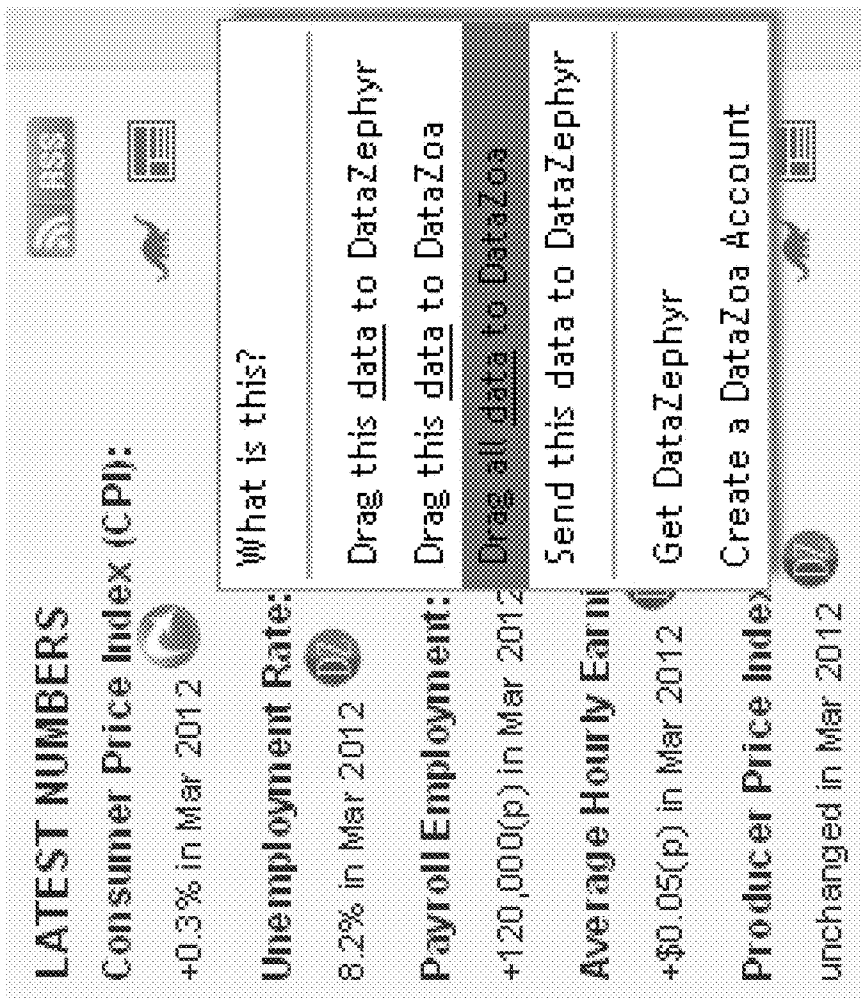
FIG. 8 is representation of a display of a web page that illustrates the effect resulting when a user causes the mouse-driven icon to hover over a DZ Dot in accordance with an embodiment of the present invention.

FIG. 8 illustrates an embodiment of the user interface for triggering the extraction of selected data in accordance with an embodiment of the present invention. In order to cause extraction of data from a web page manifesting the DZ Dot, the user simply hovers the mouse (or finger, if using a touch screen) over the DZ Dot (or clicks on it) that appears adjacent to the data of interest. This user action causes the user to be presented with a menu of choices, shown in FIG. 8, which include, among other things:

Drag this data to DataZoa

Drag this data to my DataZephyr application

Send this data to my DataZoa Account

Send this data to [the next free data window/s in] DataZephyr

Take (Drag or send) all DZ Dot flagged data on this web page into my DataZoa Account Take (Drag or send) all DZ Dot flagged data on this web page into DataZephyr In FIG. 8, when a user hovers over the DZ Dot, a visual indicator, in this case, a right-downward-hooking arrow, is displayed in the selected Dot to identify to the user the specific data series or collection that will be acted upon following the menu selection made by the user.

Figure 9:
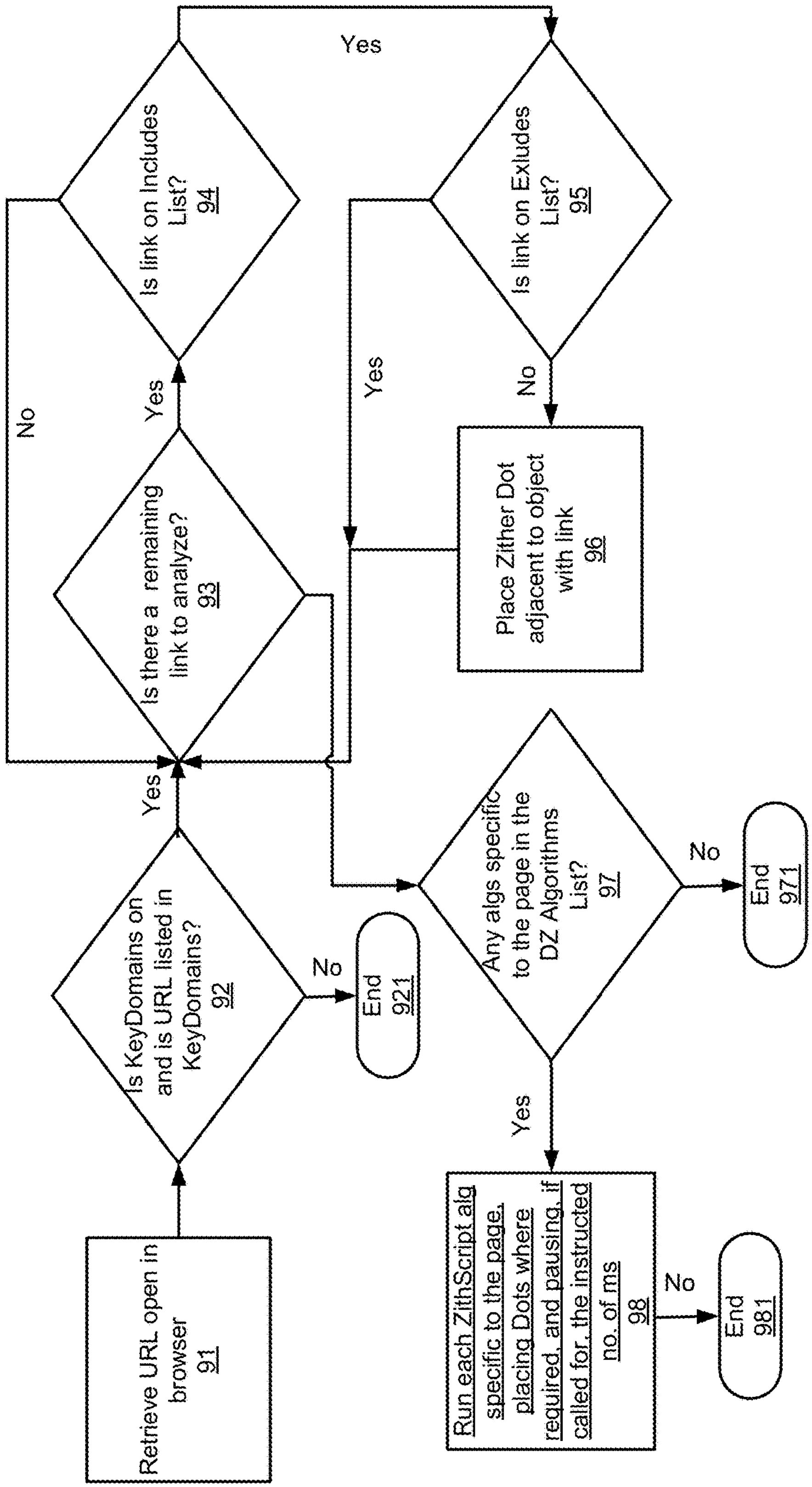
FIG. 9 is a block diagram showing processes carried out by the DZ Dot browser add-on 141 in placing a DataZither Dot, in accordance with an embodiment of the present invention, at the time of loading of a web page having numeric data.

FIG. 9 is a block diagram showing processes carried out by the DZ Dot browser add-on 141 in placing a DataZither Dot at the time of loading of a web page having numeric data. In process 91, the DZ Dot browser add-on retrieves the URL of the web page open in the browser. In process 92, the DZ Dot browser add-on determines whether the process KeyDomains (which lists URLs that have been analyzed for placement of DataZither Dots) has been turned on, and if so, whether the URL is listed in KeyDomains. If the answer to either questions is "no", then the DZ Dot browser add-on terminates dot placement processing in process 921. If the answer to both questions is "yes", then in process 93, the DZ Dot browser add-on determines whether there are any remaining links on the web page to analyze. As long as there is a remaining link to analyze, the DZ Dot browser add-on performs link analysis by in process 94 determining whether the link is listed in the Includes list and in process 95 determining whether the link not listed on the Excludes list; unless both conditions are satisfied, the DZ Dot browser add-on moves on to consider the next link. If both conditions are satisfied, then, in process 96, the DZ Dot browser add-on places a DataZither Dot in the displayed web page adjacent to the object in the web page associated with the link. When in process 93 it is determined that there are no more links to process, the DZ Dot browser add-on moves in process 97 to determine whether there are any Zithscript algorithms specific to this URL in the DZ Algorithms list. If not, then in process 971, the DZ Dot browser add-on ends dot processing. If there are any Zithscript algorithms specific to this URL, then in process 98, the DZ Dot browser add-on runs the Zithscript algorithms, placing dots where specified by the algorithms, and if any algorithm so specifies, pausing the instructed number of milliseconds before placing the dot, in order to provide time for the web page to load. After running the Zithscript algorithms, in process 981, the DZ Dot browser add-on ends processing.

Figure 10:
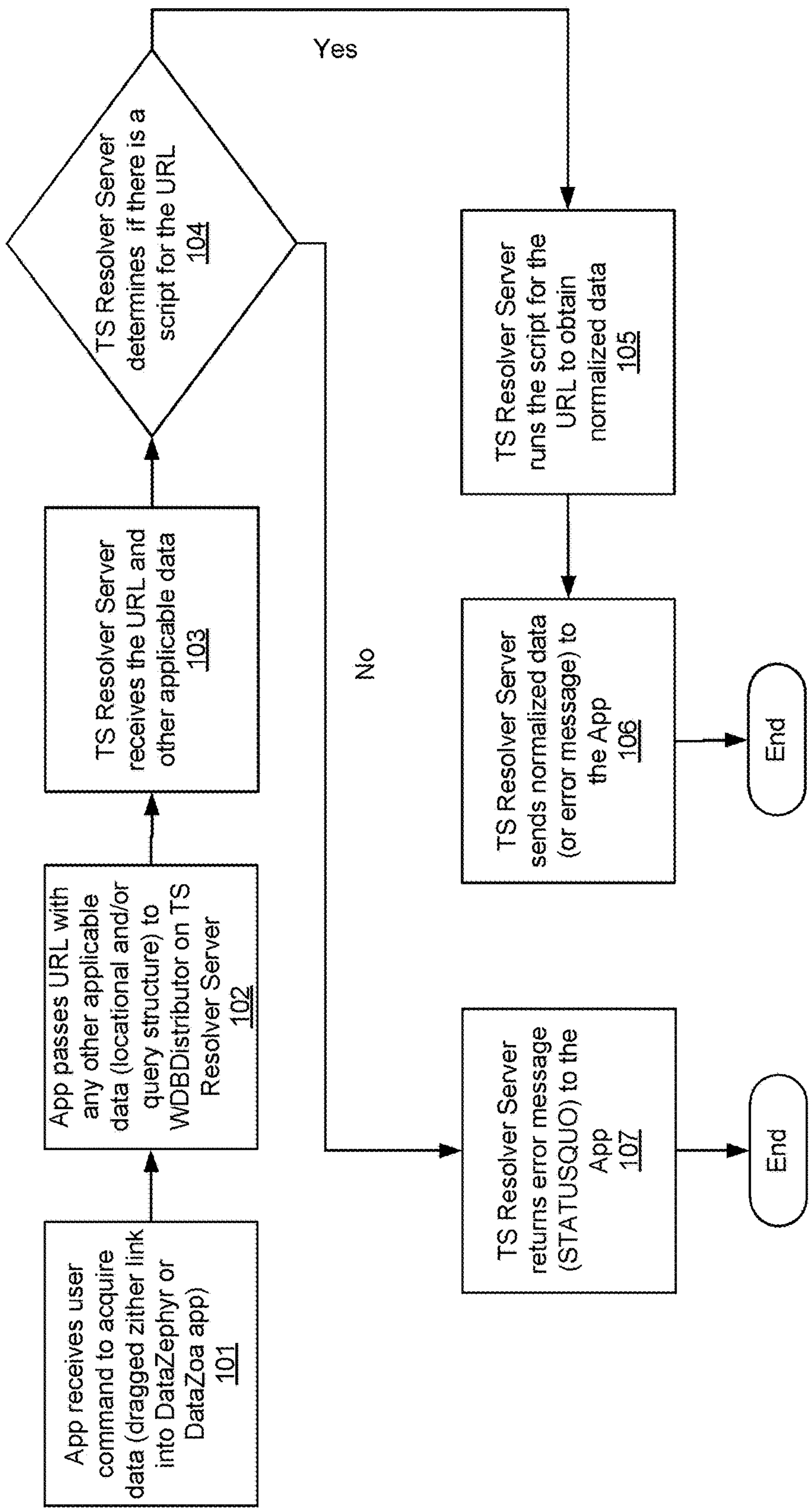
FIG. 10 is a block diagram showing processes carried out, in accordance with an embodiment of the present invention, by an application (such as DataZephyr 143 running directly on client computer 14 or the DataZoa server 17 in conjunction with the DataZoa web page running in browser 142 of client computer 14) in relation to the TS Resolver Server 16 in accessing normalized data from a third party web site.

FIG. 10 is a block diagram showing processes carried out by an application (such as DataZephyr 143 running directly on client computer 14 or the DataZoa server 17 in conjunction with the DataZoa web page running in browser 142 of client computer 14) in relation to the TS Resolver Server 16 in accessing normalized data from a third party web site. In process 101, the relevant application receives a user command to acquire the numeric data from the third party web site. On such user command, for example, may be implemented by the user's use of a mouse to drag a DataZither Dot associated with the data of interest to the user into a target in the DataZephyr application or the DataZoa web page. In process 102, in response to this command, the application passes the URL of the web site, along with any other applicable data (which may be locational and/or be a query structure associated with the data of interest) the TS Resolver Server 16, and in particular to WDBDistributor module of the server. In process 103, the TS Resolver Server 16 receives the URL and other applicable data, and in process 104, the TS Resolver Server 16 determines if for the URL there is a script in site script storage 161. If there is no script, then in process 107 the TS Resolver Server 16 returns to the application an error message STATUSQUO and ends processing. If there is a script, however, then, in process 105, the TS Resolver Server 16 runs the script to acquire the data from the web site and to normalize the data. In process 106, the TS Resolver Server 16 sends the normalized data to the application, or, if an error resulted in acquiring and normalizing the data, an appropriate error message; and then the TS Resolver Server 16 ends processing.

Figure 14:
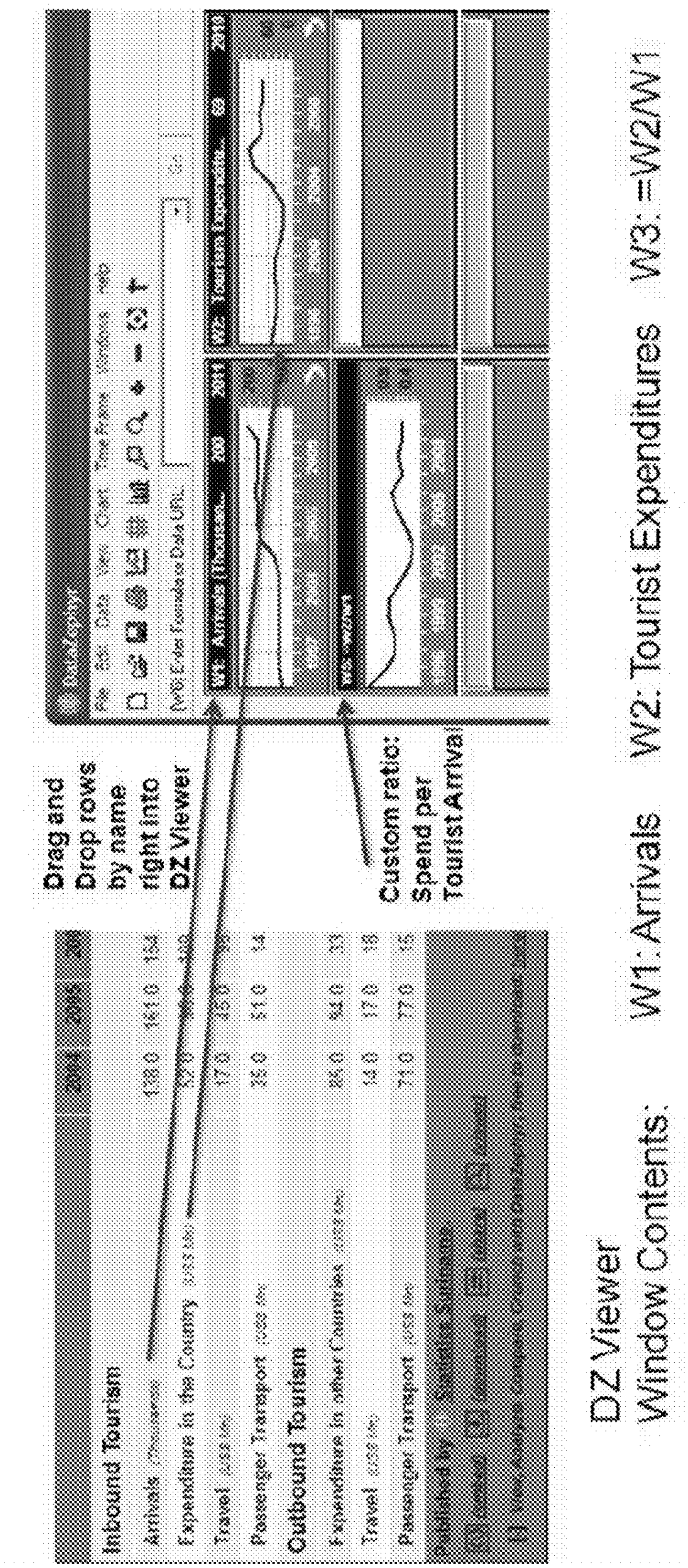
FIG. 14 is representation of a display of a web page that illustrates an aspect of the user interface of an embodiment of the present invention by which time series data appearing in a DataZoa table of the sort described in connection with FIGS. 18 and 19 may be imported into the DataZephyr charting and analysis application 143.

FIG. 14 illustrates an aspect of the user interface of an embodiment of the present invention by which time series data appearing in a table of a web page, which table is being produced and served by a DataZoa account containing the underlying data, being viewed in the browser of client computer 14 may be imported into the DataZephyr charting and analysis application 143. In this example a calculation is performed on the time series data using DataZephyr. Specifically, the interface is designed so that the user may use the mouse to drag the name of a row or table or table series of interest (such as the row name "Arrivals") from the displayed web page into the DataZephyr, where the row or table or table series is immediately charted (here, producing the chart W1 in DataZephyr). Similarly the user may drag the name "Expenditures in the Country" from the table of the displayed web page into DataZephyr to produce the chart W2. DataZephyr has been here invoked to calculate W3:=W2/W1, and the results of this calculation is another time series plotted as W3 in DataZephyr. DataZephyr is configured to cause updating of its charts (using the TS Resolver Server 16).

Figure 15:
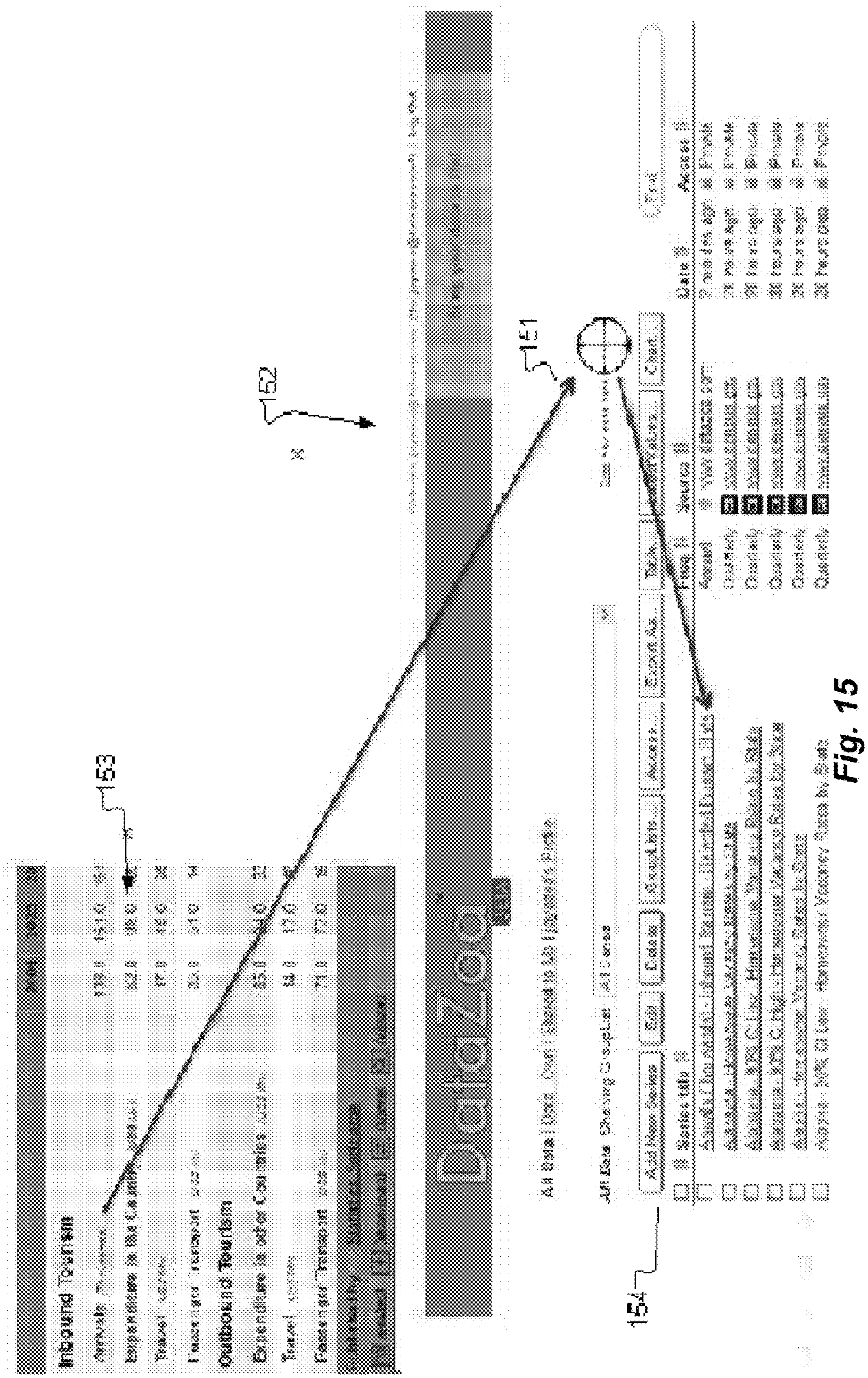
FIG. 15 is a representation of a display of a web page showing an aspect of the user interface of an embodiment of the present invention by which time series data appearing in a DataZoa table of the sort described in connection with FIGS. 18 and 19 may be imported into the user's DataZoa account.

FIG. 15 illustrates an aspect of the user interface of an embodiment of the present invention by which time series data appearing in a table of a web page being viewed in the browser of client computer 14 may be imported into the user's DataZoa account via the DataZoa web page 142 of FIG. 1 in the browser of client computer 14. In this example, as shown in FIG. 15, the user has dragged the row name "Arrivals" from a table 153 in the displayed web page to the target 151 of the DataZoa web page 152. The DataZoa web page displays names of time series data in the user's DataZoa account, and here the top row 153 in the listing is identified as "Arrivals" as a result of the user's dragging the row name "Arrivals" from the table 153 to the target 151.

It is within the scope of embodiments of the present invention to provide other compliant applications that may similarly receive and cause updating of time series data that has been dragged from a table in a displayed web page. It is also within the scope of embodiments of the present invention for DataZoa to provide other types of displays which can serve to the user individual time series which the user may take into their DataZoa account or other compliant applications.

As discussed in connection with FIG. 11, time series data may be imported into DataZoa and other compliant applications using menu selection or other techniques as an alternative to dragging with the mouse. The functionality illustrated in FIGS. 11, 14, and 15 facilitates convenient acquisition, monitoring, updating, and use of time series data, and is an important source of value of embodiments of the present invention.

Branded Data.

Figure 12:
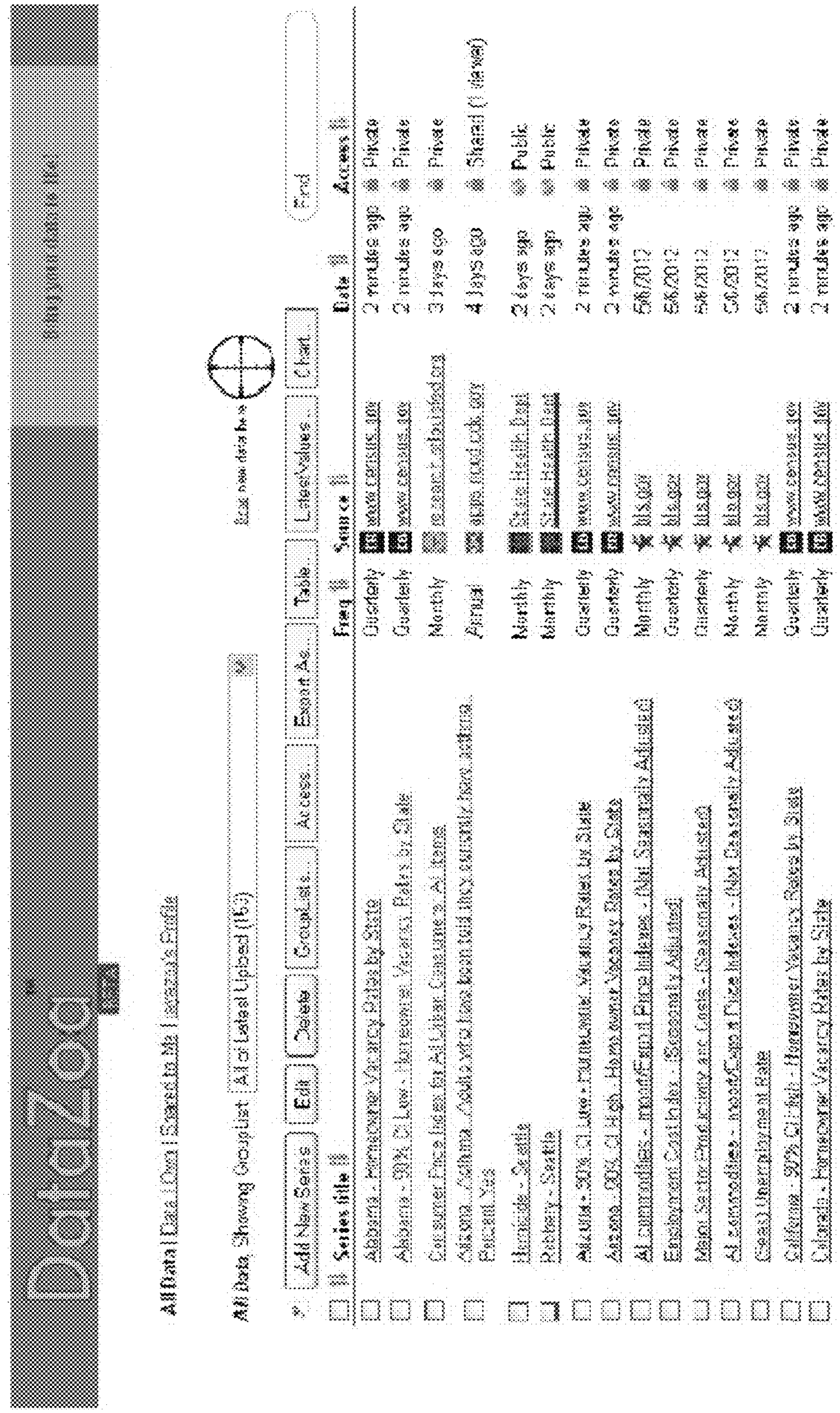
FIG. 12 is representation of a display of a web page that illustrates how publisher icons and clickable links appear in a data listing view of an end user's DataZoa account in accordance with an embodiment of the present invention.
Figure 13:
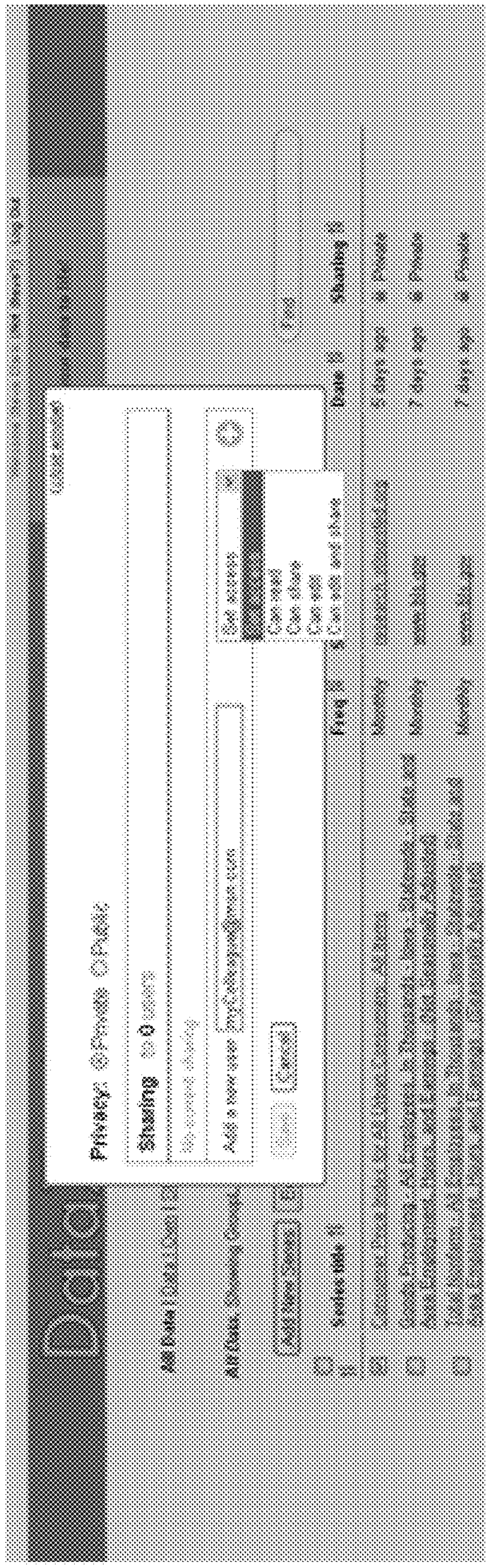
FIG. 13 is representation of a display of a web page that illustrates a user interface, in accordance with an embodiment of the present invention, for causing the sharing of data among DataZoa account users.
Figure 17:
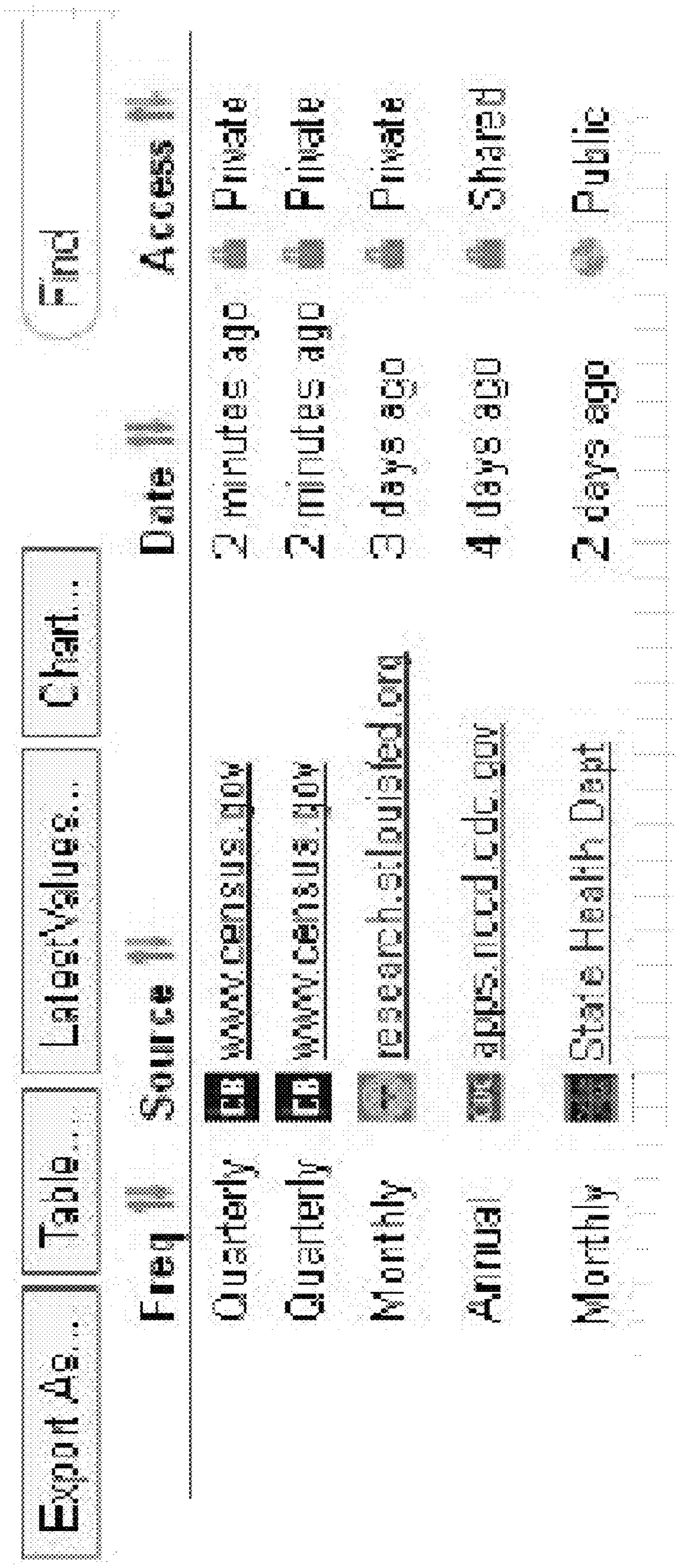
FIG. 17 provides detail of FIG. 12, showing, among other things, in each row, the web URL of the corresponding data in the DataZoa account as well as the favicon for such data.

In accordance with an embodiment of the present invention, the user's destination application will also manifest, if available, any web-based data source's favicon, which can be located on the source web site, and will place this icon, for example, in the lower right corner of a chart or listing of the data in the destination application (e.g., in the DataZephyr application or in the user's DataZoa account). While the favicon can be considered an alternative to a trademark or URL, in fact for purposes herein the favicon may usefully be implemented as a trademark that includes a hyperlink to the URL by which the relevant time series data may be accessed via the source. FIG. 17 provides detail of a portion of FIG. 12, showing, among other things, in each row, the web URL of the corresponding data in the DataZoa account as well as the favicon for such data. The favicon can also be displayed in other manifestations of the data, such as a table or chart produced by and/or served out to others, for example on the web, by the DataZoa account. The favicon will, by default, manifest that URL and other contextual data from the original site where the data came from, and will further enable the user to click on that icon and be delivered from the user's destination application (e.g., DataZoa account, DataZoa-served table or chart, or DataZephyr), to a fresh or open browser window or tab which will contain the URL for the original information, thus giving the user a convenient pathway back to the points of origin of their data.

This user clickable favicon or other trademark, which links back to the web page source of data (or to a special destination page for marketing purposes) provides a benefit to the data publisher in that it provides both branding for the publisher as well as a click-back link, adjacent to the publisher's data, even after the data has left the publisher's web site.

Data Served by the Publishing Features of DataZoa.

Even when the DZ Dot is not available on a web site, a DataZoa account can be used to publish and share numeric data, including publication of dynamic updates of this data. Thus a data owner or publisher for which a connector has not yet been established can use the publishing features of DataZoa to publish their data via DataZoa tables, charts and other display tools, which in turn empowers their site visitors to access and use the publisher's data in visitors' own DZ-Enabled applications, such as their DataZoa end-user accounts and DataZephyr desktop software applications.

More specifically, the data on an owner's site may also be data which is delivered to the site by tables, charts or other displays created and served up by the publisher's own DataZoa account, because one of the central features of DataZoa is that it can also be used as a data publishing platform. Note that such table, chart and other displays, including widgets, serve data which is implicitly able to be utilized with the DZ Dot access conventions set forth below, unless these capabilities are otherwise shut off by the data owner/publisher putting out such data display widgets. In lieu of the DZ Dot, other indications of the ability of the data in such displays to be accessed by the DZ system may be relied upon, such as a distinctive highlighting or coloring of data, explicit statement that the numerical data can be captured using DataZoa, or the appearance of a branding or other marking, a name or URL including the letters DZ, some elements of the look and feel of the DZ Dot, a right-mouse-button menu choice, or simply instructions or a link to instructions as to how to capture the data with the DZ system. For mobile devices, other user-interface conventions may be offered to enable a user to, for example, send data from such a display to their own DataZoa account or otherwise register it in their DataZoa account for monitoring. Thus while LMT creates connectors to various numeric-content hosting web sites, it also offers data owners the ability to become "DZ-compatible" by using the DataZoa data publishing tools.

Figure 11:
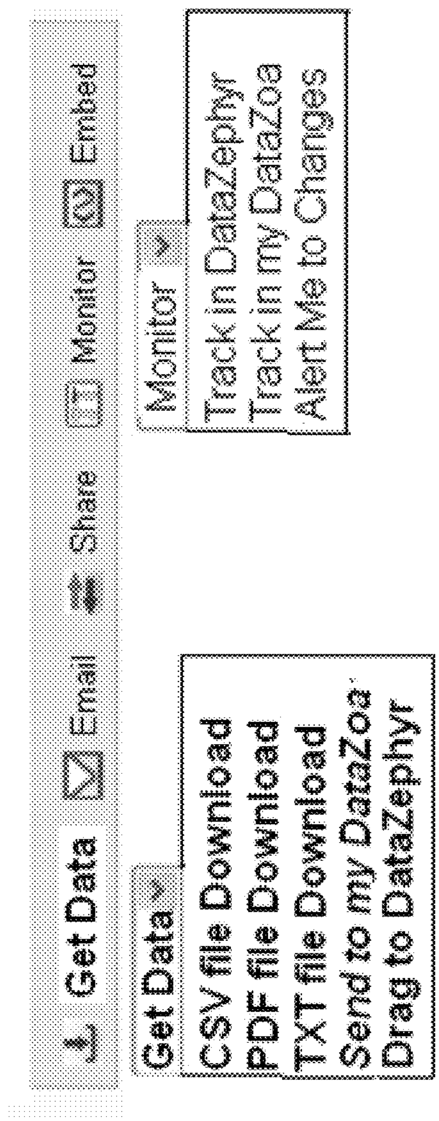
FIG. 11 is representation of a display of a web page that illustrates a user interface for an embodiment of the present invention implementing publishing features of DataZoa.

FIG. 11 provides an example of a user interface for an embodiment of these DZ-compatible features. In this example, suitable controls appear below at the bottom or in other proximity to an embeddable table or chart or other display of data served by DataZoa. Specifically, "Get Data" and "Monitor" selectors in FIG. 11 are placed above a data table or chart or other data display to which the selectors relate, and enable the user to trigger actions, in relation to the data, that include, among other things, "Send to my DataZoa" or "Track in DataZephyr".

FIG. 12 shows how publisher icons and clickable links can appear in a data listing view of an end user's DataZoa account. Here individual data series can be "hung out" on the web with publisher-determined click-back links which serve the publisher's marketing goals. DataZoa publishers have the ability to over-ride their click-back URL from favicon for marketing purposes. A publisher option exists for data published via DataZoa such that and end-user's click-back from such a favicon or other URL presented in association with such numeric data, could also go to a pre-specified web page, just like a paid ad on Google might manifest a "display url", but would click back to an advertiser-specified click-back URL which could be different from the display URL. Thus, if the large global real estate CB Richard Ellis decided to publish data about city-level rents, vacancy rates, etc., from a DataZoa publisher account, series relating to the Hong Kong market, when their associated favicons or display URLs were clicked upon, would direct the user to, for example, the web page of the Hong Kong office of CB Richard Ellis.

Automatic Data Update Cycle.

DataZoa and DataZephyr can invoke the TS Resolver to check for updates from the original web-based data source or a DataZoa account. In the case of data from a DataZoa account, the user's application may receive a signal or data updates, which in the case of the former, notifies the application that new data is available. When the DZ compatible application gets its signal to check for updates, the same TS Resolver system is again activated, utilizing the "package" of information originally used to fetch and interpret from the web site or DataZoa-served table, chart or other display, and proceeds, in the manner described in connection with FIG. 2, to extract, normalize, and store the updated data in an array, which is then used to replace, including any new values, the data already known to the DZ-compatible application. Different choices for replacing versus simply augmenting the existing data in the DZ-compatible application may be exercised by the TSResolver system based on knowledge about the source of the data. In the context of a data update cycle, specific data values of a collection, for example, the June, 2012 unemployment rate, may be superseded by the data source with a revised June, 2012 value for unemployment. Alternatively, the data source might drop off and cease, either temporarily or permanently, providing one or more of the older or oldest values it previously maintained for the unemployment rate; for example, the July, 1952 rate might be dropped as the July, 2012 rate is added, in order to save storage space or web page space or for other reasons. To handle such circumstances, optionally the DZ system (i) archives the data collection as it existed prior to any revisions of such values as the June, 2012 value in the above example, and (ii) retains the oldest values in the same data collection in the user's DataZoa account. Thus, in this example, the user's account will have an archived time series for unemployment as it looked prior to the above-described revision of the then already published June, 2012 value. Additionally, the user's DataZoa account will retain older values, such as the July, 1952 et seq. unemployment rates as these were dropped from the data presented by the source.

Sharing Numeric Data from DataZoa Accounts to Other DataZoa Account Holders or Systems Working Through a DataZoa Account and its API.

Each DataZoa account can be used to share data via an email address identifier with another person who has, or is notified that they can open (via the email sharing message) a DataZoa account. As shown in FIG. 11, any number of series can be check-boxed and shared to individuals by specifying their email address and setting their access privileges. Once data is shared by one DataZoa account with one or more others, that numeric data is accessible for those permissions allowed to each such user, such as reading, sharing to others and/or editing of the data. For efficiency, once data is shared in this way, additional copies are not made of the data, but rather access permissions are simply attached to the accounts of those to whom data was shared, as well as being attached to the information in the primary holder's account. Similarly, in various embodiments a DataZoa account holder may render a table or other data display from which data can be effectively accessed or "borrowed" by a user and followed in the user's own DZ compatible applications, such as the user's DataZoa end-user account or DataZephyr application. In such cases, the publisher of that data is permitted to see the number of individuals, and/or the identities of the individuals (as identified by their DataZoa account, typically registered with an email address) with whom the publisher had shared data or whom had "borrowed" the data from the publisher. A publisher having such data-item specific user/borrower information can use the information in a variety of commercial contexts, and of course end-users can be offered free data in exchange for allowing themselves to be identified and/or contacted by a publisher. Similarly, the ability to track data users/browsers can be used prior to granting access as a means of determining whether the user is permitted to access what may be paid subscription data. Finally, such DataZoa displays, which may, for example, take the form of tables showing only the names of various data items and/or the name and a short stub of the data, could serve as a data subscription marketing and selling platform to the underlying data and streams of data, not unlike a web site which sells music might enable the user to listen to a portion of a track of music, then purchase the entire track.

Figure 19:
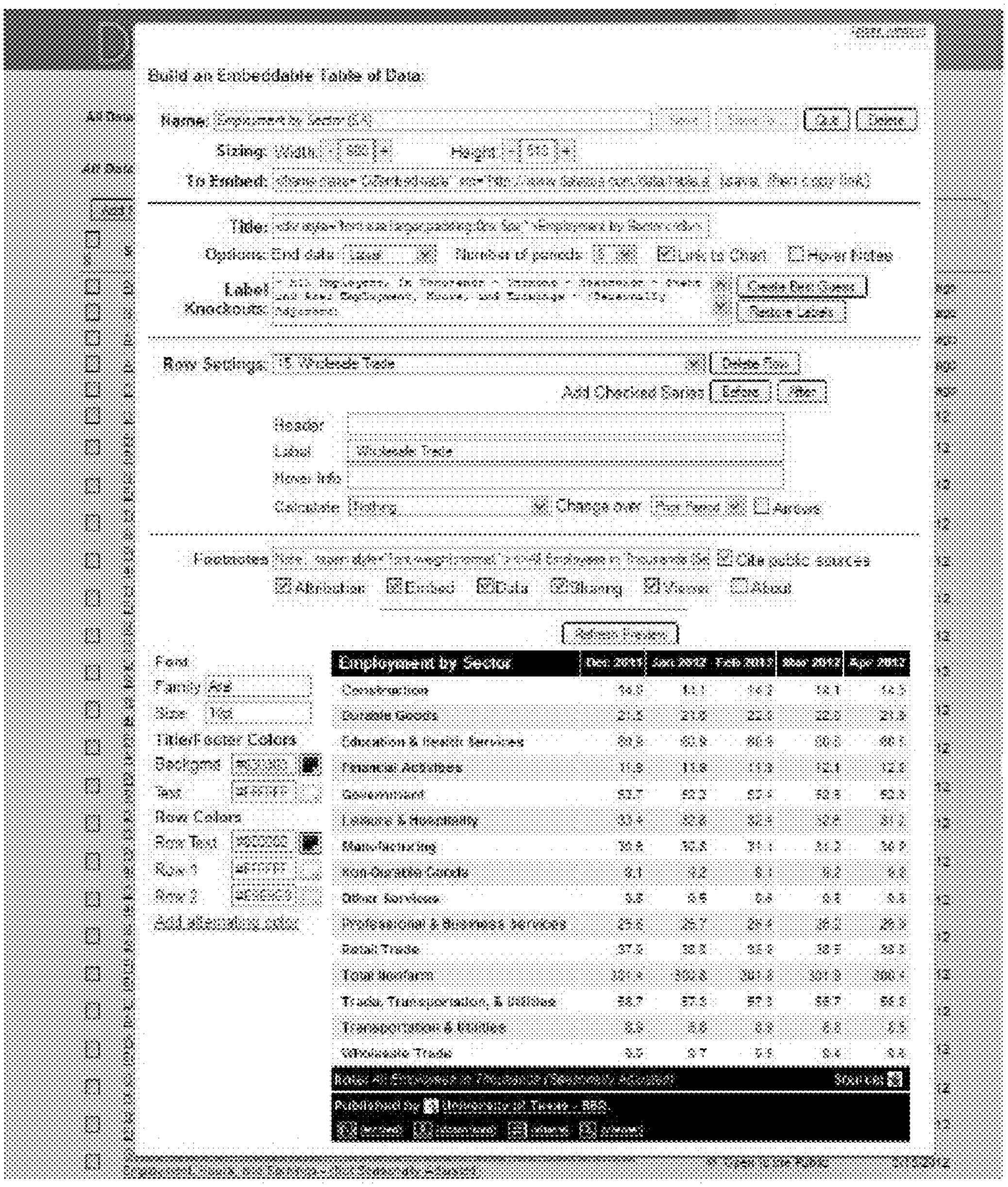
FIG. 19 is a representations of a display of a web page in which is presented the table-building tool of DataZoa that was used to render the finished, web-delivered table in FIG. 18 in accordance with an embodiment of the present invention.

FIG. 18 illustrates a classic DataZoa-served table, which, in various embodiments of the present invention, can be inserted into any web site by using the link served up by the DataZoa table builder, which in turn is depicted in FIG. 19. Any DataZoa table can carry (i) data from any external source supported by the DZ Dot processes described above via drag and drop or menu selection of sending the data to a user's DataZoa account, (ii) data from any other DataZoa table, from which data may be dragged and dropped into the account of the user rendering his own DataZoa table, (iii) data uploaded into a DataZoa account by a user, or (iv) data written into a DataZoa account by a computer process via the DataZoa API. DataZoa tables also offer the publisher the ability to turn on capabilities for the user such as (1) picking up an embed link to enable the exact depicted table to be embedded by the user on another web site, (2) downloading all the data behind the table, including historical portions of the series in the table which are not depicted in the current view, (3) sharing of the table via social networking services such as Facebook, Twitter and popular email services, and (4) downloading the DataZephyr viewer (also called DataZoa viewer) so that individual series in the table may be dragged and dropped by the user into DataZephyr for further viewing, live monitoring of updates from the DataZoa account behind the table, analysis, saving in DataZephyr worksheets, and emailing of DataZephyr worksheets to others.

FIG. 19 illustrates the table-building tool of DataZoa which was used to render the finished, web-delivered table in FIG. 18. This tool allows the user to specify in a form a set of criteria governing operation of the web-delivered table. The user may select via check-boxes, the series desired to be placed in the table, and then choose various options and controls such as number of time periods, and whether the table should always go to the "Latest" date, which means that it would roll forward in time as new data became available in the user's DataZoa account. (Such a mechanism removes data from the oldest time period to make room for data from the newest time period.) The DataZoa table building tool includes a label knockouts tool. This tool will pass through rows names in a table, which rows initially receive the sometimes rather long name for the series as it is delivered from the web site where it was found by the user, and suggest candidate text portions of those row names to "knock out" of the row labels, thereby reducing repetitive text from the row names. This is achieved by a computer process which examines all the row names for occasions of text which is repeated frequently and offering a "best guess" to the user for what should be "knocked out", and presenting a table view with that best guess knocked out of the table.

Since DataZoa has an API for both reading data from DataZoa and writing data to DataZoa (at the account level), external systems may also effectively be the recipients of sharing transactions from DataZoa as data is shared to DataZoa accounts being used by such systems.

Data, Allowing Aggregation by Multiple Attribute Dimensions of the Raw Transaction Data, and Delivery of Data into Enabled Applications.

If the data source of interest to the user comprises a collection of transactions, such as from a user's bank debit card, each transaction typified by a date/time, but also such other attributes as a Store Name, City/Location, the DZ Dot may invoke a separate loop TS Resolver program/s to:

(1) extract the block of transaction data,
(2) offer up to the user menus of data attributes such as "Vendor" and "Location",
(3) invite the user to select some or all of the desired dimensions along which to summarize the data (eg. by Vendor), including the ability to include/exclude specific alternatives among the class of Vendors found,
(4) allow the user to choose a data frequency for aggregation (eg., weekly, monthly, daily, quarterly annually or no aggregation), and then
(5) deliver an array of data conforming to the user's summarization and dimensionality requests to the DZ-compatible application.

The above case is typically one where the data originates in raw transaction format, and the User is given the opportunity to place their own interpretive rules upon the raw transaction data, which rules become part of the subsequent Automatic Data Update Cycle as described above and applied to that web page or site where the user's transaction data of interest was found.

DataZoa manifests a novel "hunting scope" drop zone for dragged-in data, which then reports on data uploading progress to the user. When the user is running the DataZephyr application, as well as the DataZoa web page, the data flows directly into chart windows contained within the DataZephyr application.

Epochal Time Series.

Another aspect of embodiments of the current invention involves the ability to store an "epochal time series", as defined above, wherein each value in the series is a function of a condition that changes with time, but not necessarily on a regular basis. As an example, the condition may be the identity of the Chairman of the Federal Reserve. Another example is where the function is of the identity of a baseball team's coach. Yet another example is where the function is of when a given team holds the World Series championship pennant. A further example is a function of each then active hurricane in a region. Such data are characterized by DataZoa as Epochal Time Series, and upon such Epochs being entered into DataZoa, can be depicted visually in charts such as in FIG. 16. Epochal time series are an important class of information which may give valuable interpretation of numeric time series data.

Up-Reporting/Sharing and Publication Release Control System.

A further embodiment of the present invention provides data publication and release authority controls. The data sharing capabilities of embodiments herein lend themselves to the needs of many primary data publishers, such as a country level statistical agency. Such agencies typically receive information from subsidiary agencies and ministries, for example the minister of tourism, who reports total tourist arrivals, and the minister of health, who reports births, deaths and myriad aggregate health statistics. Such staff members at such ministries may collect their statistics, enter them into a DataZoa account, and share them from their DataZoa account to their minister's account, who may in turn share his final figures with the country-level statistical office. This set of nested sharing arrangements provides an instantaneous pass-through and up-reporting of important statistical information. Because some level of review and approval may be desired as data moves from ground level up to the reporting hierarchy, and ultimately gets released to the public, further embodiments of the present invention include a pre-sharing-pass-thru-approval system, a pre-publication approval system, and a scheduled publication system, all as described below.

Pre-Sharing-Pass-Thru-Approval System.

This system provides the ability to establish, for any data series or collection of series, and any list of individuals to whom that data is shared within the DZ system, a list of (Internal Review) Approval Panels. For each Approval Panel there may be specified (a) one or more individuals identified by email address, (b) the number of members of the panel who must approve the data, (c) the number of vetos or negative votes required by members of the panel to stop an approval, (d) the identities of any Approval Panels which must pass on the data prior to the current Approval Panel being asked to examine the data, (e) any known date/s by which items in the data collection are needed to be approved or corrected prior to release.

Pre-Publication Approval System.

This system provides the ability to establish, for any data series or collection of series, or any data display widget, a list of (Publication) Approval Panels. For each such Panel, a similar set of specifications may be established.

Scheduled Publication System.

This system provides the ability to establish, for any data series or collection of series, or any data display widget, and for any specified data range (specified by date, time or other means), a set of specific dates and times for release of that data to the public via the specified widgets or other systems of data display, including public access via sharing to public or other access to public-facing display of DataZoa hosted data.

Upon the crossing of a sharing approval threshold in (i) or (ii) above, or a publication threshold in (iii) above, the prior existing data values may be optionally archived to enable backwards refreshing and other uses of this data.

FIGS. 20 and 21 are representations of displays of web pages in which appear DataZoa-served displays in accordance with an embodiment of the present invention providing the user with a series of options for using the time series data in the display, including the "follow" option by which the user may subscribe to time series data in the display. The "follow" option can be selected graphically in the display in FIG. 20 by clicking on the "dZ" graphic 201 associated with the "follow" option. Clicking on this graphic cause there to appear below the graphic, indicated generally by arrow 202, two separate links. One link is called "Follow this display" and the other link is called "all of these series". Each link has a different functionality. The first link causes the entire display to appear in the user's account, if the display is not already owned by the user. The second link causes all of the time series data associated with the display to appear in the user's account, if the time series data is not already owned by the user. We show in connection with FIG. 25 below another method to invoke this functionality by a menu available in hovering over a row of a DataZoa-served display. FIG. 21 is a display of latest values, and a time series underlies this display. (For this reason, we still consider this display in this description and in the accompanying claims to be of time series data. In this context, still by clicking on the "dZ" graphic 211 associated with the "follow" option, the user is similarly present with the same kinds of links as in the case of FIG. 20 and presenting the same "follow" options.

Figure 22:
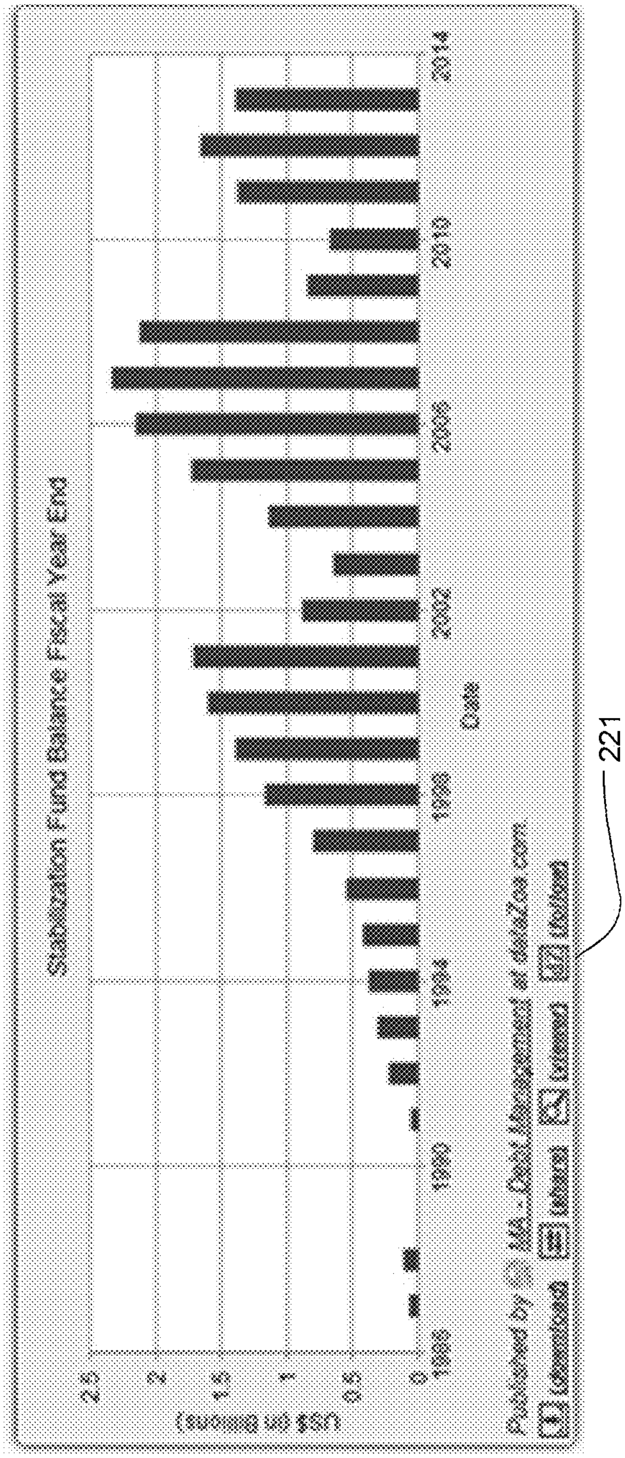
FIG. 22 similarly illustrates a web pages in which appears a DataZoa-served bar chart in accordance with the same embodiment as FIGS. 20 and 21, wherein the user with a series of options for using the time series data in the bar chart, including the "follow" option.

FIG. 22 similarly illustrates a web page in which appears a DataZoa-served bar chart in accordance with the same embodiment as FIGS. 20 and 21, wherein the user provided with a series of options for using the time series data in the bar chart, including the "follow" option. The "follow" option can be selected graphically in the table in FIG. 22 by clicking on the "dZ" graphic 221 associated with the "follow" option.

The "follow" functionality enables a casual observer of a web page in which appears a DataZoa-served table or chart to (i) open a DataZoa account, (ii) post the content constituting the table or chart or a part of it into their DataZoa account (in fact, as we describe in connection with FIG. 23, to a dZBoard named "Latest Arrivals") and (iii) follow all the time series behind the this content in their DataZoa account. The "follow" option thus enables one to subscribe to dynamically updating data displays and dynamically updating time series which one finds on the web or which has been shared with one. The "follow" option in this embodiment therefore provides for time series data what Twitter does for "Tweets". A Publisher can post dynamically updating data displays based on underlying time series data, and others can follow these displays and the underlying time series data on their "Latest Arrivals" screen, as well as follow the underlying streams of numbers in their own DataZoa accounts.

Figure 23:
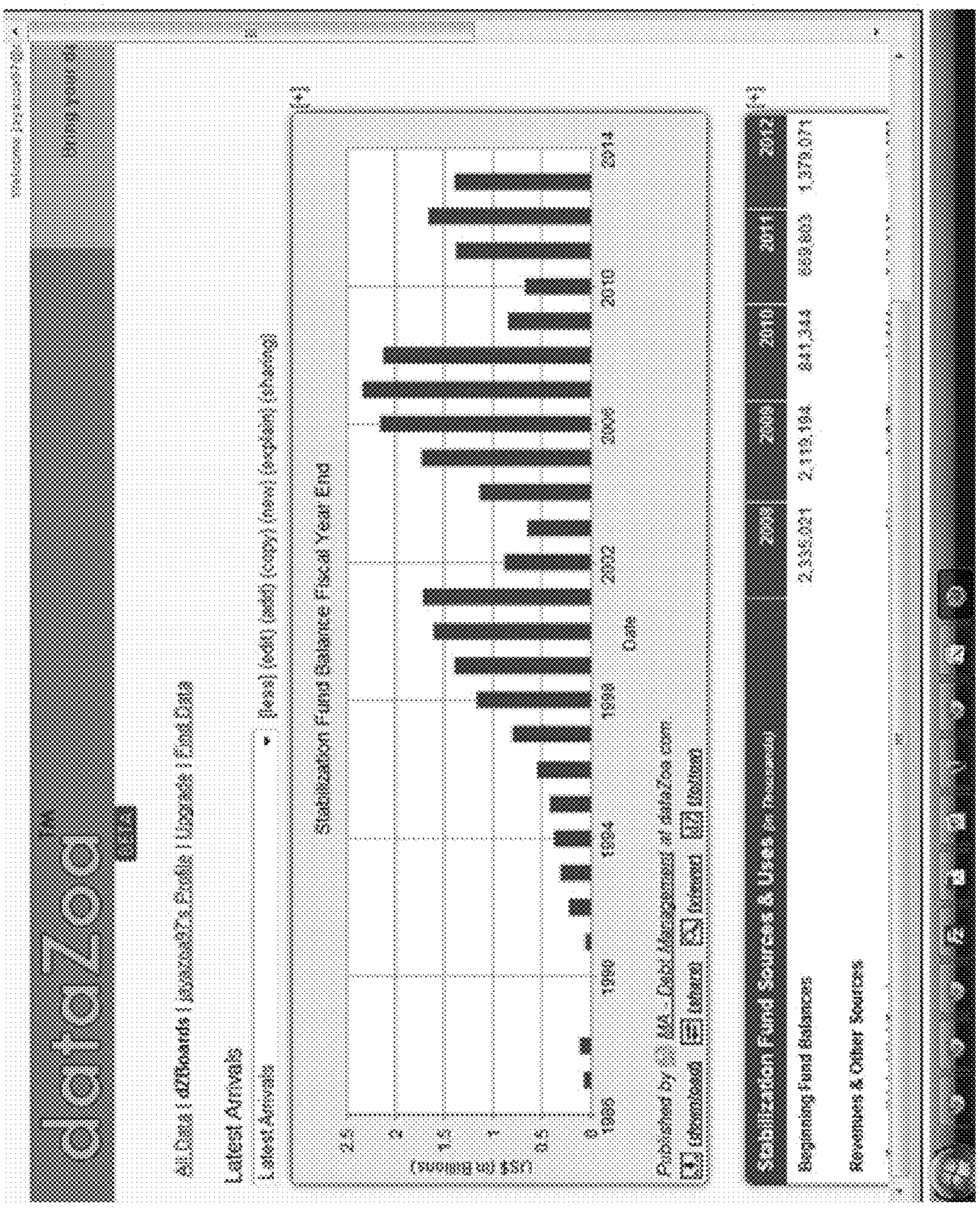
FIG. 23 is a representation of a display of a web page of a DataZoa user account using the "Latest Arrivals" screen (which is a default "dZBoard") of the dZBoards feature associated with a DataZoa user account in accordance with an embodiment of the present invention and showing the appearance in the account of the tables of FIGS. 22 and 20 after election of the "follow" option for such tables.

FIG. 23 is a representation of a display of a web page of a DataZoa user account using the "Latest Arrivals" screen (which is a default "dZBoard") of the dZBoards feature associated with a DataZoa user account in accordance with an embodiment of the present invention and showing the appearance in the account of the tables of FIGS. 22 and 20 after election of the "follow" option for such tables.

Figure 24:
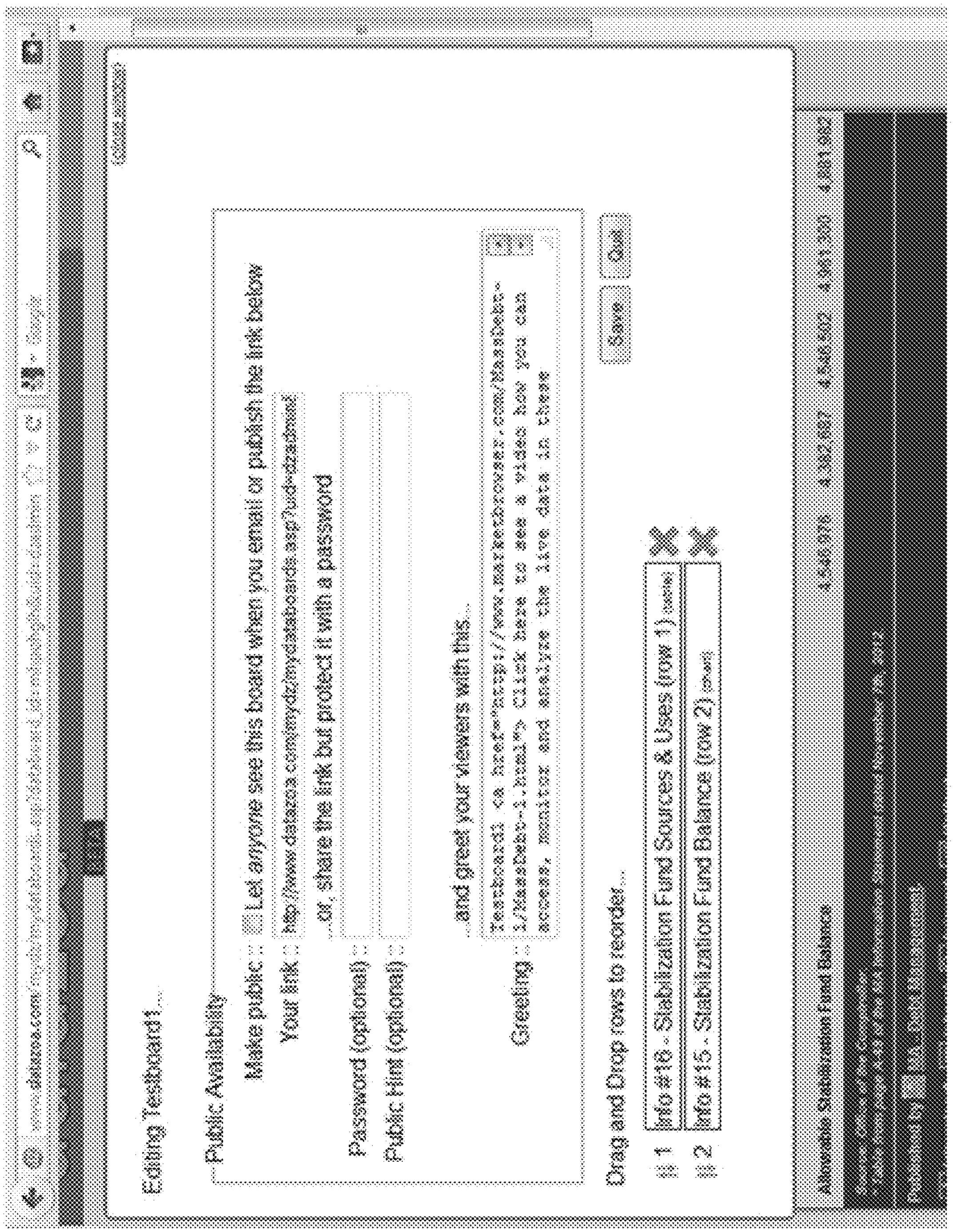
FIG. 24 is a representation of a display of a web page of a DataZoa user account showing another screen (which is a user-customizable "dZBoard"), of the dZBoards feature associated with a DataZoa user account in accordance with an embodiment of the present invention, wherein one can compose a web page including text and one or more tables or charts or both that are served by DataZoa, and cause the web page to be shared privately or publically for viewing on any web-enabled device.

FIG. 24 is a representation of a display of a web page of a DataZoa user account showing another screen (which is a user-customizable "dZBoard"), of the dZBoards feature associated with a DataZoa user account in accordance with an embodiment of the present invention, wherein one can compose a web page including text and one or more tables or charts or both that are served by DataZoa, and cause the web page to be shared privately or publically for viewing on any web-enabled device.

From our discussion it can be seen that dZBoards are a means of organizing, presenting and sharing DataZoa "embeddable" time series data (such as tables and charts of such data) also known as dZEmbeddables. A dZBoard comprises one or more dZEmbeddables organized in a list that can be edited, arranged and annotated (including the addition of text or other HTML manifestation which can be placed above, below and adjacent to any dZEmbeddable), and then displayed through a single URL. The representative URL can be shared and viewed through commonplace means such as email, blog posts, and custom web pages. The resulting dZBoard can be viewed on a personal device such as an iPhone, Android device, iPad, PC or any device which is web enabled. Among the major benefits of dZBoards is that the DataZoa account-holder can effectively render individual, stand-alone web pages for personal use or the use of others. Such pages can also link to each other, resulting in an effective "DataZoa blog" or "DataZoa site". This is of particular value to DataZoa account holders who do not otherwise have their own web sites but who wish to publish web pages leveraged by data in their DataZoa accounts. Another important benefit is the ability to use the dZBoard facility as a report writer to generate reports for individual, group or public use that are updated automatically, and can be manifest on personal web-enabled devices of the relevant audience. Thus unlike early mainframe computer report writers, which delivered a custom, static, hardcopy report, dZBoards deliver a dynamic, always current report manifesting the latest data available flowing through DataZoa's dynamically updating embeddables directly to the dZBoard. As an example, an executive can be in a meeting, or in transit, and in single finger-touch on his web-enabled mobile phone, access an up-to-the-minute dZBoard, reflecting the latest values available in the underlying DataZoa account that drives the display.

A dZBoard is owned by a DataZoa User Account and can be made public, private, or be made selectively available via a password specific to a particular dZBoard. The dZEmbeddables so comprised may be owned by the User Account or may be accessed from other User Accounts if they are publicly available.

Figure 25:
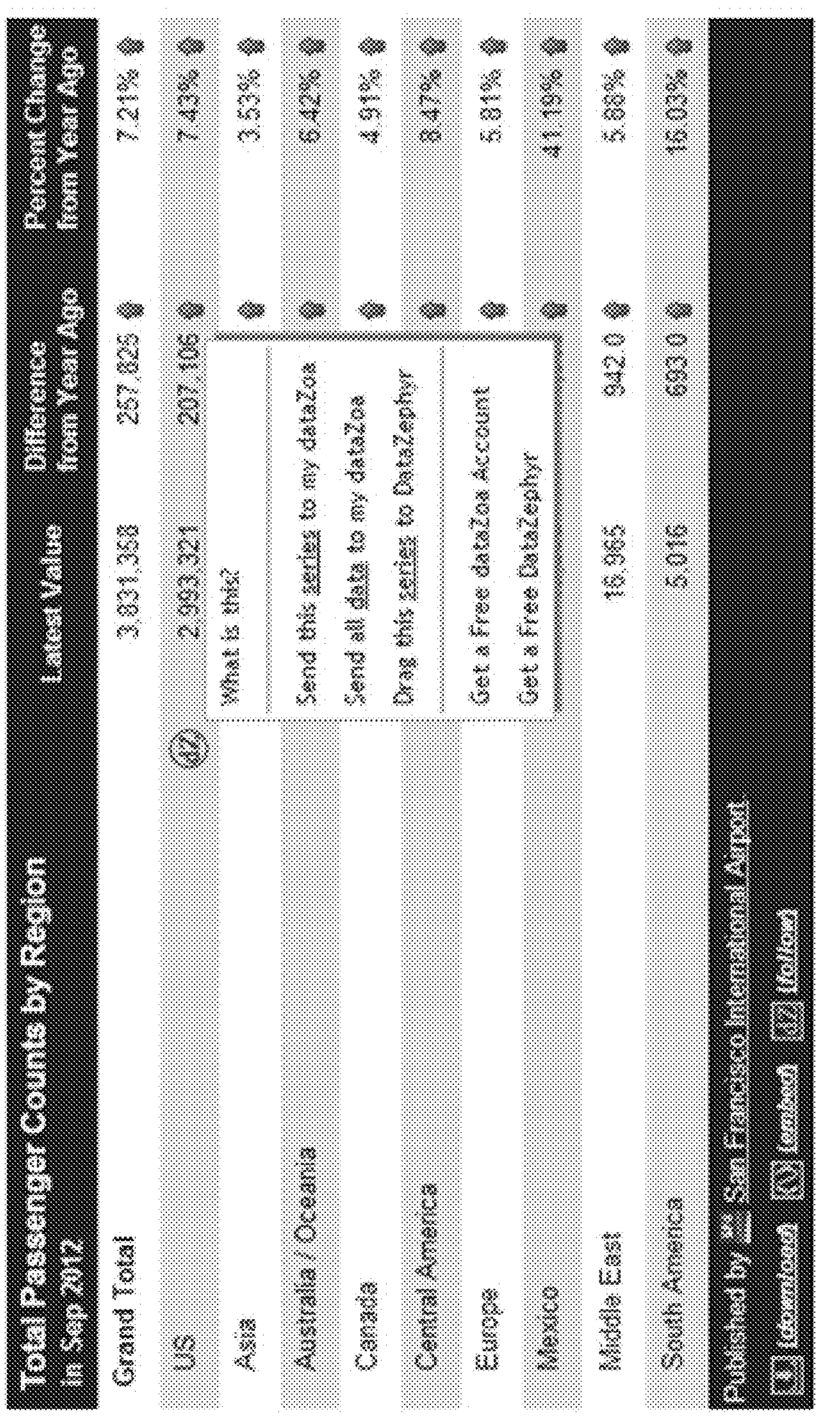
FIG. 25 is a representation of a display of a web page in which appears a DataZoa-served display in accordance with an embodiment of the present invention, wherein a user is provided with options, labeled with the Grey DZ Dot, for use of the display or its underlying data, including the "follow" option (here indicated as a "send" option) by which the user may subscribe to time series data in the row or in the entire display and have the subscribed data appear in the user's DataZoa account.

FIG. 25 is a representation of a display of a web page in which appears a DataZoa-served display in accordance with an embodiment of the present invention wherein a user is provided with options, labeled with the Grey DZ Dot, for use of the display or its underlying data, including two distinct "follow" options (here indicated as "send" options) by which the user may subscribe to time series data in the row or in the entire display and have the subscribed data appear in the user's DataZoa account, if the user is not already the owner of the data and the owner has not disabled the "follow" option. The web page is configured so that when the user's mouse is caused to hover over selected portions of the web page, such as a row, the Grey DZ Dot appears and then, after a moment, a menu appears in a pop-up window with various possible options for use of the time series data in the table, Besides the options to subscribe to time series data in the row or in the entire display, other options include dragging the series into the DataZephyr application for graphing or manipulation purposes; getting a free DataZoa account; and getting a free DataZephyr application.

FIG. 26 is a representation of a display of a web page in which appears a DataZoa-served table in accordance with an embodiment of the present invention, wherein an option is presented to have data in the tabled mirrored in a spreadsheet and repetitively updated in the spreadsheet.

Figure 27:
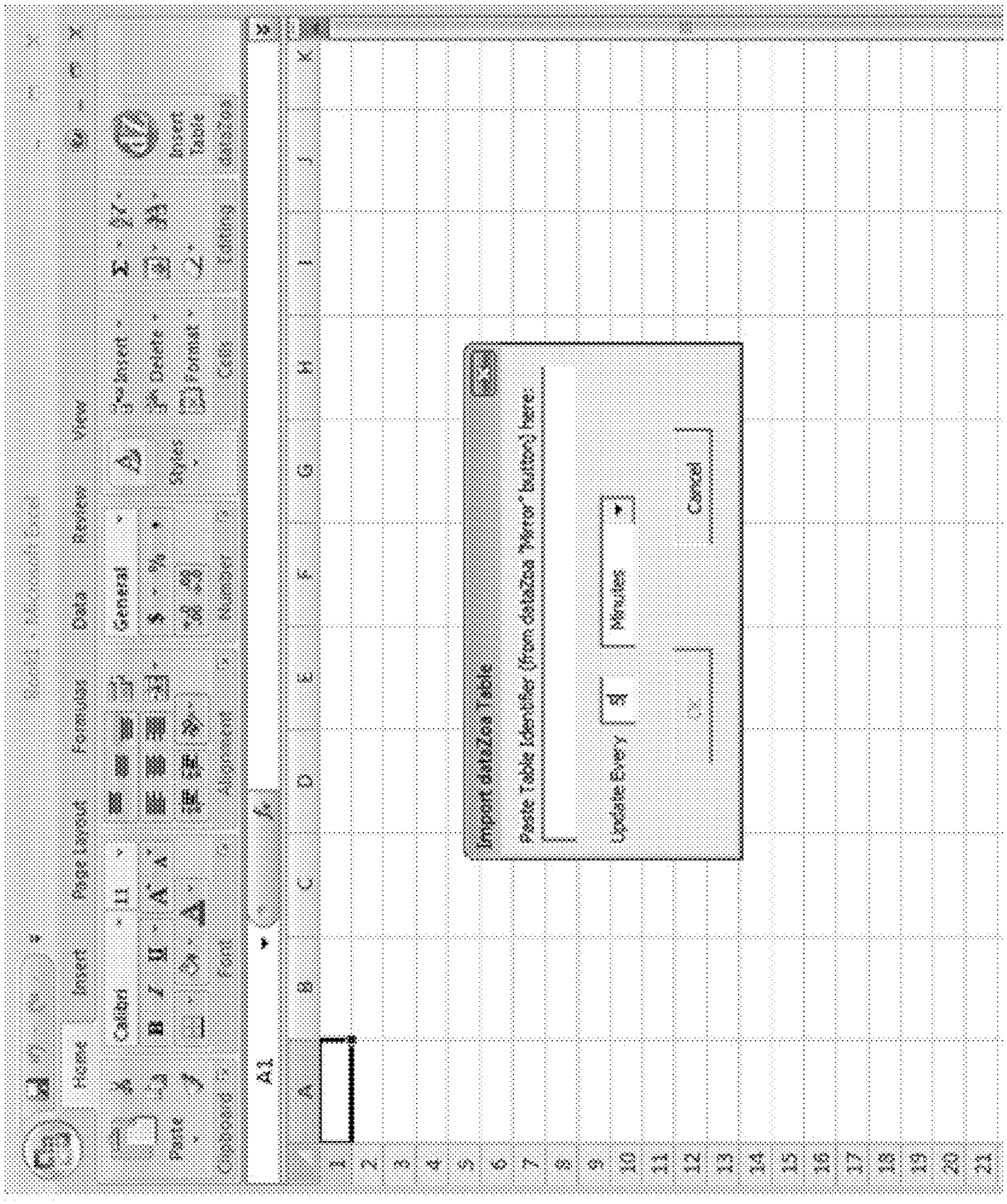
FIG. 27 is a representation of display of an Excel spreadsheet in which there has been installed a DataZoa add-in, which has been invoked so as to trigger a pop-up window by which one can enter a URL to identify a table (such as the table of FIG. 26) that is to be mirrored in the spreadsheet and to specify the update frequency by which the data in the spreadsheet will be updated, all in accordance with an embodiment of the present invention.
Figure 28:
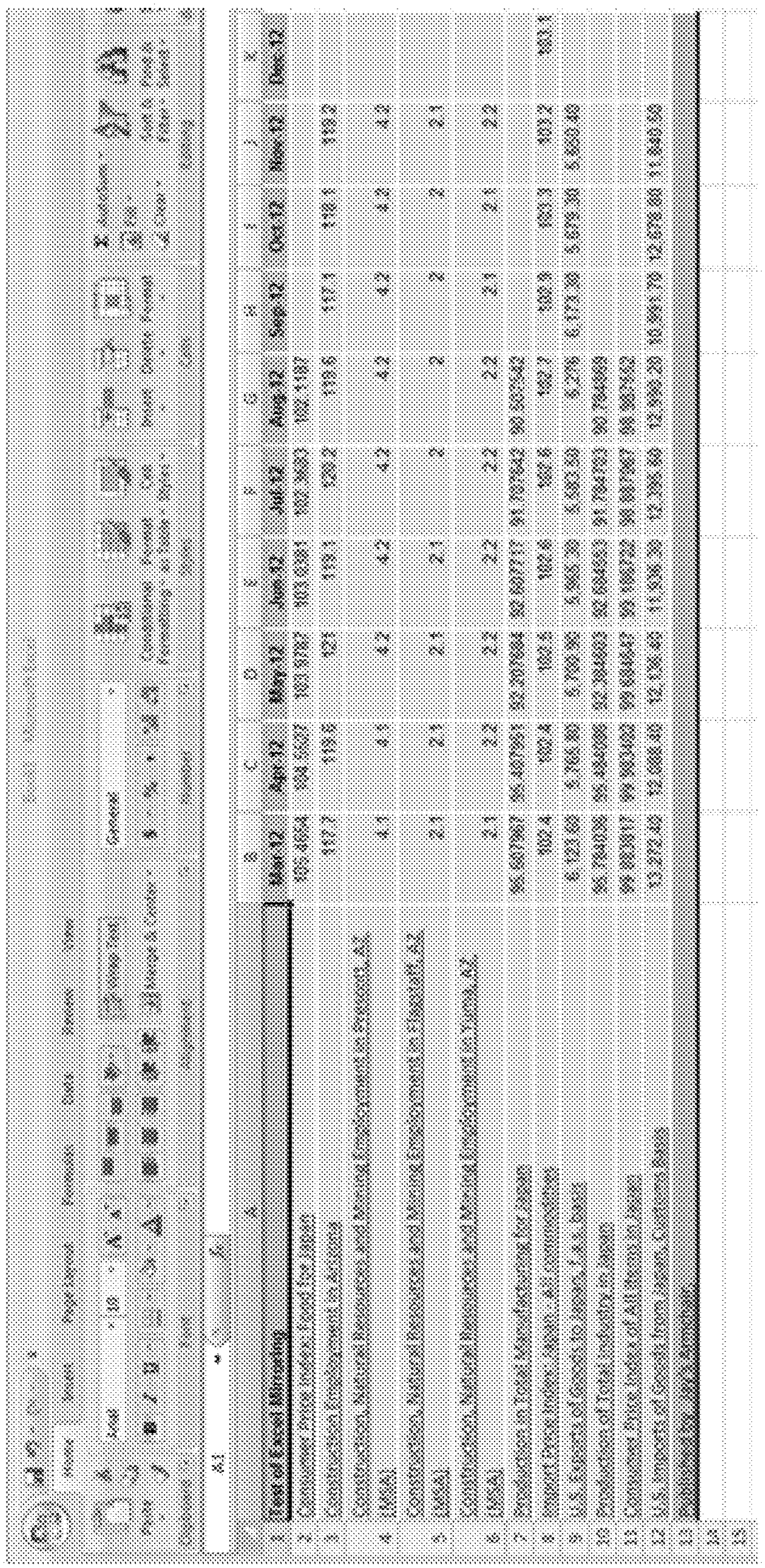
FIG. 28 is a representation of display of an Excel spreadsheet in which there have been mirrored a number of DataZoa-served tables, using the DataZoa add-in of FIG. 27, in accordance with an embodiment of the present invention.

FIG. 27 is a representation of display of an Excel spreadsheet in which there has been installed a DataZoa add-in, which has been invoked so as to trigger a pop-up window by which one can enter a URL to identify a table (such as the table of FIG. 26) that is to be mirrored in the spreadsheet and to specify the update frequency by which the data in the spreadsheet will be updated, all in accordance with an embodiment of the present invention;

FIG. 28 is a representation of display of an Excel spreadsheet in which there have been mirrored a number of DataZoa-served tables, using the DataZoa add-in of FIG. 27, in accordance with an embodiment of the present invention. We discuss processes involved in mirroring in connection with FIG. 36. As we have discussed, the Mirror button enables a user to have a live DataZoa table mirrored in their Excel spreadsheet software, including setting of the data update interval to keep abreast of new values. Thus a user is enabled to have his own Excel formulas and other data fed by the dynamically updating table provided by the DataZoa server. The user merely invokes the mirror button in the DataZoa-served table of interest and follows the simple instructions to have a desired DataZoa table mirrored in his Excel spreadsheet.

Figure 29:
FIG. 29 is a representation of a display of a web page of a DataZoa user account using the DZ Slates feature by which the user can create and e-mail a web page, repetitively if desired, to a data contributor of the user, for use by the contributor in causing a direct upload, to the user's designated URL, of the contributor's data in accordance with an embodiment of the present invention.

FIG. 29 is a representation of a display of a web page of a DataZoa user account using the DZ Slates feature by which the user can create and e-mail a web page, repetitively if desired, to a data contributor of the user, for use by the contributor in causing a direct upload, to the user's designated URL, of the contributor's data in accordance with an embodiment of the present invention.

Figure 30:
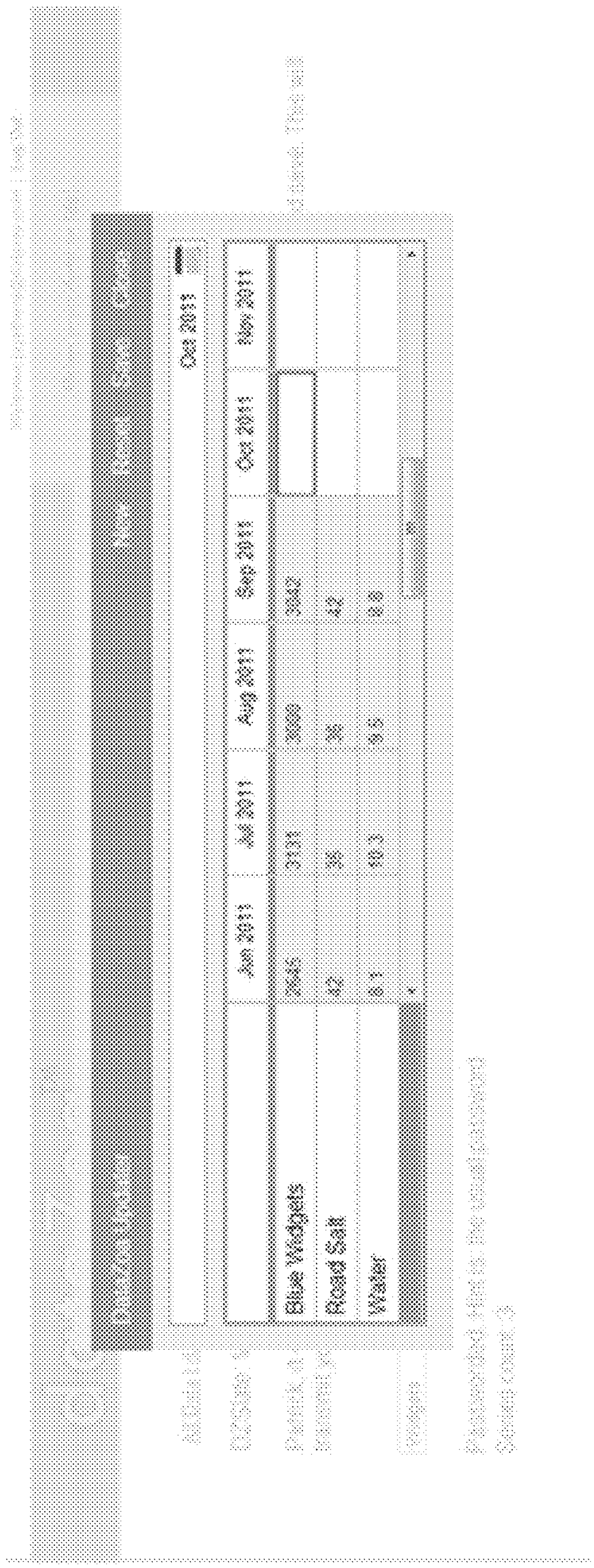
FIG. 30 is a representation of a display of a web page that results when the data contributor of FIG. 29, having received the e-mailed web page, activates the "slate" by which the data contributor can enter data, requested by the user, directly to the user's designated UR, in accordance with an embodiment of the invention providing the DZ Slates feature.

FIG. 30 is a representation of a display of a web page that results when the data contributor of FIG. 29, having received the e-mailed web page, activates the "slate" by which the data contributor can enter data, requested by the user, directly to the user's designated URL, in accordance with an embodiment of the invention providing the DZ Slates feature.

Figure 31:
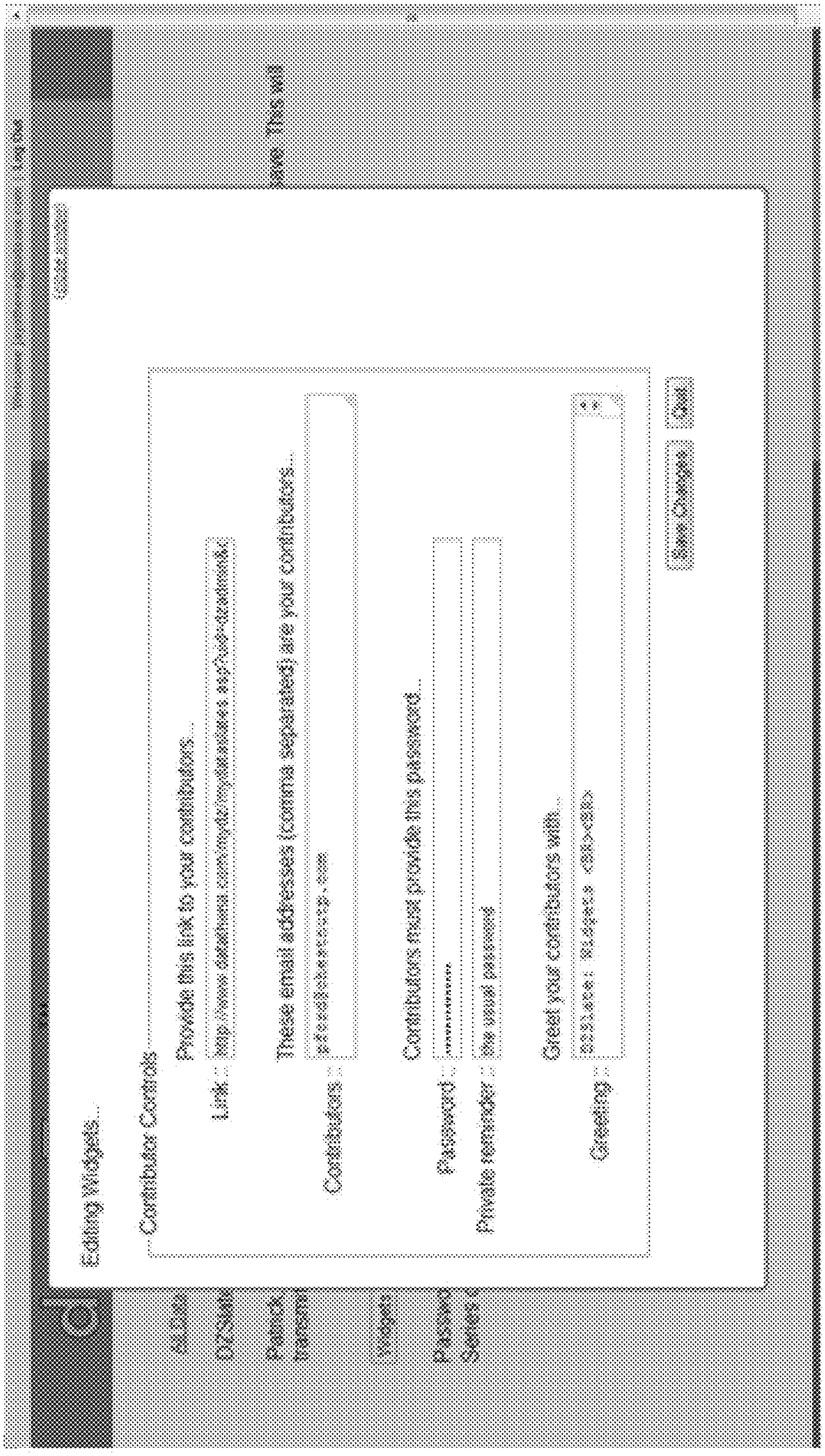
FIG. 31 is a representation of a display of a web page by which the user can configure and edit the context in which the data contributor can enter data, including target URL for data upload, contributor e-mail address, optionally required password, and greeting to the contributor, in accordance with an embodiment of the invention providing the DZ Slates feature.

FIG. 31 is a representation of a display of a web page by which the user can configure and edit the context in which the data contributor can enter data, including target URL for data upload, contributor e-mail address, optionally required password, and greeting to the contributor, in accordance with an embodiment of the invention providing the DZ Slates feature.

An important benefit of dZSlates is effectively "Teeing up the data contribution ball" by presenting, to the those who have needed data, a perfectly scoped data entry form that presents a rolling history of recent prior values for the data items needed, as well as presenting the "gap" for the most recently requested data with simple data entry cells for those values. Values can be entered manually or copied and pasted into the form. By structuring the data contribution transaction in this fashion, the timeliness and accuracy of the data are facilitated.

The dZSlates functionality assists in consistently updating data series over time and allows collaborative contributions from others selectively, without granting full account access. In implementation, dZSlates are hosted in a User Account at a DataZoa server. They are accessed through a URL that allows access to specific prescribed data series in that account. The access is protected by a password specific to that dZSlate. The dZSlate-specific URL is made available to outside contributors via email notification. In a further enhancement, email notification can be offered to contributors periodically, on a schedule tied to the periodicity of the data series prescribed in the dZSlate, and reminders of not-yet-supplied data can be sent via email notification, at a chosen reminder frequency until such time as the period-appropriate data are contributed. In a further enhancement, contributed data values can be marked as provisional, and blocked from flowing through to DataZoa public data displays, until approved by the owner of the DataZoa User Account. In a further enhancement, contributed data values can be marked as requiring the signoff/approval of one or more members of one or more data-approval groups before the data-contribution transaction is submitted by the data contributing process into the view of the owner of the DataZoa account. The signoff/approval of members of a data-approval group/s is a process which can be administered via email notifications to the members of the data-approval group/s, some pre-defined threshold number/s of whom must sign off on the data prior to submission into view of the DataZoa account owner. The data approval groups can be set in a sequence or hierarchy such that lower level approvals must occur first before higher level approvals are requested, with each level of the hierarchy being able to see the trail of approvals which have already occurred, including identity of approvers and date/time stamp of their approvals. Notification of a needed approval and reminders of not-yet-approved data updates needing approval group members' approvals are sent via email.

The constellation of features associated with embodiments of dZSlates (including customizable message content, customizable data entry fields, automated distribution and reminders) make it an excellent vehicle for conducting surveys without any change in the underlying structure of dZSlates.

Figure 32:
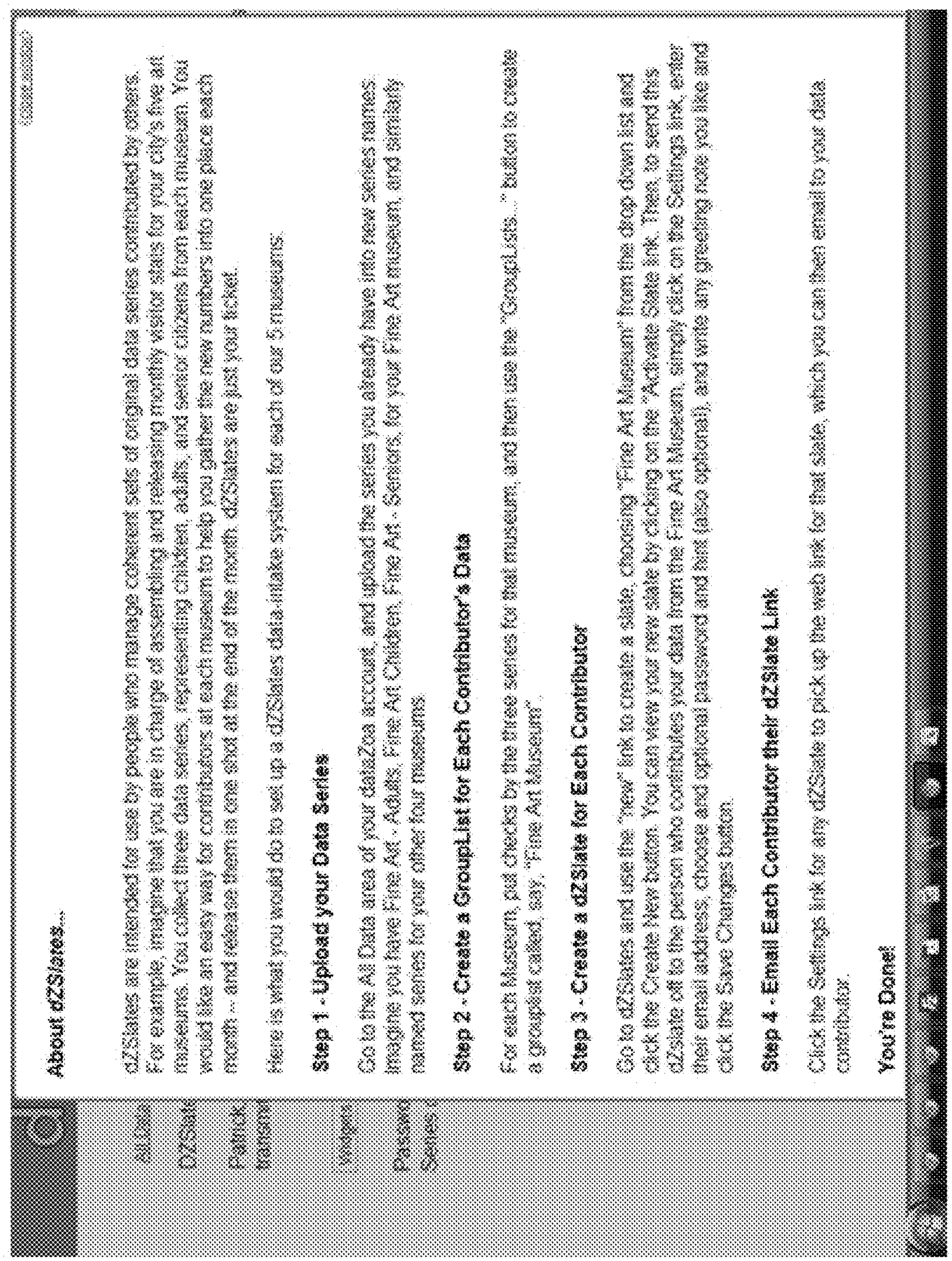
FIG. 32 is a representation of a display of a web page proving to the user guidance on configuring and using DZ Slates for gathering data.

FIG. 32 is a representation of a display of a web page proving to the user guidance on configuring and using DZ Slates for gathering data.

Figure 33:
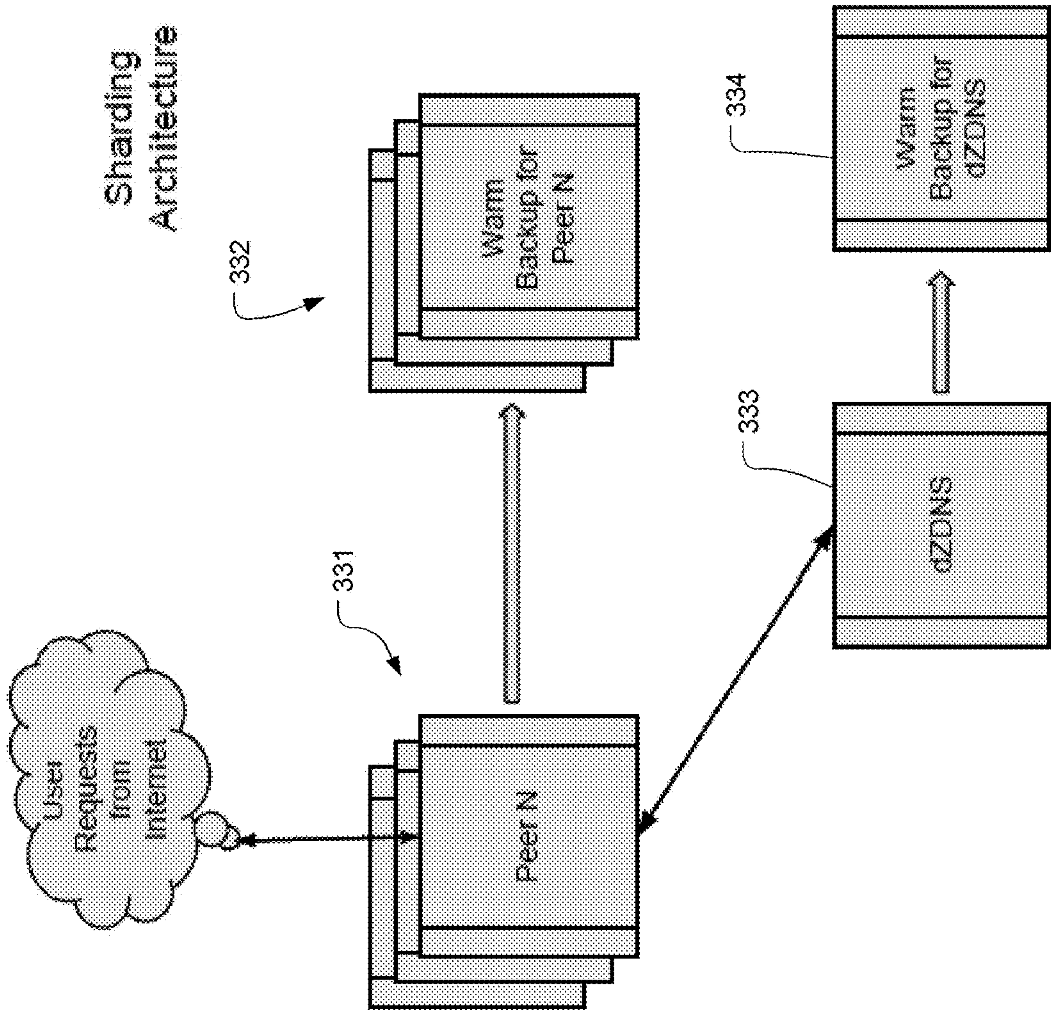
FIG. 33 is a block diagram of system architecture of an embodiment of the present invention for implementing the DataZoa server 17 of FIG. 1 as a series of peer-to-peer servers for handling loads larger than could be handled by a single server.

FIG. 33 is a block diagram of system architecture of an embodiment of the present invention for implementing the DataZoa server 17 of FIG. 1 as a series of peer-to-peer servers for handling loads larger than could be handled by a single server. A "sharded" architecture dividing a single logical appearance over several distinct machines is used to fulfill requirements that cannot be met in a single physical machine. User requests arrive from the Internet and are handled by one of several Peer machines 331. A user request may require data from several User Accounts in order to be fulfilled, but the description of how to fulfill the request is always a property of some single User Account. Thus a single particular Peer machine is responsible for assembly and return of a response, but that Peer may coordinate with and rely upon other Peers to do so.

There are potentially millions of User Accounts, each containing potentially millions of data series. This scale is beyond the practical physical capabilities of individual machines. The distributed nature of request fulfillment requires a data store that is logically integrated as a single unit but is physically partitioned ("sharded") into several separate data stores in order to achieve the scale requirements. Each Peer machine is the repository for data in one or more User Accounts. All data for a particular User Account is stored on a particular Peer machine.

Because user requests may require information from several different User Accounts from several different physical storage shards, it is important that all User Account information and coordinating information remain highly available. Each Peer machine has an associated Warm Backup machine, in the set of Warm Backup machines 332, which keeps a complete copy of the Peer machine's data store and is available to answer queries on behalf of the Peer machine in the event it is unavailable because of failure or maintenance activity. Together these two machines are a "Peer Cluster."

All Peer Machines rely on a centralized dZDNS machine 333 to resolve questions about which Peer Cluster and specific machine (Peer machine or Warm Backup) is responsible for a particular User Account and its associated data. The dZDNS machine 333 has an associated Warm Backup dZDNS machine 334 which keeps a complete copy of the dZDNS machine's data store and is available to answer dZDNS queries in the event the dZDNS machine is unavailable because of failure or maintenance activity. Together these two machines are a "dZDNS Cluster."

Figure 34:
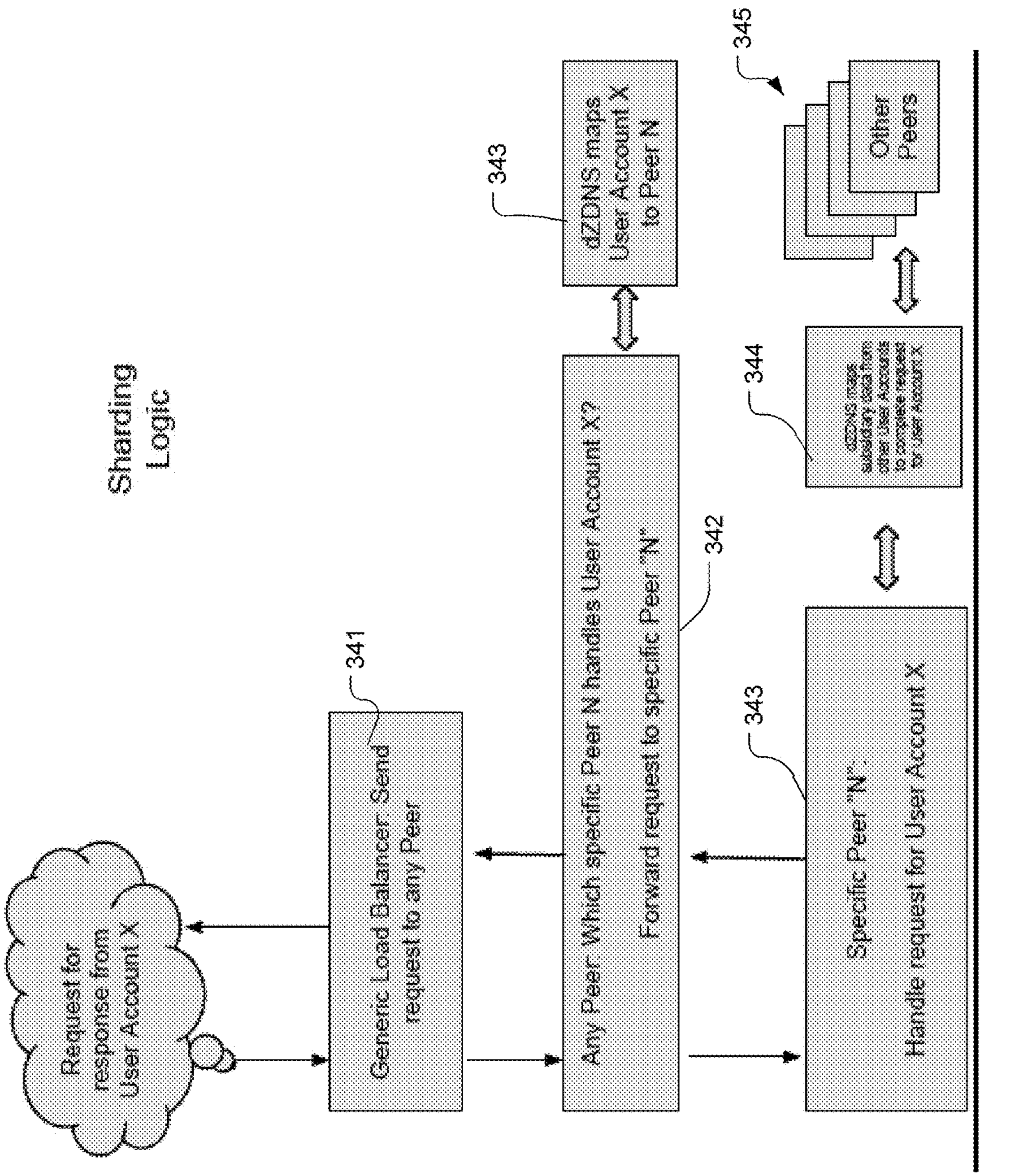
FIG. 34 is a block diagram of logical flow for the system architecture of FIG. 33.

FIG. 34 is a block diagram of logical flow for the system architecture of FIG. 33. Storing data and routing requests among many distinct machines while maintaining the logical appearance of one seamless serving machine. As User requests arrive from the Internet, they contain information that associates the request with a particular User Account. That identifying information is used to route the request to appropriate resources for fulfillment. A request for User Account "X" is sent to a generic Load Balancer in process 341 which assigns the request to the next available Peer machine as a "broker", without regard to any particulars in the request.

In process 342, the broker Peer machine uses the dZDNS service 343 to identify which particular Peer machine "N" is responsible for User Account X. The broker Peer machine may in fact turn out to be the appropriate Peer N. Also, in practice, if Peer N is unavailable, the dZDNS service may identify Warm Backup N rather than Peer N as the appropriate member of Cluster N to handle the request. For this discussion we will refer only to Peer N for the sake of simplicity. If the broker Peer machine is not identified as the appropriate Peer N to handle the request, the broker Peer forwards the request to Peer N as part of process 342. Otherwise, the request is handled by the broker Peer in its role as Peer N.

At Peer N, the request is processed in process 343. This may involve gathering and coordinating data from User Accounts other than X, and perhaps from other Peer machines 345. Peer N relies on dZDNS services 344 to locate and coordinate these additional resources. When the response to the request is assembled, it is returned to the broker Peer (if not already Peer N), which then returns it to the Internet requestor.

Figure 35:
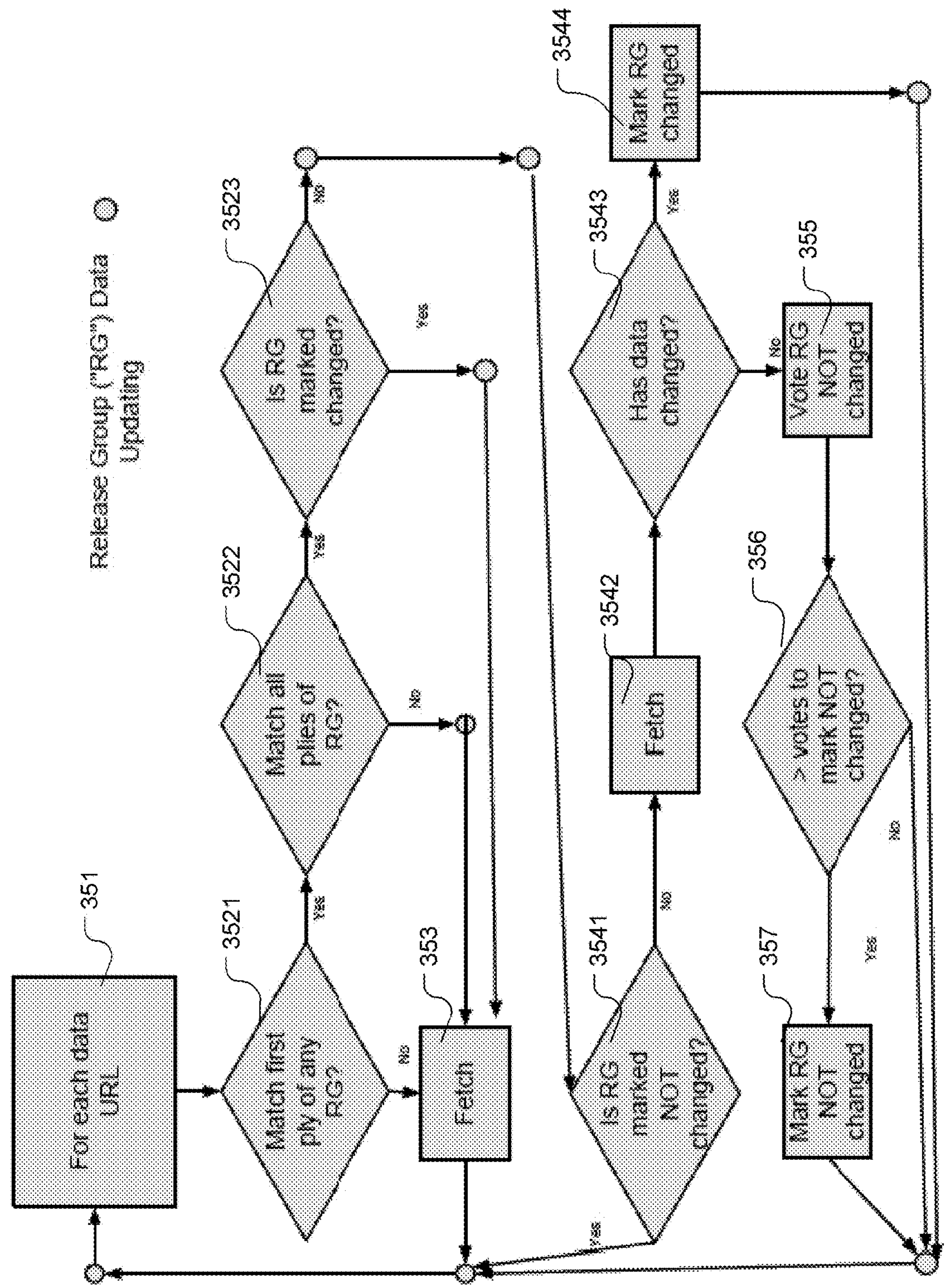
FIG. 35 is a block diagram of logical flow for processes by with the DataZoa server 17 of FIG. 1 causes time series data stored by it to be updated.

FIG. 35 is a block diagram of logical flow for processes by with the DataZoa server 17 of FIG. 1 causes time series data stored by it to be updated. After a DataZoa user obtains data from a particular URL, DataZoa keeps the data current in the user account by automatically revisiting that URL from time to time in order to see if the data at the URL has been updated. If the data at the URL is found to have changed, the data is processed and posted to DataZoa storage as appropriate. A particular URL may supply data to more than one DataZoa user and may update more than one DataZoa time series.

Even though the data at a URL may change infrequently (once a month, for example), it is necessary to fetch the URL often in order to reflect changes in a timely fashion. Data sources do not typically have precisely implemented calendars or other external signals to show that they have been updated. Thus frequent fetching is required, and the overwhelming majority of data fetches are a waste of time and resources for all parties.

We have developed the concept of "Release Groups" as a method of utilizing certain data site policies to minimize fruitless fetches and maximize timeliness. The publishers of some data sources may, as a matter of policy, release data updates as coordinated groups, rather than sporadic events. Such data sources and policies can be identified as a "Release Group" (RG) in DataZoa. Where possible, Release Groups are utilized to minimize the time and resources required to rule out superfluous data fetches at URLs that belong to the Release Groups. This is achieved by testing only a few URLs within the Release Groups, and then making a determination whether the Group as a whole has been updated and should be fetched in its entirety, or can be safely skipped based on the sample fetched.

As implemented in DataZoa, a Release Group comprises a distinctly recognizable set of required common substrings among URLs. These substrings may be organized as hierarchical layers, or "plies" where each Release Group is ultimately distinct but may share a common substring in a higher level ply. These plies are used to optimize the problem of testing each and every URL for membership in every known Release Group. Each Release Group also specifies a threshold of the number of URLs that must be tested and found invariant in order to conclude that the group represented as a whole has not changed.

For the foregoing processes, we present some logic pseudo code to provide more detail:

For each URL fetch candidate (process 351 of FIG. 35):

If URL is not part of a Release Group (determined in process 3521), fetch (process 352) and continue to next URL (process 351)

If part of a Release Group and the Release Group is known to have changed (determined in processes 3522 and 3523), fetch (process 353) and continue to the next URL (process 351).

If part of a Release Group and the Release Group is known not to have changed (determined in process 3541), continue to the next URL (process 351).

If part of a Release Group and the Release Group is not yet determined to have changed or not (process 3541), fetch (process 3542). If the fetch reveals a change (determined in process 3543), mark this release group as known to have changed (process 3544). If the fetched data has not changed, add one "vote" for marking as known not to have changed (in process 355). If enough votes have accumulated (determined in process 356), mark the Release Group as known not to have changed (in process 357).

A fragment of a typical Release Group file looks like this:

```
# URLs containing ALL of these strings will SAMPLE for evidence of change on a poll cycle
#
# Structure:
#
# TESTS NEEDED—number of fetches needed to conclude if this pattern is skippable
#|—field separator
# PLYn—one or more required matching fragments
#
# e.g. 3|SurveyOutputServlet|series_id=AP
# e.g. 5|doleta.gov
#
### BEGIN BLS Survey data
3|SurveyOutputServlet|series_id=AP
3|SurveyOutputServlet|series_id=BD
. . .
3|SurveyOutputServlet|series_id=WP
3|SurveyOutputServlet|series_id=WS
### END BLS Survey data
#
### DOL
2|doleta.gov/unemploy/wkclaims/reportasp
```

Figure 36:
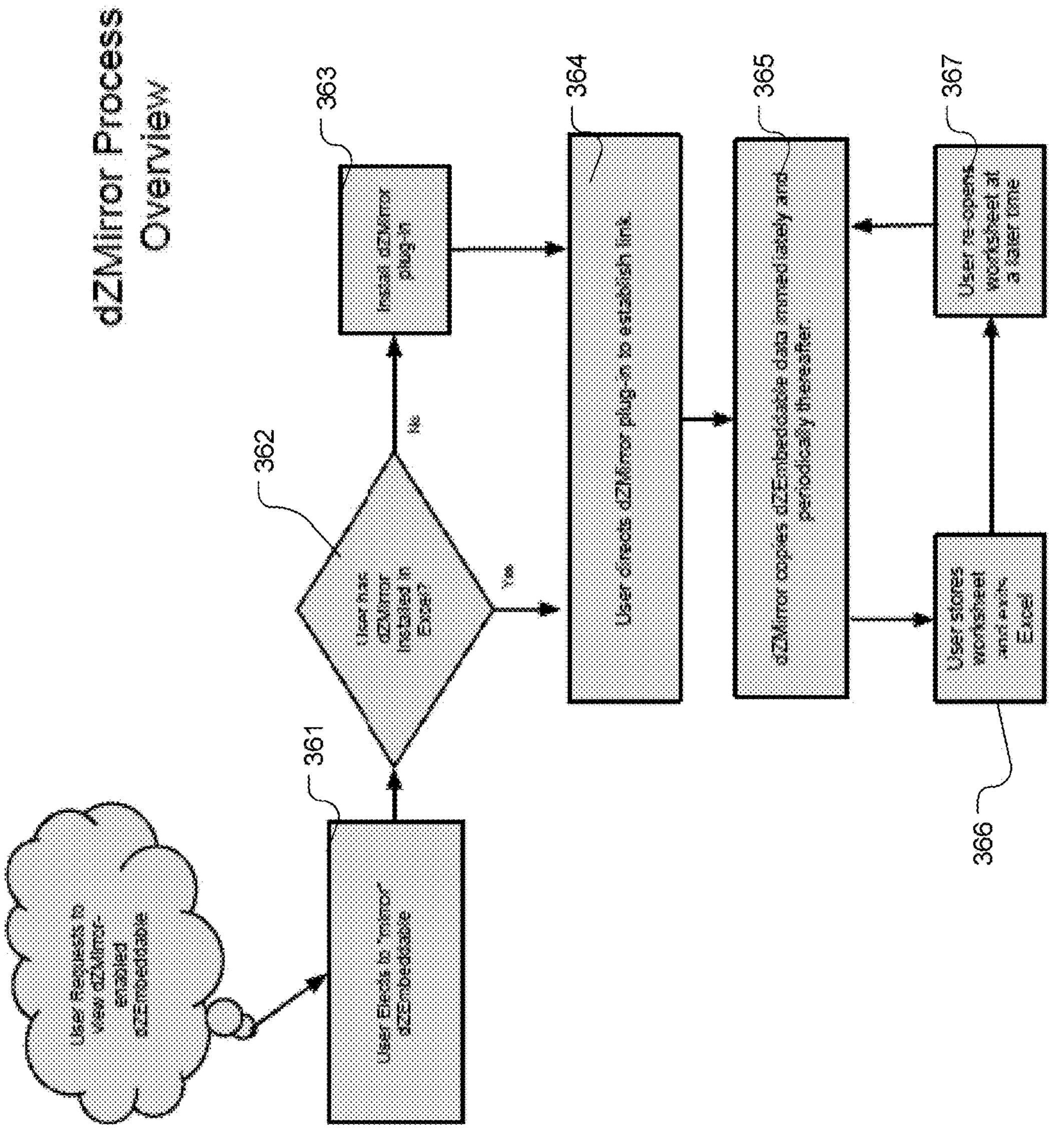
FIG. 36 is a block diagram of logical flow and user interaction by which a data in a DataZoa-served table can be mirrored in a spreadsheet in accordance with an embodiment of the present invention.

FIG. 36 is a block diagram of logical flow and user interaction by which a data in a DataZoa-served table can be mirrored in a spreadsheet. The representation of the contents is a copy of the numbers and labels in the HTML cells of the dZEmbeddable into spreadsheet cells in the Excel spreadsheet. Thus the term "mirror" in that the table contents is effectively mirrored in the user's spreadsheet. The contents thus "mirrored" is refreshed whenever the spreadsheet is re-opened and also periodically on a timed cycle as long as the spreadsheet remains open. In process 361, the user elects to mirror a DataZoa-served embeddable. In process 362, there is determination whether the user has installed an Excel plug-in for DataZoa, and if not, in process 363, the user installs the plug-in. After that, or otherwise, in process 364, the user invokes the Mirror functionality to obtain a URL link and uses the plug-in to invoke the link so that the spreadsheet is repetitively updated in process 365. The user is offered the ability to set the mirror updating frequency at some number of minutes, hours or days, at the time the DataZoa table mirroring is established. In a further embodiment the update frequency can be changed by the user at will from within Excel. In alternate embodiments, the mirroring of new time-period values from a DataZoa table can be reflected by adding successive columns for each new time-period to the user's spreadsheet copy in Excel (i.e., retaining all of the earliest time-period columns seen by the user and adding new ones for new time-periods as they are put forth in the DataZoa table), or by dropping off older columns as new columns are added in direct correspondence to the observable manifestation of the DataZoa table being mirrored. dZMirror is activated when a user, viewing a dZEmbeddable where the dZMirror feature is enabled, elects the mirror feature. The user has the option of downloading and installing the plug-in if they have not previously done so, and can set further options for the mirroring from within Excel once the mirroring is established. In process 366, the user stores the worksheet and exits Excel, and in process 367, can reopen the spreadsheet at a later time to cause renewed updating of the data in process 365.

Implementation of Calculated Series in DataZoa.

We address here a further embodiment of the present invention that enables the defining and evaluating of mathematical relationships using DataZoa-served time series data, and reevaluating the defined expression whenever the underlying time series data are altered. To implement calculated series in DataZoa, we model every DataZoa series a potential vertex in one or more directed acyclic graphs (DAGs). The edges of a given DAG which connect vertices are defined by the mathematical relations between vertices. The evaluation order of the DAGs is established through topological sorting.

A benefit of this model is that a user's desired calculation of derived series values is performed continuously as new data which drive the calculation appear anywhere within the DataZoa ecosystem, so the calculated values are "always on" and available. This approach stands in sharp contrast to a typical prior art approach of having one's desired calculations buried within a stored spreadsheet that must be opened and activated manually and updated with new source data manually (or in some cases pulled via macros from a database). Little "user-sophistication" is needed to take advantage of the continuous calculation update aspects of dZCalculation. One simply uses the desired data to feed one's calculation, and as any of that feeding data changes in the DataZoa ecosystem, the user's calculation is updated automatically.

Calculated Series are owned by distinct DataZoa User Accounts, just like non-calculated series. Calculated Series may depend on other Calculated Series. Calculated Series in a given User Account may depend on series from another User Account. The interdependencies among Calculated Series can span separate Shards, but must preserve the logical appearance of a single unified set of calculation nodes. Whenever a non-calculated series anywhere in DataZoa is updated, any Calculated Series that depend upon the non-calculated series must be recalculated. Whenever the definition of a Calculated Series is changed, any other Calculated Series that depend upon the changed one must be recalculated, For output purposes, Calculated Series participate in the same display mechanisms as non-calculated DataZoa series. For input, Calculated Series use interfaces designed for the definition of mathematical formulae rather than actual numeric values.

One input method uses web-based input forms where mathematical equations can be typed directly, using DataZoa series names as operands and standard mathematical notation for operators. Another web-based forms method of input involves DataZoa series first being identified by the user as being involved in a calculation, which are then each gathered in a list at the top of the calculation form, associated by the form with a short mnemonic, such as a succession of alphabetical characters (A, B, C, D, etc.) or a succession of numbered alpha characters (S1, S2, S3, S4, etc). The identification of the series s being involved in the calculation is achieved by the user checkboxing a group of series and/or successively checkboxing or dragging and dropping individual series into the calculation form, which then assigns the next successive short mnemonic to the most recent series added to the form.

Yet another input method uses interoperation with the DataZephyr to define Calculated Series. In this method, the User clicks and drags data elements from a DataZoa display into a DataZephyr worksheet, uses the DataZephyr formula conventions to define relationships, and then defines one or more resultant series as Calculated Series in a DataZoa User Account. This method has the benefit of enabling the user to visualize the stages of a calculation among multiple series, including breaking it into intermediate stages, as well as making it easy to make individual derived series out of both the intermediate and final stages of a calculation, simply by dragging and dropping the stage (intermediate or final) into DataZoa.

In a further embodiment, the output of a calculation is marked as "preliminary", meaning that it is not considered "official" and fed to public- or private-facing displays until the account owner approves the calculated value for release. Such approvals may be achieved through approval groups or approval group hierarchies as described elsewhere.

In a further embodiment, each series in the DataZoa ecosystem that is being used (depended upon) by a calculation anywhere else in the ecosystem can be called a "Parent Series" and, as a Parent Series, it knows (and can manifest) the date/time stamp of its own last change/s in any value/s in itself and/or the addition of new values to the series. Each Parent Series used (depended upon) by others in calculations has associated with it a list of the identities, DataZoa account holders and physical locations of those calculated series (Child Series) which depend upon it. Each derived series (call it a "Child Series") in DataZoa knows the identity, account owner and server-series-location of each series in the DataZoa ecosystem upon which it depends (call these "Parent Series"). It also knows (and can manifest) the date/time stamp of its own most recent calculation update, AND the then-current date/time stamp of the latest update manifest in each Parent Series upon which it depended at the time the Child Series was last calculated. Thus at any point in time, it can be determined whether a given calculated Child Series is current by checking to make sure that the date/time stamps for each of its Parent Series when last used to calculate the Child Series values are the same as the latest date/time stamp then manifest by each parent.

Each DataZoa account having calculated series (Child Series) which depend upon other series (Parent Series) in the DataZoa ecosystem can have a Calculation-Supervisor Process (CSP) running which is responsible for watching out for changes in the Parent Series which any account's calculated series depend upon, and driving a calculation update of dependent (Child) series. The process of updating dependent (Child) series can be driven by the following method. Specifically, upon the event of a change in a Parent Series anywhere in the DataZoa ecosystem, notifications are composed and immediately sent to the CSPs that update calculations are needed, which notifications can be sent as topologically ordered instructions for calculations so as to assure that intermediate values are calculated in the correct order. Given that calculation interdependencies can span different shards, the ordered performance of calculations requires inter-shard manifestation and notification of calculation completion status so that each successive calculation can be performed in the proper order.

In an alternate embodiment, calculation update logic is consolidated in a large, centralized computer or network of computers which is aware of compute interdependencies and maintains an always-current topological order, and can thus supervise the ordering of calculations across the DataZoa ecosystem, either sending ordered instructions to CSPs for each account, or even performing the necessary calculations and sending updated series values and/or blocks of updated series values, or alternatively, maintaining a cache of latest values which is checked by individual accounts, including their embeddables, whenever series values are needed to be used, which accounts then refresh their values upon learning of new cached values.

The “Follow” Functionality Time Series and for dZEmbeddable Displays.

Figure 37:
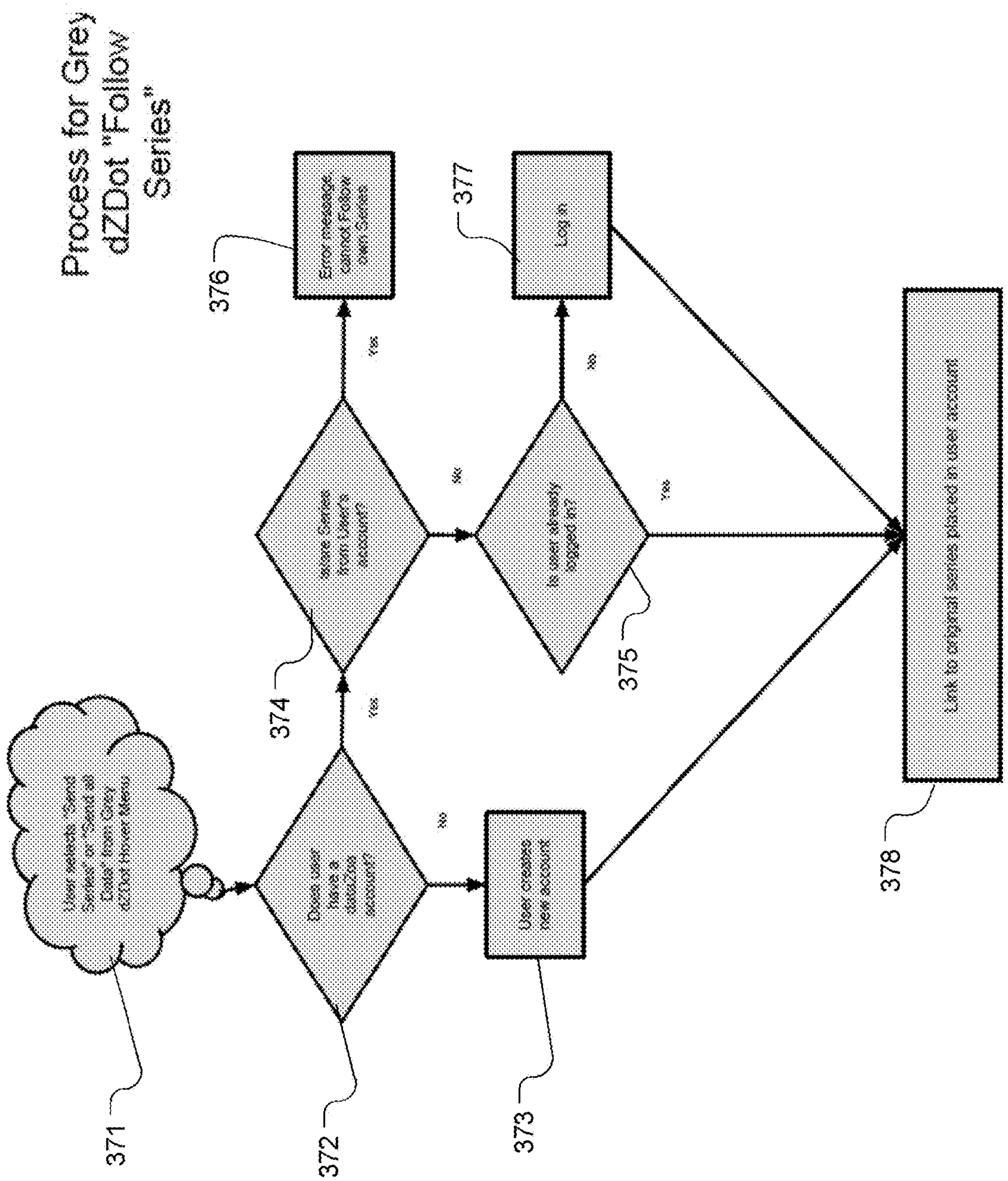
FIG. 37 is a block diagram of logical flow in connection with an embodiment of the present invention wherein the "follow" functionality has been invoked with respect to a time series.
Figure 38:
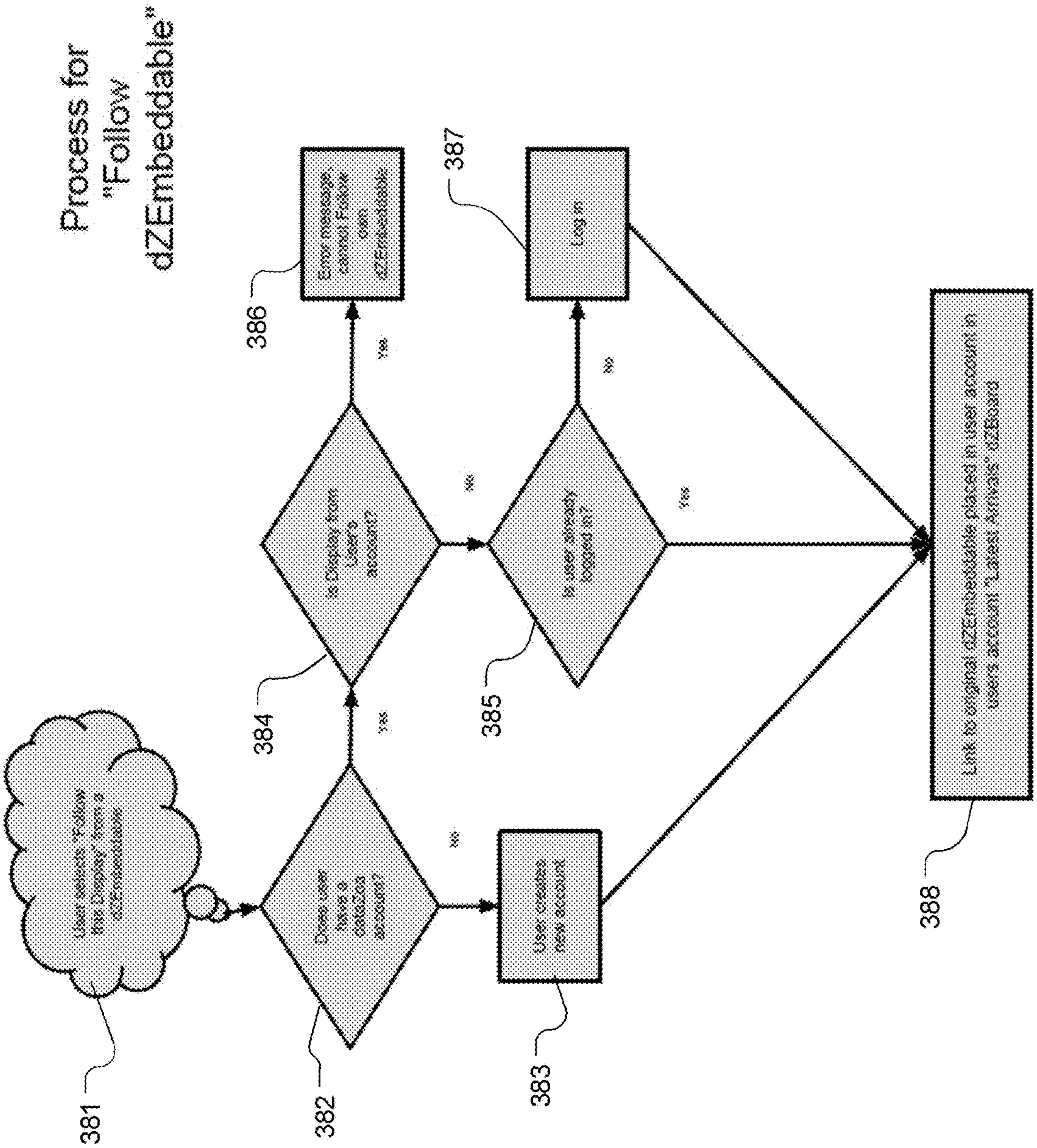
FIG. 38 is a block diagram of logical flow in connection with an embodiment of the present invention wherein the "follow" functionality has been invoked with respect to a dZEmbeddable display of time series data.

Not all time series data appearing on web pages from the DataZoa server originate from the account owner. Specifically, a given account holder may choose to create, using the DataZoa server, a display of time series data from one or more accounts other than that of the given account holder. For example, in a dZEmbeddable table display, each data row may correspond to a distinct time series, and those series may in all or part be owned by other accounts. Similarly, if the account holder so chooses, he can enable other account holders in turn to have account access to the time series in the display. Furthermore, if he so chooses, the account holder can enable others to have access to the display in its entirety. We refer to users accessing time series in other accounts without making privately owned copies as “following” those time series. Similarly, we refer to linking to a display in another user account as “following” a display. Importantly, because no copies are made, any “followed” items are by definition up to date. Any user accessing data via a “follow” is guaranteed to see the latest version of that data because ultimately only the original items are used in any rendering. Examples of such displays appear in FIGS. 20 (a time series table), 21 (a latest values display), 22 (a chart), and 25 (a latest values display). In FIGS. 37 and 38, we discuss logical flow in connection with using the “follow” functionality in to provide account access to time series data and the entire display respectively.

FIG. 37 is a block diagram of logical flow in connection with an embodiment of the present invention wherein the “follow” functionality (labeled as “Send” options in FIG. 25) has been invoked with respect to a time series. When the user invokes such a selection 371, a request is sent to the DataZoa Server 17 for processing. Process 372 determines whether the user has a user account. If not, the user is afforded the opportunity to create a new account in process 373 and upon completion process 378 creates a link (or links) to the requested data in the new account, completing the Follow transaction. If process 372 has determined that the user already has an account, process 374 determines whether any series in the request are owned by the user. If all are owned by the user, process 376 indicates that the user cannot follow data that the user owns, and then processing terminates. For any requested series not owned by the user, process 375 determines whether the user is already logged in. If not, process 377 affords the user the opportunity to log in. Once the user is or has become logged in, process 378 creates a link (or links) to the any requested data not already owned or followed in the user account, completing the Follow transaction.

FIG. 38 is a block diagram of logical flow in connection with an embodiment of the present invention wherein the “follow” functionality (labeled as “follow this display” 202 in FIG. 20) has been invoked with respect to a dZEmbeddable display of time series data. When the user makes such a selection to follow a display of time series data in process 381, a request is sent to the DataZoa Server 17 of FIG. 1 for processing. Process 382 determines whether the user has a user account. If not, the user is afforded the opportunity to create a new account in process 383 and, upon completion, process 388 creates a link to the requested display of time series data in the new account, completing the Follow display transaction. If process 382 has determined that the user already has an account, process 384 determines whether the display requested is owned by the user. If so, process 386 indicates that the user cannot follow a display that the user owns, and then processing terminates. If not, process 385 determines whether the user is already logged in. If not, process 387 affords the user the opportunity to log in. Once the user is or has become logged in, process 388 creates a link to the requested display of times series data in the new account, completing the Follow display transaction.

Figure 39:
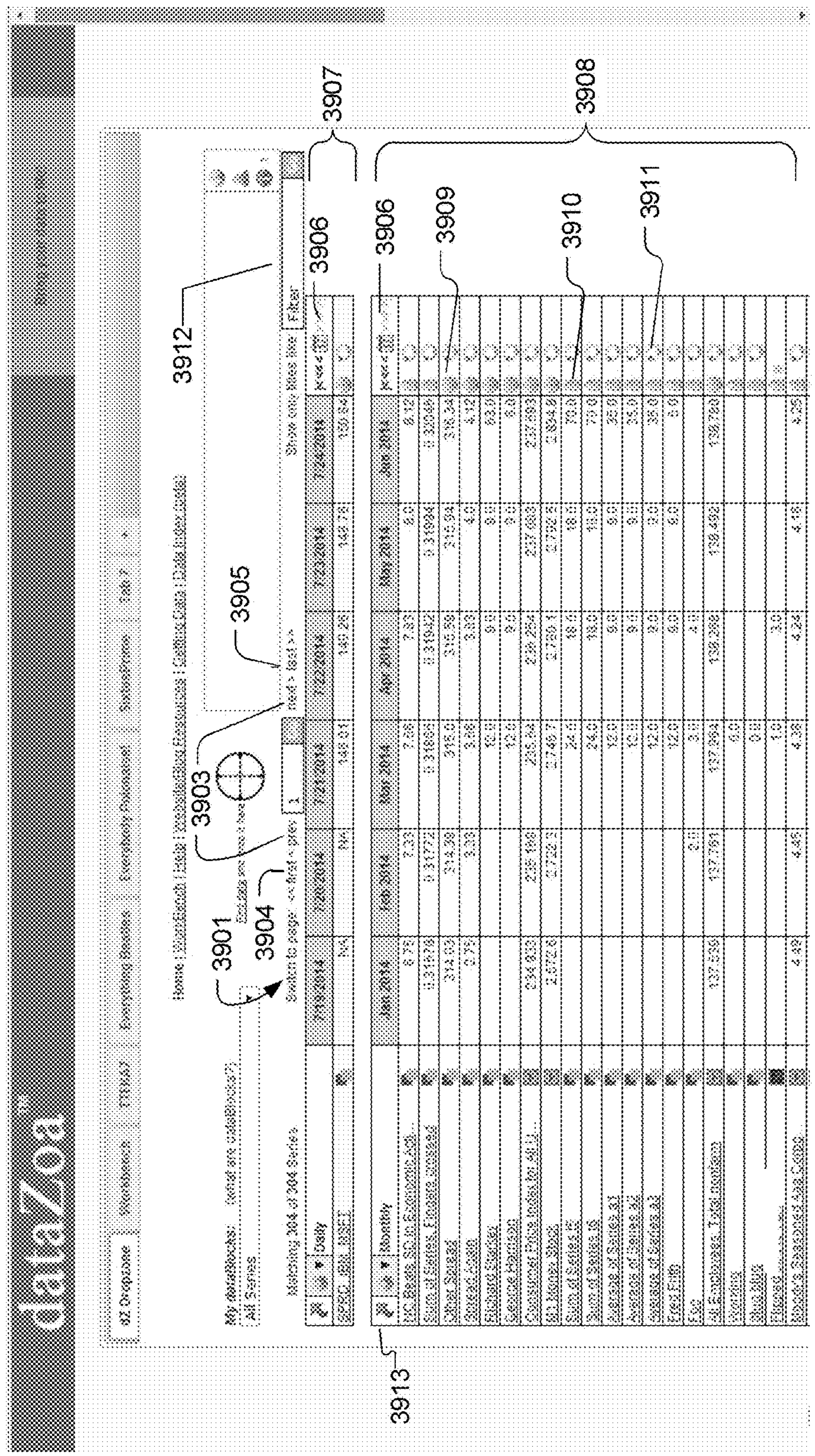
FIG. 39 is a representation of a display of a web page of a user's account illustrating the DataBlocks feature available in accordance with an embodiment of the present invention when the Dropzone tab is active, whereby there is presented a scrollable panning view of data that include a fixed date.

FIG. 39 is a representation of a display of a web page of a user’s account illustrating the dataBlocks feature available in accordance with an embodiment of the present invention when the Dropzone tab is active, whereby there is presented a scrollable panning view of data that include a fixed date. The dZ Dropzone is one of two areas where new data appears in DataZoa after having been dragged and dropped into DataZoa or uploaded by the user, the other area being the Workbench tab. DataZoa groups series in the dZ Dropzone into “dataBlocks” which are scrollable over the entire range of the series (which the user invokes by clicking on the |<, <<, <, >, >> and >| controls 3906 in the upper right region of the dataBlock), as well as being able to be instruct the dataBlock to scroll to a specific date by using the calendar icon 3906. The |< control presents to the user the very beginning date range of the series, starting with the very first date, while the >| icon presents to the user the ending date range of the series, including the very last date available. The << and >> controls enable the user to page, one page at a time (a page consisting of the number of time periods in view), to the left and right respectively, while the < and > controls enable the user to move left and right respectively by a single time period. The dZ Dropzone (and the Workbench) splits into multiple pages in cases where the user has large amounts of data and also enables the user to scroll among various pages 3901 of the dZ Dropzone using the <<, first 3904, <prev, next 3903> and last 3905>> controls, as well as enabling the user to go to a specific page by entering the number for that page and clicking on the GO button adjacent to the entered number. Additionally, the user can enter text in a “Filter” box 3912 which will cause only series matching that text to appear in the dZ Dropzone, the function of which is further illustrated in FIG. 59. In a DataZoa dataBlock the top row of the display is referred to as the header row 3913.

Data in dataBlocks can be presented in different frequencies. FIG. 39 reflects both daily data in the first dataBlock 3907 and monthly data in the second dataBlock 3908. FIG. 39 also reflects individual data series level controls which enable the user to declare individual data series to be public or private—achieved by clicking on the Globe icon 3909 to make a public series private, or clicking on the lock icon 3910 to make a private series public. Additionally, a user may click on the circular arrow icon 3911 to share the indicated data series with individuals by entering the email addresses of individuals with whom one wishes to share the indicated data series. Similarly, clicking on the circular arrow icon will present the email addresses of those to whom the series is presently shared, and enable the user to remove the shared access for any individual user or users.

Figure 40:
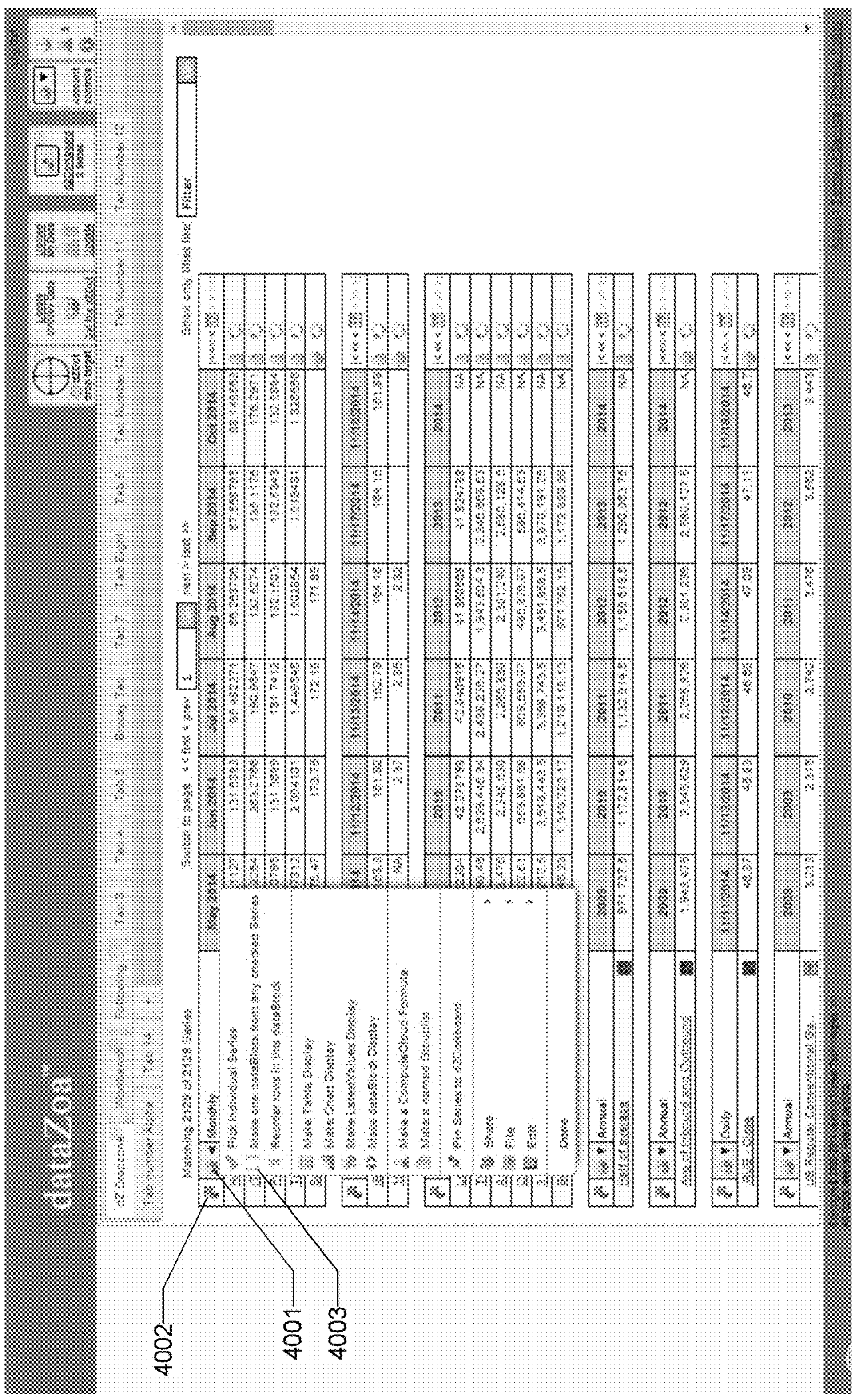
FIG. 40 is a representation of a display of a web page of a user's account presenting a gear menu available in an embodiment of the present invention when the Dropzone tab is active.

FIG. 40 is a representation of a display of a web page of a user's account presenting a gear menu available in an embodiment of the present invention when the Dropzone tab is active. The dZ Dropzone has a Blue drag handle 4002 in the form of an upward pointing arrow which has the functions described as follows:

(Blue drag handle, Upward pointing Blue Arrow) This control, positioned to the left of the gear enables the user to (i) drag the entire dataBlock from the dZ Dropzone to any Tab (excluding the Workbench and Following tabs), which has the effect of placing a copy of the dataBlock into that Tab, or (ii) drag the dataBlock to the dZCorkboard to place all of the series from the dataBlock into the dZCorkboard.

The dZ Dropzone gear menu 4001 has various controls at the user's disposal as described below in the order of their appearance in the gear menu:

1. Pick Individual Series. This control presents check-boxes for the current dataBlock as well as the other dataBlocks in the user's current displayed page in the dZ Dropzone. The user may then select individual data series by checking the check-boxes adjacent to those series (which can be series in other dataBlocks as well) in order to define a collection of series to be operated upon by other choices in the drop-down menu.
2. Make a Block from checked Series. This control enables a user to select individual series from one or more dataBlocks, to make a new dataBlock comprised of the selected series. In this process the selected series will be removed from their current dataBlock and placed in the new dataBlock. This enables users to group their data series into dataBlocks of related series.
3. Reorder Series in the current dataBlock. This control enables the user to change the order of the series in the dataBlock via a drag and drop re-ordering control panel through which the user can drag each series into an ordinal position relative to the others.
4. Make Table Display. This control enables the user to make a DataZoa Table from the chosen series, and if no series are chosen via the Pick Individual Series check-boxes, from all the series in the current dataBlock.
5. Make Chart Display. This control enables the user to make a DataZoa Chart from the chosen series, and if no series are chosen via the Pick Individual Series check-boxes, from all the series in the current dataBlock.
6. Make LatestValues Display. This control enables the user to make a DataZoa LatestVlaues Display from the chosen series, and if no series are chosen via the Pick Individual Series checkboxes, from all the series in the current dataBlock.
7. Make dataBlock Display. This control enables the user to make a DataZoa dataBlock from the chosen series, and if no series are chosen via the Pick Individual Series checkboxes, from all the series in the current dataBlock.
8. Make a ComputeCloud Formula. This control enables a user to make a calculation from a collection of series which produces a derived series, which derived series will update automatically upon changes in any of those series used in the calculation of the derived series.
9. Make a named GroupList. This control enables the user to define and name a Grouplist from series selected via the Pick Individual Series control, which is a list of series bearing the user's chosen name which will be accessible from the Workbench tab.
10. Pin Series to dZCorkboard. This control enables the user to add any series selected via the Pick Individual Series control to the dZCorkboard.
11. Share. This control enables the user to share individual data series chosen via the Pick Individual Series control with others by using their email addresses, as well as enabling the user to revoke the shared access from such users. This control is further depicted in FIG. 41.
12. File. This control enables the user to choose among two sub-controls: (i) export the data from the current dataBlock, and (ii) print the current dataBlock.
13. Edit. This control enables the user to choose among two sub-controls which apply to series chosen via the Pick Individual Series control: (i) update the data series (which applies to user-uploaded data, not data flowing from external sites), or (ii) delete the series.
14. Done. Invoking this control dismisses the Gear menu.

Figure 41:
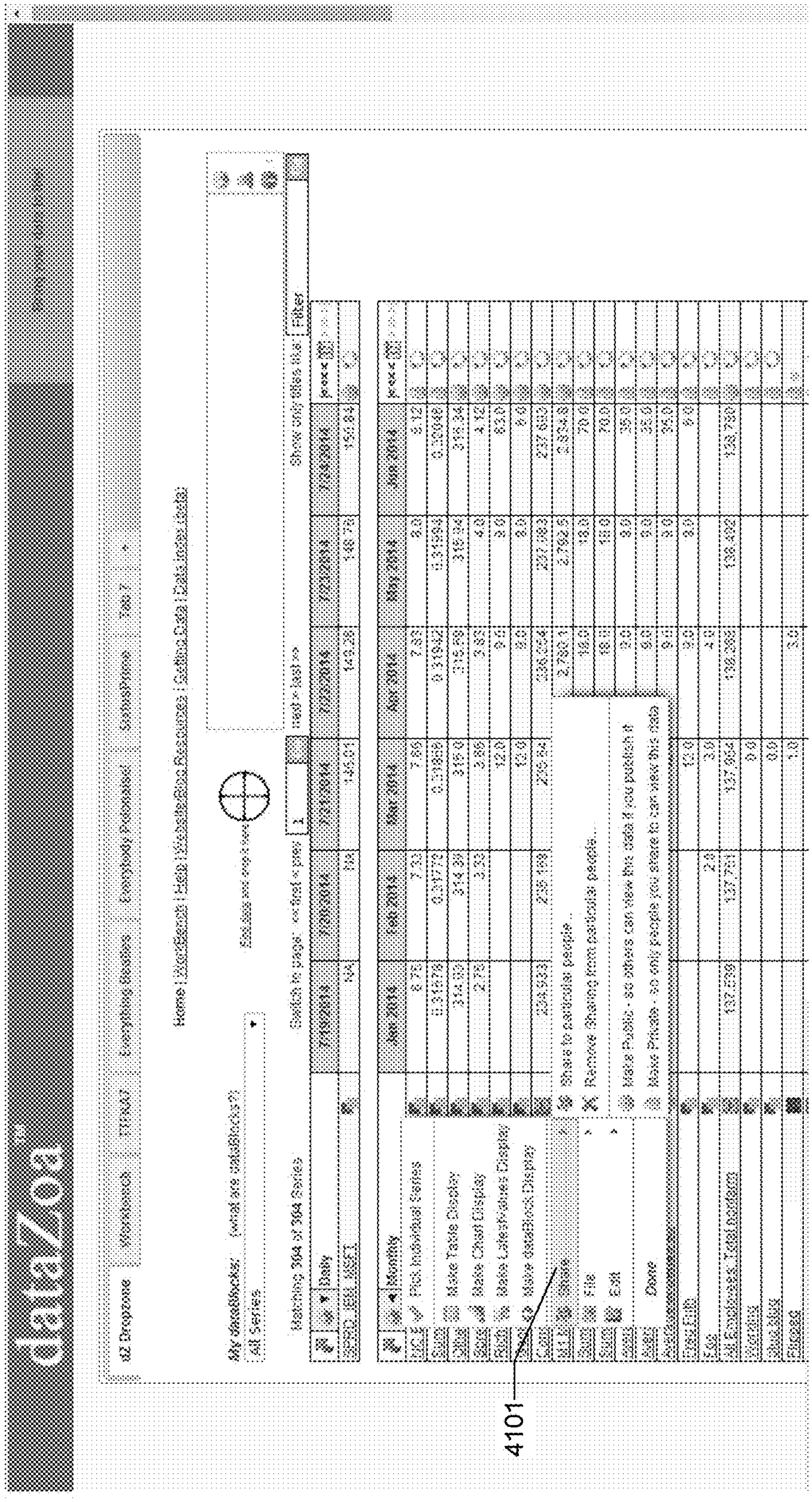
FIG. 41 is a representation of a display of a web page of a user's account in accordance with an embodiment of the present invention by which a user, when the Dropzone tab is active, is provided with options to select time series data and to share it with designated individuals, to make the data public, and to make the data private.

FIG. 41 is a representation of a display of a web page of a user's account in accordance with an embodiment of the present invention by which a user, when the Dropzone tab is active, is provided with options to select time series data and to share it with designated individuals, remove sharing access from designated individuals, to make the data public, and to make the data private. More specifically, the user may "Pick Individual Series" using the first choice in the Gear menu described in FIG. 40 and upon invoking the sharing menu 4101 the user may click upon the "Share to particular people . . . " option and is presented with a panel into which the user enters email addresses of those individuals to whom the user wishes to share the chosen data. The user may also click upon the "Remove sharing from particular people . . . " option and is presented with a listing of email addresses of those who have access to the indicated data, from which the user may then eliminate shared access for any particular individuals. The "Make Public" menu choice enables the data to be viewed publicly if the user publishes this data in a public-facing web site, while the "Make Private" menu choice would prevent this data from being publicly displayed, even if manifest in a dZEmbeddable display. Data which is made "Private" will only be viewable by those users to whom the account holder has specifically shared this data by email address.

Figure 42:
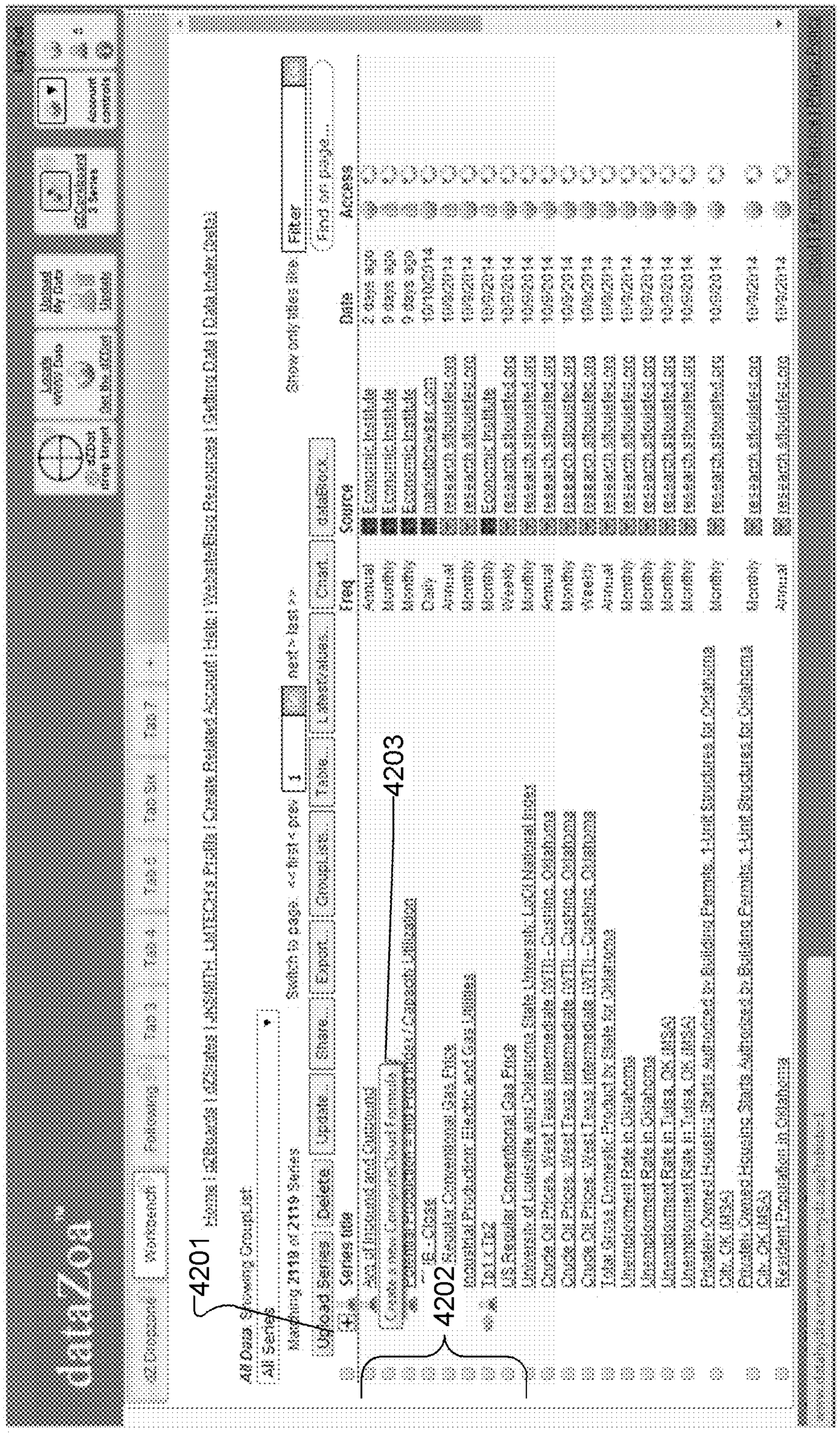
FIG. 42 is a representation of a display of a web page of a user's account in accordance with an embodiment of the present invention by which a user, when the Workbench tab is active, can elect to create a new ComputeCloud formula.

FIG. 42 is a representation of a display of a web page of a user's account in accordance with an embodiment of the present invention by which a user, when the Workbench tab is active, can elect to create a new ComputeCloud formula. More specifically, the user, in order to create a new formula, would select the series to be used in the formula by checking the leftmost empty box 4202 next to each series to be used, and then click upon the plus (+) button 4201. The user by hovering his mouse over the plus (+) button 4201 is also presented with a message 4203 describing the function of that button: "Create a new ComputeCloud Formula".

Figure 43:
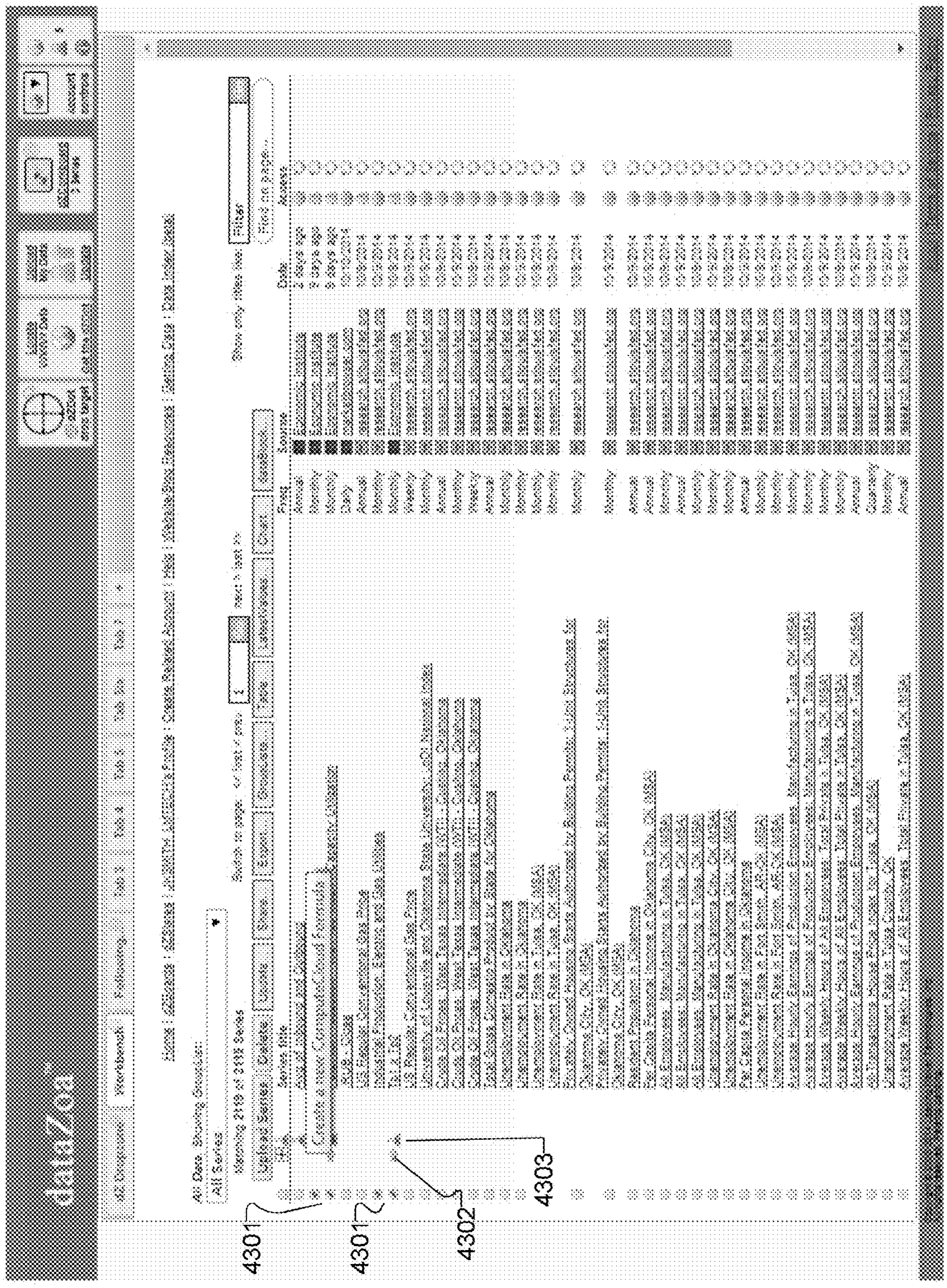
FIG. 43 is a representation in accordance with an embodiment of the present invention of a display of a web page of a user's account by which a user, when the Workbench tab is active, can elect to create a new ComputeCloud formula by checking each series to which the formula is applicable and then clicking on the plus button.

FIG. 43 is a representation in accordance with an embodiment of the present invention of a display of a web page of a user's account by which a user, when the Workbench tab is active, can elect to create a new ComputeCloud formula by checking each series to which the formula is applicable and then clicking on the plus button. More specifically, the user has checked series of interest 4301 and has the further option of inspecting those series manifesting a gold arrow 4302 adjacent to the blue flask 4303 icon which gold arrow 4302 indicates that the series in question is a "Parent Series", meaning that it is utilized by other ComputeCloud formulas to generate "Children" series and possibly also further "Descendant" series. Upon clicking on the Gold Arrow 4302 or the Blue Flask 4303 icon adjacent to the series the user may view the specific children and other descendants of the series as well as viewing any ancestors to this series and the computational evaluation order of other series which are computed involving this particular series. The depiction of series ancestry and descendants as well as computational evaluation order is reflected in FIG. 46 and FIG. 47.

Figure 44:
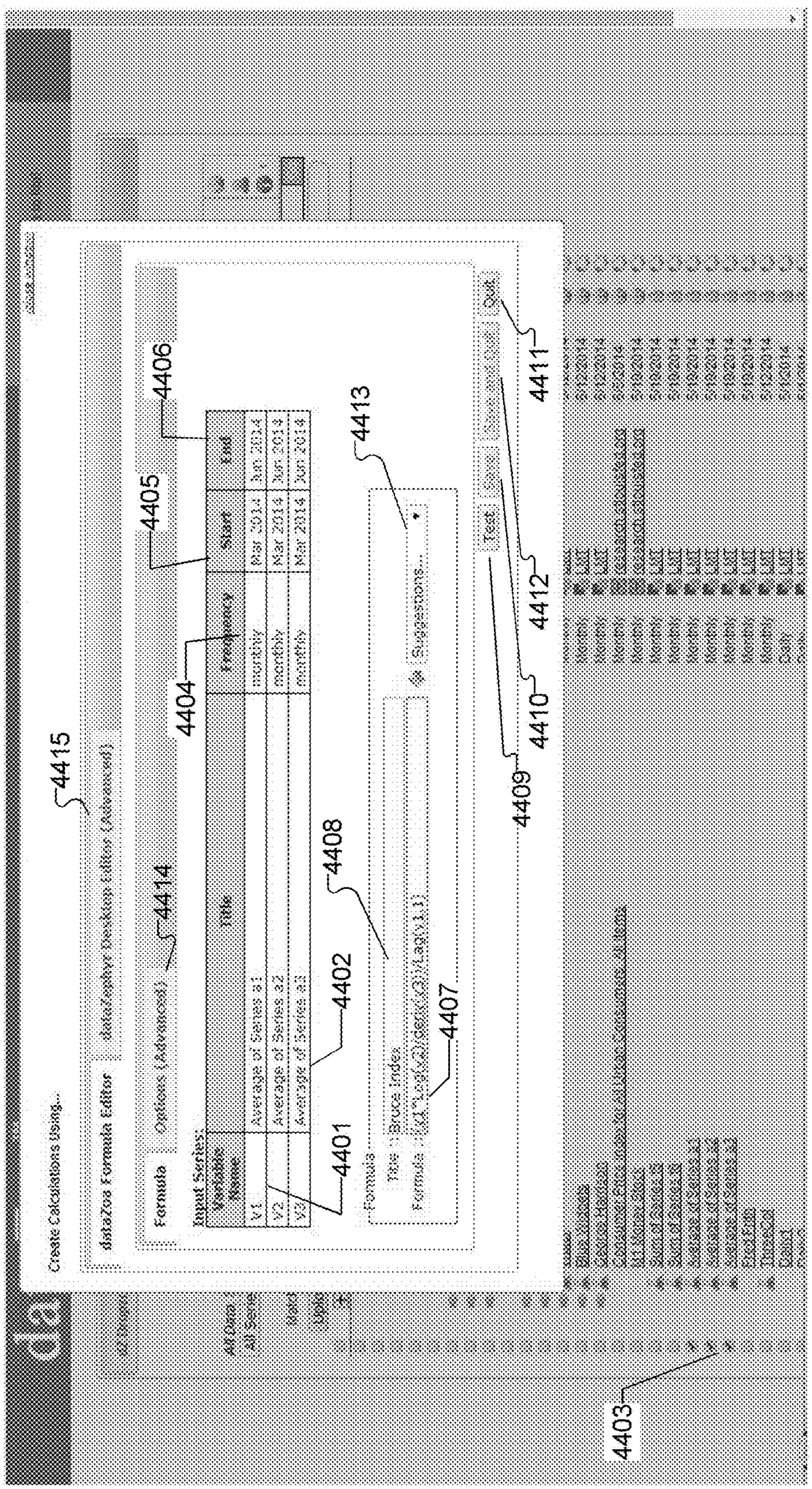
FIG. 44 is a representation of a display of a web page of a user's account, in accordance with an embodiment of the present invention, similar to that of FIG. 43, wherein a ComputeCloud tool window is presented by which the user can define a formula using time series data.

FIG. 44 is a representation of a display of a web page of a user's account, in accordance with an embodiment of the present invention, similar to that of FIG. 43, wherein a ComputeCloud tool window is presented by which the user can define a formula using time series data. More specifically, the series checked by the user 4403 are given short designations as variables for used in the creation of a formula, with the variable names being V1, V2, V3 et seq. 4401 corresponding to as many series as were selected for creating the calculation. The full name of each series 4402 is displayed adjacent to the short designation of V1, V2 and V3 respectively. Also shown to the user are the frequency 4404 and time span of each of the series which is depicted by the "Start" date 4405 and "End" date 4406 of each series to be used in the calculation. The user is offered an area to enter their own formula 4407 as a function of the V1, V2, V3 series designations, as well as being prompted to enter a title 4408 for their new series. Upon the user entering their desired formula 4407, the user may invoke the "Test" 4409 button to examine the computed value of the most recent value in their computed time series. Upon the user being satisfied with their calculation, the user may "Save" 4410 the calculation as a new series in their DataZoa account, and "Quit" 4411 from the compute cloud panel (closing the panel) or simultaneously "Save and Quit" 4412 from the compute cloud panel which causes the calculation to be saved and the panel exited and dismissed. The ComputeCloud tool window also offers some "suggestions" 4413 which take the form of formulas using DataZoa ComputeCloud functions for which the syntax is automatically laid into the formula part of the panel. At present the "suggestions" include: (i) moving average, (ii) remove mean, (iii) Index to 100, (iv) percent change, (v) quarterly frequency conversion, and (vi) annual frequency conversion. Additionally there are Options (Advanced) 4414 through which the user can set options for dealing with "ragged" data calculations—i.e., calculations involving series which may not have identical time spans. In the case of "ragged" data, the user options are (i) operate only on the time period where there is data for all series (called the "Intersection" of all series), or (ii) operate on the "Union" of all series, meaning to perform the calculation even in the absence of complete temporal overlap of all series, meaning that in the instance of missing values (NAs) an NA in a source series for the calculated series would be passed through into the calculated series. The other of the Options (Advanced) which is offered enables the user to set options for dealing with NA (not available) data in the resulting calculated series. These options are as follows: (i) Accept NA values which means that NA values occurring in a source series for the calculation will be passed as NA values into the resulting computed series in the same time periods in which the NA values occurred in the source series, (ii) Fill Forward, meaning the most recent non-NA value in a series will be used to replace all NA values occurring immediately after that non-NA value in the series, (iii) Fill Forward, then Backward, meaning that the most recent non-NA value in a series will be used to replace all NA values occurring both immediately after and before that non-NA value, (iv) Fill Backward, meaning that a non-NA value which is preceded by NA values occurring before it in the series, will be used to replace those NA values occurring before it in the series, and (v) Fill Backward, then Forward, meaning that a non-NA value occurring after a sequence of one or more NA values will be used to replace those immediately prior NA values as well as being used to replace NA values occurring immediately after the non-NA value.

By way of explicit example of options (ii) through (v) here is how this scheme is implemented in practice. Let S be a time series with interspersed NA values and actual numeric values as follows:

S=NA, 1, NA, NA, 4, 5, NA, NA

Fill Forward results in this series: NA,1,1,1,4,5,5,5

Fill Forward, then Backward results in this series: 1,1,1,1,4,5,5,5

Fill Backward results in this series 1,1,4,4,4,5,NA,NA

Fill Backward, then Forward results in this series: 1,1,4,4,4,5,5,5

The DataZoa ComputeCloud also offers the user the ability to have their chosen series sent to DataZephyr as primary series "DataZephyr Desktop Editor (Advanced)" 4415, each series being placed in a blank window in DataZephyr, which enables the user to utilize DataZephyT to render the user's desired calculation, and upload this calculation into the DataZoa ComputeCloud.

Figure 45:
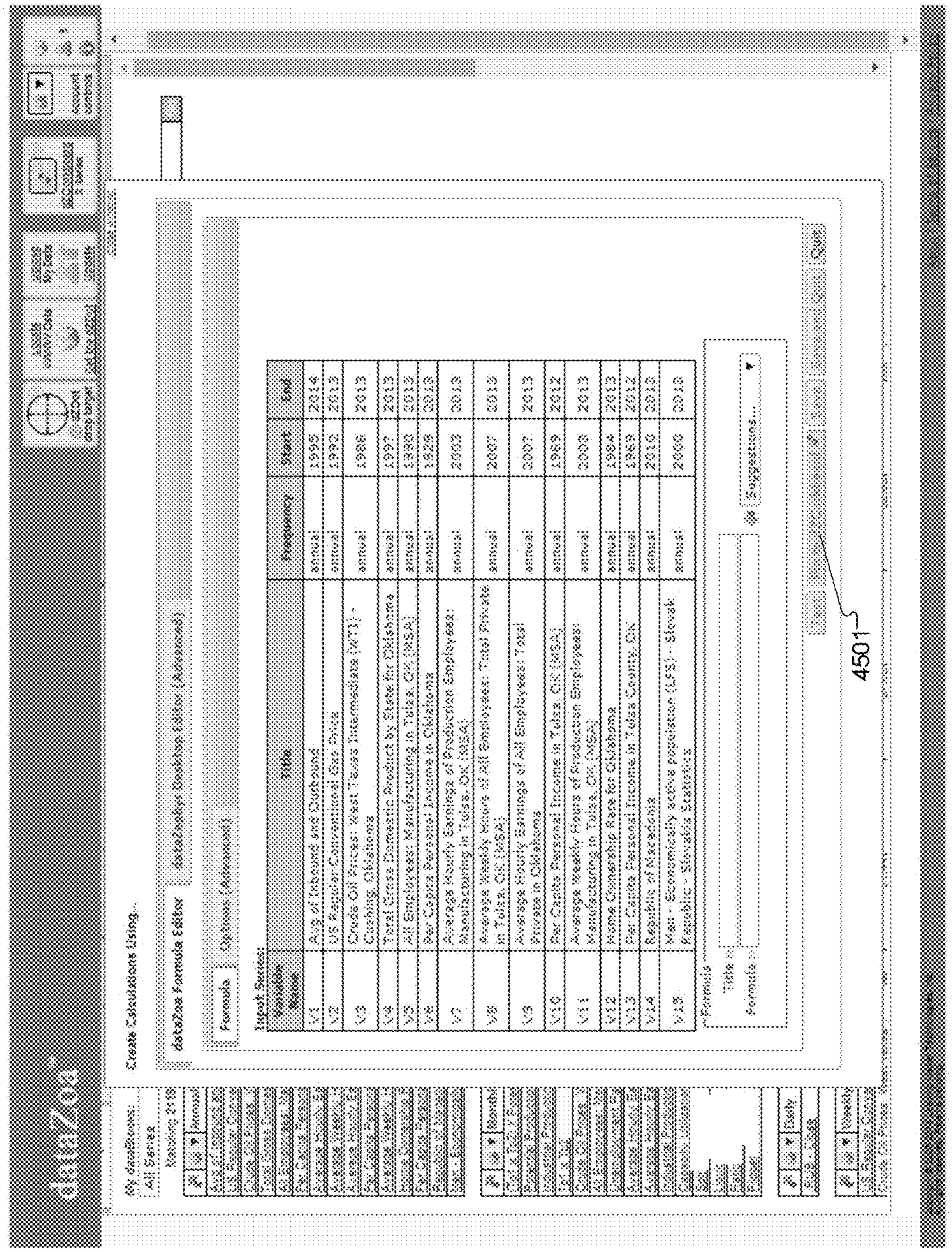
FIG. 45 is a representation of a display of another web page of a user's account, in accordance with an embodiment of the present invention, similar to that of FIG. 43, by which the ComputeCloud tool window similarly provides a mechanism for the user to define a formula using time series data from the Dropzone tab.

FIG. 45 is a representation of a display of another web page of a user's account, in accordance with an embodiment of the present invention, similar to that of FIG. 43, by which the ComputeCloud tool window similarly provides a mechanism for the user to define a formula using time series data from the Dropzone tab. In this FIG. 15 series, designated as V1 through V15 are made available for use in the user's calculation, and the ComputeCloud panel presented on the Dropzone has the added option of enabling the user to pin the resulting calculation to the dZCorkboard 4501.

Figure 46:
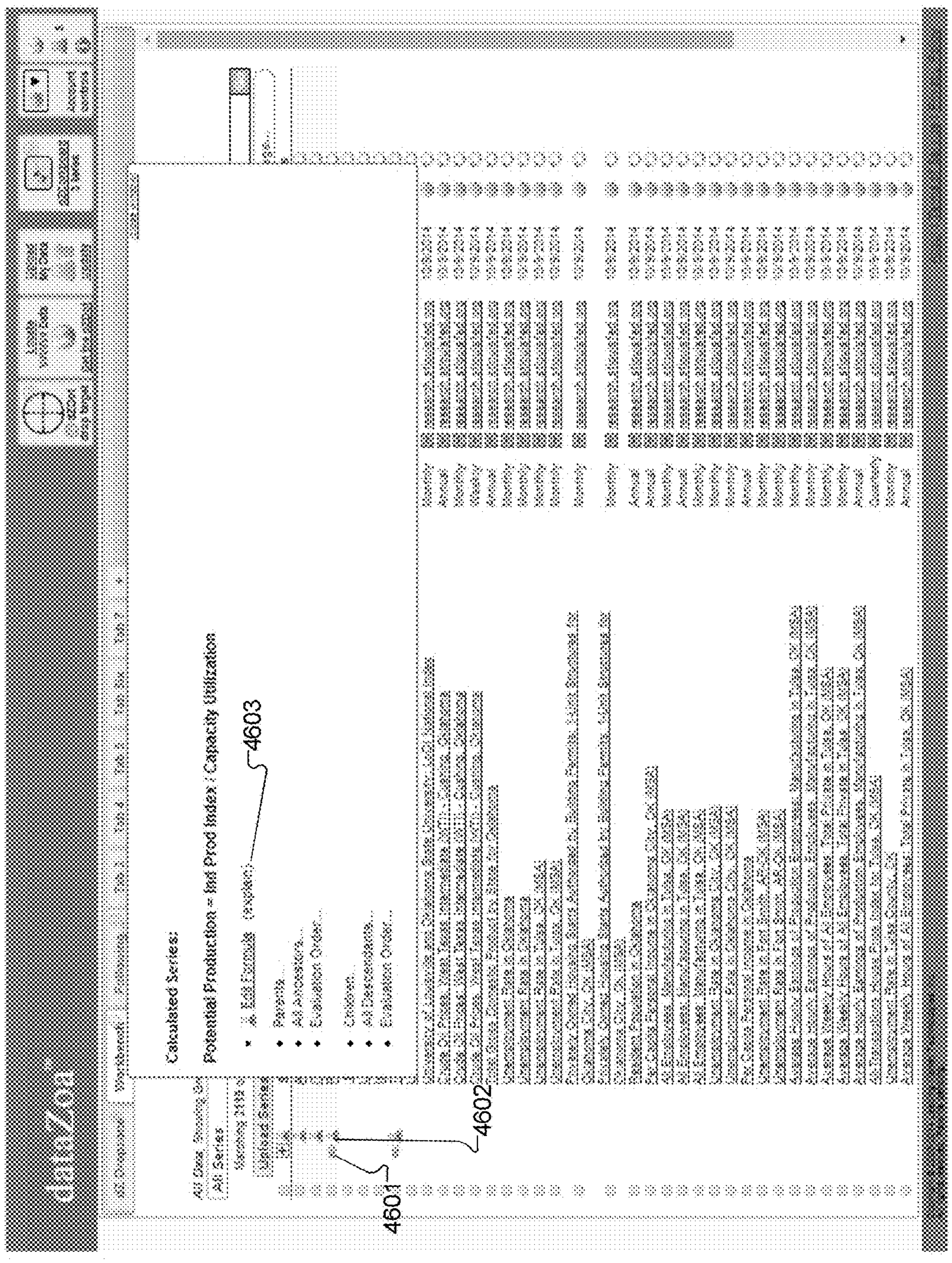
FIG. 46 is a representation of a display of a web page of a user's account, in accordance with an embodiment of the present invention, similar to that of FIG. 43, presenting a window by which a user has obtained a first level menu offering an analysis of a series that has been calculated using the ComputeCloud to identify parent series, ancestor series, child series and all descendant series as well as the computational evaluation order of all ancestor and descendant series.
Figure 47:
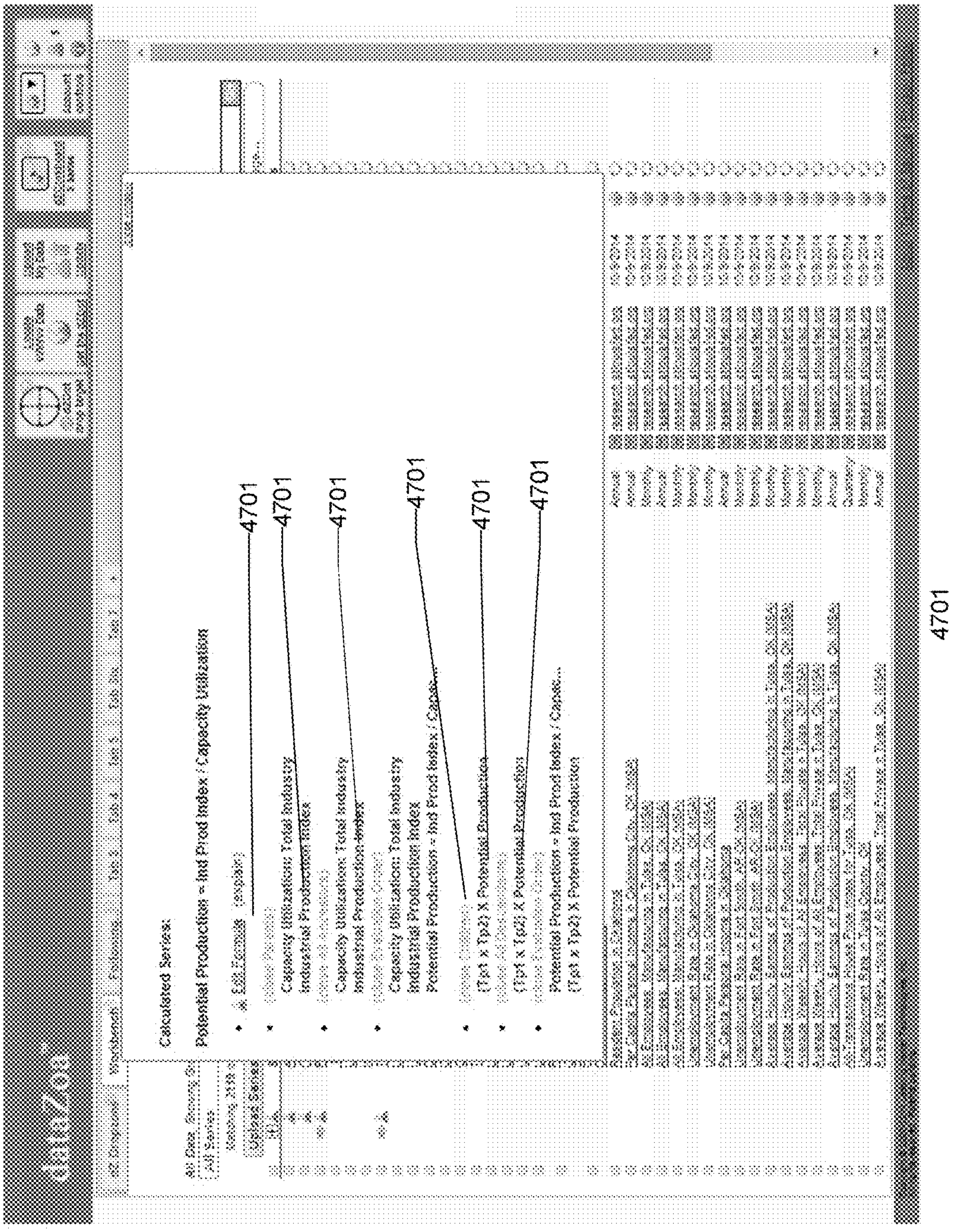
FIG. 47 is a representation of a display of the web page of FIG. 46, in accordance with an embodiment of the present invention, presenting a similar window to the one shown in FIG. 46, wherein the user has obtained an analysis to identify all ancestor and descendant series and the calculations defined with respect to them including the evaluation order of the calculations utilized in both the ancestral and descendant calculation chains.

FIG. 46 is a representation of a display of a web page of a user's account, in accordance with an embodiment of the present invention, similar to that of FIG. 43, presenting a window by which a user has clicked upon the Gold Arrow 4601 icon or the Blue Flask 4602 icon adjacent to the series of interest, in this case the series is titled "Potential Production=Ind Prod Index/Capacity Utilization". The user, by clicking on the Gold Arrow icon 4601 or the Blue Flask icon 4602, has obtained a first level menu offering an analysis of a series, which is comprised of clickable links as follows: (i) Edit Formula 4603, which enables the user to revise the formula for the ComputeCloud series by presenting a ComputeCloud panel similar to those depicted in FIG. 44 and FIG. 45, (ii) "Parents . . . " which will show the series used directly in the calculation of this series, (iii) "All Ancestors . . . " which will show the "Parents . . . " as well as any series used to calculate the "Parents . . . ", (iv) "Evaluation Order . . . " which will show the ordered sequence of all antecedent computations used to compute this series, (v) "Children . . . " which will show series directly computed from this series, (vi) "All Decendants . . . " which will show all series which are calculated as children or sub-generational series computed from this series, and (vii) "Evaluation Order . . . " which will show the ordered sequence of calculations used to compute all descendants from this series. FIG. 47 depicts the details available to the user upon clicking upon each of the links in the panel presented in FIG. 46.

FIG. 47 is a representation of a display of the web page of FIG. 46, in accordance with an embodiment of the present invention, presenting a similar window to the one shown in FIG. 46, wherein the user has obtained an analysis to identify all ancestor and descendant series and the calculations defined with respect to them including the evaluation order of the calculations utilized in both the ancestral and descendant calculation chains. Each of the links described in FIG. 46, enumerated (ii) through (vii) has been clicked upon resulting in the display of the corresponding information offered in FIG. 46 under each respective category, as well as showing a corresponding link above each information category in orange 4701 which enables the user to "close" out that category of information. Clicking upon the category orange link 4701 results in the re-display of the corresponding blue link displayed in FIG. 46 for each category closed out by clicking on an orange link.

Figure 48:
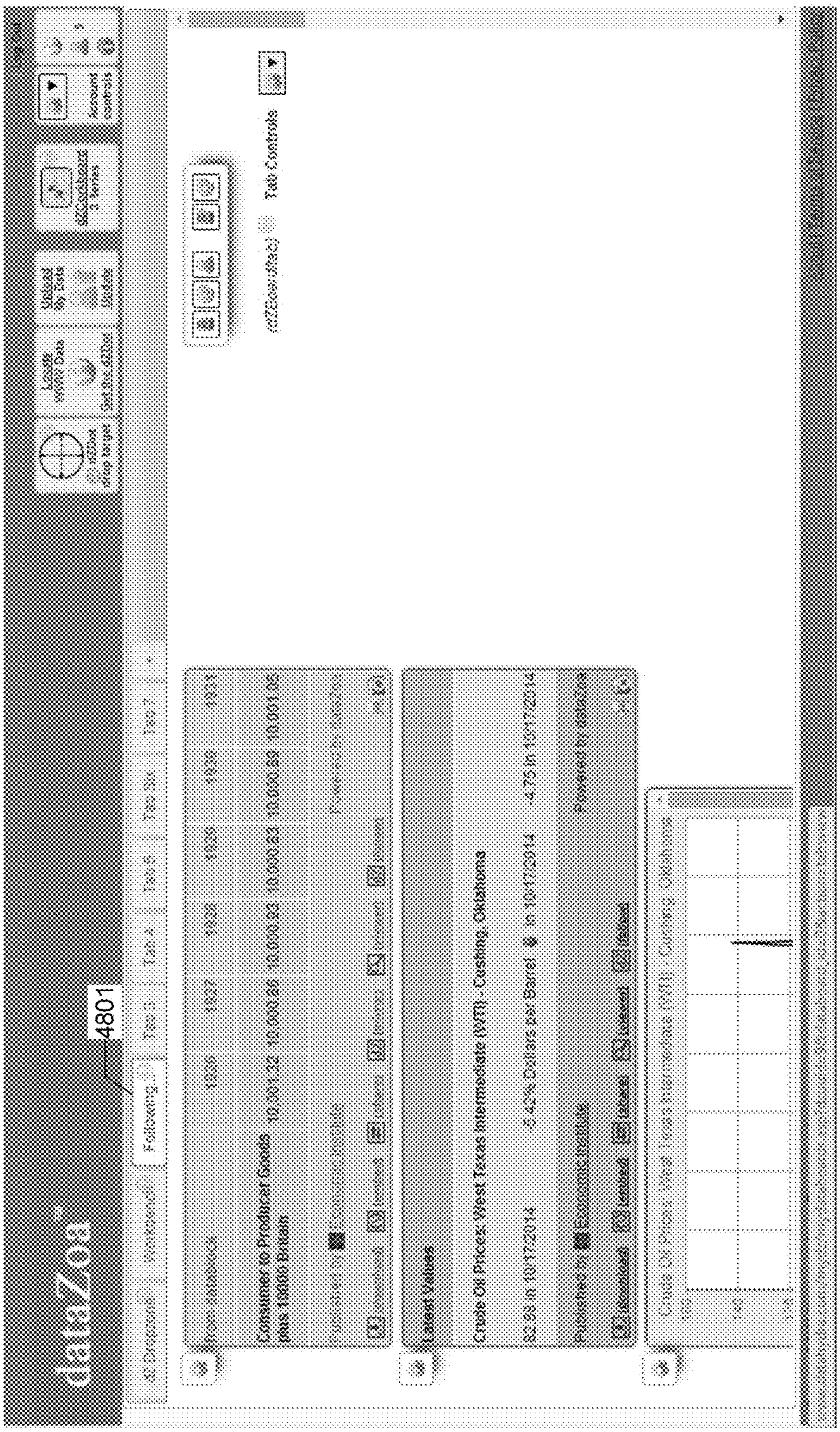
FIG. 48 is a representation of a display of a web page of a user's account, in accordance with an embodiment of the present invention, wherein the Following tab is active, to which can be posted time series data to which the user's account is subscribed, in the form of DataZoa tables, charts, latest values displays and dataBlocks, and also displays of the user's own in-account data.

FIG. 48 is a representation of a display of a web page of a user's account, in accordance with an embodiment of the present invention, wherein the Following tab 4801 is active, to which can be posted time series data to which the user's account is subscribed, in the form of DataZoa tables, charts, latest values displays and dataBlocks, and also such displays of the user's own in-account data. The posting of such displays to the Following tab is achieved by the user finding a DataZoa display (table, chart, latest values or dataBlock) on a web page which could be public facing or on a private network or intranet accessible to the user, or within the user's own account, and clicking on the "Follow" button on that display (which "Follow" button the publisher can offer at the publisher's discretion) with an example of the "Follow" button on a public facing display being found at the bottom of FIG. 49 below.

FIG. 49 is a representation of a display of a web page presenting time series data as a DataZoa table, in accordance with an embodiment of the present invention, manifesting the "Follow" 4901 button, which enables the user to either (i) post this display to the Following tab in the user's own DataZoa account, or to (ii) post all data series manifest in the display as individual time series in the user's own account. Upon the user clicking on the "Follow" button at the bottom of a DataZoa display where the publisher has switched on the "Follow" feature for that display, the user is offered two choices in the form of clickable links in a simple panel: (i) "Follow this display", or (ii) "all of these series". In the case where the user chooses "Follow this display" the display will be posted to the "Following . . . " tab in the user's DataZoa account as depicted in FIG. 48. In the case where the user chooses to "Follow . . . all of these series" the individual data series in the display will be posted to the user's account as individual data series. In both cases (i) and (ii) whenever the publisher posts new data to the display or underlying series, this data will be instantly manifest in the user's account.

Figure 50:
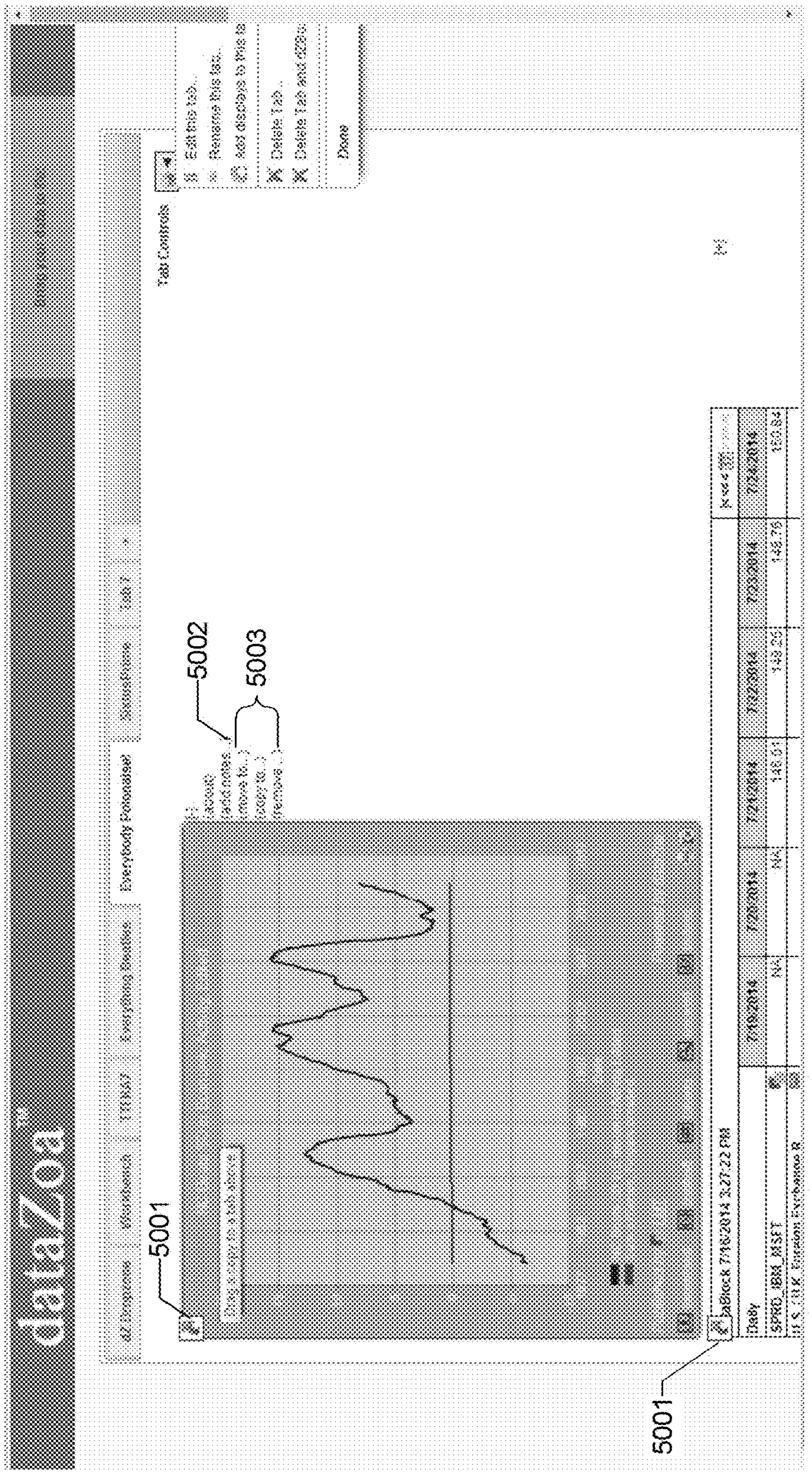
FIG. 50 is a representation of a display of a web page of a user's account, in accordance with an embodiment of the present invention, wherein a user-defined tab is active, showing a control by which an individual display can be dragged and dropped into another existing or new tab, as well as a control giving the user the ability to add formatted text ("notes") located above, below or beside the display, and further controls to move or copy the display to a selected destination.

FIG. 50 is a representation of a display of a web page of a user's account, in accordance with an embodiment of the present invention, wherein a user-defined tab is active, showing a control 5001 by which an individual display can be dragged and dropped into another existing or new tab, as well as a control 5002 giving the user the ability to add formatted text ("notes") located above, below or beside the display, and further controls 5003 to move or copy the display to a selected destination or remove it from the current tab.

Figure 51:
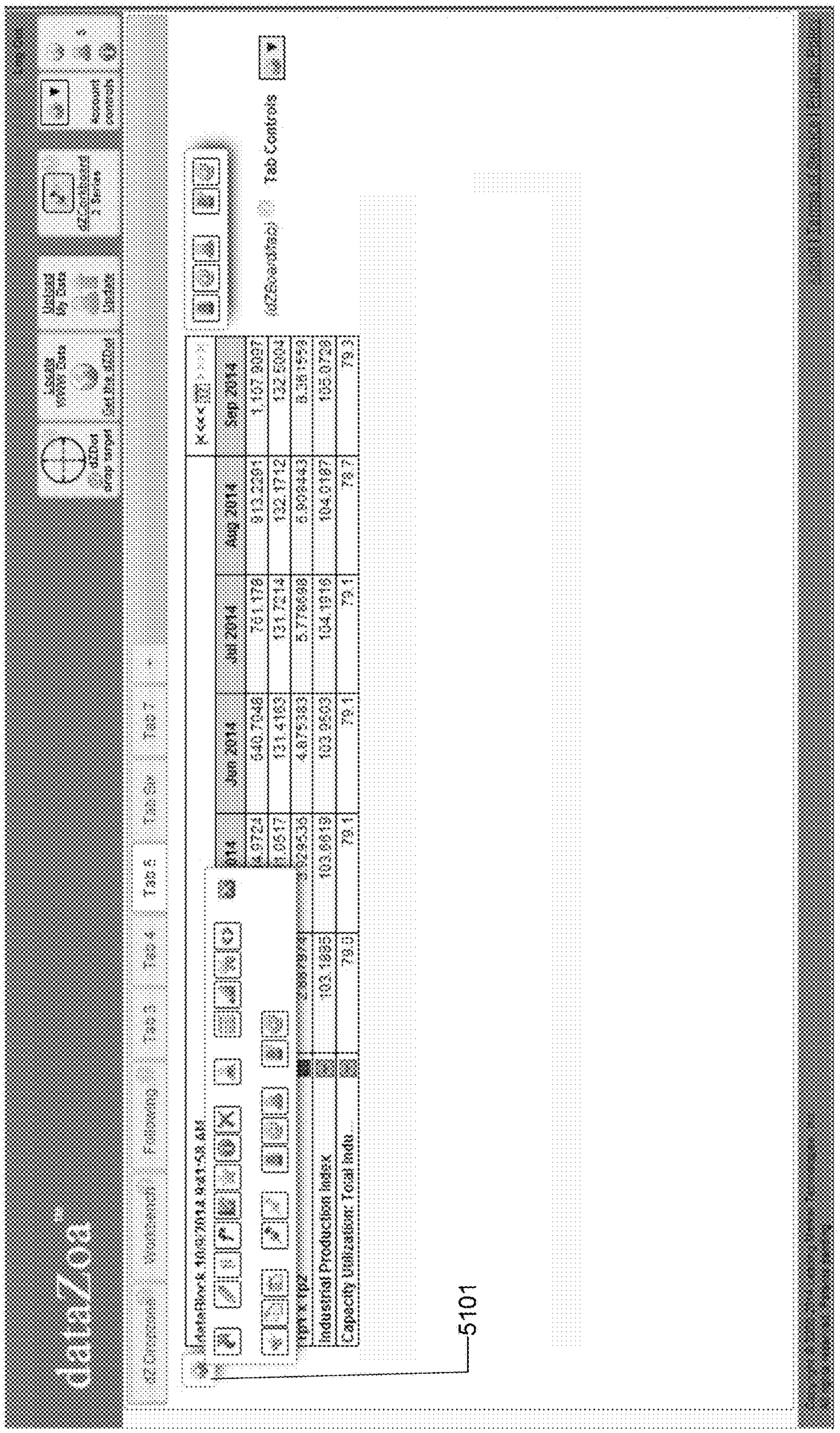
FIG. 51 is a representation of a display of a web page of a user's account, in accordance with an embodiment of the present invention, showing an active tab with a dataBlock display, reflecting the full range of controls available to the user for manipulating this display, getting information about the display, posting it to the DataZoa Workbench tab, rendering calculations from series in the display, rendering the full range of DataZoa display types from the data in the display, copying or cutting and pasting rows from the display, pinning series in the display to the dZ Corkboard, transmitting the display, via SMS, email or internal DataZoa messaging, to a smart phone or e-mail account of the user or of other individuals.

FIG. 51 is a representation of a display of a web page of a user's account, in accordance with an embodiment of the present invention, showing an active tab with a dataBlock display, reflecting the full range of controls available to the user which controls are displayed upon the user hovering the user's mouse over the gear icon 5101, for manipulating this display, getting information about the display, posting it to the DataZoa Workbench tab, rendering calculations from series in the display, rendering the full range of DataZoa display types from the data in the display, copying or cutting and pasting rows from the display, pinning series in the display to the dZ Corkboard, transmitting the display, via SMS, email or internal DataZoa messaging, to a smart phone or e-mail account of the user or of other individuals. In more specific detail, the function of each control available over a display—be it a chart, table, latest values display or dataBlock—are described by enumerating the buttons starting in the upper left corner of the control panel and are detailed below, button by button proceeding left to right on the first row of controls, then following with the second row of controls proceeding from left to right as well:

1. (Blue Upward Pointing Arrow Drag Handle) Drag this display to another tab. This control enables the user to drag the entire display to any other tab and drop it into that tab, or to drag it to the + tab and create a new tab with it. The display is positioned at the top of the tab but can be reordered among the other displays in the tab by using the Tab Controls.
2. (Pencil) Edit the display. This control enables the user to invoke the display editor for the type of display being edited, which offers a full range of options to control the contents of the display.
3. (UpDown Arrows) Reorder the rows in the display. This control enables the user to change the order of the series in the display, which applies to dataBlocks, tables, latest values displays and some types of charts.
4. (f*) Turn on the footer which includes the traditional controls displayed at the base of DataZoa embeds, including buttons to download, share, mirror, and other controls already disclosed, and also the ability to download a PDF or PNG file depicting the display.
5. (Pencil over book) This enables the user to enter and edit text as well as in-line HTML code (including text, images, videos and other content) which can be placed above, below and to the sides of the display. This control enables the user to render free-form commentary and content comingled with the DataZoa displays.
6. (Star) This button enables the user to Name the Display and make it available in the Workbench area, from which it can be reused and easily placed in other tabs through invoking it by name.
7. (I) This is an info button giving background information on the display, including whether it resides only on the current tab or in the workbench, and its name if it resides in the workbench. Additionally, counts of private and public series contained in the display are shown, and by hovering over the counts, the individual public or private series are shown by name.
8. (X) This button is to remove the display from the current tab.
9. (Flask) This button is used to create a compute-cloud formula to generate a computationally derived series from the series in the display.
10. (Table Icon) This button enables the user to create a table display from the data in the current display. This feature incorporates the Movable Divider display to make it easier for the user to define a sub-group of the series from this display prior to making the new table.

11. (Chart Icon) This button enables the user to create a chart display from the data in the current display. This feature incorporates the Movable Divider display to make it easier for the user to define a sub-group of the series from this display prior to making the new chart.
12. (% Icon) This button enables the user to create a Latest Values Display from the data in the current display. This feature incorporates the Movable Divider display to make it easier for the user to define a sub-group of the series from this display prior to making the new Latest Values Display.
13. (< > Icon) This button enables the user to create a dataBlock display from the data in the current display. This feature incorporates the Movable Divider display to make it easier for the user to define a sub-group of the series from this display prior to making the new dataBlock display.
14. (x Icon) This button dismisses the panel of buttons from the user's view.

2nd Row of Buttons taken from left to right:

15. (Sissors Icon) This button enables the user to Cut select series from the current display while placing them on a working clipboard (not the dZCorkboard).
16. (Copy Icon) This button enables the user to Copy select series from the current display while placing them on a working clipboard (not the dZCorkboard) while not Cutting them from the display.
17. (Paste Icon) This button enables the user to paste series on the working clipboard into specific locations in any display, including choosing the paste point for placement above or below any row in a type of display which contains rows.
18. (Blue Pin) This button enables the user to add the series in the current display to the dZCorkboard.
19. (Yellow Pin) This button enables the user to clear the current dZCorkboard of series and add the series from the current display to the dZCorkboard.
20. (Cell Phone Icon) This button enables the user to send this display to the cell phone of one or more people via SMS messaging, from which the display can be saved to the cell phone's home screen and called up instantly showing current data. This button offers a panel giving easy access to the user's previously used cell phone numbers for sharing data, as well as displaying the counts of public and private series the user is about to share and enabling the user to see, by hovering the user's mouse over the counts, which series by name are public or private including those owned by the user or shared to the user by others. An example of this panel appears in FIG. 54.
21. (@ Icon) This button is similar to the button enabling one to send a display via SMS but it uses email. As with SMS, the recent email recipients are kept at the ready and presented in a panel for the user's convenience and public and private series are enumerated and viewable to confirm to the user that the user may be sharing private data which maybe owned by the user or others. The recipient can receive the message on a cell phone, tablet or PC and save it to the home screen, enabling them to call up current data by simply touching or clicking upon the icon on their phone, tablet device or PC.
22. (Person Icon) This button enables the user to share a DataZoa display via DataZoa's Internal Messaging System among DataZoa users, sending a DataZoa internal message to another DataZoa account holder.
23. (Cell Phone Lighting Bolt Icon) This button enables a DataZoa user to send the display to his own cell phone, provided that he has entered his cell phone number in his account profile. From his cell phone he can save it to his home screen and call up live data in one click upon the icon on his phone.
24. (@ Lightning Bolt Icon) This button enables a DataZoa user to send the display to his own email account, from which he can view it and easily save it to the home screen of his cell phone or tablet device, calling up current data in one click upon the icon.

Figure 52:
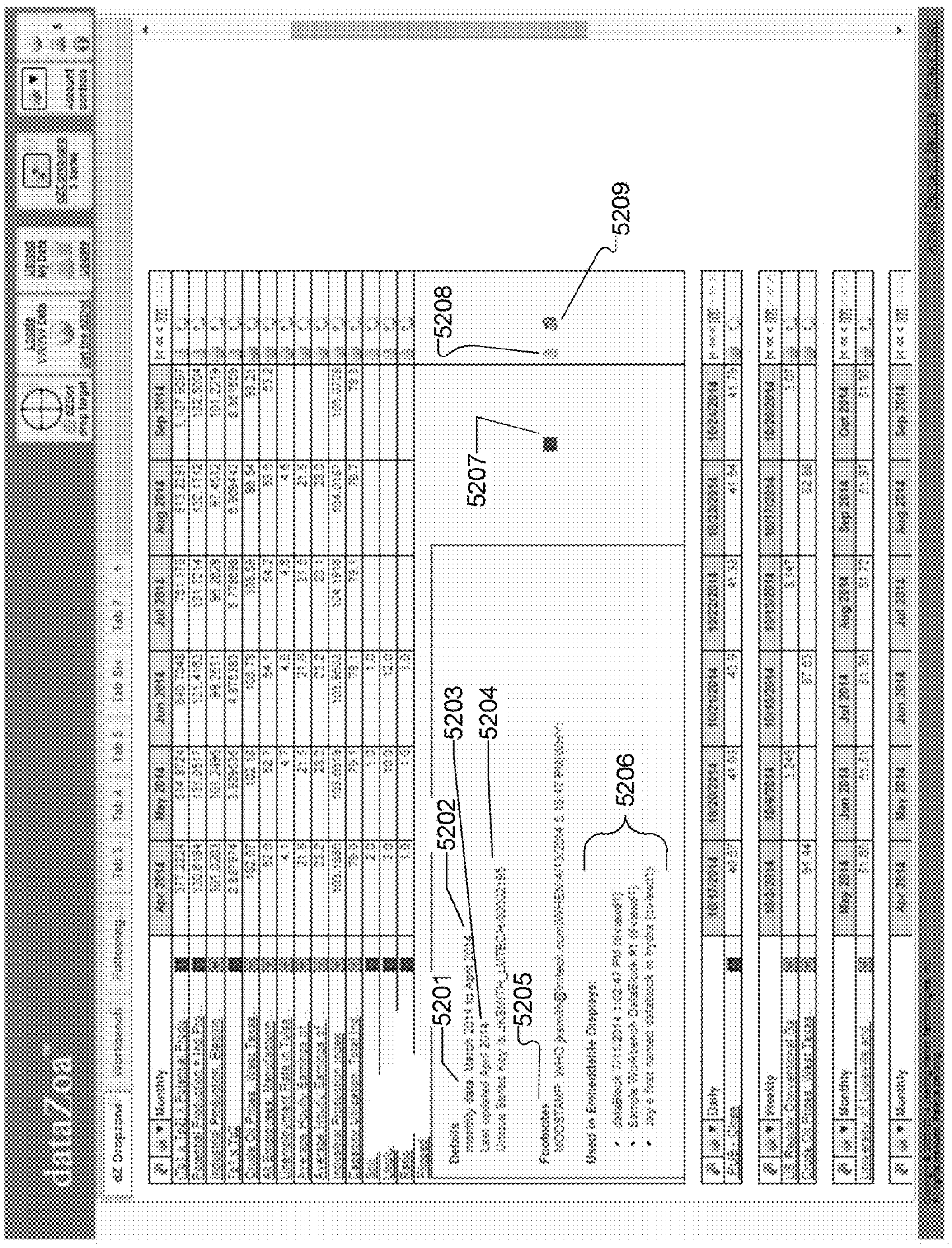
FIG. 52 is a representation of a display of a web page of a user's account, in accordance with an embodiment of the present invention, after the user has clicked upon the blue info icon (shown below in FIG. 60) (which is manifest by hovering the user's mouse-driven cursor over a data row (series) of interest appearing in either the dZ Dropzone or the Workbench) to cause appearance of a window displaying a full range of information about the data series, including its frequency, time span, date of latest update, unique series key in DataZoa, footnotes associated with the series, with the footnotes also including the identification of any parent series used to compute the series of interest, if applicable, the identity of named workbench-residing displays which use this series is set forth in the info icon panel under the heading "Used in Embeddable Displays", the favicon of the publisher of this series, a lock or globe icon to indicate whether the series is private or public respectively, and a human silhouette icon or circular sharing icon to indicate whether the series is shared with others or not respectively.

FIG. 52 is a representation of a display of a web page of a user's account, in accordance with an embodiment of the present invention, after the user has clicked upon the blue info icon (shown below in FIG. 60) (which is manifest by hovering the user's mouse-driven cursor over a data row (series) of interest appearing in either the dZ Dropzone or the Workbench) to cause appearance of a window displaying a full range of information about the data series, including its frequency 5201, time span 5202, date of latest update 5203, unique series key 5204 in DataZoa, footnotes 5205 associated with the series, with the footnotes also including the identification of any parent series used to compute the series of interest, if applicable, the identity of named workbench-residing displays 5206 which use this series is set forth in the info icon panel under the heading "Used in Embeddable Displays", the favicon of the publisher 5207 of this series, a lock 5208 or globe icon to indicate whether the series is private or public respectively, and a human silhouette 5209 icon or circular sharing icon to indicate whether the series is shared with others or not respectively. By the user hovering their mouse-driven cursor over the favicon of the publisher, the user may see the website of the publisher, and by clicking on that favicon the user will be taken to the website of the publisher. In the case of a public data series supported by the green DZ Dot, clicking on the favicon will take the user to the web page where the corresponding public data series resides.

Figure 53:
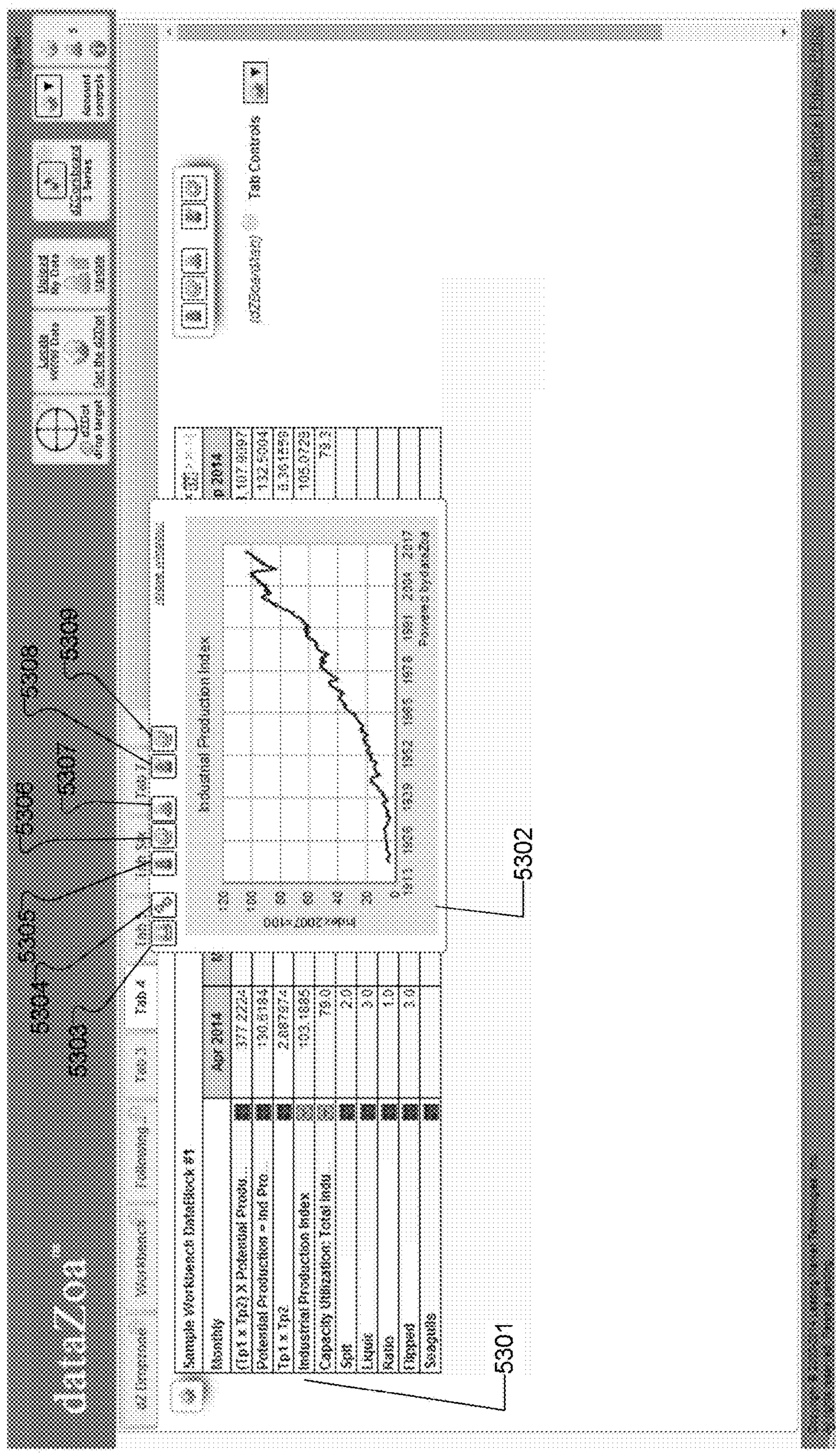
FIG. 53 is a representation of a display of a web page of a user's account, in accordance with an embodiment of the present invention, wherein the user has clicked on a data series named "Industrial Production Index" to cause presentation of a chart display of that data, which in turn includes selectable icons to enable the user to download the data in the display, pick up a web-embeddable link to the chart, send the chart, via SMS messaging, email or internal DataZoa messaging, to a smart phone or e-mail account of the user or of other individuals.

FIG. 53 is a representation of a display of a web page of a user's account, in accordance with an embodiment of the present invention, wherein the user has clicked on a data series named "Industrial Production Index" 5301 to cause presentation of a chart display 5302 of that data referred to herein as a "PopChart", which in turn includes selectable icons to enable the user to download the data 5303 in the display, pick up a web-embeddable link 5304 to the chart, send the chart, via SMS messaging 5305, email 5306 or internal DataZoa messaging 5307, to a smart phone or e-mail account of the user or of other individuals. In more specific detail, from the dZ Dropzone or Workbench or any tab display which contains a DataZoa dataBlock, Table or Latest Values Display, a user may click upon a data series name and produce a DataZoa "PopChart". An example of a DataZoa PopChart appears in FIG. 53. This chart has a range of controls on it which are enumerated below:

1. (Data Download Icon) 5303 This button enables the user to view the data contained in the DataZoa PopChart in a the user's browser, and choose a particular file format for downloading data from the chart. Data can be downloaded in XLS, CSV, QCSV, TSV or Text format as well as being Printed directly from the download tool.

2. (Link Icon) 5304 This enables the user to pick up a web-embeddable link to the chart which can be used to place this chart on a web site or the link could be included in an email.
3. (Cell Phone Icon) 5305 This button enables the user to send this chart to a recipient's cell phone via SMS messaging. Upon invoking this control the account holder will be informed if the series in question is marked as private. Upon receipt by the recipient of a message containing a link to this chart on his cell phone, the chart can be viewed and saved to the recipient's home screen of their smartphone or tablet device if it supports SMS. If the series is private, there is a further message to the recipient notifying them that they have been given "trusted access" and upon displaying the chart the recipient is notified to share the display only with persons trusted by the recipient.
4. (@ Icon) 5306 This button enables the user to send this chart to a recipient's email address which enables the recipient to view the chart on their PC, tablet or cell phone. Upon invoking this control the account holder will be informed if the series in question is marked as private. If the series is private, there is a further message to the recipient notifying them that they have been given "trusted access" and upon displaying the chart the recipient is notified to share the display only with persons trusted by the recipient.
5. (Person Icon) 5307 This button enables the user to share a DataZoa display via DataZoa's Internal Messaging System among DataZoa users, sending a DataZoa internal message to another DataZoa account holder. Upon invoking this control the account holder will be informed if the series in question is marked as private.
6. (Cell Phone Lighting Bolt Icon) 5308 This button enables a DataZoa user to send the display to his own cell phone, provided that he has entered his cell phone number in his account profile. From his cell phone he can save it to his home screen and call up live data in one click upon the icon on his phone.
7. (@ Lightning Bolt Icon) 5309 This button enables a DataZoa user to send the display to his own email account, from which he can view it and easily save it to the home screen of his cell phone or tablet device, calling up current data in one click upon the icon.

Figure 54:
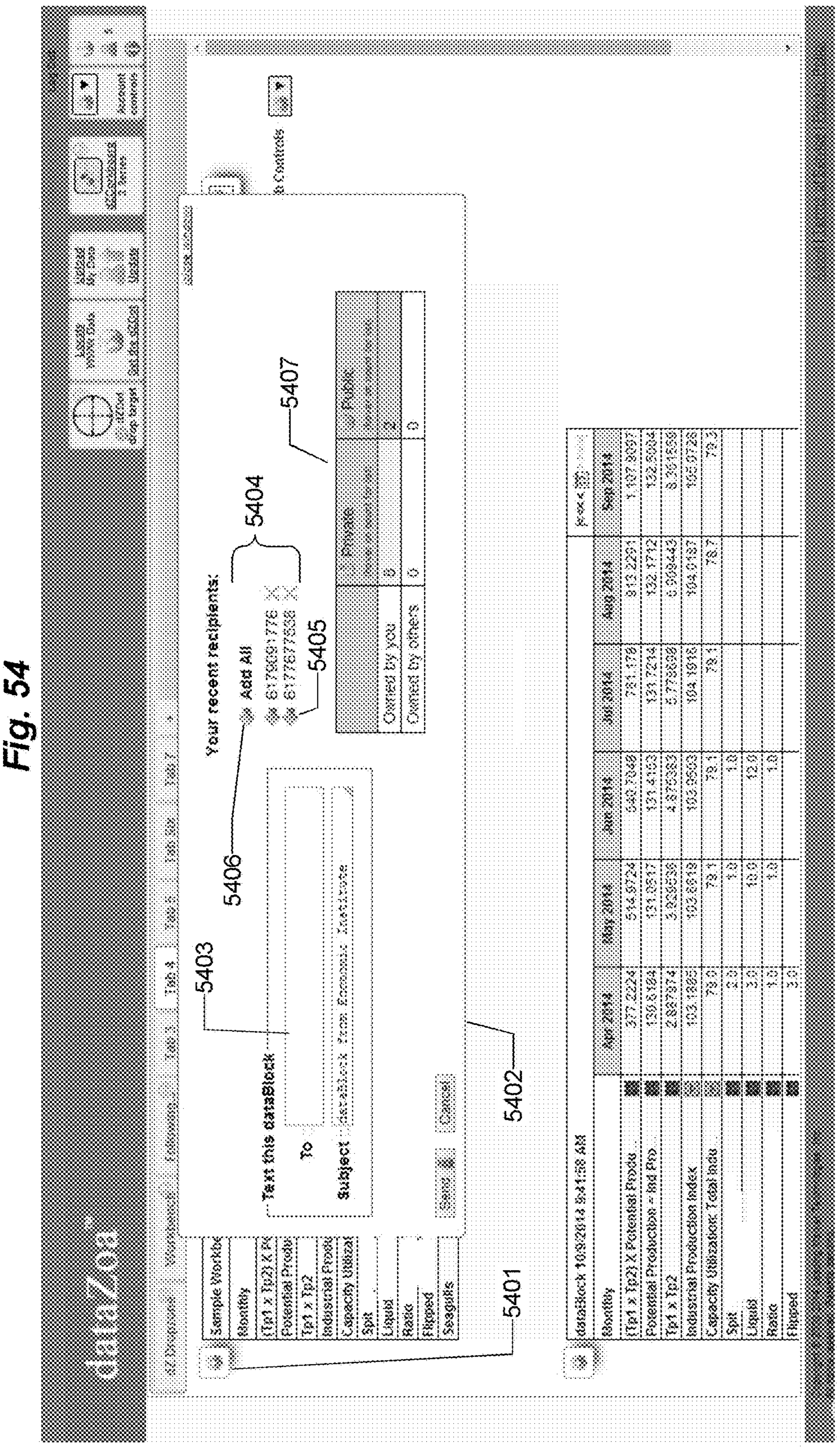
FIG. 54 is a representation of a display of the web page of FIG. 53, wherein the icon for sending the chart via SMS has been invoked, resulting in display of the SMS messaging panel, wherein the user can designate telephone numbers to send the FIG. 53 display, access previously used telephone numbers and direct these into the send-to panel by clicking on the blue arrow next to each number, or send all numbers into the send-to panel by clicking the blue arrow next to the "Add All" phrase, and in which is also displayed a table including the number of private and public series being shared as well as the ownership of these series by others and by the user.

FIG. 54 is a representation of a display of the web page of FIG. 53, wherein the icon available under the Gear Menu 5401 for sending the dataBlock via SMS has been invoked, resulting in display of the SMS messaging panel 5402, wherein the user can designate telephone numbers to send 5403 the FIG. 53 display, access previously used telephone numbers 5404 and direct these into the send-to panel by clicking on the blue arrow 5405 next to each number, or send all numbers into the send-to panel by clicking the blue arrow next to the "Add All" 5406 phrase, and in which is also displayed a table 5407 including the number of private and public series being shared as well as the ownership of these series by others and by the user. The tabular display of public and private series owned by the user or others is similarly displayed by invoking the option to send the dataBlock (or other DataZoa display type) via email or DataZoa internal messaging. In further detail, the user is offered the ability to select individual previous telephone numbers used or all numbers, as well as being able to remove any individual telephone number from the retained list by clicking on the X control next to the telephone number to be deleted. Similarly, if the user chose to send this dataBlock (or any other DataZoa display type) via email or internal DataZoa messaging, a list of previously used email addresses would be presented in a fashion similar to the presentation of previously used phone numbers, as well as the table showing public vs. private series, as well as series owned by the user vs. series owned by others.

Figure 55:
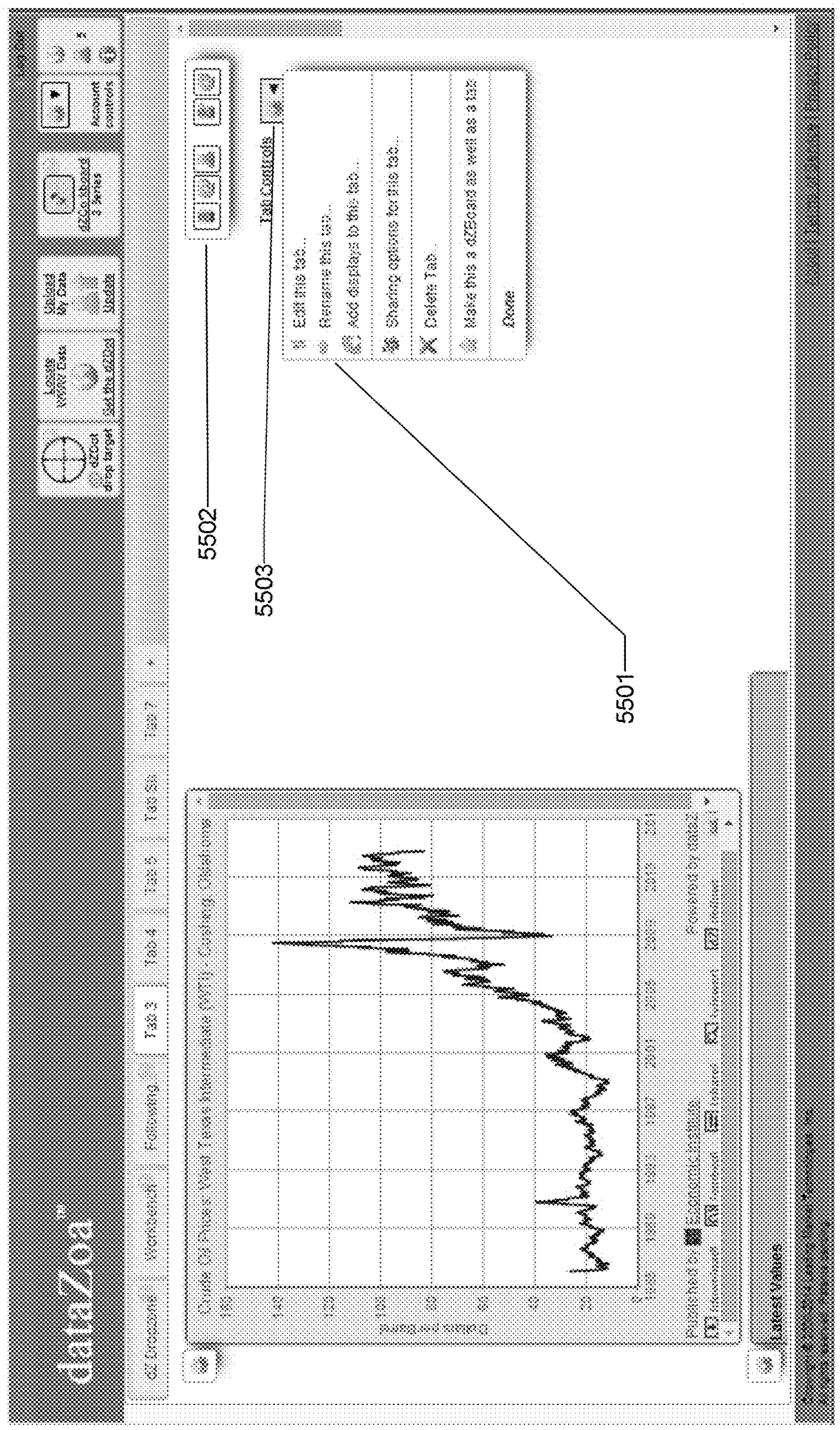
FIG. 55 is a representation of a display of a web page of a user's account, in accordance with an embodiment of the present invention, wherein on an active DataZoa tab, there has been graphically invoked (via the gear control) the menu of tab-level controls to perform functions, including re-ordering the elements of the tab, renaming the tab, adding displays to the tab from the DataZoa Workbench, specifying options for sharing the tab to others, password-protecting the tab, deleting the tab, and making the tab operate as a dZBoard, while also displayed on the page is a panel of buttons enabling the user to send this tab, via SMS, email or DataZoa internal messaging, to a smart phone or e-mail account of the user or of other individuals.

FIG. 55 is a representation of a display of a web page of a user's account, in accordance with an embodiment of the present invention, wherein on an active DataZoa tab, there has been graphically invoked (via the gear control 5503) the menu of tab-level controls 5501 to perform functions, including re-ordering the elements of the tab, renaming the tab, adding displays to the tab from the DataZoa Workbench, specifying options for sharing the tab to others, password-protecting the tab, deleting the tab, and making the tab operate as a dZBoard, while also displayed on the page is a panel of buttons 5502 enabling the user to send this tab, via SMS, email or DataZoa internal messaging, to a smart phone or e-mail account of the user or of other individuals. The functions of these controls are enumerated below.

Button Panel 5502, Enumerated Left to Right.

1. (Cell Phone Icon) This button enables the user to share the entire contents of the tab to one or more persons' cell phone via SMS messaging. This button enables the user to send the entire contents of this DataZoa Tab to the cell phone of one or more people via SMS messaging, from which the display can be saved to the cell phone's home screen and called up instantly showing current data. This button offers easy access to the user's previously used cell phone numbers (as disclosed elsewhere in this application) for sharing data, as well as displaying the counts of public and private series (as disclosed elsewhere in this application using a panel display like FIG. 54) they are about to share and enabling the user to see which series are public or private and which are owned by the user or others, by hovering their mouse over the counts.
2. (@ Icon) This button is similar to the button enabling one to send a full DataZoa Tab via SMS but it uses email. As with SMS, the recent recipients are kept at the ready for the user's convenience and public and private series are enumerated and viewable to confirm to the user that the user may be sharing private data owned by the user or others using a panel with the functionality summarized in FIG. 54. The recipient can receive the message on a cell phone, tablet or PC and save it to the home screen, enabling them to call up current data by simply touching or clicking upon the icon on their phone, tablet device or PC.
3. (Person Icon) This button enables the user to share a DataZoa Tab via DataZoa's Internal Messaging System among DataZoa users, sending a DataZoa internal message to another DataZoa account holder who is identified by their email address. As with the SMS and Email controls, a panel is presented to the account holder to inform him of counts and an explicit listing of the series which are public vs. private and owned by the account holder vs. others.
4. (Cell Phone Lighting Bolt Icon) This button enables a DataZoa user to send the display to his own cell phone, provided that he has entered his cell phone number in his account profile. From his cell phone he can save it to his home screen and call up live data in one click upon the icon on his phone.
5. (@ Lightning Bolt Icon) This button enables a DataZoa user to send the display to his own email account, from which he can view it and easily save it to the home screen of his cell phone or tablet device, calling up current data in one click upon the icon.

Tab Controls Drop-Down Gear Menu 5501

Figure 56:
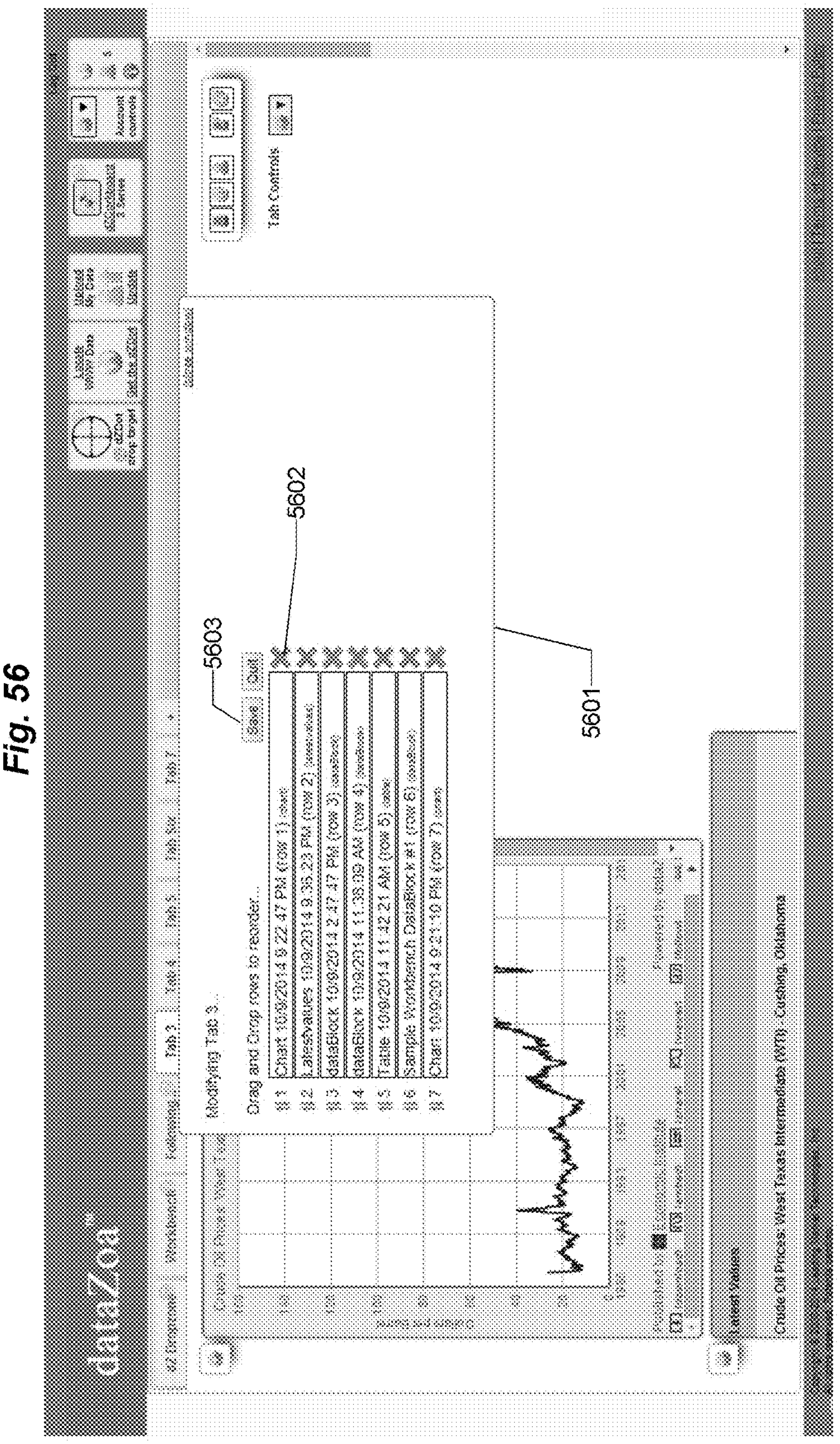
FIG. 56 is a representation of a display of the web page of FIG. 55, wherein the same tab is active as in FIG. 55 and wherein there has been graphically selected the "Edit this tab" entry in the tab-level controls menu to invoke the reordering control, by which the user can drag and drop the indicated displays to effectuate the user's desired ordering of these displays.

These controls are enumerated in order from the top of the Tab Controls menu to the Bottom:

1. Edit this tab . . . This control enables the user to rearrange the order of the displays shown in the tab via a panel which enables the user to drag and drop of the displays into any order the user chooses or to remove any particular display by using the X control. This tool is depicted in FIG. 56.
2. Rename this tab . . . This control enables the user to change the name of the DataZoa Tab.
3. Add displays to this tab . . . This control enables the user to call up a panel of all displays associated with the DataZoa Workbench view, from which the user may click on any Named Display in the panel to examine it visually, as well as clicking on a check-box adjacent to the display in order to add it to the current DataZoa Tab.
4. Sharing options for this tab . . . This control enables the user to impose the requirement that a password be entered by any sharing recipient of this DataZoa Tab prior to viewing it and also offers the user the ability to offer a password "hint" to the recipient. Additionally, this control enables the user to write a greeting message which will appear at the top of the DataZoa Tab upon display to the recipient.
5. Delete Tab . . . This control enables the user to delete the current DataZoa Tab from their account.
6. Make this a dZBoard as well as a tab. This control will place the current Tab as a dZBoard within the Workbench section of the user's DataZoa account.
7. Done. This control dismisses the drop-down menu.

FIG. 56 is a representation of a display of the web page of FIG. 55, wherein the same tab is active as in FIG. 55 and wherein there has been graphically selected the "Edit this tab . . . " entry in the tab-level controls menu to invoke the reordering control panel 5601, by which the user can drag and drop the indicated displays to effectuate the user's desired ordering of these displays. The nature of this control panel enables the user to drag and drop with their mouse-driven cursor any item in the list of dZEmbeddables in the tab into whatever ordinal position the user desires, or to eliminate any display from the tab by clicking upon the red X control 5602. Upon completion of the user's desired reordering the user clicks upon the "Save" button 5603 to save the new ordering of displays, which will then be displayed in the current tab in the user's indicated order.

Figure 57:
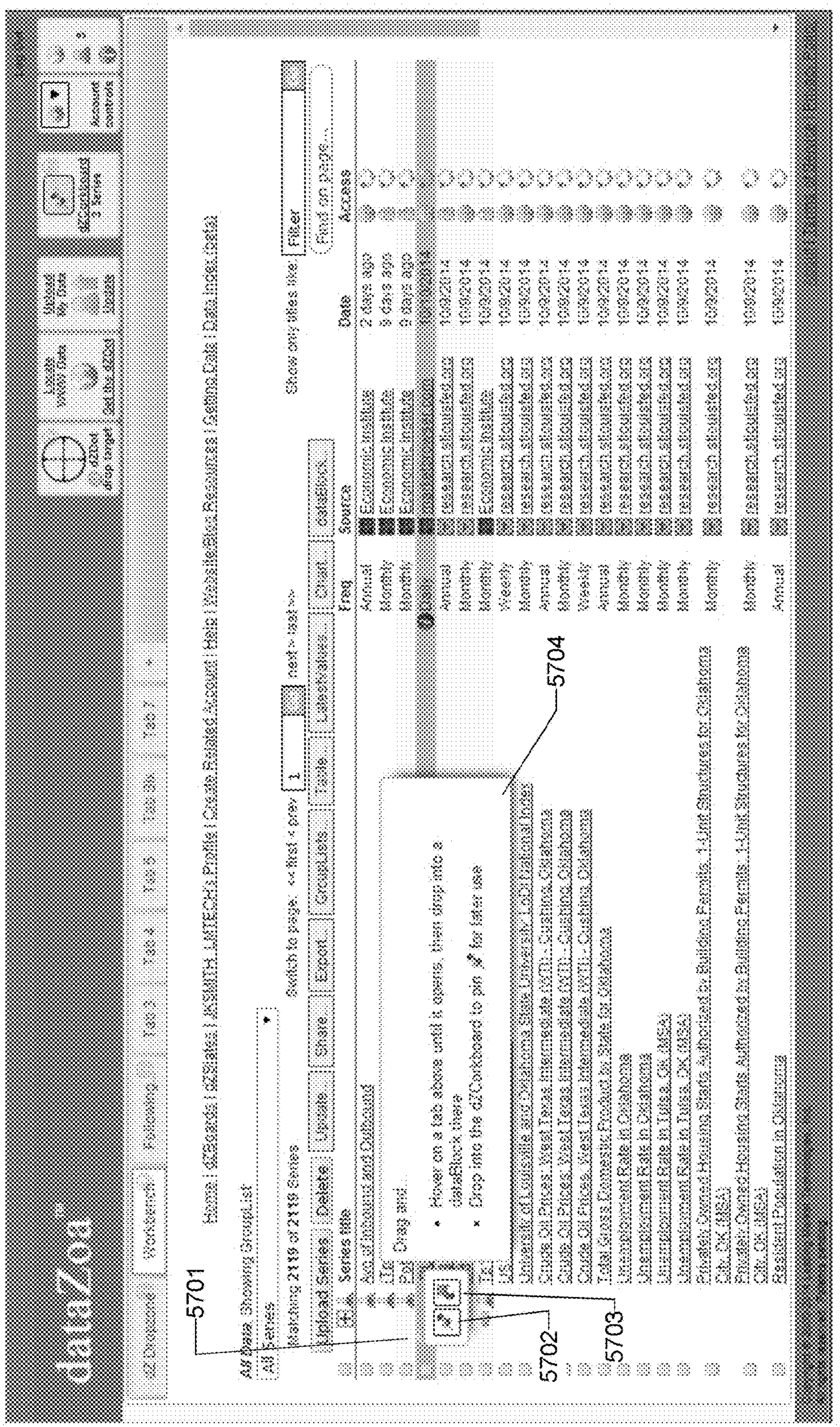
FIG. 57 is a representation of a display of a web page of a user's account, in accordance with an embodiment of the present invention, wherein the Workbench tab is active, and, by the user hovering his mouse over the area to the right of the check-box for a given series, a gear 5701 presents itself and offers two controls and an instructional window to guide the user in the use of these two controls, one for pinning that series to the dZ Corkboard 5702 which is selected merely by clicking on the Blue Pin control, and the other which is an upward pointing Blue Arrow 5703 which serves as a drag handle enabling the user to drag that series to any user-defined tab, and drop it into an existing display on that tab, such as a chart, a table, a latest values display or a dataBlock, with the result being that the series then appears in the chart, table, latest values display or dataBlock, noting that to appear in a dataBlock, Table or Latest Values display, it must be of the same frequency (daily, weekly, monthly, et al.) as the target display, whereas it may be dropped into a DataZoa line chart without any concerns as to its frequency.

FIG. 57 is a representation of a display of a web page of a user's account, in accordance with an embodiment of the present invention, wherein the Workbench tab is active, and, by the user hovering his mouse over the area to the right of the check-box for a given series, a gear 5701 presents itself and offers two controls and an instructional window 5704 to guide the user in the use of these two controls, one for pinning that series to the dZ Corkboard 5702 which is selected merely by clicking on the Blue Pin control, and the other which is an upward pointing Blue Arrow 5703 which serves as a drag handle enabling the user to drag that series to any user-defined tab, and drop it into an existing display on that tab, such as a chart, a table, a latest values display or a dataBlock, with the result being that the series then appears in the chart, table, latest values display or dataBlock, noting that to appear in a dataBlock, Table or Latest Values display, it must be of the same frequency (daily, weekly, monthly, et al.) as the target display, whereas it may be dropped into a DataZoa line chart without any concerns as to its frequency.

Figure 58:
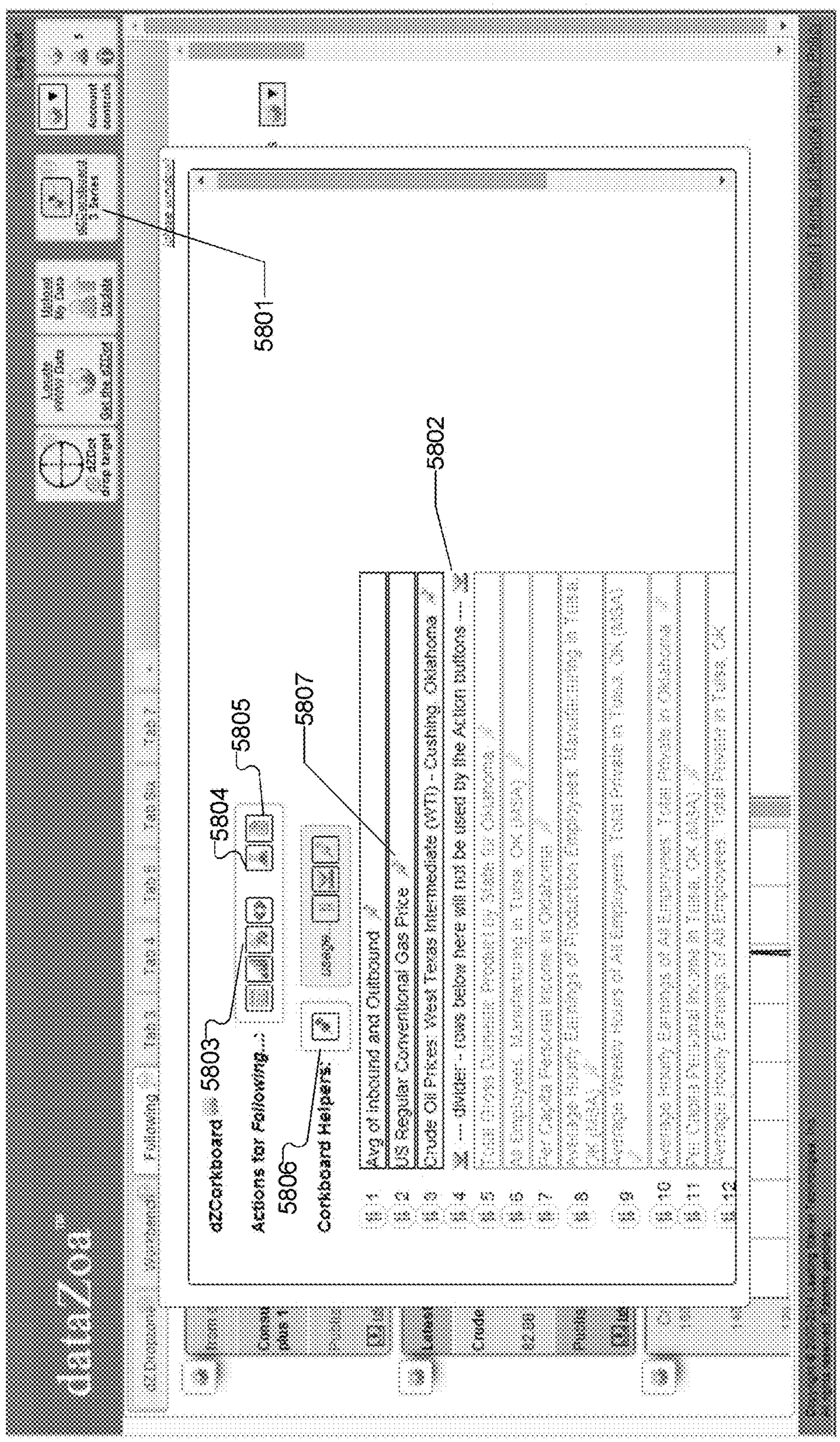
FIG. 58 is a representation of a display of a web page of a user's account, in accordance with an embodiment of the present invention, wherein the dZ Corkboard has been graphically invoked by selection of the Corkboard icon at the upper right band of icons on the web page, showing the Corkboard's movable divider which facilitates defining a collection of series located above the divider (including by dragging and dropping a series and ordering series above the divider or dragging the divider up and down), from which collection the user may create a DataZoa display (Chart, table, latest values display or dataBlock), render a calculation, make a DataZoa GroupList (a list of series saved under a name for future use); and in which are also displayed other controls to clear the Corkboard (red pin) or to unpin (yellow pin) individual series from the dZ Corkboard.

FIG. 58 is a representation of a display of a web page of a user's account, in accordance with an embodiment of the present invention, wherein the dZ Corkboard has been graphically invoked by selection of the Corkboard icon 5801 at the upper right band of icons on the web page, showing the Corkboard's movable divider 5802 which facilitates defining a collection of series located above the divider (including by dragging and dropping a series and ordering series above the divider or dragging the divider up and down), from which collection the user may create a DataZoa display 5803 (Chart, table, latest values display or dataBlock), render a calculation 5804, make a DataZoa GroupList 5805 (a list of series saved under a name for future use); and in which are also displayed other controls to clear the Corkboard (red pin) 5806 or to unpin (yellow pin) 5807 individual series from the dZ Corkboard. Series may be sent to the dZ Corkboard from the dZ Dropzone, the Workbench, the Following tab, or any display in a user-defined tab. The dZ Corkboard provides the user with a flexible means of gathering a working collection of series above the divider, which can be reordered via drag-and-drop operations just like in FIG. 56. The user's chosen and ordered collection above the up/down movable divider is acted upon by the the action buttons for creating a table, chart, latest values display, dataBlock, formula or GroupList.

Figure 59:
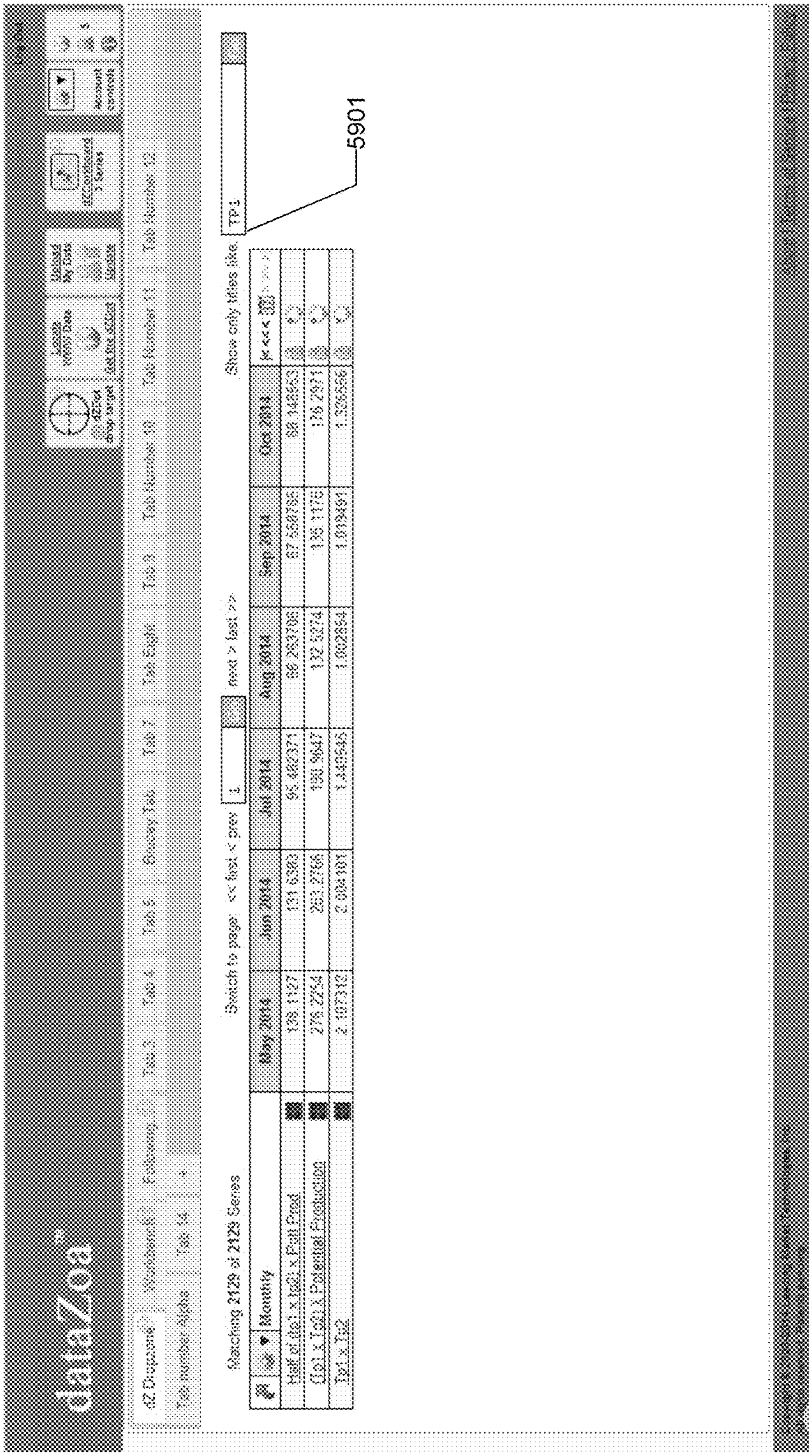
FIG. 59 is a representation of a display of a web page of a user's account, in accordance with an embodiment of the present invention, wherein the Workbench tab is active (with a similar functionality when the Dropzone tab is active), showing use of filtering of the displayed series on the basis of the series names including text matching the text entered in the box entitled: "Show only titles like:"

FIG. 59 is a representation of a display of a web page of a user's account, in accordance with an embodiment of the present invention, wherein the Workbench tab is active (with a similar functionality when the Dropzone tab is active), showing use of filtering of the displayed series on the basis of the series names including text matching the text entered in the box entitled: "Show only titles like:" 5901. This tool helps users who have large numbers of series in their account to locate specific series based on elements of the series title.

Figure 60:
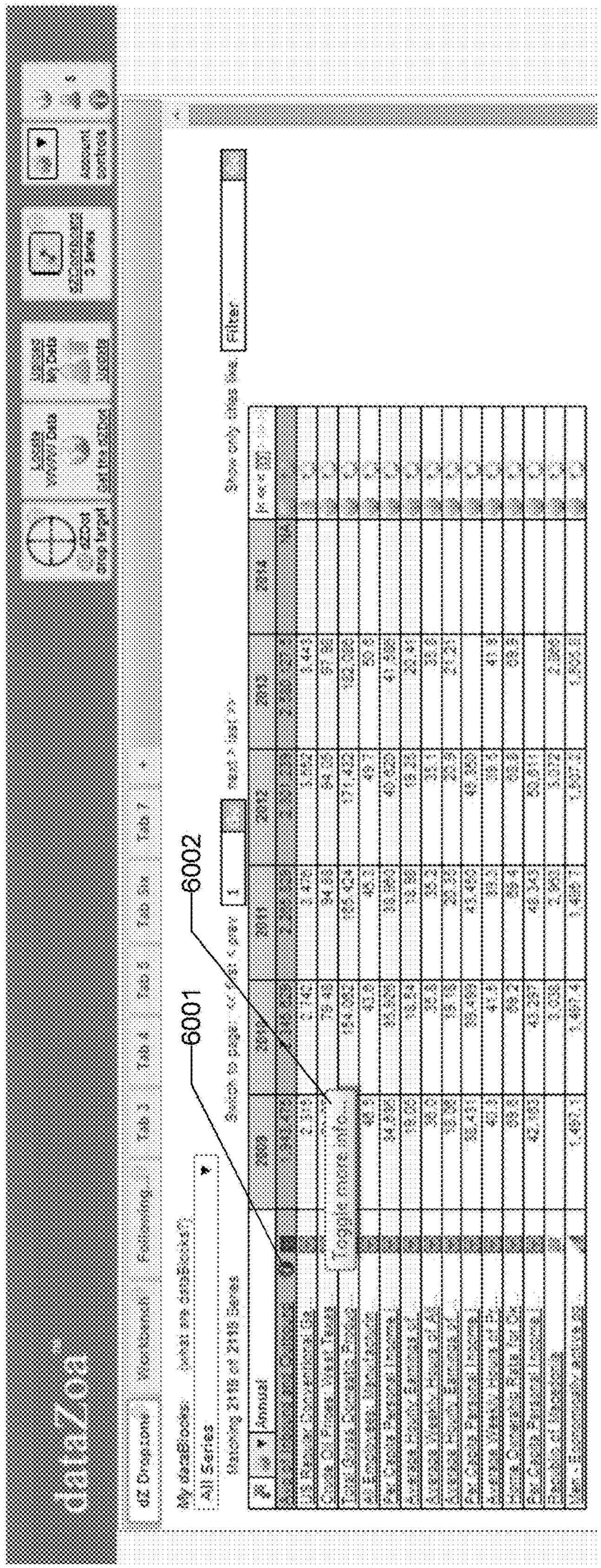
FIG. 60 is a representation of a display of a web page reflecting the blue Info Icon referenced in FIG. 52 which can be invoked for any series displayed in the dZ Dropzone or the Workbench.

FIG. 60 is a representation of a display of a web page of a user's account, in accordance with an embodiment of the present invention, wherein the dZ Dropzone tab is active (with a similar functionality when the Workbench tab is active) reflecting the appearance of the blue Info Icon 6001 referenced in FIG. 52 which appears upon the user hovering their mouse over any series title and which can be invoked by clicking upon the blue Info Icon with the user's mouse. Upon hovering the user's mouse over the blue info icon an explanatory panel appears telling the user to "Toggle more info . . . " 6002.

Figure 61:
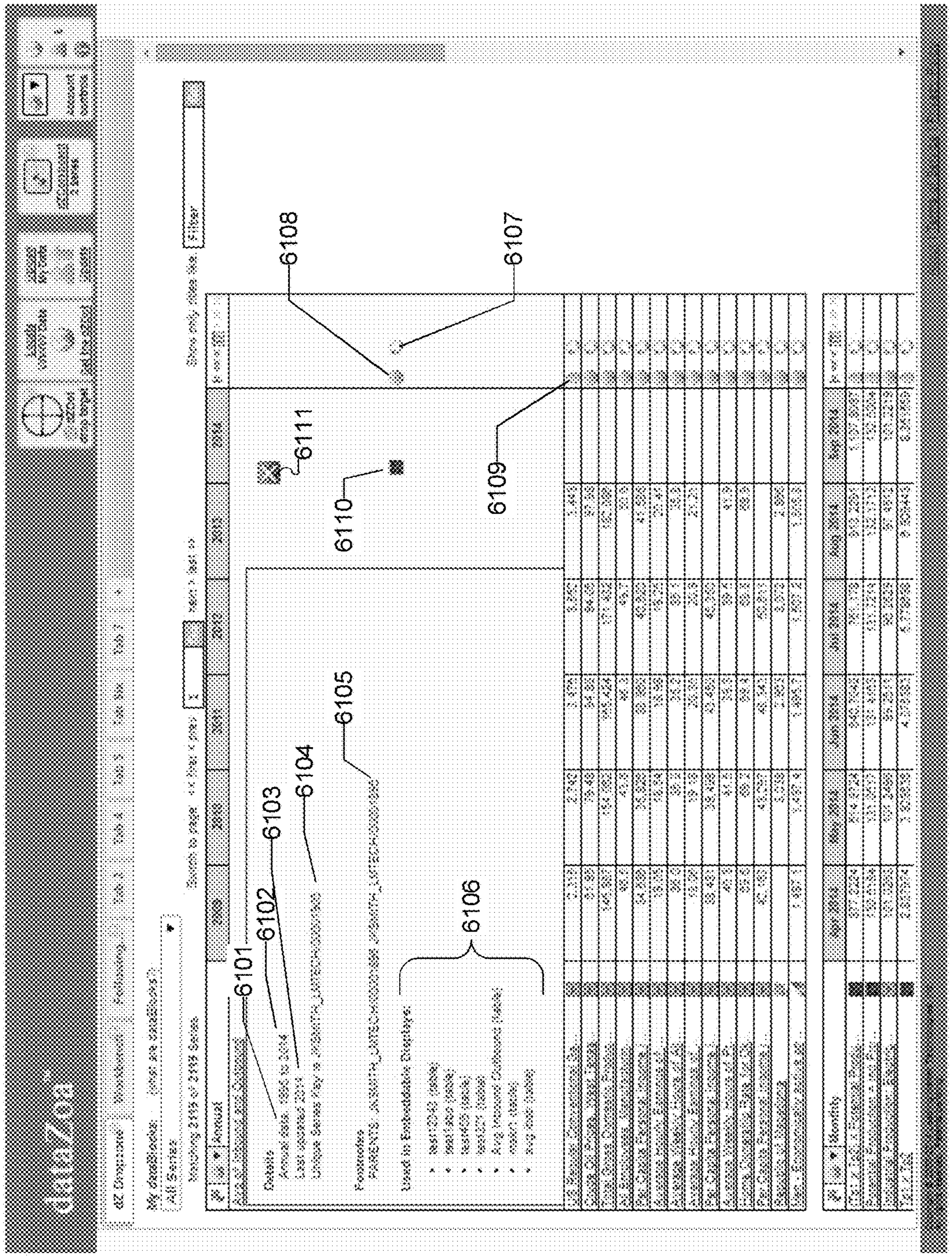
FIG. 61 is a representation of a display of a web page of a user's account, in accordance with an embodiment of the present invention, the user has clicked upon the blue info icon (shown in FIG. 60) which action exposes a panel containing a full range of information about that data series, including its frequency, time span, date of latest update, unique series key in DataZoa, footnotes associated with the series, which for data from DZ Dot supported sources will include descriptive metadata coming from the supported source and a URL from the web page where the data was procured by the DZ Dot, and for calculated series, the footnotes include identification of other series used in the calculation of the subject series (called "parents" or "ancestors"), and identification of web-embeddable displays which use this series, as well as the sharing status of the series (human silhouettes icon if shared which silhouette icon may be clicked upon to change sharing, or a circular sharing icon if not shared, which circular sharing icon may be clicked upon to share the series), whether the series is public (globe icon) or private (lock icon), and the favicon with an active link to the web site of the publisher of the data, which may for a DZ Dot supported site give the actual URL where the data is located. The panel includes a red square button to dismiss the panel and revert back to the single-line display of the series title.

FIG. 61 is a representation of a display of a web page of a user's account, in accordance with an embodiment of the present invention, the user has clicked upon the blue info icon (shown in FIG. 60) which action exposes a panel containing a full range of information about that data series, including its frequency 6101, time span 6102, date of latest update 6103, unique series key 6104 in DataZoa, footnotes associated with the series, which for data from DZ Dot supported sources will include descriptive metadata coming from the supported source and a URL from the web page where the data was procured by the DZ Dot, and for calculated series, the footnotes include identification of other series used in the calculation of the subject series (called "parents" or "ancestors") 6105, and identification of web-embeddable displays 6106 which use this series, as well as the sharing status of the series 6107 (human silhouettes icon if shared which silhouette icon may be clicked upon to change sharing, or a circular sharing icon if not shared, which circular sharing icon may be clicked upon to share the series), whether the series is public (globe icon 6108) or private (lock icon 6109), and the favicon 6110 with an active link to the web site of the publisher of the data, which may for a DZ Dot supported site give the actual URL where the data is located. The panel includes a red square button 6111 to dismiss the panel and revert back to the single-line display of the series title.

Figure 62:
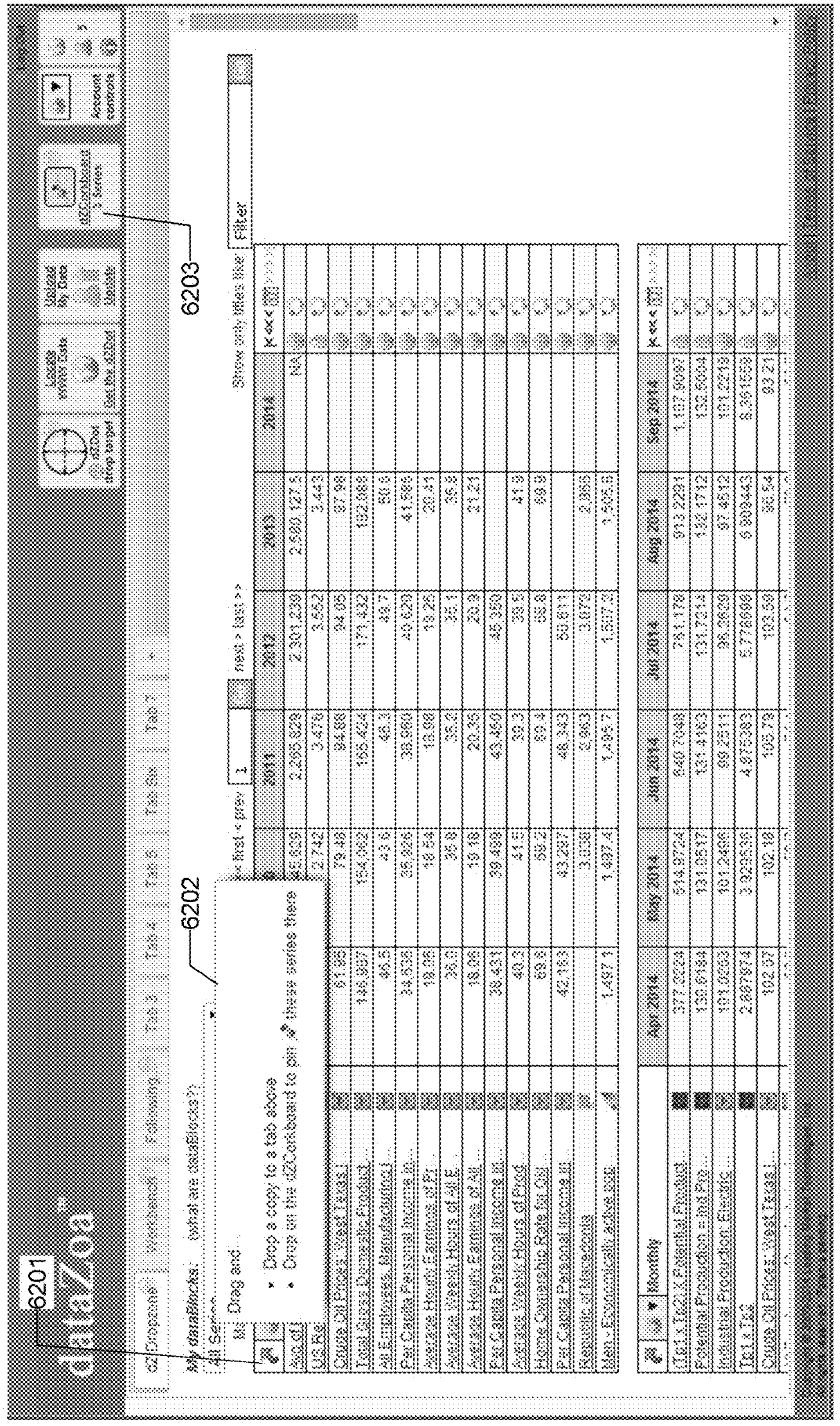
FIG. 62 is a representation of a display of a web page showing the dZ Dropzone blue arrow control with its associated help panel, which control enables the user to drag a full copy of the indicated data display to any user-defined tab or to the dZ Corkboard.

FIG. 62 is a representation of a display of a web page of a user's account, in accordance with an embodiment of the present invention, showing the dZ Dropzone upward pointing blue arrow control 6201 with its associated help panel 6202, which control enables the user to click on the blue arrow and drag a full copy of the indicated data display from the dZ Dropzone to any user-defined tab or to the dZ Corkboard 6203. When the user drops the blue arrow control onto a user-defined tab the dataBlock the user has dragged from the dZ Dropzone will appear in that tab. If the user elects to drag the blue arrow control and drop it on the dZ Corkboard, then the series within the dataBlock will be added to those series listed in the dZ Corkboard.

Figure 63:
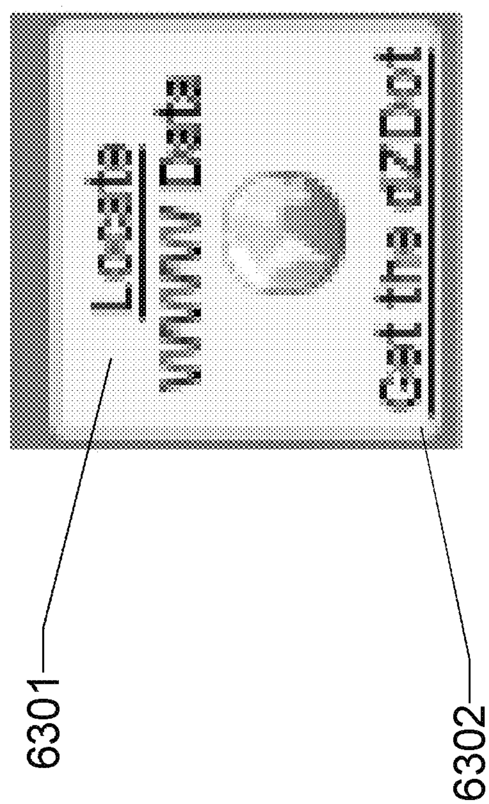
FIG. 63 is a representation of a display of a the DataZoa control for finding data via the DataZoa index ("Locate WWW Data") and for installing the DZ Dot browser add-on into the user's browser ("Get the DZ Dot")

FIG. 63 is a representation of a display of a control from the upper right region of a web page of a user's account, in accordance with an embodiment of the present invention, which control has two parts: (i) a control for finding data via the DataZoa index (invoked by clicking on "Locate WWW Data" 6301) and (ii) a control for installing the DZ Dot browser add-on into the user's browser (invoked by clicking on "Get the DZ Dot" 6302). Upon the user clicking on "Locate WWW Data" the user is sent to the top-level index web page depicted in FIG. 64. Upon the user clicking on "Get the DZ Dot" the user is presented with the web page depicted in FIG. 67.

Figure 64:
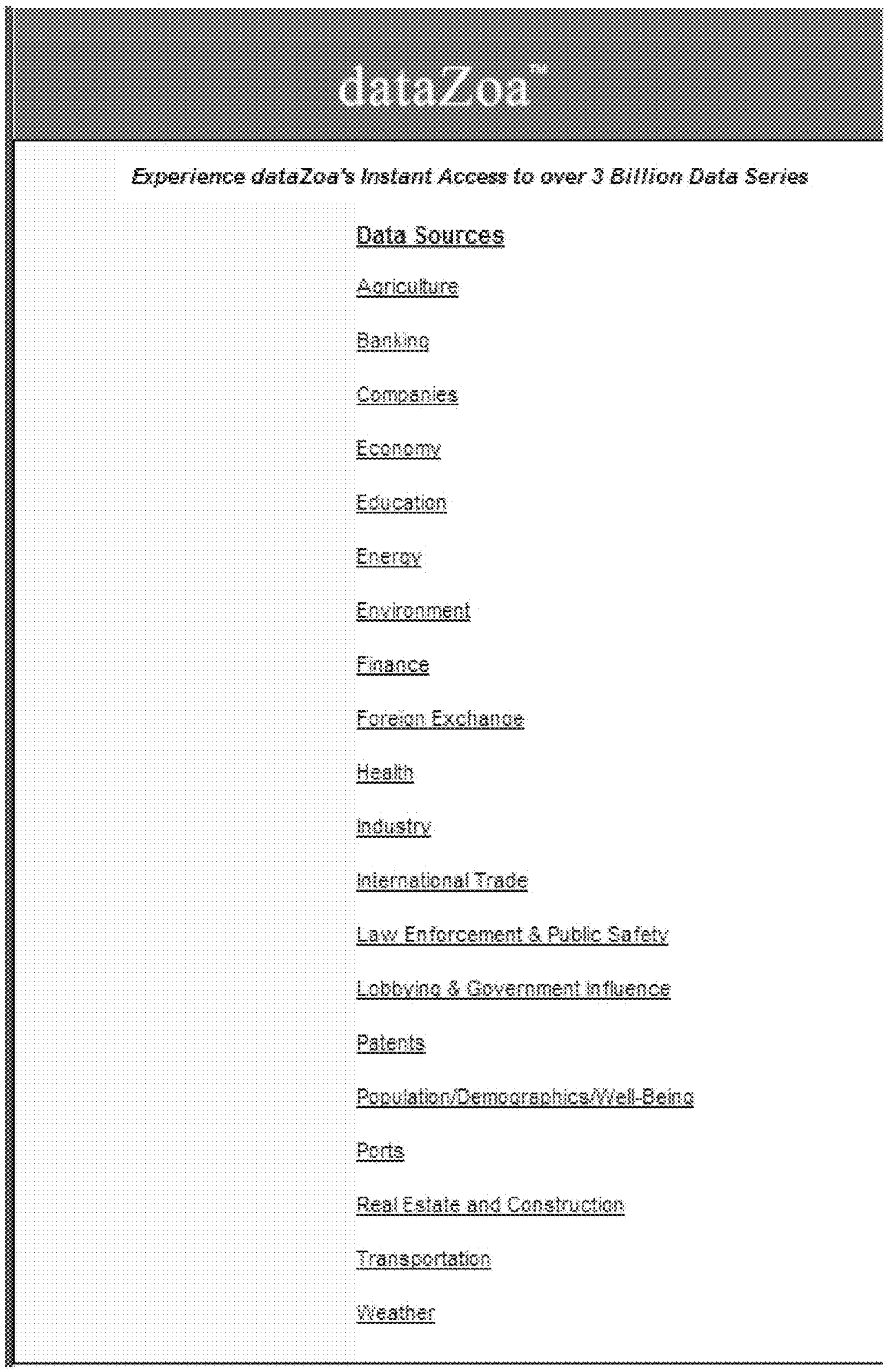
FIG. 64 is a representation of a display of a web page of a user's account, in accordance with an embodiment of the present invention, by which the user has invoked the "Locate WWW Data" control in FIG. 63, which results in the display of the top-level of the DataZoa index of sites supported by DataZoa for data access via the DZ Dot. The top level DataZoa index is topical in nature and by a user clicking upon any topical category the user will be presented with the next level of detail, which may be a further collection of sub-categories, such as is exemplified in FIG. 65, or it could be a listing of web sites supported by the DZ Dot as is exemplified in FIG. 66.

FIG. 64 is a representation of a display of a web page of a user's account, in accordance with an embodiment of the present invention, by which the user has invoked the "Locate WWW Data" control in FIG. 63, which results in the display of the top-level of the DataZoa index of sites supported by DataZoa for data access via the DZ Dot. The top level DataZoa index is topical in nature and by a user clicking upon any topical category the user will be presented with the next level of detail, which may be a further collection of sub-categories, such as is exemplified in FIG. 65, or it could be a listing of web sites supported by the DZ Dot as is exemplified in FIG. 66.

Figure 65:
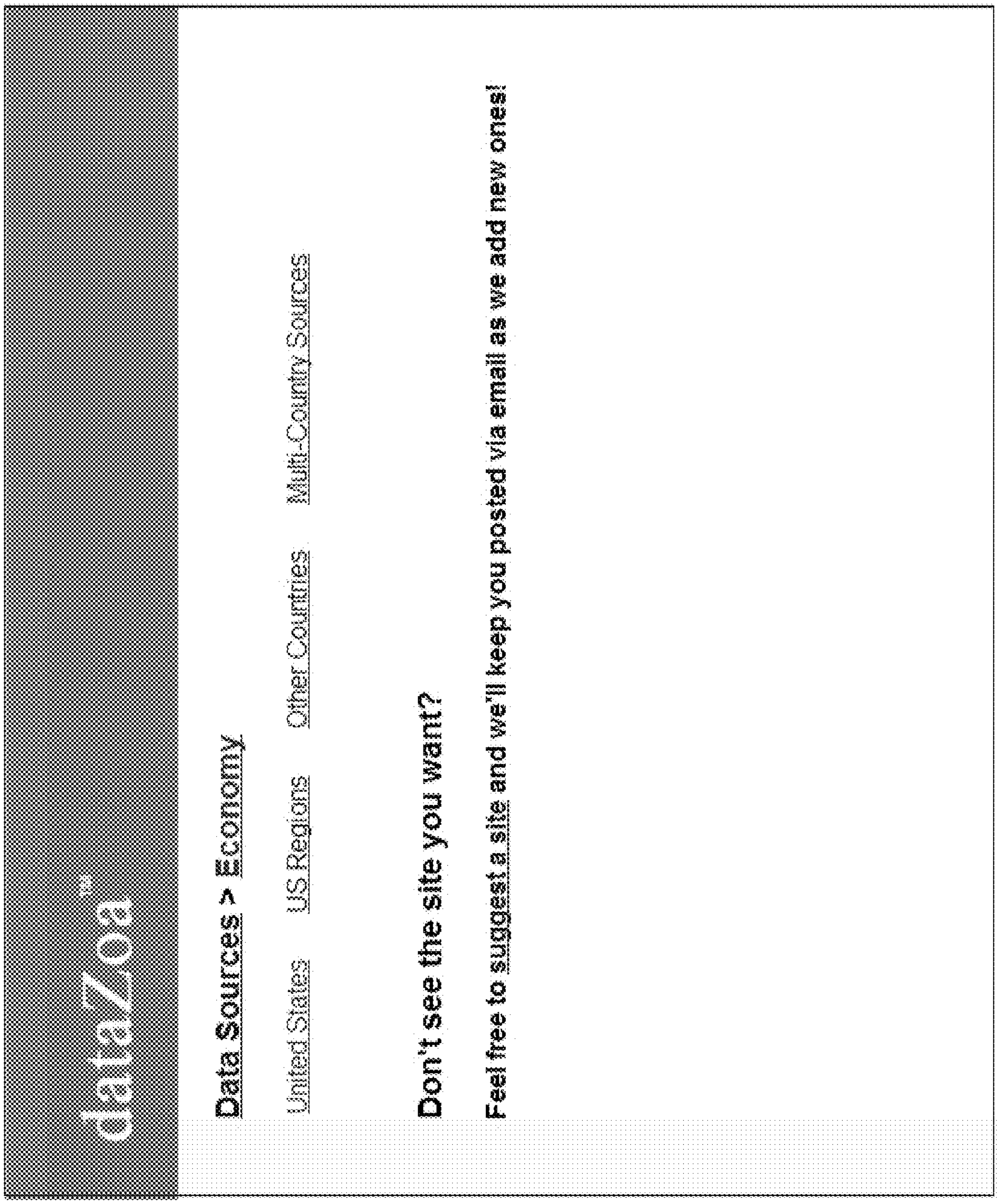
FIG. 65 is a representation of a display of a web page of a user's account, in accordance with an embodiment of the present invention, by which the user has clicked on the "Economy" choice in the top level data index presented in FIG. 64. In this instance the user is presented with sub-categories in the form of web links, which links may be clicked upon to see the next level of the index, with an example of such next-level result shown in FIG. 66.

FIG. 65 is a representation of a display of a web page of a user's account, in accordance with an embodiment of the present invention, by which the user has clicked on the "Economy" choice in the top level data index presented in FIG. 64. In this instance the user is presented with subcategories in the form of web links, which links may be clicked upon to see the next level of the index, with an example of such next-level result shown in FIG. 66.

Figure 66:
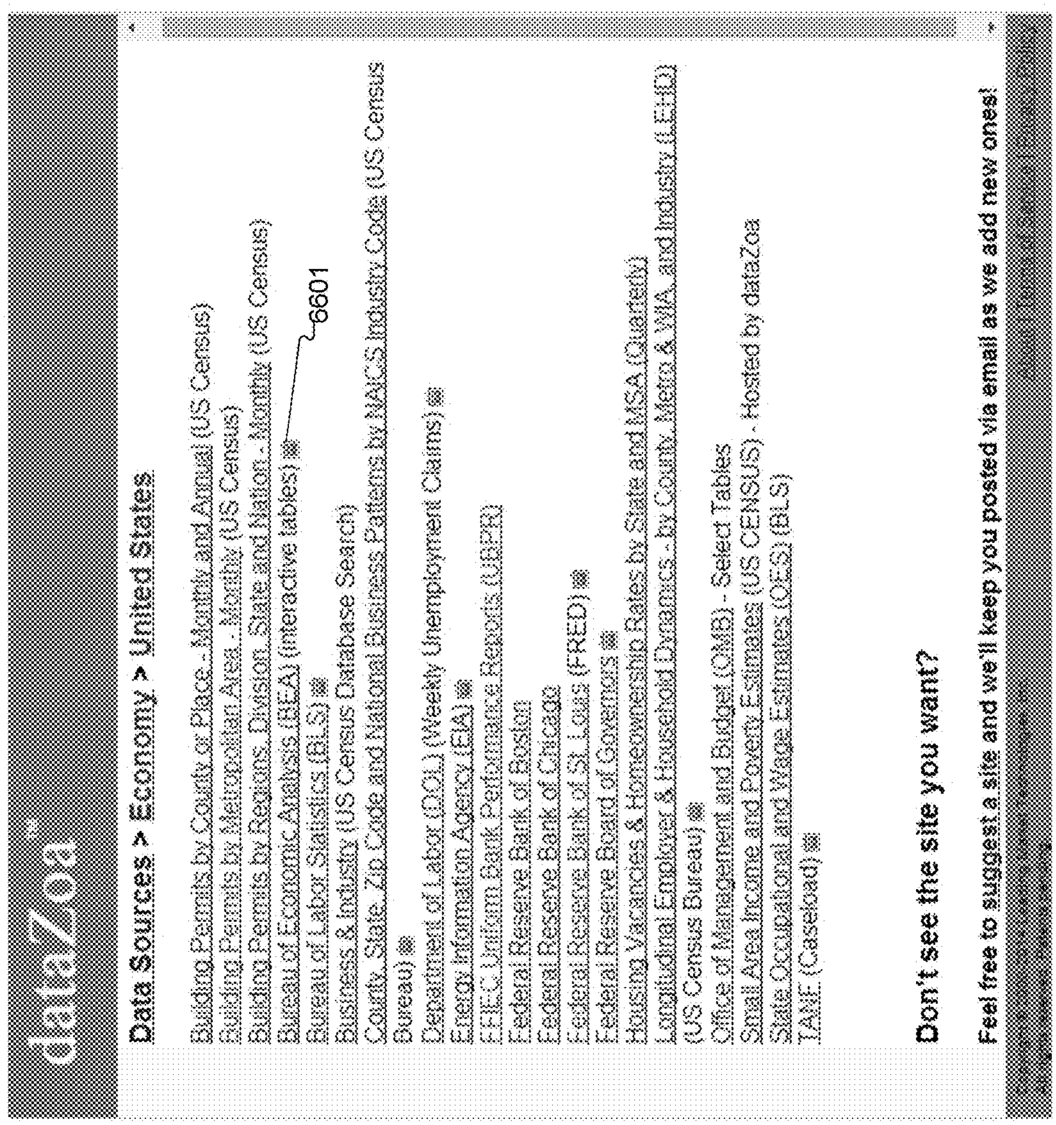
FIG. 66 is a representation of a display of a web page of a user's account, in accordance with an embodiment of the present invention, by which the user has clicked on the "United States" choice in FIG. 65. In this instance links to the actual web sites supported by the DZ Dot are presented and in some instances short video clips are presented as represented by a clickable blue television screen icon, which videos exist to help guide the user in accessing the data from the indicated site.

FIG. 66 is a representation of a display of a web page of a user's account, in accordance with an embodiment of the present invention, by which the user has clicked on the "United States" choice in FIG. 65. In this instance links to the actual web sites supported by the DZ Dot are presented and in some instances short video clips are presented as represented by a clickable blue television screen icon 6601, which videos exist to help guide the user in accessing the data from the indicated site.

Figure 67:
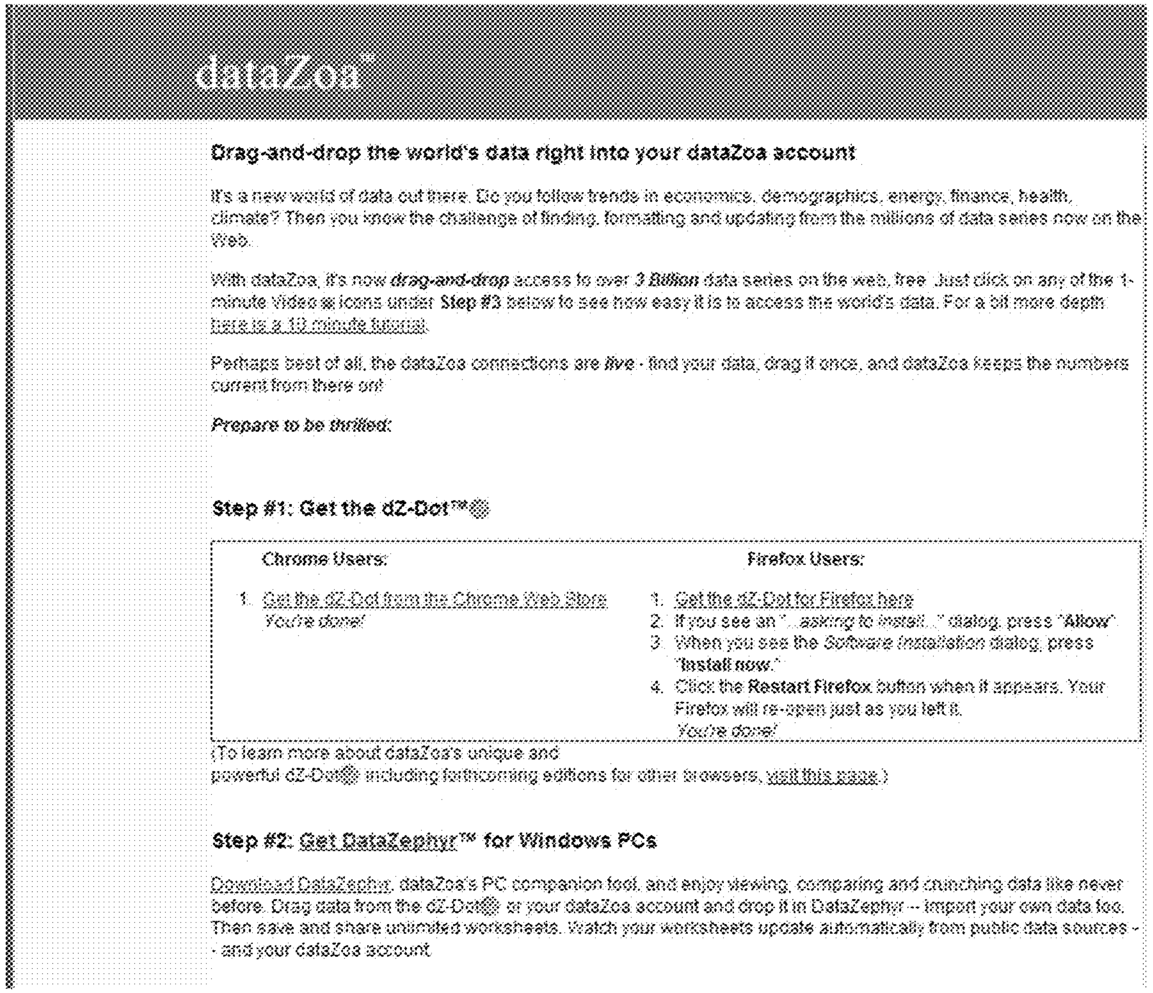
FIG. 67 is a representation of a display of a web page of a user's account, in accordance with an embodiment of the present invention, by which the user has clicked on the "Get the DZ Dot" choice in FIG. 63 and is presented with a web page with access to and guidance on installing the DZ Dot as well as downloading DataZephyr, DataZoa's desktop viewing and analysis tool.

FIG. 67 is a representation of a display of a web page of a user's account, in accordance with an embodiment of the present invention, by which the user has clicked on the "Get the DZ Dot" choice in FIG. 63 and is presented with a web page with access to and guidance on installing the DZ Dot as well as downloading DataZephyr, DataZoa's desktop viewing and analysis tool. In this page the DZ Dot is offered for both the Google Chrome browser and the Mozilla Firefox browser. DataZephyr is offered as a Microsoft Windows compatible software download.

Figure 68:
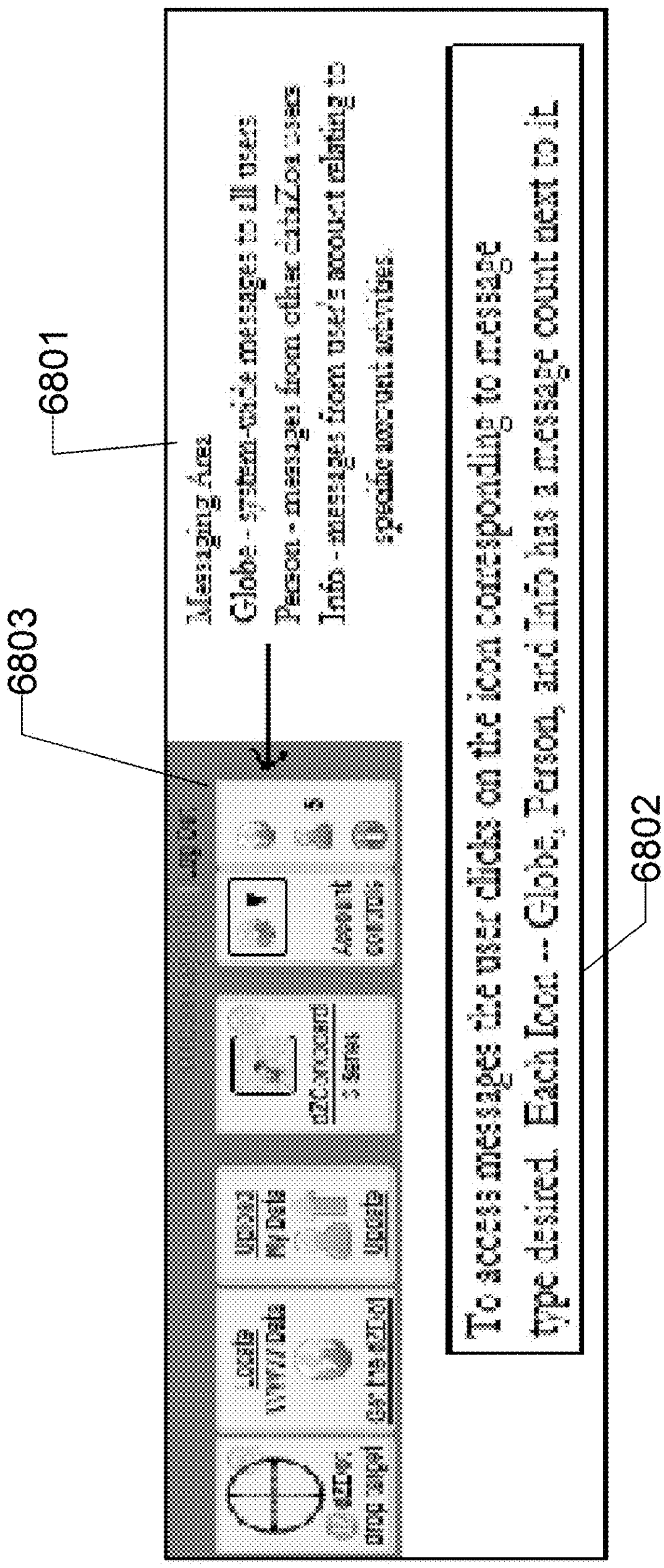
FIG. 68 is a representation of a display of part of a web page of a user's account, in accordance with an embodiment of the present invention, which includes detailed annotations to the right of and below the DataZoa messaging control area, which explain the DataZoa internal messaging system controls by which the user can display their messages by clicking on each of the three types of icons set forth below, noting that the icons are augmented by message counts placed adjacent to three types of icons representing different types of messages as follows: (i) a Globe Icon for system-wide messages to all users, (ii) a human silhouette icon for messages among DataZoa users showing a count of 5 messages, and (iii) an Info Icon (letter "I" within a round grey icon) which gives access to messages about the user's own activities in their account. By clicking on any of the three icons, the user is presented with a message panel as is exemplified in FIG. 69 for messages from other DataZoa users.

FIG. 68 is a representation of a display of part of a web page of a user's account, in accordance with an embodiment of the present invention, which includes detailed annotations 6801 to the right of and below 6802 the DataZoa messaging control area 6803, which explain the DataZoa internal messaging system controls by which the user can display their messages by clicking on each of the three types of icons set forth below, noting that the icons are augmented by message counts placed adjacent to three types of icons representing different types of messages as follows: (i) a Globe Icon for system-wide messages to all users, (ii) a human silhouette icon for messages among DataZoa users showing a count of 5 messages, and (iii) an Info Icon (letter "I" within a round grey icon) which gives access to messages about the user's own activities in their account. By clicking on any of the three icons, the user is presented with a message panel as is exemplified in FIG. 69 for messages from other DataZoa users.

Figure 69:
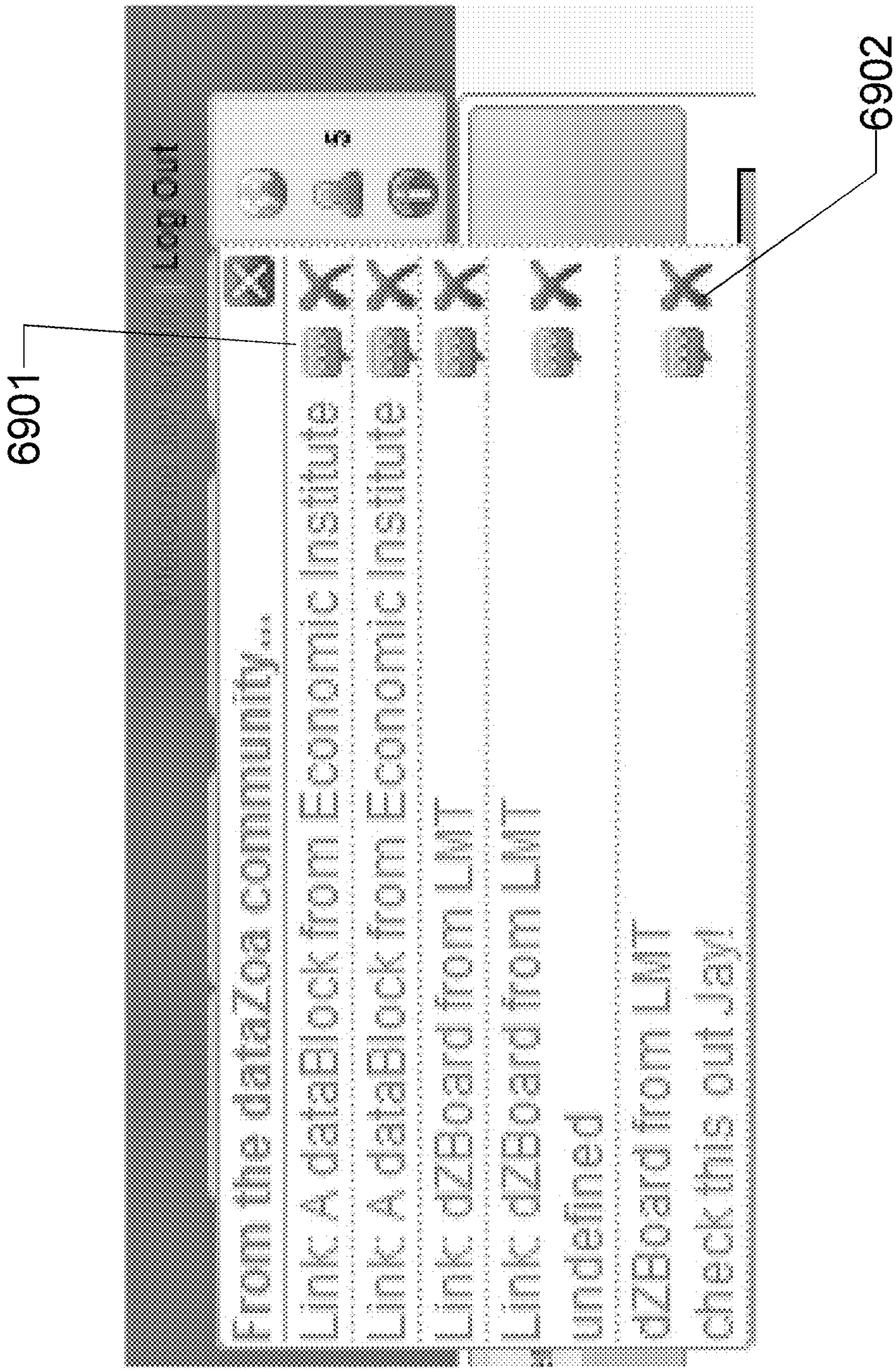
FIG. 69 is a representation of a display of part of a web page of a user's account, in accordance with an embodiment of the present invention, which includes five detailed messages from other DataZoa users which are displayed by clicking on the human silhouette icon in FIG. 68. Each individual message has two controls to the right of it as follows: (i) a blue panel containing the characters " . . . " which may be clicked upon for more information about the message, and (ii) a red X which may be clicked upon to erase that message.

FIG. 69 is a representation of a display of part of a web page of a user's account, in accordance with an embodiment of the present invention, which includes five detailed messages from other DataZoa users which are displayed by clicking on the human silhouette icon in FIG. 68. Each individual message has two controls to the right of it as follows: (i) a blue panel containing the characters " . . . " 6901 which may be clicked upon for more information about the message, and (ii) a red X 6902 which may be clicked upon to erase that message.

FIG. 70 is a representation of a display of part of a web page of a user's account, in accordance with an embodiment of the present invention, which includes the account controls menu which is presented to the user upon the user clicking on the gear icon 7001 above the control labeled "Account Controls". This figure also includes short explanations 7002 line-by-line of the function of each line item in the Account Controls menu. In more specific detail the choices offered by this menu are as follows: (i) "Profile/Preferences"—this enables the user to set a range of information the user and to select various preferences as set forth in FIG. 71, (ii) "Create Related Account"—this control enables a user to create an account which is of the same privilege level as the user's account, noting that at present, this feature is only available to accounts with the highest level of resource privilege available to a DataZoa account, (iii) "dZBoards"—this invokes the dZBoards page of DataZoa, as previously disclosed, (iv) "dZSlates"—this invokes the dZSlates page of DataZoa, as previously disclosed, (v) "Website/Blog Resources"—this invokes a page in DataZoa which offers copy and paste embeddable HTML code with corresponding images and explanations which enable the user to offer visitors to their web site or blog, controls to (a) get a free DataZoa account, (b) download DataZephyr, and (c) get the DZ Dot and install it in their browser, (vi) "Tutorial" directs the user to a page containing tutorial information on how to use DataZoa, (vii) "Logout" will log the user out of their DataZoa account, and (viii) "Done" dismisses the account controls menu.

FIG. 71 is a representation of a display of a web page of a user's account, in accordance with an embodiment of the present invention, which includes the profile/preferences page invokable by the user in FIG. 70 and sets forth the options selectable by the user in an explanatory panel 7101 on the right side of FIG. 71. The user information and preferences are changed by clicking on the Edit link found directly below the last preferences item in the list. The specific contents of the user information are set forth in items 1 through 9 at the right side of FIG. 71 and the Preference settings are set forth in items 10 though 12 to the right of FIG. 71. The control links at the bottom of the page are explained in items 13 though 20 at the right side of FIG. 71.

Figure 72:
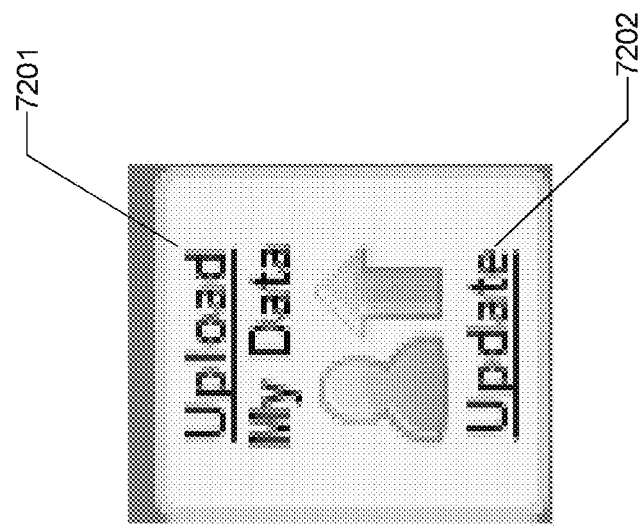
FIG. 72 is a representation of a display of part of a web page of a user's account, in accordance with an embodiment of the present invention, which includes two clickable controls, one for uploading the user's own data ("Upload my data") and the other for updating the user's own data ("Update"). When a user wishes to upload their own data they simply click on the "Upload my data" control and are presented with the data upload panel depicted in FIG. 73. When a user wishes to update data which has previously been uploaded, the user clicks upon the "Update" control and is presented with the panel in FIG. 76.

FIG. 72 is a representation of a display of part of a web page of a user's account, in accordance with an embodiment of the present invention, which includes two clickable controls, one for uploading the user's own data ("Upload my data" 7201) and the other for updating the user's own data ("Update" 7202). When a user wishes to upload their own data they simply click on the "Upload my data" control and are presented with the data upload panel depicted in FIG. 73. When a user wishes to update data which has previously been uploaded, the user clicks upon the "Update" control and is presented with the panel in FIG. 76.

Figure 73:
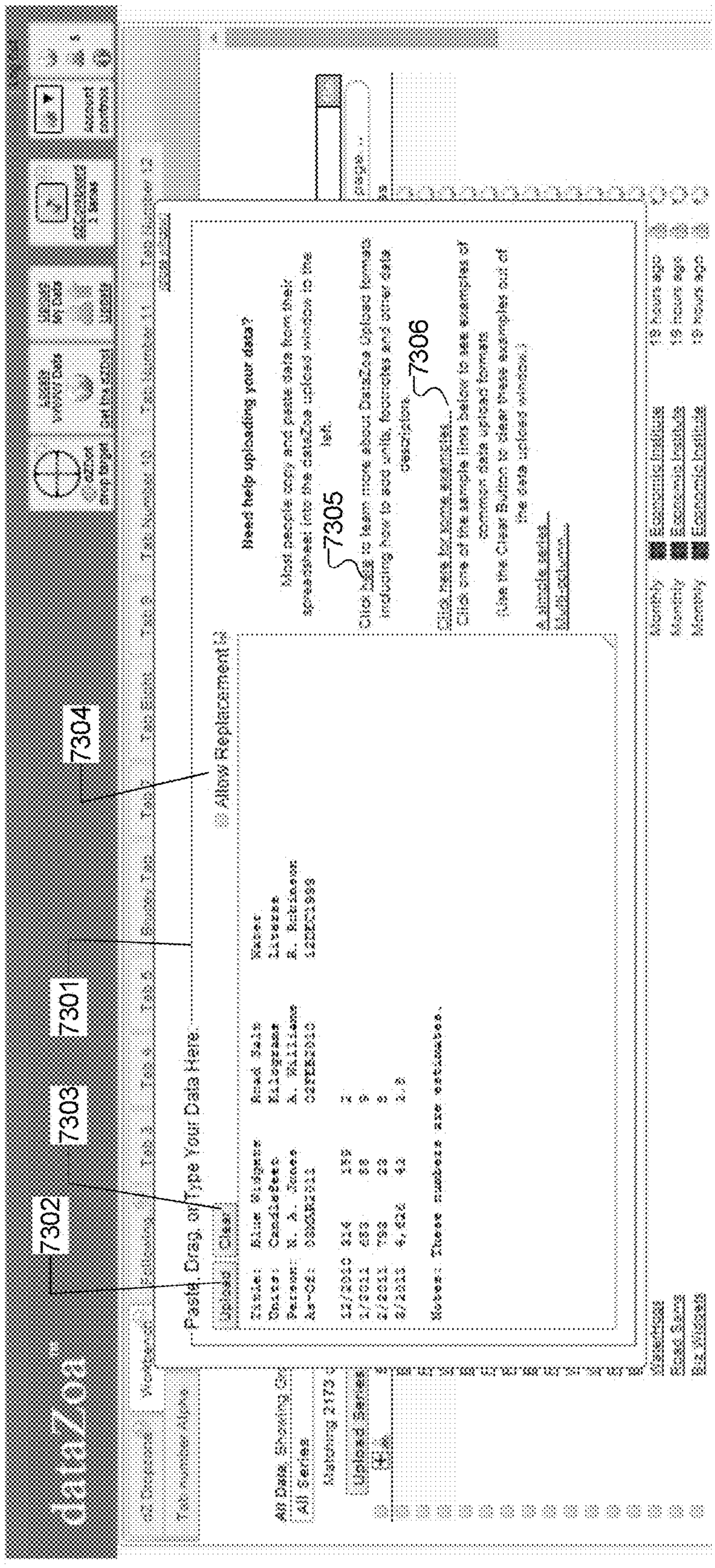
FIG. 73 is a representation of a display of a web page of a user's account, in accordance with an embodiment of the present invention, which includes the data upload panel presented as a result of the user clicking on the "Upload my data" control in FIG. 72. The data upload panel includes three controls: (i) "Upload" which uploads the user's data which has been copied or entered into the upload panel, (ii) "Clear" which clears any and all characters and data from the upload panel, and (iii) a checkbox to "Allow Replacement" which a user may check in order to have the uploaded data replace same-named data series in their account.

FIG. 73 is a representation of a display of a web page of a user's account, in accordance with an embodiment of the present invention, which includes the data upload panel 7301 presented as a result of the user clicking on the "Upload my data" control in FIG. 72. The data upload panel includes three controls: (i) "Upload" 7302 which uploads the user's data which has been copied or entered into the upload panel, (ii) "Clear" 7303 which clears any and all characters and data from the upload panel, and (iii) a checkbox to "Allow Replacement" 7304 which a user may check in order to have the uploaded data replace same-named data series in their account. Additionally, there is a link labeled "here" 7305 to take the user to a page which explains allowable DataZoa upload formats as well as a link which exposes some examples of uploadable data ("Click here for some examples . . . " 7306). These examples will appear automatically in the upload panel simply by clicking on the example links, in this case "A simple series . . . " and "Multi-column . . . " which gives the user the experience of being able to upload some sample data and examine it in their account. The user may have any tab active within their DataZoa account when uploading data, but will see the uploaded series names appear in the Workbench and dZ Dropzone tabs upon completion of the upload if either of these respective tabs is active at the time of the user's uploading of their own data.

Figure 74:
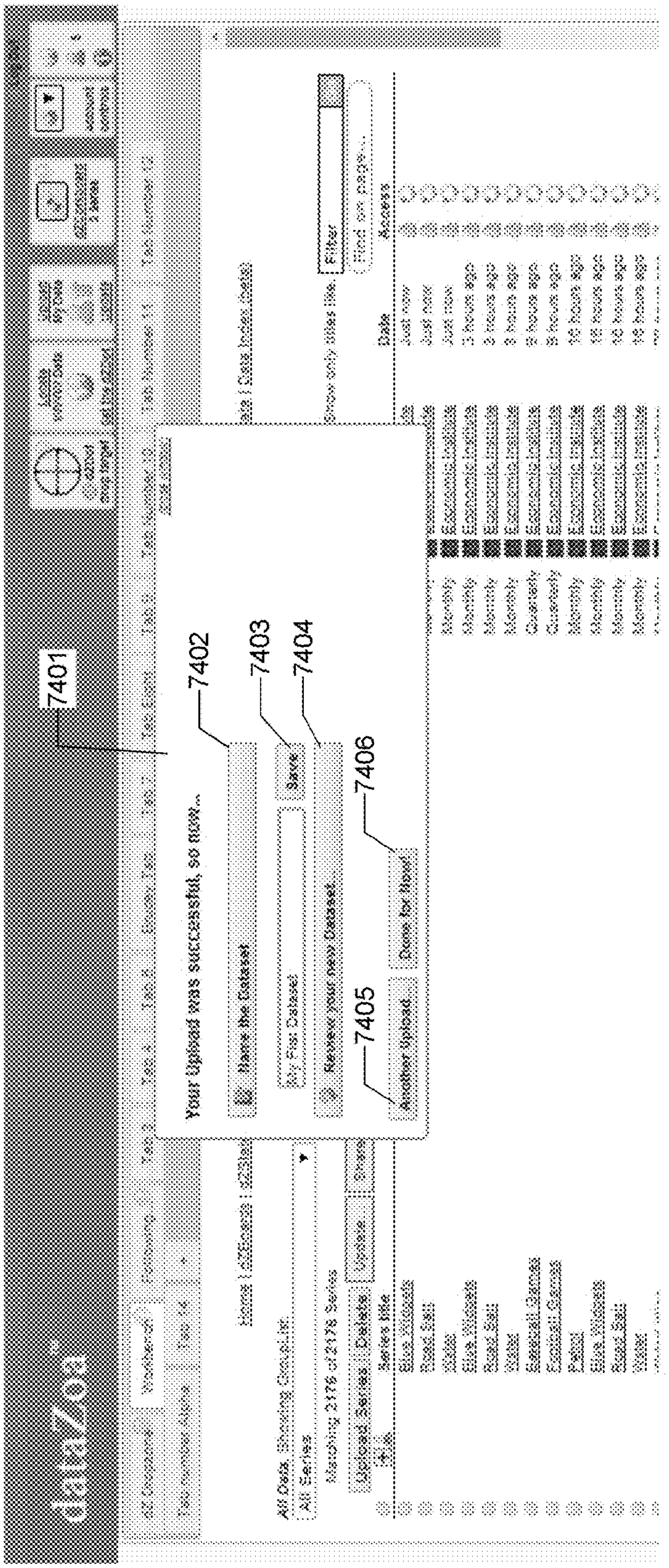
FIG. 74 is a representation of a display of a web page of a user's account, in accordance with an embodiment of the present invention, which includes a control panel presented to the user after the user uploads their own data via the panel in FIG. 73, with this control panel offering these controls: (i) "Name the Dataset" which enables the user to name their dataset with a user-specified name (noting that the dataset is automatically named by DataZoa by default using a name composed from the date and time of the user's upload with an example of such a name being as follows: DZDataset-2014_12_12_10_53_44 which utilizes the year, month, day, hour, minute and second of the upload), (ii) "Save" which saves the user's selected and entered name for the dataset, (iii)"Review your new dataset . . . ", which presents the panel shown in FIG. 75 enabling the user to edit values, add new time period values (before and after the data uploaded) and add additional named series to the dataset, (iv) "Another Upload" which enables the user to commence another upload via the panel presented in FIG. 73, and (v) "Done for Now!" which enables the user to exit the control panel.

FIG. 74 is a representation of a display of a web page of a user's account, in accordance with an embodiment of the present invention, which includes a control panel 7401 presented to the user after the user uploads their own data via the panel in FIG. 73, with this control panel offering these controls: (i) "Name the Dataset" 7402 which enables the user to name their dataset with a user-specified name (noting that the dataset is automatically named by DataZoa by default using a name composed from the date and time of the user's upload with an example of such a name being as follows: DZDataset-2014_12_12_10_53_44 which utilizes the year, month, day, hour, minute and second of the upload), (ii) "Save" 7403 which saves the user's selected and entered name for the dataset, (iii)"Review your new dataset . . . " 7404, which presents the panel shown in FIG. 75 enabling the user to edit values, add new time period values (before and after the data uploaded) and add additional named series to the dataset, (iv) "Another Upload" 7405 which enables the user to commence another upload via the panel presented in FIG. 73, and (v) "Done for Now!" 7406 which enables the user to exit the control panel.

Figure 75:
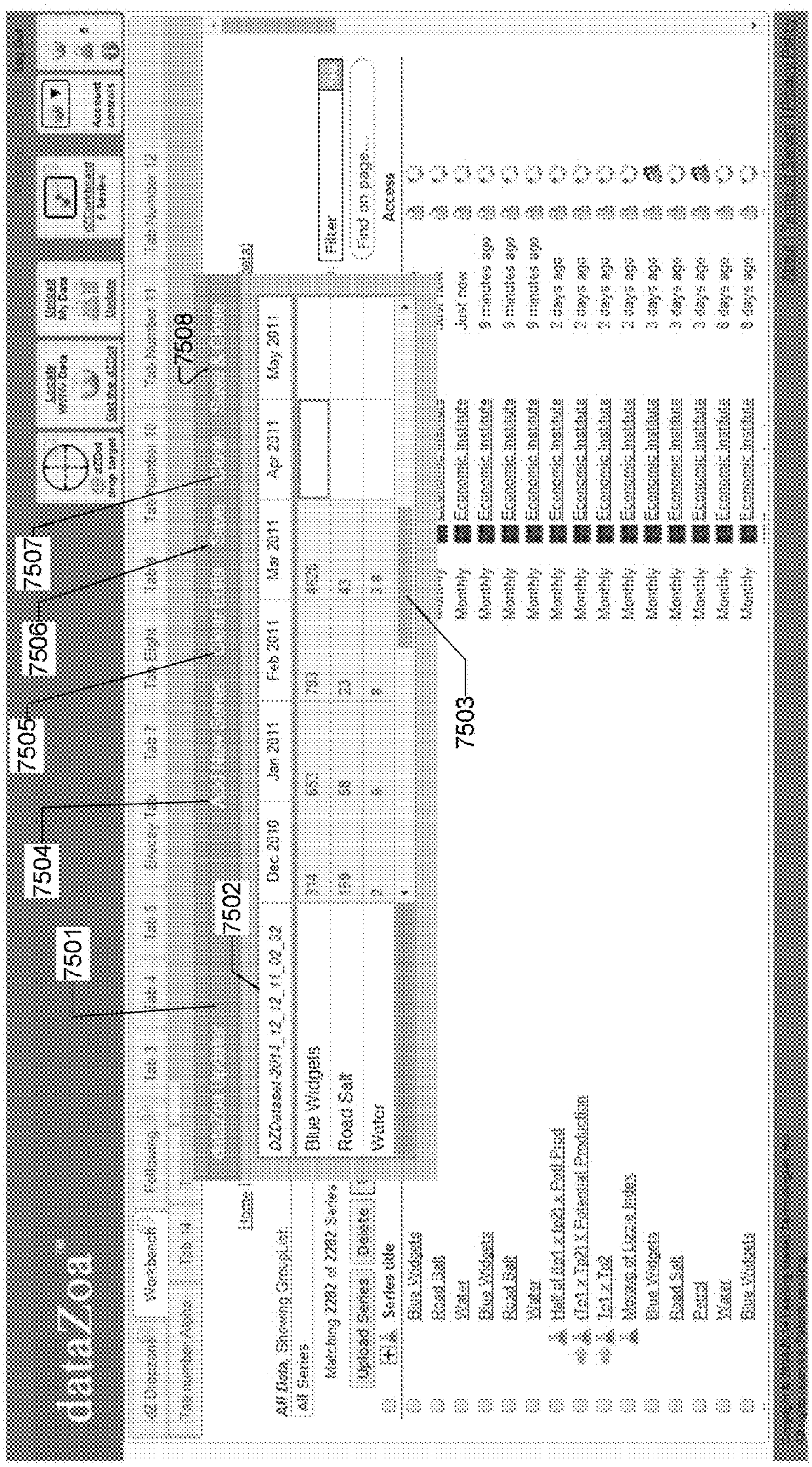
FIG. 75 is a representation of a display of a web page of a user's account, in accordance with an embodiment of the present invention, which includes the data review panel called the "DataZoa Updater" which is accessible via the "Review your new dataset . . . " control in FIG. 74, which data review panel shows the name of the user's dataset and enables the user to (i) edit values in the user's uploaded dataset by cursoring to occupied or empty cells and entering new values, (ii) add values for new and prior time periods, (iii) add new named series to the dataset and enter values for these new series, (iv) clear the edits made since the last saving operation on the dataset, (v) save the edits and additions of data and series to the dataset, (vi) close the panel, and (vii) save the dataset edits and close the panel in a single operation.

FIG. 75 is a representation of a display of a web page of a user's account, in accordance with an embodiment of the present invention, which includes the data review panel 7501 called the "DataZoa Updater" which is accessible via the "Review your new dataset . . . " control in FIG. 74, which data review panel shows the name 7502 of the user's dataset and enables the user to (i) edit values in the user's uploaded dataset by cursoring to occupied or empty cells and entering new values, (ii) add values for new and prior time periods by scrolling to future or past time periods using the lateral sliding tool 7503 to expose different time periods, (iii) add new named series 7504 to the dataset and enter values for these new series, (iv) clear the edits 7505 made since the last saving operation on the dataset, (v) save 7506 the edits and additions of data and series to the dataset, (vi) close the panel 7507, and (vii) save the dataset edits and close 7508 the panel in a single operation.

Figure 76:
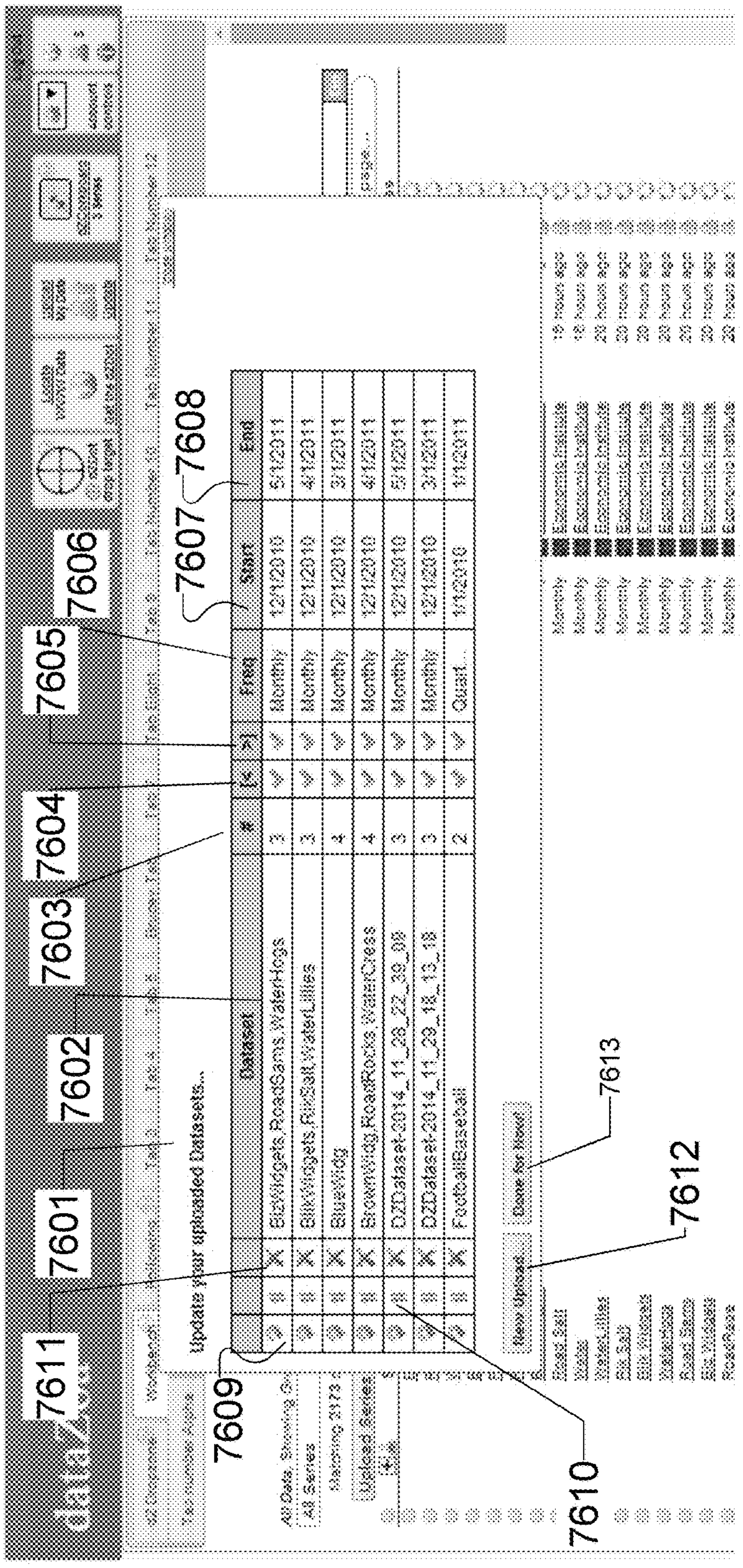
FIG. 76 is a representation of a display of a web page of a user's account, in accordance with an embodiment of the present invention, which includes the dataset selection panel which is presented to the user upon the user clicking upon the "Update" control in FIG. 72.

FIG. 76 is a representation of a display of a web page of a user's account, in accordance with an embodiment of the present invention, which includes the dataset selection panel 7601 which is presented to the user upon the user clicking upon the "Update" control in FIG. 72. This panel informs the user of various facts about the dataset including (i) the name 7602 of each dataset, (ii) the number of series 7603 in each of the user's uploaded datasets which appears under the # symbol, (iii) whether all series in the dataset have the same start date which is communicated via a checkmark under the column headed "[<" 7604, (iv) whether all series in the dataset have the same end date which is communicated via a checkmark under the column headed ">]" 7605, (v) the Frequency of the dataset 7606 (e.g., daily, weekly, monthly, annual, et al.), (vi) the start date 7607 of the dataset, and (vii) the end date 7608 of the dataset. Additionally this panel presents controls to the user, commencing in the first column there is a curved arrow 7609 which the user clicks upon to update their data, while the second column has a control consisting of an up arrow adjacent to a down arrow 7610 which enables the user to reorder the series in their dataset and the third control consists of a red X 7611 enabling the user to delete that dataset from their account. The bottom of the update panel offers a control to the user to commence a new upload ("New Upload" 7612) and a control to exit the panel ("Done for Now!" 7613).

Figure 77:
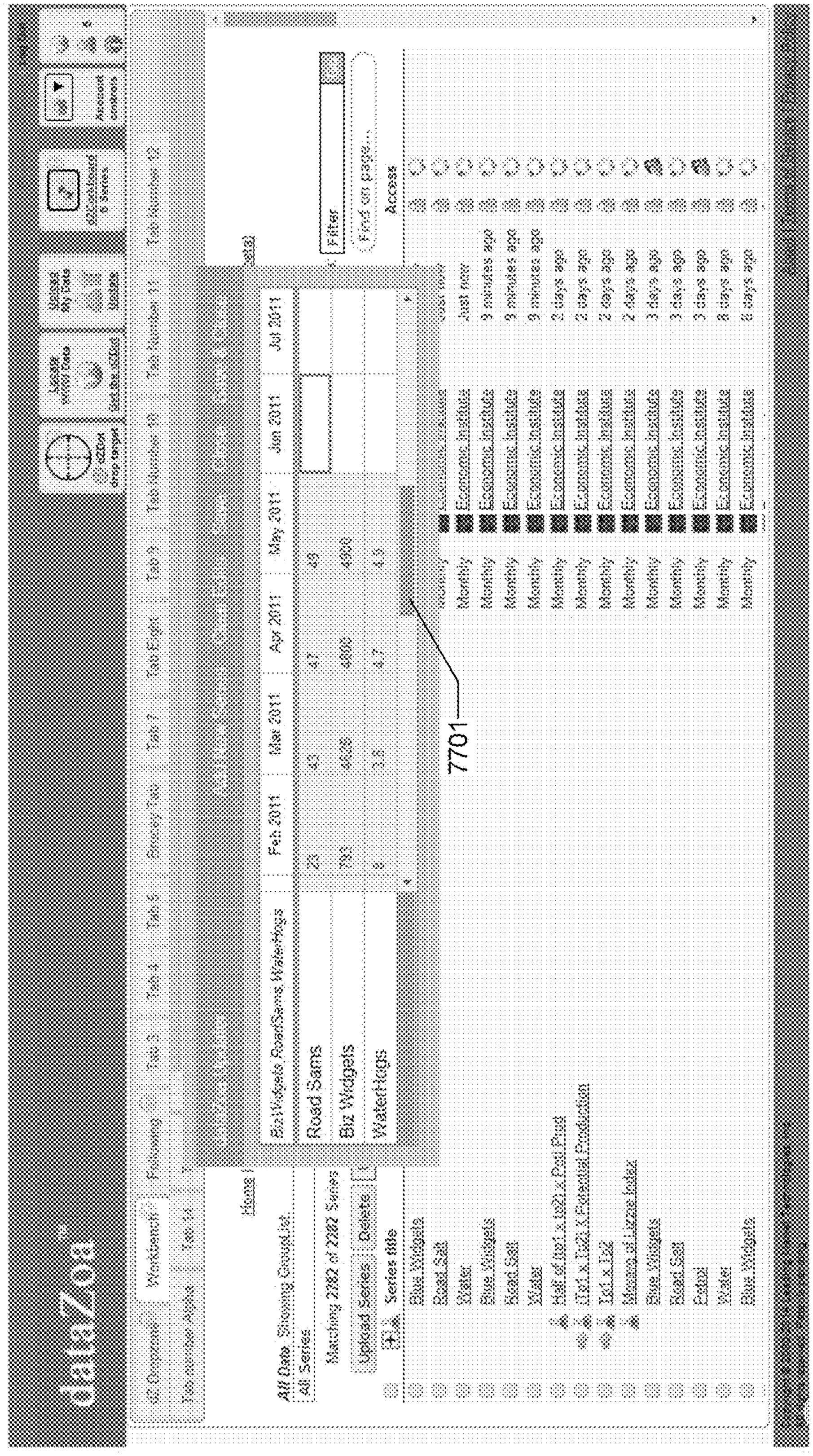
FIG. 77 is a representation of a display of a web page of a user's account, in accordance with an embodiment of the present invention, which shows the "DataZoa Updater" grid which is presented upon the user clicking on the curved blue arrow control in FIG. 76 for a specific dataset.

FIG. 77 is a representation of a display of a web page of a user's account, in accordance with an embodiment of the present invention, which shows the "DataZoa Updater" grid which is presented upon the user clicking on the curved blue arrow control in FIG. 76 for a specific dataset. This DataZoa Updater panel shows the name of the chosen dataset, and the values in that dataset, and offers the user same user controls and actions described in FIG. 75 (the post-data upload review panel), which options enable the user to add new data values before or after the data in the existing dataset, add new data series and save these edits as set forth in detail in the description of FIG. 75. The DataZoa Updater has a scolling control 7701 at the bottom to enable the user to scroll throughout the time period of the dataset as well as enabling the user to scroll to time periods prior to or after the data presented in the dataset.

Figure 78:
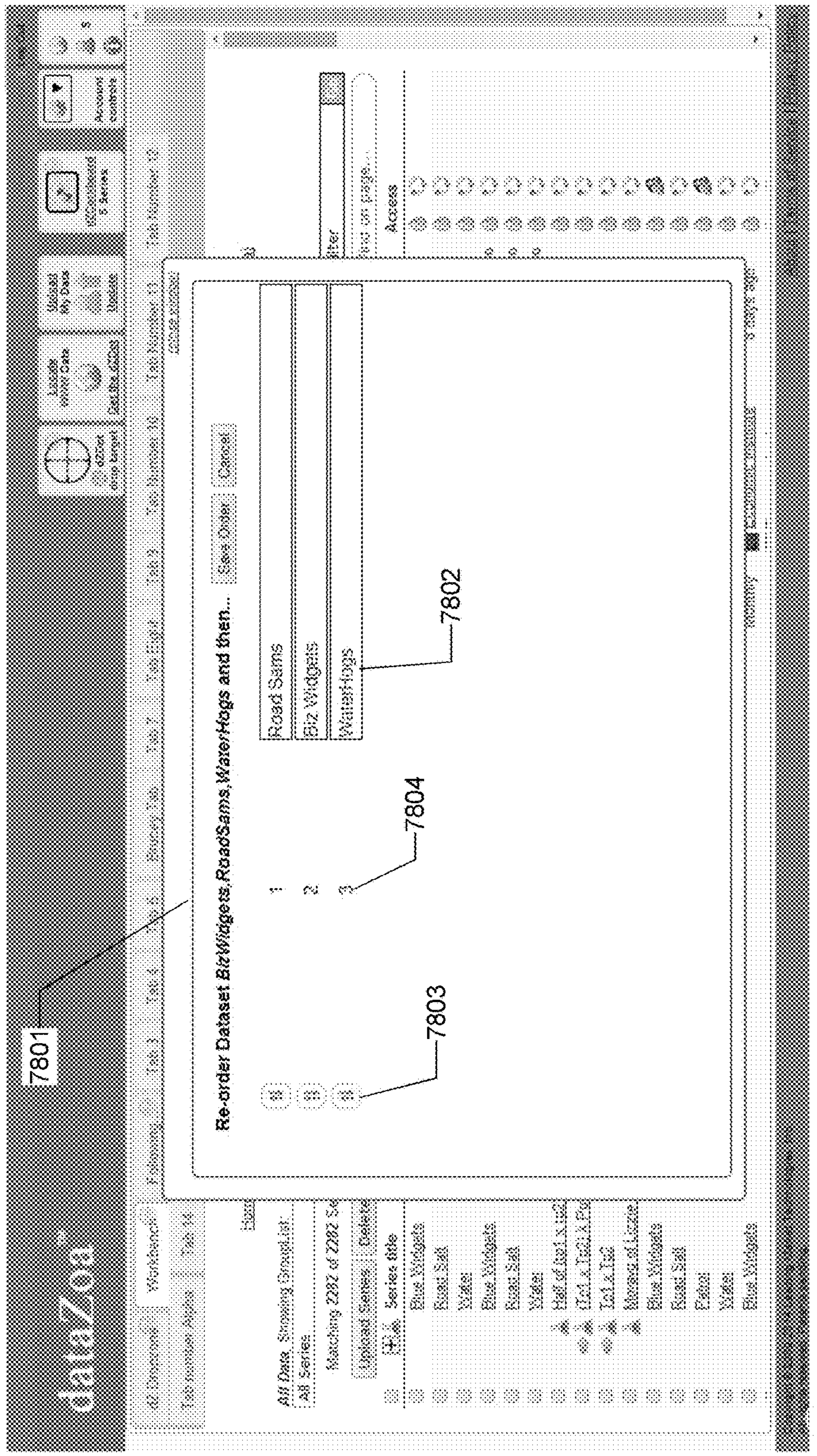
FIG. 78 is a representation of a display of a web page of a user's account, in accordance with an embodiment of the present invention, which shows the dataset reordering panel which is presented upon the user clicking on the blue up and down arrow control in FIG. 76 which results in the presentation of the panel in FIG. 78 which panel enables the user to click upon any series name and drag and drop that series into the user's desired order in the dataset.

FIG. 78 is a representation of a display of a web page of a user's account, in accordance with an embodiment of the present invention, which shows the dataset reordering panel 7801 which is presented upon the user clicking on the blue up and down arrow control in FIG. 76 which results in the presentation of the panel in FIG. 78 which panel enables the user to click upon any series name 7802 and drag and drop that series into the user's desired order in the dataset. This control enables the user to revise the order of the series in their dataset to any configuration the user wishes. In practice the user may click upon and drag any element (the up/down arrow 7803, the series number 7804 or the series name 7802) in the line representing that series and drag the series so as to place it in the user's desired order among the other series in the dataset.

Figure 79:
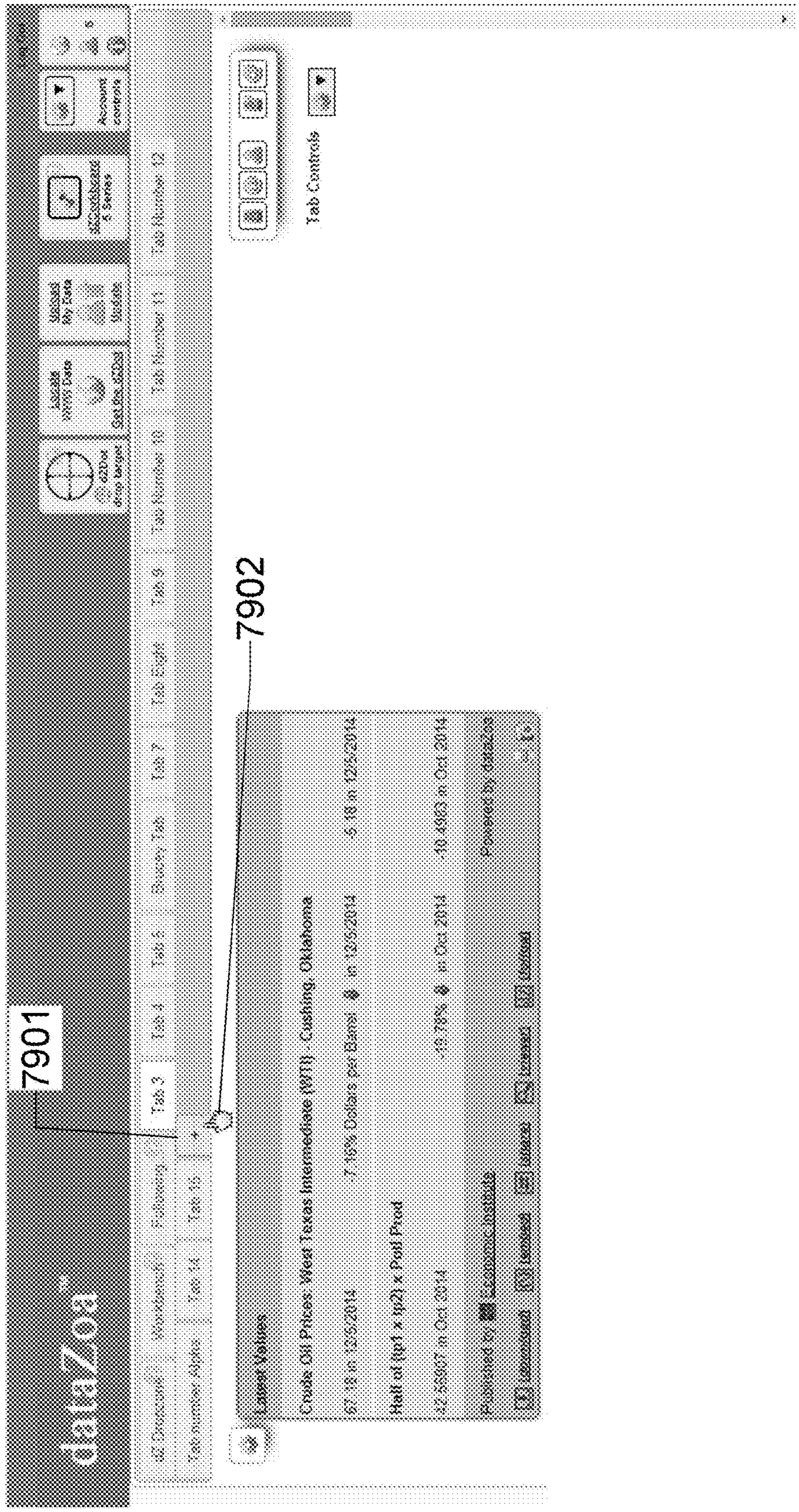
FIG. 79 is a representation of a display of a web page of a user's account, in accordance with an embodiment of the present invention, which shows the creation of a new tab by the user clicking the user's mouse-driven cursor upon the next unnamed tab which bears the + sign which results in a tab being created with the next successive number, in this case "Tab 16", which the user can then rename using the Tab Controls pull-down menu depicted in FIG. 55. As the user creates and names more tabs in their account the tabs appear in their creation sequence in successive rows in the user's account.

FIG. 79 is a representation of a display of a web page of a user's account, in accordance with an embodiment of the present invention, which shows the creation of a new tab by the user clicking the user's mouse-driven cursor 7902 upon the next unnamed tab which bears the + sign 7901 which results in a tab being created with the next successive number, in this case "Tab 16", which the user can then rename using the Tab Controls pull-down menu depicted in FIG. 55. As the user creates and names more tabs in their account the tabs appear in their creation sequence in successive rows in the user's account.

Figure 80:
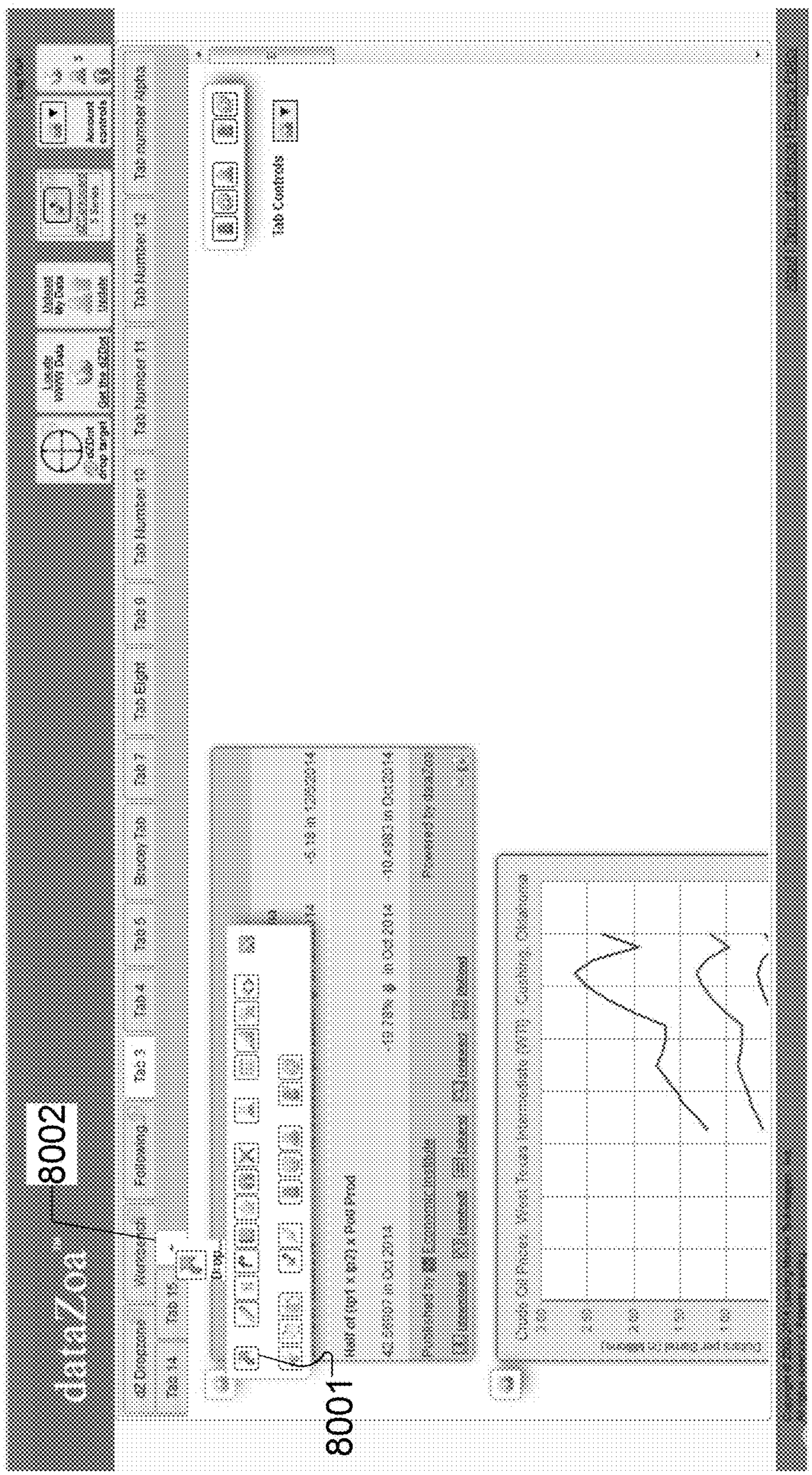
FIG. 80 is a representation of a display of a web page of a user's account, in accordance with an embodiment of the present invention, which shows the creation of a new tab by dragging and dropping the upward pointing blue arrow control from any embed in a pre-existing tab or from a dataBlock in the dZ Dropzone onto the tab bearing the + sign, which results in a tab being created with the next successive number, in this case "Tab 16", which the user can then rename using the Tab Controls pull-down menu depicted in FIG. 55.

FIG. 80 is a representation of a display of a web page of a user's account, in accordance with an embodiment of the present invention, which shows the creation of a new tab by dragging and dropping the upward pointing blue arrow control 8001 from any embed in a pre-existing tab or from a dataBlock in the dZ Dropzone onto the tab bearing the + sign 8002, which results in a tab being created with the next successive number, in this case "Tab 16", which the user can then rename using the Tab Controls pull-down menu depicted in FIG. 55. The automatic generation of a new tab in response to the user dragging and dropping a DataZoa display or dataBlock from the dZ Dropzone facilitates the user's ability to organize their work and generate different views and scenarios from data in their account.

Figure 81:
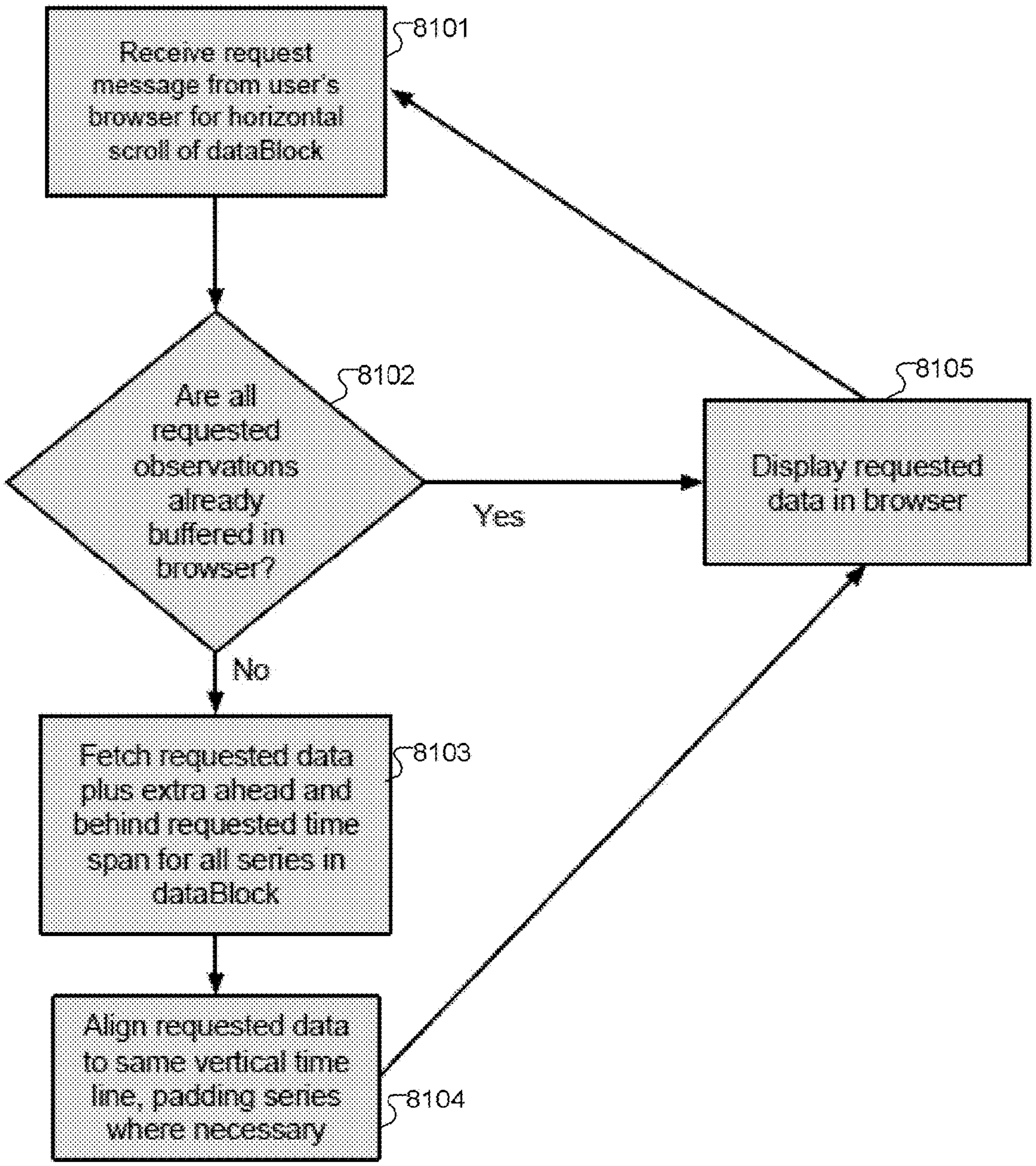
FIG. 81 is a block diagram of logical flow in connection with an embodiment of the present invention wherein the "horizontal scroll" functionality has been invoked with respect to a dataBlock display of time series data.

FIG. 81 is a block diagram of logical flow in connection with an embodiment of the present invention wherein the "horizontal scroll" functionality (afforded by control 3906 of FIG. 39) has been invoked with respect to a dataBlock display of time series data. When the scroll is invoked, a message is received by process 8101 running on a DataZoa peer server (17 of FIG. 1). Process 8102 determines whether data sufficient to fulfill the request has been sent in response to an earlier similar request. If sufficient, a message is returned to the browser in process 8105 indicating which extant data to display. If not sufficient, process 8103 fetches sufficient data plus extra data before and after the specified timespan to be displayed, if available. Process 8104 conditions the data to be returned by aligning and if necessary, padding all the requested series so that they comprise a complete rectangular block of data, where each row represents a portion of a requested series and each column aligns the data observation appropriate for a given time period. Process 8105 then returns the conditioned data and formatting instructions to the browser.

Figure 82:
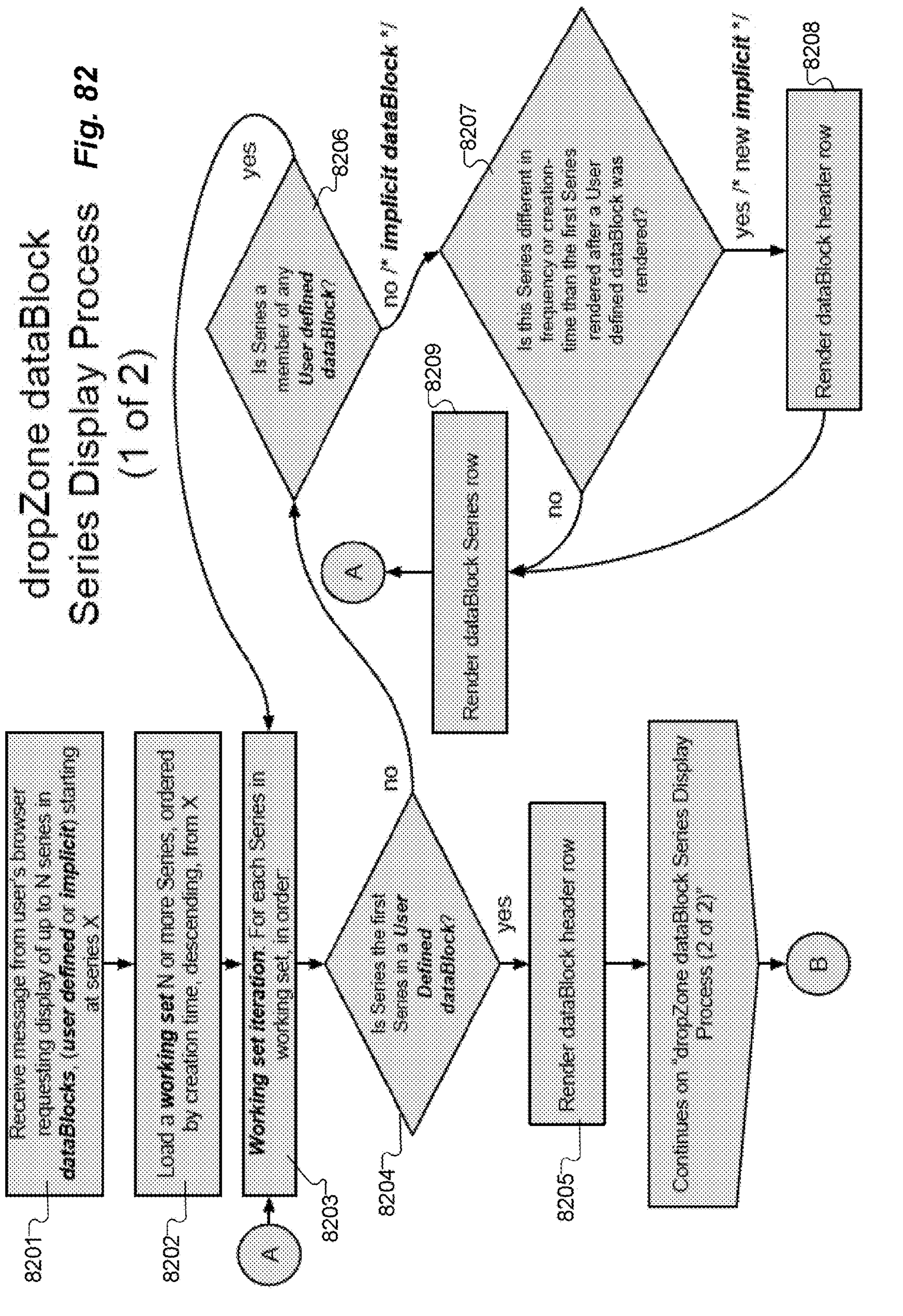
FIG. 82 is the first of two block diagrams which together represent the logical flow in connection with an embodiment of the present invention wherein the dropZone display tab has been invoked to display an ordered set of time series data, dynamically organized into an ordered set of dataBlocks, which dataBlocks comprise either explicit user defined groupings or implicit groupings.

FIG. 82 is the first of two block diagrams which together represent the logical flow in connection with an embodiment of the present invention wherein the dropZone display tab (FIG. 39) has been invoked to display an ordered set of time series data, dynamically organized into an ordered set of dataBlocks, which dataBlocks comprise either explicit user defined groupings or implicit groupings. When the display is invoked, a message is received by process 8201 running on a DataZoa peer server (17 of FIG. 1). Process 8202 fetches a working set of data that is likely (but not guaranteed) to include all of the data series required to fulfill the request. Process 8203 iterates over this working set series-by-series, in reverse order of the creation time of the series. For each iteration, the subject of the iteration is called the "current series" in this description. Process 8204 determines whether the current series is the first series in a "user defined dataBlock" (as created in the processes in FIG. 84). If so, a dataBlock header row (3913 of FIG. 39) is rendered for display, and then flow passes to FIG. 83 at entry point "B" for further processing. If not, process 8206 determines whether the current series is a member of any user defined dataBlock. If so, control is simply returned to iterator process 8203. If not a member of any user defined dataBlock, the current series is a member of an implicit dataBlock, and is passed to Process 8207. Process 8207 determines whether the current series is a continuation of an implicit dataBlock currently being rendered, by determining that the prior series rendered, if any was itself part of an implicit dataBlock, and if so, whether the current and prior series have the same frequency and creation time. If a continuation of an implicit dataBlock, the current row is rendered by process 8209. If not a continuation, a dataBlock header row is rendered by process 8208.

Figure 83:
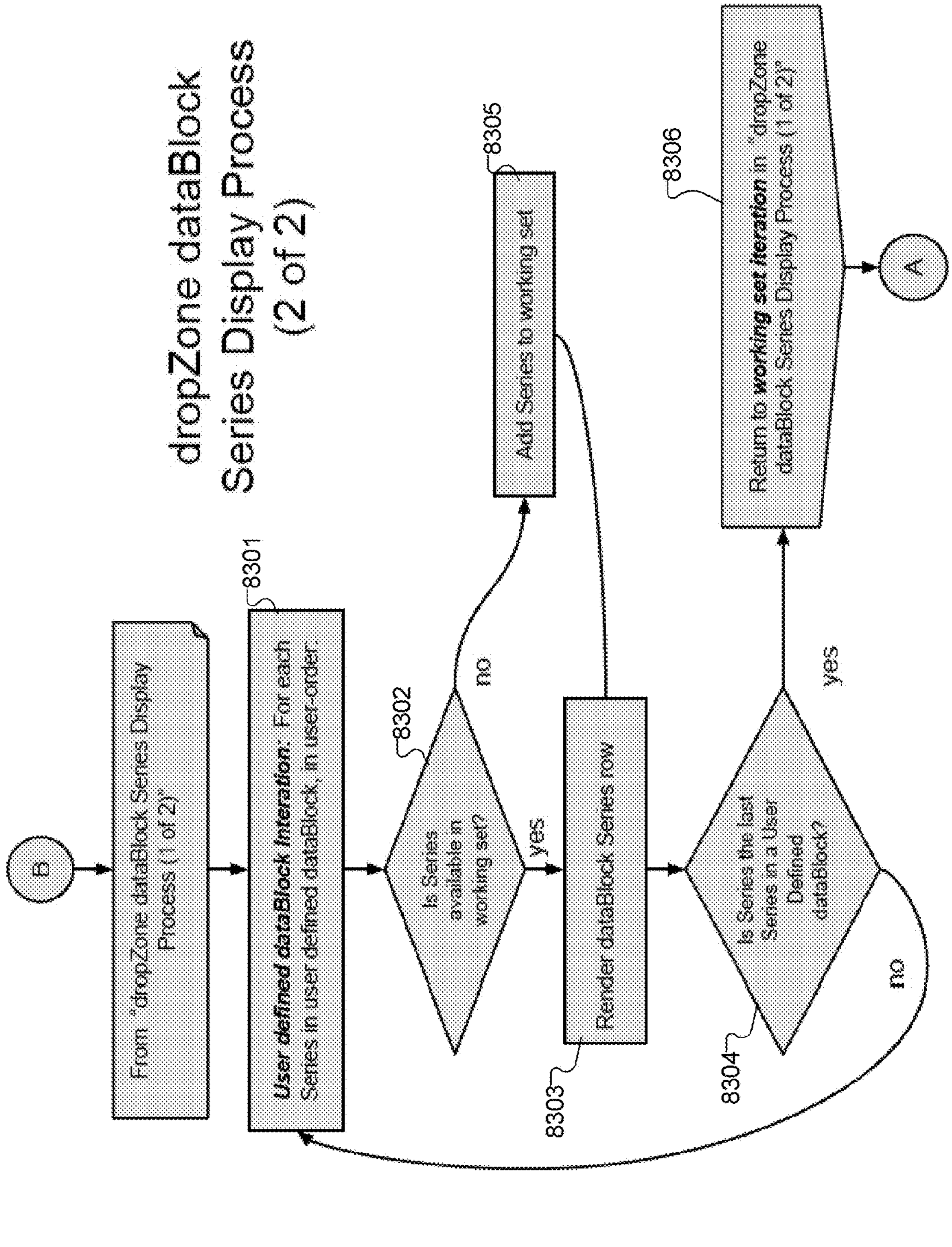
FIG. 83 is the second of two block diagrams which together represent the logical flow in connection with an embodiment of the present invention wherein the dropZone tab has been invoked to display an ordered set of time series data, dynamically organized into an ordered set of dataBlocks, which dataBlocks comprise either explicit user defined groupings or implicit groupings.

FIG. 83 is the second of two block diagrams which together represent the logical flow in connection with an embodiment of the present invention wherein the dropZone tab (FIG. 39) has been invoked to display an ordered set of time series data, dynamically organized into an ordered set of dataBlocks, which dataBlocks comprise either explicit user defined groupings or implicit groupings. The "current series" from FIG. 82 is passed to entry point "B" where process 8301 continues to iterate over the members of the user defined dataBlock series-by-series, in the order explicitly defined by that dataBlock. For each iteration, the subject of the iteration is called the "member series" in this description. Process 8302 determines whether the member series is present in the working set. If not, process 8305 adds it to the working set. Process 8303 then renders the series as a dataBlock row. Process 8304 determines whether the current member is the last member if its user defined dataBlock. If not, control is returned to the iterator Process 8301. If so, flow passes to FIG. 82 entry point "A" for further processing.

Figure 84:
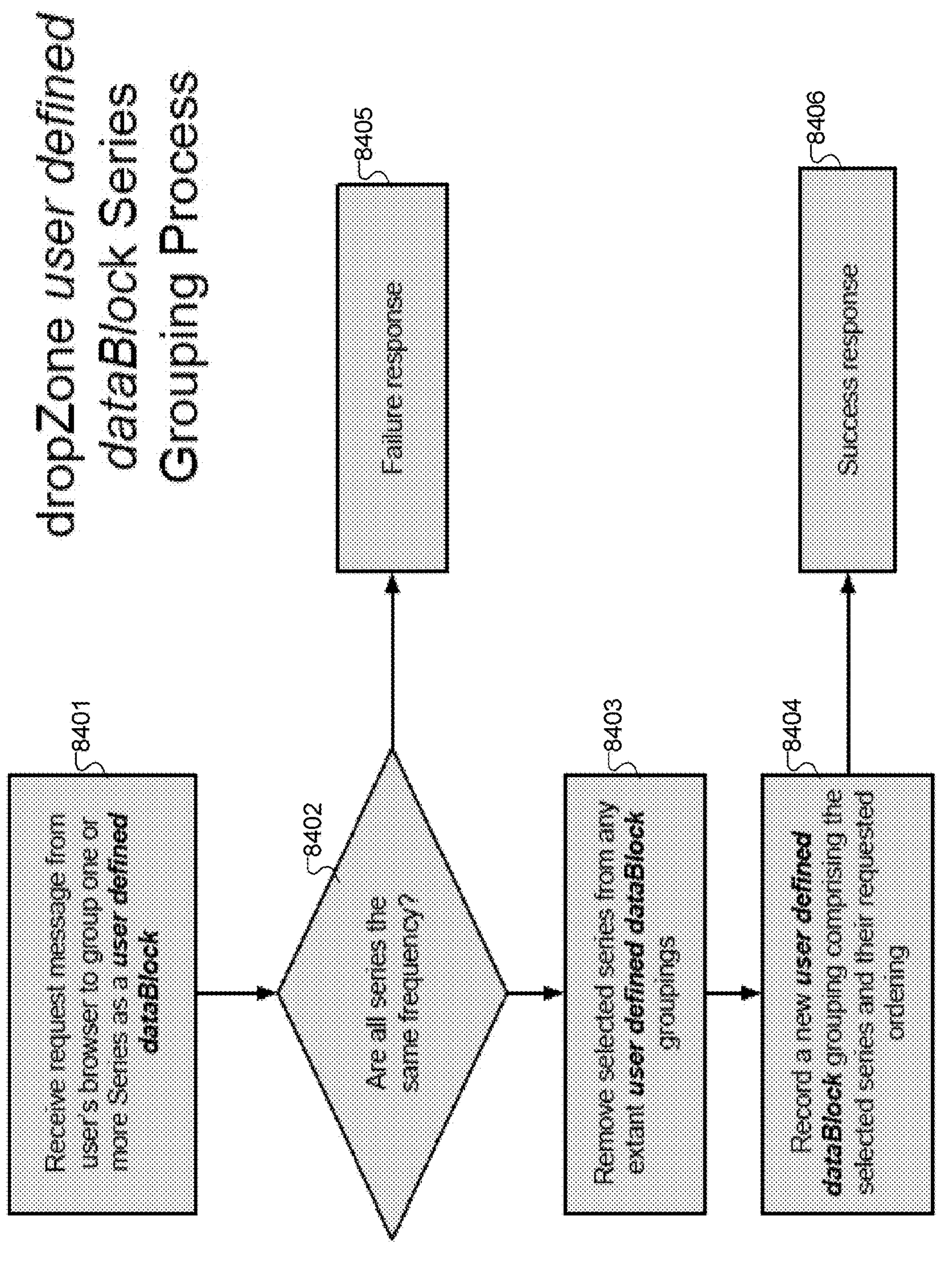
FIG. 84 is a block diagram of logical flow in connection with an embodiment of the present invention wherein the user defined dataBlock grouping functionality in the dropZone tab has been invoked to create an explicitly ordered set of time series data.

FIG. 84 is a block diagram of logical flow in connection with an embodiment of the present invention wherein the user defined dataBlock grouping functionality in the dropZone tab has been invoked to create an explicitly ordered set of time series data. When the functionality is invoked (afforded by control 4003 of FIG. 40), a message is received by process 8401 running on a DataZoa peer server (17 of FIG. 1). This message includes reference to a set of series called "proposed members" in this description. Process 8402 determines whether all proposed members share the same frequency. If not, a failure response is returned by process 8405. If so, process 8304 scans each existing user defined dataBlock, and if any of its members is a proposed member, that member is removed from the existing dataBlock. Process 8304 records the proposed members as a new dataBlock. Process 8406 then returns a success response.

Figure 85:
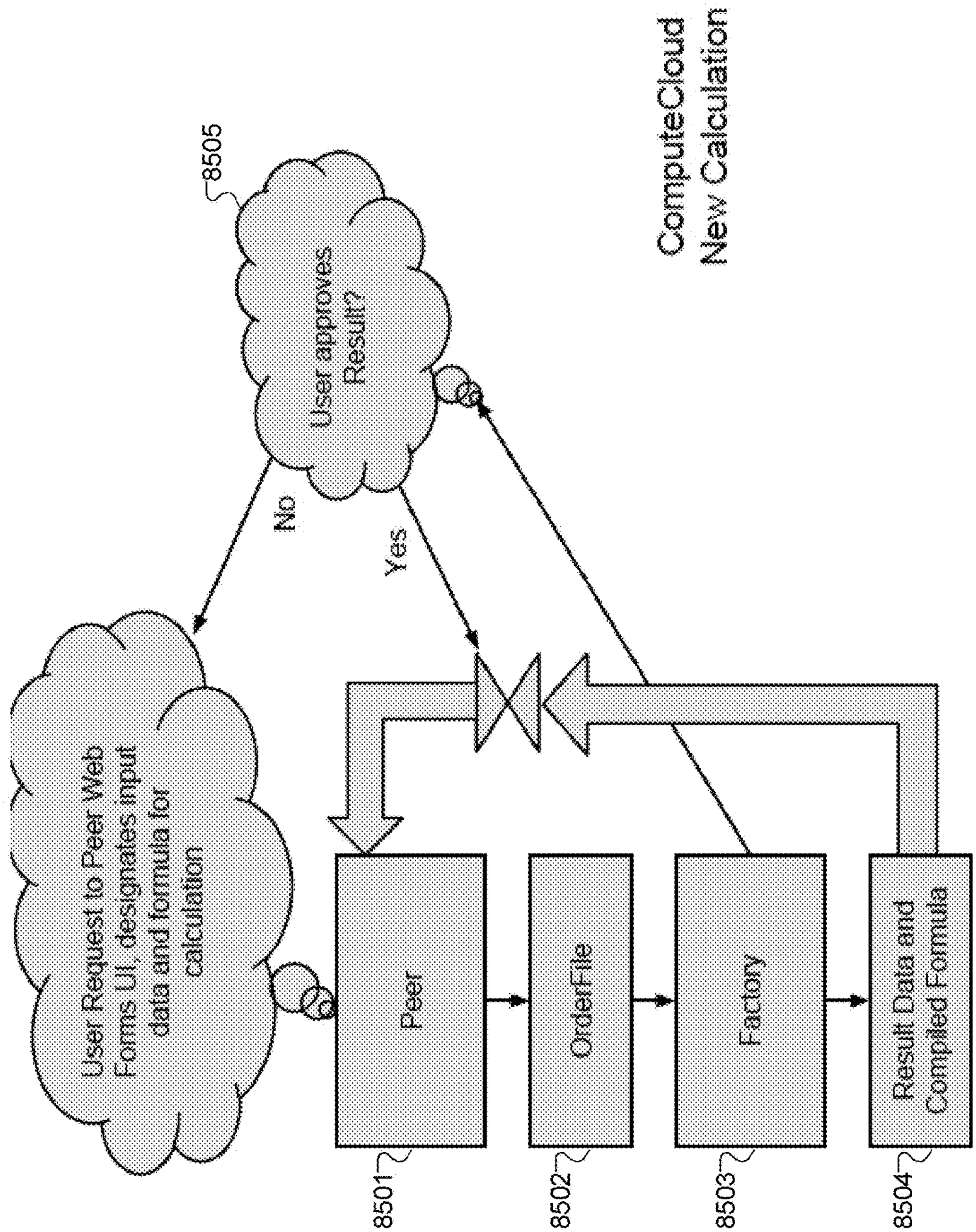
FIG. 85 is a block diagram of logical flow in connection with an embodiment of the present invention wherein the "ComputeCloud" functionality has been invoked to create a new ComputeCloud calculation, which functionality includes an iterative review and approval process by the user.

FIG. 85 is a block diagram of logical flow in connection with an embodiment of the present invention wherein the "ComputeCloud" functionality has been invoked (4409 of FIG. 44) to create a new ComputeCloud calculation, which functionality includes an iterative review and approval process by the user. When the functionality is invoked, a message is received by process 8501 running on a DataZoa peer server (17 of FIG. 1). Process 8502 formats the message as an "order file" containing the formula for the calculation. Process 8504 delivers the order file to a calculation Factory (entry point "A" of FIG. 87) for evaluation by the DataZephyr compute engine. The DataZephyr compute engine is a server-based implementation of stand-alone DataZephyr-Pro software, which is a PC-based software tool, for viewing, comparing, and making calculations using time series data, available from Leading Market Technologies, Inc. of Boston, Mass. The server-based version of DataZephyr-Pro software implements all functionality of the PC-based software except for some functions that are peculiar to the PC environment, such as PRINT, READA( ), etc. The reference manual for DataZephyr-Pro is reproduced in a document attached hereto and incorporated herein by reference as Appendix A. The help screens for DataZephyr, a simplified version of DataZephyrPro, are reproduced in the document attached hereto and incorporated herein by reference as Appendix B. In the event of any inconsistency between the content of Appendices A and B and the body of this description, the body of this description shall govern. Process 8505 receives the result of the evaluation. In callout 8507, the user's browser also receives the result of the factory evaluation and the user then can cause a message to be sent indicating approval of the result 4410 or 4412 of FIG. 44). If an approval message is received by gate 8508, the results from 8505 are committed to the peer hosting process 8502. If the user does not approve, flow returns to the user web forms of FIG. 44.

Figure 86:
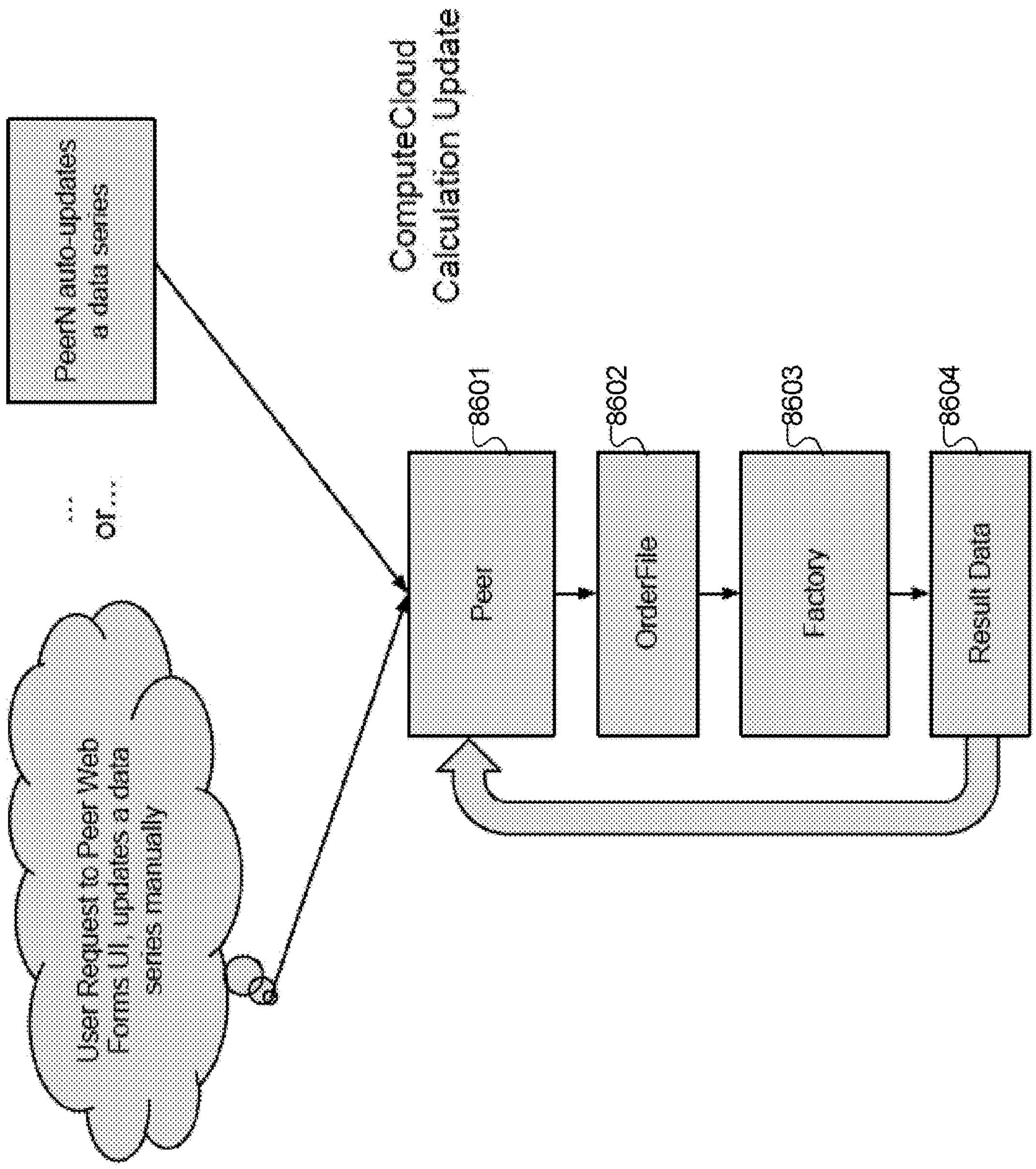
FIG. 86 is a block diagram of logical flow in connection with an embodiment of the present invention wherein the "ComputeCloud" functionality has been invoked, either by the user or an automatic process, to update an existing ComputeCloud calculation that depends on the data that was updated.

FIG. 86 is a block diagram of logical flow in connection with an embodiment of the present invention wherein the "ComputeCloud" functionality has been invoked, either by the user when updating series values (FIG. 30) or by an automatic process updating series values (FIG. 35), to update an existing ComputeCloud calculation that depends on the data that was updated. When the functionality is invoked, a message is received by process 8601 running on a DataZoa peer server (17 of FIG. 1). Process 8602 formats the message as an "order file" containing the formula for the calculation. Process 8503 delivers the order file to a calculation Factory (entry point "A" of FIG. 87) for evaluation by the DataZephyr compute engine. Process 8504 receives the result of the evaluation and delivers it for storage on the DataZoa peer hosting process 8601.

Figure 87:
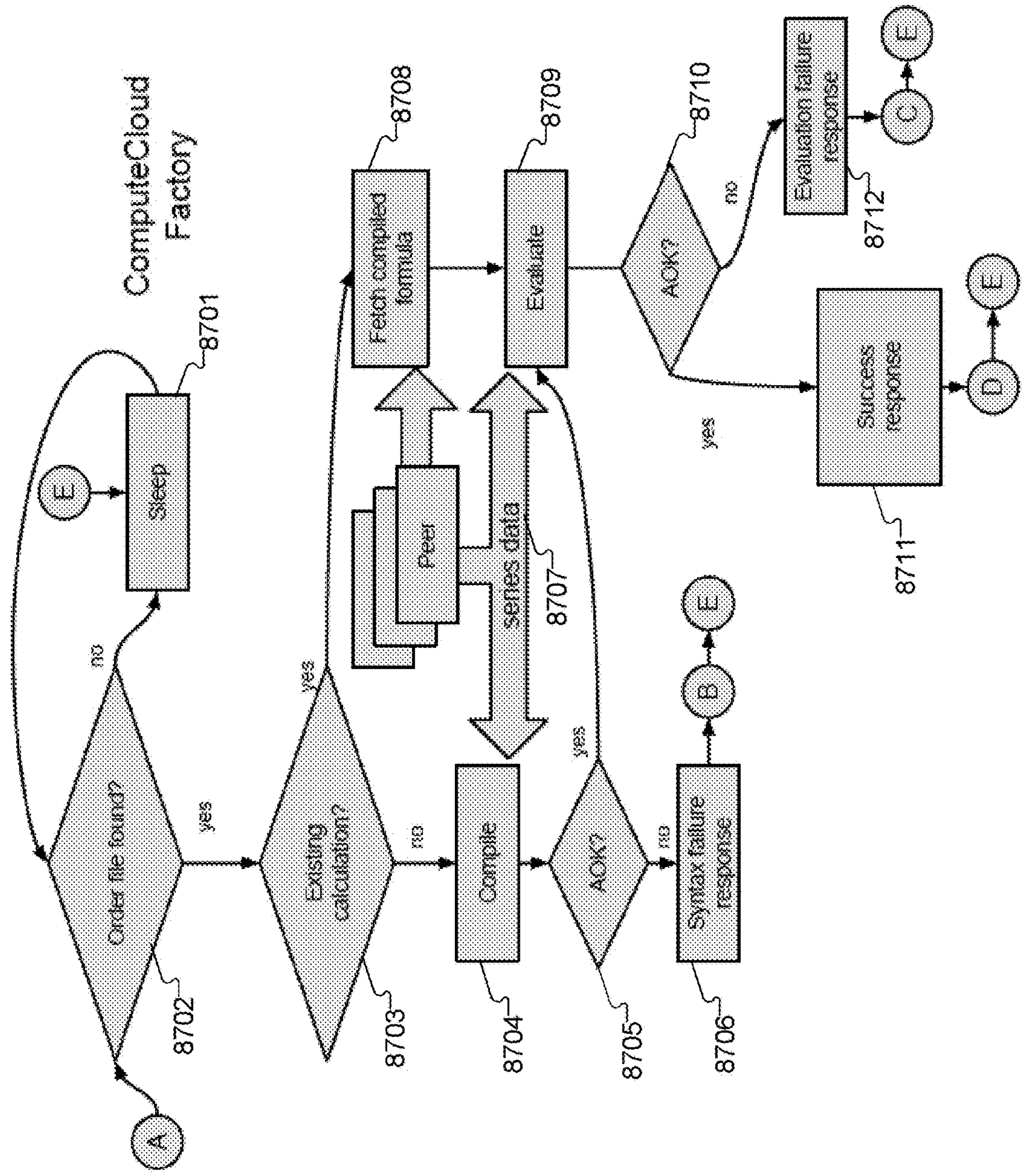
FIG. 87 is a block diagram of logical flow in connection with an embodiment of the present invention wherein the DataZoa ComputeCloud factory is invoked to evaluate a set of input time series according to a user defined mathematical formula and return a result series along with a compiled form of same.

FIG. 87 is a block diagram of logical flow in connection with an embodiment of the present invention wherein the DataZoa ComputeCloud factory is invoked to evaluate a set of input time series according to a user defined mathematical formula and return a result series along with a compiled form of same. Process 8701 polls idly until process 8702 discovers an "order file" placed in a special location. Process 8703 determines whether the order references a new or existing calculation. If the calculation is already existing, process 8708 fetches the compiled formula from storage on the appropriate peer 8707. Process 8709 then retrieves required data series from the appropriate peer(s) 8707 and in process 8709 evaluates the formula with that data using the DataZephyr compute engine. Process 8710 determines whether the evaluation was successful. If not, process 8711 provides a failure response to exit point C and control passes back to entry point A. If the evaluation is successful, process 8712 provides a success response to exit point D and control passes back to entry point E. If process 8703 determined that the calculation is new, process 8704 compiles the formula and checks all data references on the appropriate peer(s) 8707. If the compilation is successful, control passes to process 8709 for evaluation. If the compilation is not successful, process 8706 provides a failure response at exit point B and control passes back to entry point E.

Figure 88:
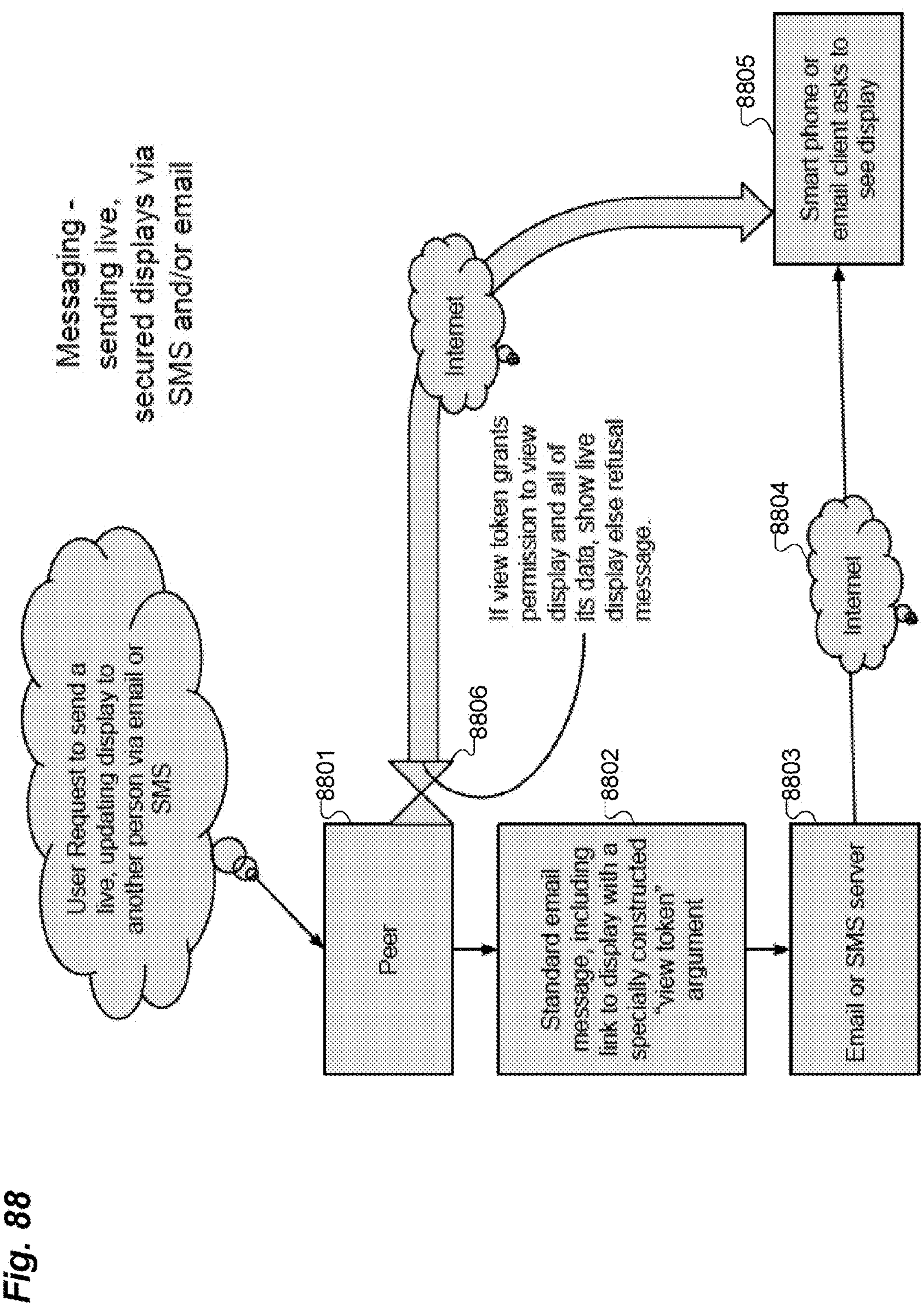
FIG. 88 is a block diagram of logical flow in connection with an embodiment of the present invention wherein the functionality for sending live, secured displays has been invoked.

FIG. 88 is a block diagram of logical flow in connection with an embodiment of the present invention wherein the functionality for sending live, secured displays has been invoked (FIG. 54). When the functionality is invoked, a message is received by process 8801 running on a DataZoa peer server (17 of FIG. 1). Process 8802 prepares a standard email or SMS message with a special "view token" argument. The message is dispatched to the internet 8804 by process 8803. The receiving process 8805, running on an independent device, contacts the originating peer 8801 asking to render the display. The gating process 8806 evaluates the "view token" and other forwarded information to determine whether the display is permitted to be shown in this context, returning either the display or a refusal response.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method for providing a user interface for defining, on a client computer by a given user having a user account, a mathematical manipulation of a set of time series and for obtaining results of such manipulation, wherein the time series are subject to being updated, the method comprising:

maintaining, and repeatedly updating, in normative formats, on a time series server, the time series server being a web server configured to store and serve time series data for a plurality of users, wherein each user has a separate user account by which such user can store and access time series data using web pages, each member of the set of time series;

serving by the time series server a distinct time series name for each member of the set of time series in a web page over a wide area network to the client computer for display in a browser thereof in such a manner that, when the given user graphically selects the name of a given one of the time series in the browser for invoking a functionality provided by the time series server, there is provided to the server by the browser a unique location identifier of an underlying location, of the selected time series, wherein data for the time series is stored on the server;

causing, by the time series server, display, in the browser running on the client computer, along with the time series names, of a graphical mechanism to invoke a set of tools, accessible to the given user by which the user can define in the browser an expression that implements the mathematical manipulation;

receiving, by the time series server, from the browser of the client computer over the wide area network an expression message corresponding to the expression defined by the user via the set of tools;

storing by the time series server, in association with the user's account, expression data, in the expression message characterizing the user-defined expression, wherein the expression data utilizes the unique location identifiers for the time series;

on receipt by the time series server of an access request message, by the user, from a given client computer, to access the expression from the user's account, initiating an evaluation process to evaluate the expression, using the time series data as it has been updated from time to time by the time series server, and storing the resulting evaluation of the expression using the updated time series data; and serving by the time series server, responsive to the access request message, over the wide area network, to the given client computer, the resulting evaluation of the expression using the updated time series data.

2. The computer-implemented method according to claim 1, wherein serving by the time series server a distinct time series name for each member of the set of time series in a web page includes serving the web page configured with a listing of names of distinct time series from which the set of time series is graphically selectable by the user.

3. The computer-implemented method according to claim 2, further comprising causing, by the time series server, display in the client browser, after the set of time series has been graphically selected by the user, of a web page in which each member of the set is labeled with a short designation as a distinct variable so as to facilitate user entry of the expression.

4. The computer-implemented method according to claim 2, further comprising, responsive to user selection, causing, by the time series server display in the client browser of: times series that are descendants of a selected time series, time series that are ancestors of a selected series of the selected time series, time series that are immediate parents of the selected time series, and time series that are immediate children of the selected time series.

5. The computer-implemented method according to claim 1, wherein the set of tools includes a designator of an average of the series entries and a designator of a sum of the series entries, and the evaluation process is configured to handle algebraic notation and operations, so that the expression defined by the user can employ algebraic notation and operations.

6. A computer-implemented method for providing a user interface, on a client computer of a given user having an account, for saving, grouping, and accessing time series, wherein the time series are subject to being updated, the method comprising:

maintaining, and repeatedly updating, in normative formats, on a time series server, the time series server being a web server configured to store and serve time series data for a plurality of users, wherein each user has a separate user account by which such user can store and access time series data using web pages, each member of a set of time series; and serving by the time series server a distinct time series name for each member of the set of time series in a first web page over a wide area network to the client computer for display in a browser thereof in such a manner that, when the given user graphically selects the name of a given one of the time series in the browser for invoking a functionality provided by the time series server, there is provided to the server by the browser a unique location identifier of an underlying location, of the selected time series, wherein data for the time series is stored on the server;

causing, by the time series server, display, in the first web page, of a plurality of tabs, each tab, when selected, causing display of a different web page providing a different view of items associated with the user's account, the plurality of tabs also being visible in each of the different web pages, wherein a first tab invokes the first web page and a second tab invokes a user-defined second web page into which a user can add user-selected time series data.

7. The method according to claim 6, wherein the user can add a plurality of user-defined tabs to invoke a plurality of user-defined web pages to accommodate user-selected time series data, and wherein the plurality of tabs is a quantity definable by the user according to needs of the user.

* * * * *